(12) United States Patent
Kimura et al.

(10) Patent No.: US 11,803,074 B2
(45) Date of Patent: Oct. 31, 2023

(54) DISPLAY DEVICE

(71) Applicant: Semiconductor Energy Laboratory Co., Ltd., Atsugi (JP)

(72) Inventors: Hajime Kimura, Atsugi (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/356,791

(22) Filed: Jun. 24, 2021

(65) Prior Publication Data

US 2021/0373372 A1 Dec. 2, 2021

Related U.S. Application Data

(60) Continuation of application No. 16/023,080, filed on Jun. 29, 2018, now Pat. No. 11,048,111, which is a
(Continued)

(30) Foreign Application Priority Data

Mar. 27, 2015 (JP) ................. 2015-066887
Apr. 13, 2015 (JP) ................. 2015-081398

(51) Int. Cl.
*G02F 1/1333* (2006.01)
*G06F 3/044* (2006.01)
*G06F 3/041* (2006.01)

(52) U.S. Cl.
CPC ........ *G02F 1/13338* (2013.01); *G06F 3/0412* (2013.01); *G06F 3/0445* (2019.05); *G06F 3/0446* (2019.05); *G06F 3/04166* (2019.05)

(58) Field of Classification Search
CPC ...... G06F 3/044; G06F 3/0412; G06F 3/0416; G06F 1/13338
See application file for complete search history.

(56) References Cited

U.S. PATENT DOCUMENTS 7,449,833 B2  11/2008  Kobayashi
7,674,650 B2   3/2010  Akimoto et al.
(Continued)

FOREIGN PATENT DOCUMENTS

CN  101681221 A  3/2010
CN  101825966 A  9/2010
(Continued)

OTHER PUBLICATIONS

International Search Report (Application No. PCT/IB2016/051496) dated Jul. 5, 2016.
(Continued)

*Primary Examiner* — Stephen G Sherman
(74) *Attorney, Agent, or Firm* — ROBINSON INTELLECTUAL PROPERTY LAW OFFICE; Eric J. Robinson

(57) ABSTRACT

A touch panel which is thin, has a simple structure, or is easily incorporated into an electronic device is provided. The touch panel includes a first substrate, a second substrate, a first conductive layer, a second conductive layer, a third conductive layer, a fourth conductive layer, liquid crystal, and an FPC. The first conductive layer has a function of a pixel electrode. The second conductive layer has a function of a common electrode. The third and fourth conductive layers each have a function of an electrode of a touch sensor. The FPC is electrically connected to the fourth conductive layer. The first, second, third, and fourth conductive layers and the liquid crystal are provided between the first and second substrates. The first, second, and third conductive layers are provided over the first substrate. The FPC is provided over the first substrate.

18 Claims, 92 Drawing Sheets

Related U.S. Application Data division of application No. 15/077,009, filed on Mar. 22, 2016, now Pat. No. 10,067,621.

(56) References Cited

U.S. PATENT DOCUMENTS

| | | | |
|---|---|---|---|
| 7,732,819 B2 | 6/2010 | Akimoto et al. |
| 7,859,521 B2 | 12/2010 | Hotelling et al. |
| 7,868,543 B2 | 1/2011 | Kobayashi |
| 7,910,490 B2 | 3/2011 | Akimoto et al. |
| 7,920,129 B2 | 4/2011 | Hotelling et al. |
| 7,932,521 B2 | 4/2011 | Akimoto et al. |
| 7,995,041 B2 | 8/2011 | Chang |
| 8,217,913 B2 | 7/2012 | Hotelling et al. |
| 8,243,027 B2 | 8/2012 | Hotelling et al. |
| 8,274,077 B2 | 9/2012 | Akimoto et al. |
| 8,363,027 B2 | 1/2013 | Hotelling et al. |
| 8,466,463 B2 | 6/2013 | Akimoto et al. |
| 8,502,799 B2 | 8/2013 | Hotelling et al. |
| 8,629,069 B2 | 1/2014 | Akimoto et al. |
| 8,669,550 B2 | 3/2014 | Akimoto et al. |
| 8,692,283 B2 | 4/2014 | Nakanishi et al. |
| 8,780,078 B2 | 7/2014 | Kim et al. |
| 8,786,557 B2 | 7/2014 | Noguchi et al. |
| 8,790,959 B2 | 7/2014 | Akimoto et al. |
| 8,796,069 B2 | 8/2014 | Akimoto et al. |
| 9,099,562 B2 | 8/2015 | Akimoto et al. |
| 9,128,568 B2 | 9/2015 | Long et al. |
| 9,134,560 B2 | 9/2015 | Hotelling et al. |
| 9,140,922 B2 | 9/2015 | Noguchi et al. |
| 9,158,398 B2 | 10/2015 | Jeong et al. |
| 9,304,639 B2 | 4/2016 | Ishizaki et al. |
| 9,395,831 B2 | 7/2016 | Kim et al. |
| 9,449,992 B2 | 9/2016 | Kim et al. |
| 9,483,987 B2 | 11/2016 | Kawachi et al. |
| 9,626,060 B2 | 4/2017 | Ishizaki et al. |
| 10,067,624 B2 | 9/2018 | Ishizaki et al. |
| 10,303,320 B2 | 5/2019 | Ishizaki et al. |
| 2002/0005928 A1 | 1/2002 | Hanakawa et al. |
| 2002/0008815 A1 | 1/2002 | Hanakawa et al. |
| 2008/0180584 A1* | 7/2008 | Utsunomiya ......... G06F 3/0412 349/12 |
| 2008/0278458 A1* | 11/2008 | Masuzawa ............ G06F 3/0445 345/174 |
| 2010/0026659 A1 | 2/2010 | Long et al. |
| 2010/0182273 A1 | 7/2010 | Noguchi et al. |
| 2010/0194697 A1 | 8/2010 | Hotelling et al. |
| 2010/0194699 A1 | 8/2010 | Chang |
| 2010/0194707 A1 | 8/2010 | Hotelling et al. |
| 2010/0289765 A1 | 11/2010 | Noguchi et al. |
| 2011/0025969 A1 | 2/2011 | Chen et al. |
| 2011/0187677 A1 | 8/2011 | Hotelling et al. |
| 2011/0228188 A1 | 9/2011 | Kim et al. |
| 2011/0273397 A1 | 11/2011 | Hanari |
| 2012/0262406 A1 | 10/2012 | Hotelling et al. |
| 2013/0106755 A1 | 5/2013 | Hotelling et al. |
| 2013/0271689 A1 | 10/2013 | Kim et al. |
| 2013/0300953 A1 | 11/2013 | Hotelling et al. |
| 2014/0055412 A1 | 2/2014 | Teramoto |
| 2014/0146013 A1 | 5/2014 | Noguchi et al. |
| 2014/0267159 A1 | 9/2014 | Miyazaki et al. |
| 2014/0292718 A1 | 10/2014 | Noguchi et al. |
| 2015/0022484 A1 | 1/2015 | Chiu et al. |
| 2015/0301422 A1 | 10/2015 | Miyake et al. |
| 2015/0363032 A1 | 12/2015 | Hotelling et al. |
| 2016/0274715 A1 | 9/2016 | Wang et al. |
| 2019/0278402 A1 | 9/2019 | Ishizaki et al. |

FOREIGN PATENT DOCUMENTS

| | | |
|---|---|---|
| CN | 201611416 U | 10/2010 |
| CN | 102171630 A | 8/2011 |
| CN | 102341774 A | 2/2012 |
| CN | 103365516 A | 10/2013 |
| CN | 103543898 A | 1/2014 |
| CN | 105117050 A | 12/2015 |
| EP | 2214084 A | 8/2010 |
| EP | 2650763 A | 10/2013 |
| EP | 2687963 A | 1/2014 |
| JP | 2005-209612 A | 8/2005 |
| JP | 2007-096055 A | 4/2007 |
| JP | 2007-123861 A | 5/2007 |
| JP | 2009-003916 A | 1/2009 |
| JP | 2009-244958 A | 10/2009 |
| JP | 2010-231773 A | 10/2010 |
| JP | 2011-197685 A | 10/2011 |
| JP | 2011-237489 A | 11/2011 |
| JP | 2012-517051 | 7/2012 |
| JP | 2013-068883 A | 4/2013 |
| JP | 2013-171369 A | 9/2013 |
| JP | 2013-222202 A | 10/2013 |
| JP | 2013-254515 A | 12/2013 |
| JP | 2014-021964 A | 2/2014 |
| JP | 2014-044537 A | 3/2014 |
| JP | 2014-109904 A | 6/2014 |
| JP | 2014-164185 A | 9/2014 |
| JP | 2014-178847 A | 9/2014 |
| JP | 2014-202959 A | 10/2014 |
| JP | 2014-232530 A | 12/2014 |
| JP | 2015-181018 A | 10/2015 |
| KR | 2010-0127164 A | 12/2010 |
| KR | 2011-0122726 A | 11/2011 |
| KR | 2011-0122727 A | 11/2011 |
| KR | 2013-0101141 A | 9/2013 |
| KR | 2014-0010799 A | 1/2014 |
| KR | 2014-0096905 A | 8/2014 |
| KR | 2015-0085123 A | 7/2015 |
| KR | 2016-0018862 A | 2/2016 |
| TW | 201001010 | 1/2010 |
| TW | 201031961 | 9/2010 |
| TW | 201044245 | 12/2010 |
| TW | 201405403 | 2/2014 |
| TW | 201423541 | 6/2014 |
| TW | 201441732 | 11/2014 |
| WO | WO-2009/119664 | 10/2009 |
| WO | WO-201 0/014783 | 2/2010 |
| WO | WO-201 0/088666 | 8/2010 |
| WO | WO-2010/088670 | 8/2010 |

OTHER PUBLICATIONS

Written Opinion (Application No. PCT/IB2016/051496) dated Jul. 5, 2016.

Taiwanese Office Action (Application No. 105108100) dated Feb. 25, 2020.

* cited by examiner

Writing period

Sensing period

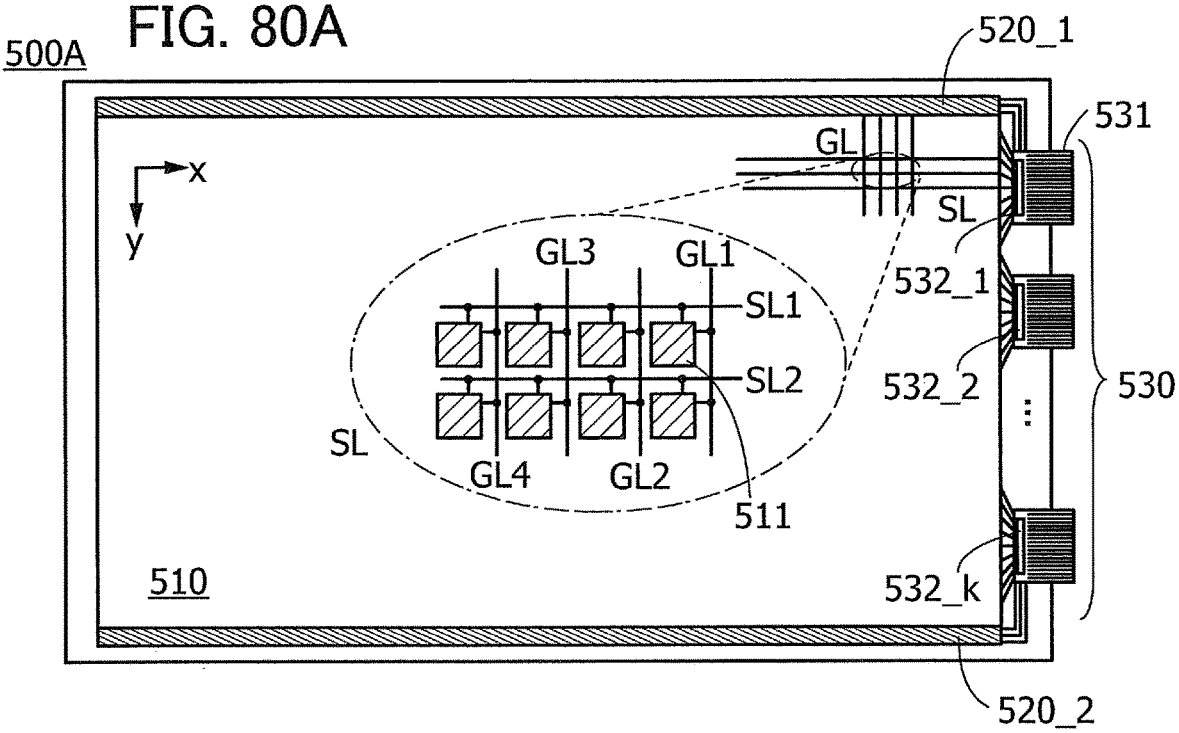
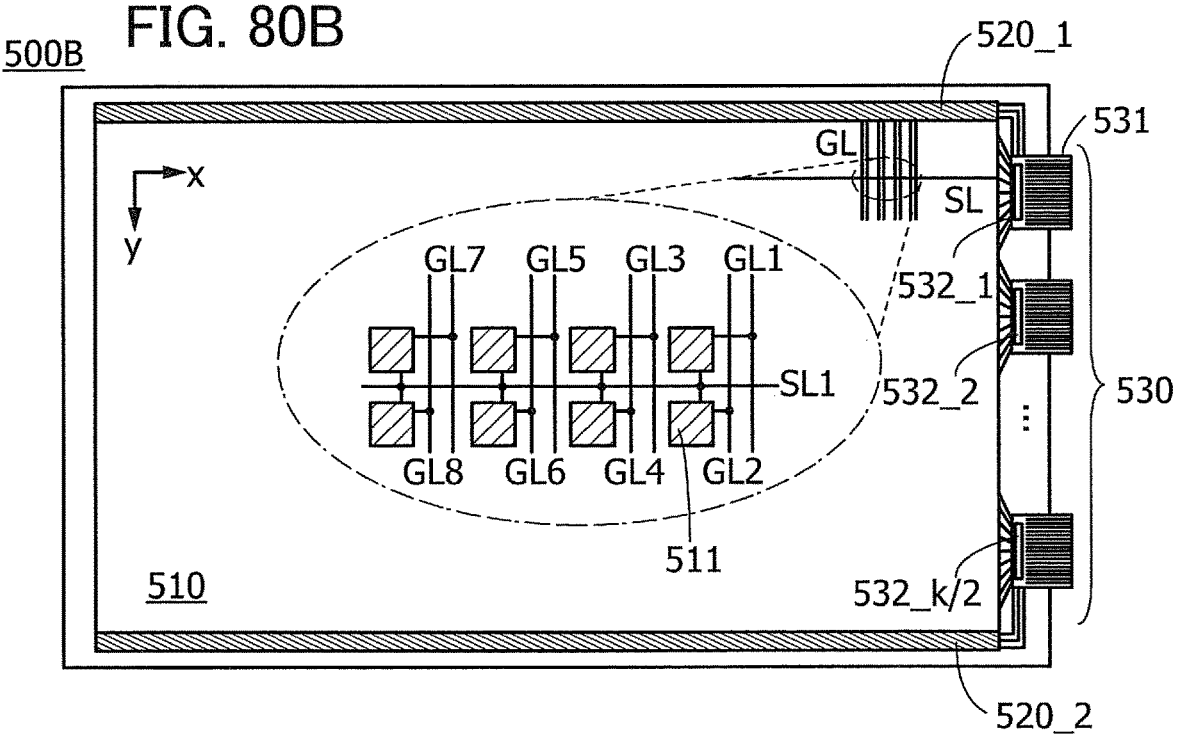

FIG. 81A1
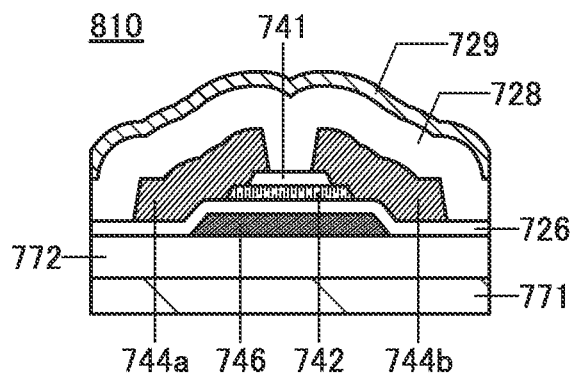
FIG. 81A2
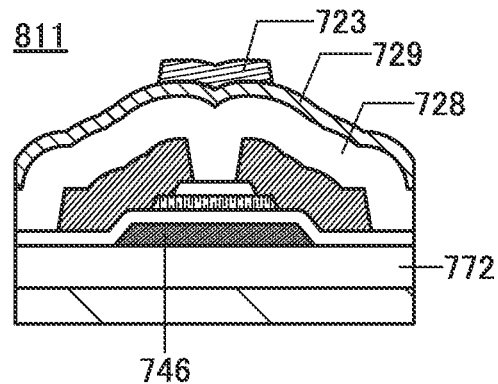
FIG. 81B1
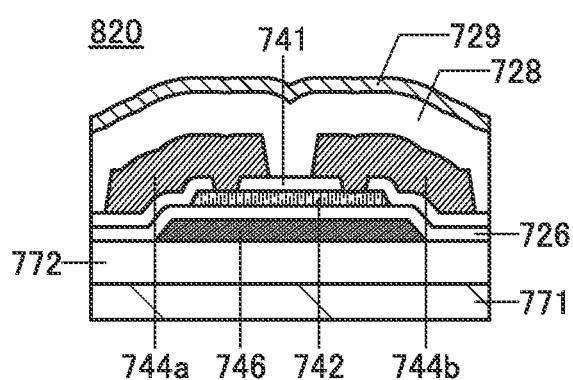
FIG. 81B2
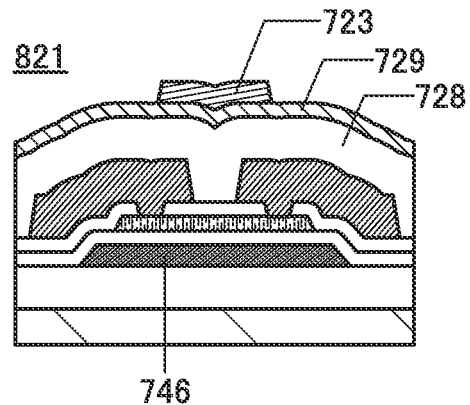
FIG. 81C1
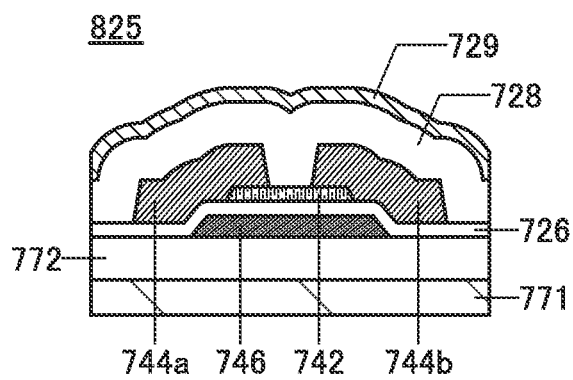
FIG. 81C2
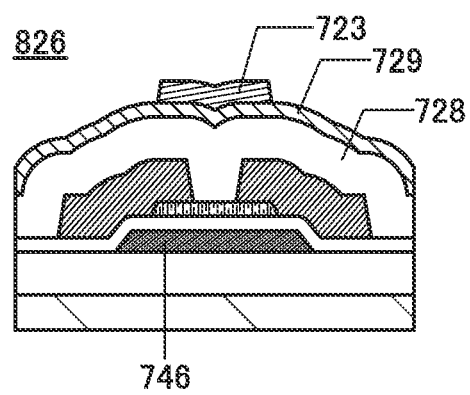

FIG. 82A1
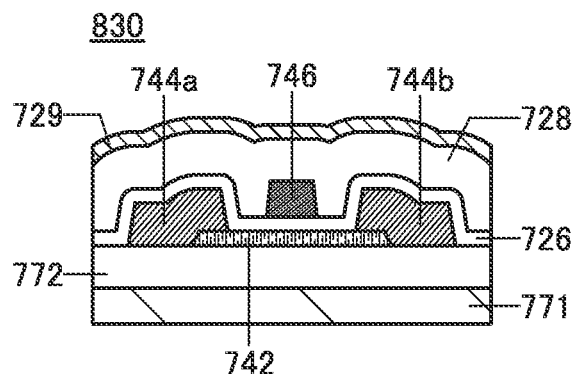
FIG. 82A2
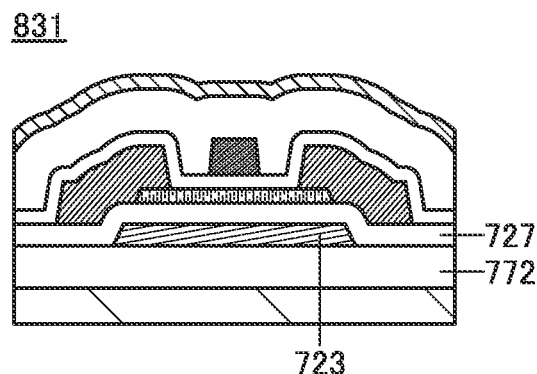
FIG. 82A3
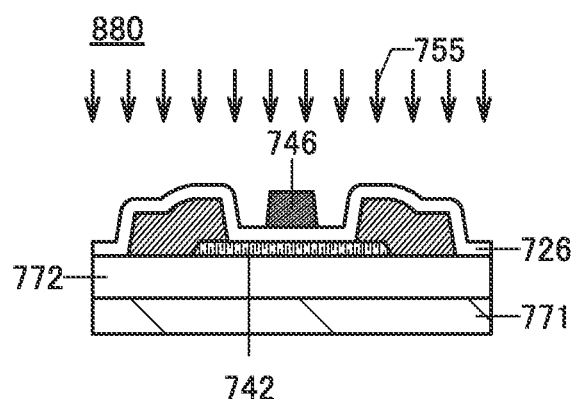
FIG. 82B1
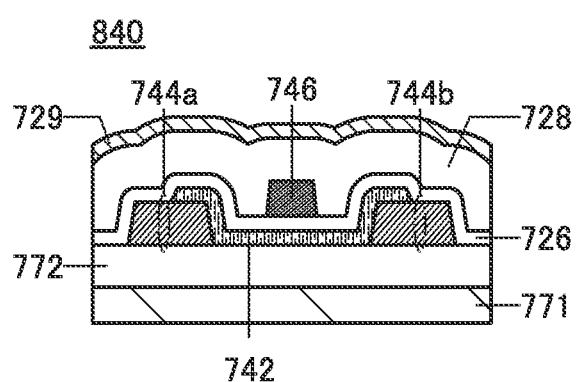
FIG. 82B2
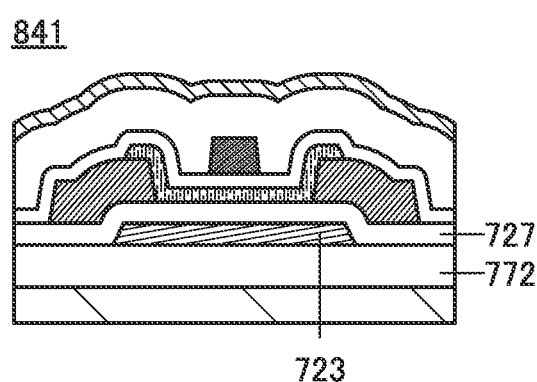

FIG. 83A1
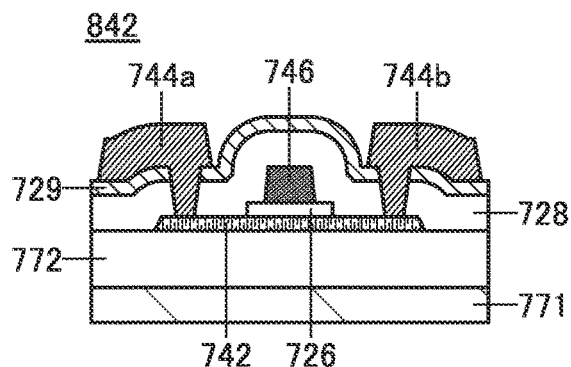
FIG. 83A2
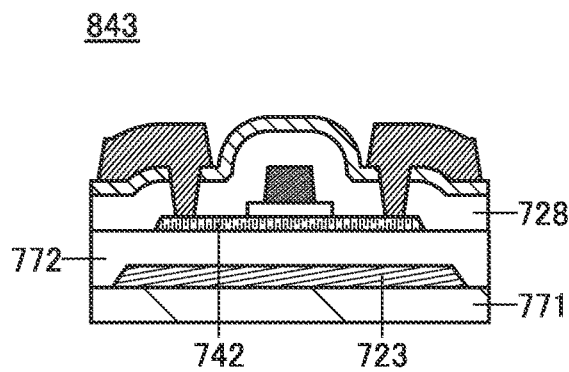
FIG. 83A3
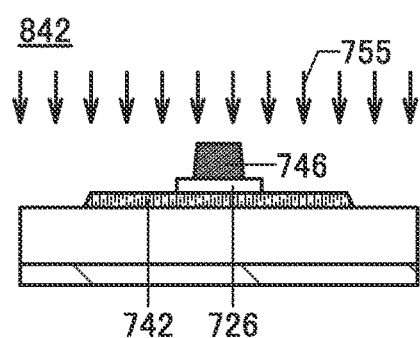
FIG. 83B1
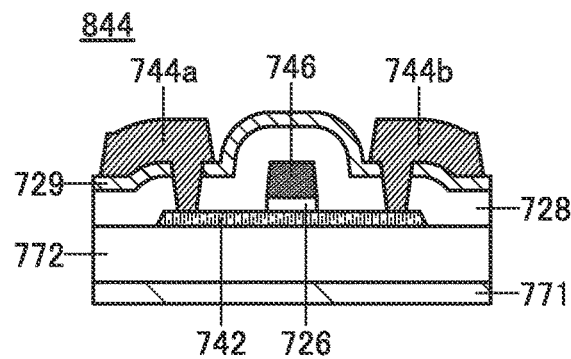
FIG. 83B2
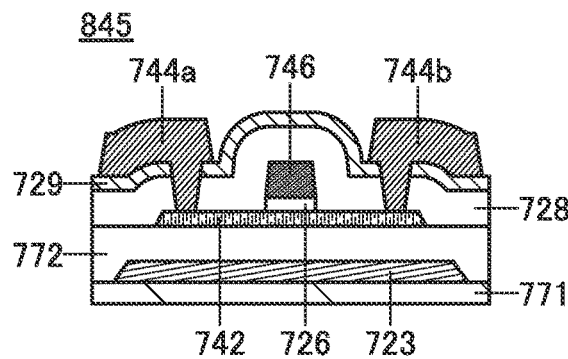
FIG. 83C1
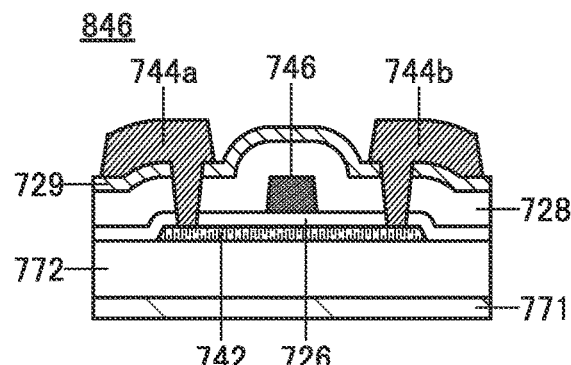
FIG. 83C2
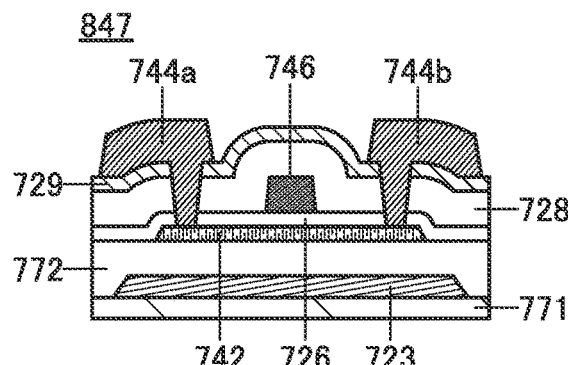

DISPLAY DEVICE

TECHNICAL FIELD

One embodiment of the present invention relates to an input device. One embodiment of the present invention relates to a display device. One embodiment of the present invention relates to an input/output device. One embodiment of the present invention relates to a touch panel.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an input device, an input/output device, an electro-optical device, a power generation device (including a thin film solar cell, an organic thin film solar cell, and the like), and an electronic device may each include a semiconductor device.

BACKGROUND ART

In recent years, a display device (or a display module) that is provided with a touch sensor as a position-input means has been put to practical use. A display device (or a display module) that is provided with a touch sensor is called a touch panel, a touch screen, or the like (hereinafter, this type of display device may be simply referred to as a touch panel). A device which does not include a display device and includes only a touch sensor is also called a touch panel in some cases. A display device that is provided with a touch sensor is also called a touch sensor equipped display device, a display device equipped touch panel, a display module, or the like in some cases. Furthermore, a display device in which a touch sensor is incorporated is called an in-cell touch sensor (or an in-cell touch sensor equipped display device), an on-cell touch sensor (or an on-cell touch sensor equipped display device), or the like in some cases. In the in-cell touch sensor, for example, an electrode used for a liquid crystal element is also used as an electrode for the touch sensor. In the on-cell touch sensor, for example, an electrode for the touch sensor is formed on the upper side (the side that is not provided with a display element) of a counter substrate. Examples of a portable information terminal provided with such a touch panel or the like include a smartphone and a tablet terminal.

As one of display devices, there is a liquid crystal display device provided with a liquid crystal element. For example, an active matrix liquid crystal display device in which pixel electrodes are arranged in a matrix and transistors are used as switching elements connected to respective pixel electrodes has attracted attention.

For example, active matrix liquid crystal display devices in which a transistor formed using a metal oxide for a channel formation region is used as each of switching elements connected to respective pixel electrodes are known (see Patent Documents 1 and 2).

Touch panels in which a liquid crystal element is used are disclosed in Patent Documents 3 to 6.

It is known that liquid crystal display devices are roughly divided into two kinds of liquid crystal display devices: a transmissive liquid crystal display device and a reflective liquid crystal display device.

In the transmissive liquid crystal display device, a backlight such as a cold cathode fluorescent lamp or an LED is used, and optical modulation action of liquid crystal is utilized to select one of the two states: a state where light from the backlight passes through liquid crystal to be output to the outside of the liquid crystal display device and a state where light is not output to the outside of the liquid crystal display device, whereby a bright or dark image is displayed. Furthermore, those images are combined to perform image display.

In the reflective liquid crystal display device, optical modulation action of liquid crystal is utilized to select one of the two states: a state where external light, that is, incident light is reflected on a pixel electrode to be output to the outside of the device and a state where incident light is not output to the outside of the device, whereby a bright or dark image is displayed. Furthermore, those images are combined to perform image display.

REFERENCE

Patent Documents

[Patent Document 1] Japanese Published Patent Application No. 2007-123861
[Patent Document 2] Japanese Published Patent Application No. 2007-096055
[Patent Document 3] Japanese Published Patent Application No. 2011-197685
[Patent Document 4] Japanese Published Patent Application No. 2014-044537
[Patent Document 5] Japanese Published Patent Application No. 2014-178847
[Patent Document 6] U.S. Pat. No. 7,920,129

DISCLOSURE OF INVENTION

What is desirable is a touch panel in which a display panel (a display device or a display module) is provided with a function of inputting data with a finger, a stylus, or the like touching a screen as a user interface.

Furthermore, it is required that an electronic device using a touch panel is reduced in thickness and weight. Therefore, a touch panel itself is required to be reduced in thickness and weight.

For example, in a touch panel, a touch sensor can be provided on the viewer side (the display surface side), that is, the side a finger or a pen (stylus) touches, of a display panel.

For example, in a touch panel (or a display module), a substrate provided with a touch sensor can be attached to the display surface side of a display panel. In other words, in a touch panel (or a display module), a display panel and a touch sensor can be separate components and can be attached to each other. However, in such a structure, a substrate for a touch sensor is needed in addition to a substrate for a display panel, resulting in that the thickness of a touch panel (or a display module) cannot be reduced and the number of components is increased.

An object of one embodiment of the present invention is to provide a thin touch panel (or a thin touch sensor equipped display device) and the like. Another object is to provide a touch panel (or a touch sensor equipped display device) with a simple structure and the like. Another object is to provide a touch panel (or a touch sensor equipped display device) which can be easily incorporated into an electronic device and the like. Another object is to provide a touch panel (or a touch sensor equipped display device) with a small number of components and the like. Another object is to provide a lightweight touch panel (or a lightweight touch sensor equipped display device) and the like.

Another object is to provide a novel input device. Another object is to provide a novel input/output device. Another object is to provide a novel display device. Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is a touch panel including a first substrate, a second substrate, a first conductive layer, a second conductive layer, a third conductive layer, a fourth conductive layer, liquid crystal, and an FPC. The first conductive layer has a function of a pixel electrode. The second conductive layer has a function of a common electrode. The third conductive layer and the fourth conductive layer each have a function of an electrode of a touch sensor. The FPC is electrically connected to the fourth conductive layer. The first conductive layer, the second conductive layer, the third conductive layer, the fourth conductive layer, and the liquid crystal are provided between the first substrate and the second substrate. The first conductive layer, the second conductive layer, and the third conductive layer are provided over the first substrate. The FPC is provided over the first substrate.

It is preferable that the above-described touch panel further include a fifth conductive layer and a connector, the fifth conductive layer be provided over the first substrate, the fourth conductive layer be provided over the second substrate, and the fourth conductive layer and the fifth conductive layer be electrically connected to each other through the connector.

It is preferable that the fourth conductive layer be provided over the first substrate.

It is preferable that one of the third conductive layer and the fourth conductive layer be provided on the same plane as the second conductive layer.

It is preferable that the third conductive layer be provided on the same plane as the first conductive layer or the second conductive layer and that the fourth conductive layer be provided on the same plane as the first conductive layer or the second conductive layer.

It is preferable that the second conductive layer and one of the third conductive layer and the fourth conductive layer be continuous.

It is preferable that the first conductive layer and one of the third conductive layer and the fourth conductive layer be continuous.

In accordance with one embodiment of the present invention, a thin touch panel (or a thin touch sensor equipped display device) and the like can be provided. A touch panel (or a touch sensor equipped display device) with a simple structure and the like can be provided. A touch panel (or a touch sensor equipped display device) which can be easily incorporated into an electronic device and the like can be provided. A touch panel (or a touch sensor equipped display device) with a small number of components and the like can be provided. A lightweight touch panel (or a lightweight touch sensor equipped display device) and the like can be provided. A novel input device can be provided. A novel input/output device can be provided. A novel display device can be provided. Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIGS. 80A and 80B are schematic views each illustrating an example of a display device.
FIGS. 81A1, 81A2, 81B1, 81B2, 81C1, and 81C2 are cross-sectional views each illustrating one embodiment of a transistor.
FIGS. 82A1, 82A2, 82A3, 82B1, and 82B2 are cross-sectional views each illustrating one embodiment of a transistor.
FIGS. 83A1, 83A2, 83A3, 83B1, 83B2, 83C1, and 83C2 are cross-sectional views each illustrating one embodiment of a transistor.

BEST MODE FOR CARRYING OUT THE INVENTION

Figure 1A:
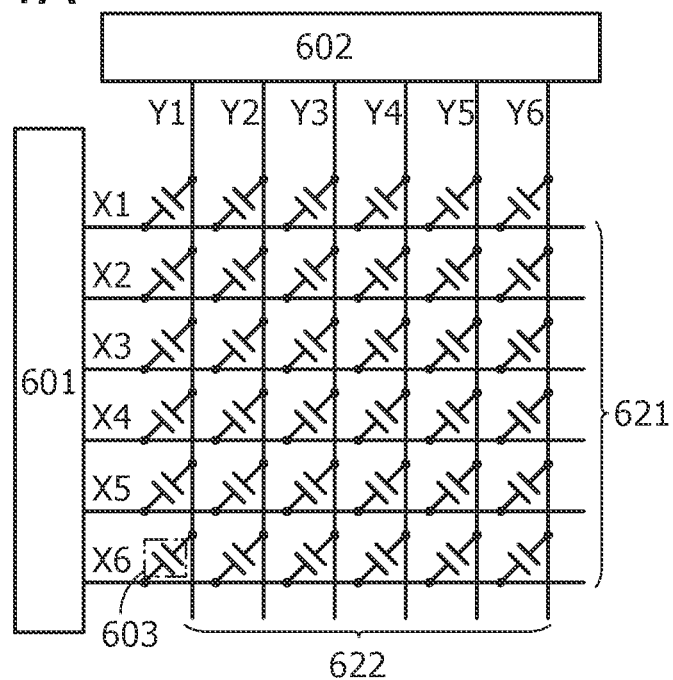
FIGS. 1A and 1B are a block diagram and a timing chart of a touch sensor of one embodiment.

Embodiments will be described in detail with reference to the drawings. Note that the present invention is not limited to the description below, and it is easily understood by those skilled in the art that the mode and details can be variously changed without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and the description of such portions is not repeated. Furthermore, the same hatching pattern is applied to portions having similar functions, and the portions are not especially denoted by reference numerals in some cases.

Note that in each drawing referred to in this specification, the size, the layer thickness, or the region of each component is exaggerated for clarity in some cases. Therefore, embodiments of the present invention are not limited to such a scale.

In this specification and the like, ordinal numbers such as "first" and "second" are used in order to avoid confusion among components and do not limit the components numerically.

Note that the terms "film" and "layer" can be interchanged with each other in some cases. For example, in some cases, the term "conductive film" can be used instead of the term "conductive layer", and the term "insulating layer" can be used instead of the term "insulating film".

Embodiment 1

In this embodiment, a driving method, a mode, and a structure example of an input device or an input/output device of one embodiment of the present invention will be described with reference to the drawings.

Example of Sensing Method of Sensor

FIG. 1A is a block diagram illustrating the structure of a mutual capacitive touch sensor. FIG. 1A illustrates a pulse voltage output circuit 601 and a current sensing circuit 602. In FIG. 1A, as an example, six wirings X1 to X6 represent electrodes 621 to which a pulse voltage is applied, and six wirings Y1 to Y6 represent electrodes 622 that sense changes in current. The number of such electrodes is not limited to those illustrated in this example. FIG. 1A also illustrates a capacitor 603 that is formed with the electrodes 621 and 622 overlapping with each other or being provided very close to each other. Note that the functions of the electrodes 621 and 622 can be interchanged with each other.

The pulse voltage output circuit 601 is, for example, a circuit for sequentially applying a pulse voltage to the wirings X1 to X6. By applying a pulse voltage to the wirings X1 to X6, an electric field is generated between the electrodes 621 and 622 of the capacitors 603. With a pulse voltage, current flows through the capacitor 603. An electric field generated between the electrodes 621 and 622 is changed by being blocked, for example, when a finger or a stylus touches the touch sensor. That is, for example, by touch with a finger or a stylus, the capacitance of the capacitor 603 is changed. By utilizing the change in capacitance caused by touch with a finger or a stylus as described above, the approach or contact of an object can be detected.

The current sensing circuit 602 is a circuit for sensing changes in current flowing through the wirings Y1 to Y6 that are caused by the changes in capacitance of the capacitors 603. No change in the current values of the wirings Y1 to Y6 is sensed when there is no approach or contact of an object, whereas a decrease in the current value is sensed when capacitance is decreased owing to the approach or contact of an object. In order to sense a change in current, the total amount of current may be sensed. In that case, an integrator circuit or the like may be used for sensing the total amount of current. Alternatively, the peak value of current may be sensed. In that case, current may be converted into voltage, and the peak value of voltage may be sensed.

Figure 1B:
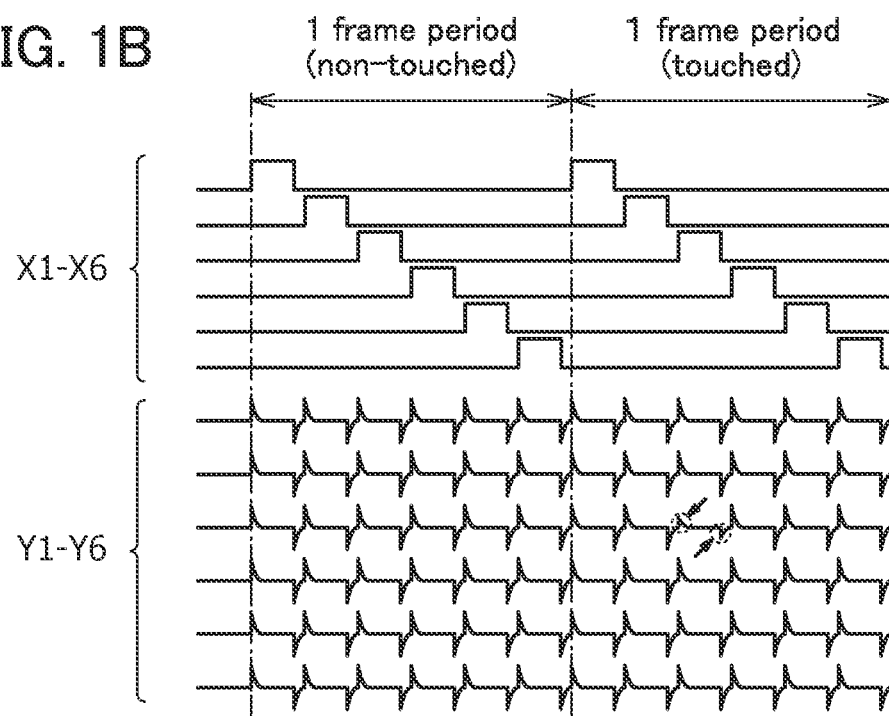

FIG. 1B is a timing chart showing input and output waveforms of the mutual capacitive touch sensor illustrated in FIG. 1A. In FIG. 1B, detection of an object is performed in all the rows and columns in one frame period. FIG. 1B shows a period during which an object is not detected (not touched) and a period during which an object is detected (touched). Sensed current values of the wirings Y1 to Y6 are shown as waveforms of voltage values. Note that a display panel performs display operation. The timing of the display operation in the display panel is preferably in synchronization with the timing of the sensing operation in the touch sensor. FIG. 1B shows an example in which these timings are not in synchronization.

A pulse voltage is sequentially applied to the wirings X1 to X6, and the waveforms of the wirings Y1 to Y6 change in accordance with the pulse voltage. When there is no approach or contact of an object, the waveforms of the wirings Y1 to Y6 change in accordance with changes in the voltages of the wirings X1 to X6. In contrast, the current value is decreased at the point of approach or contact of an object; accordingly, the waveform of the voltage value also changes.

By sensing a change in capacitance in this manner, the approach or contact of an object can be detected. Even when an object such as a finger or a stylus does not touch but only approaches a touch sensor or a touch panel, a signal may be sensed in some cases.

It is preferable that, as an example, the pulse voltage output circuit 601 and the current sensing circuit 602 be formed in one IC chip. For example, the IC chip is preferably mounted on a touch panel or a substrate in a housing of an electronic device. In the case where the touch panel has flexibility, parasitic capacitance might be increased in a bent portion of the touch panel, and the influence of noise might be increased. In view of this, it is preferable to use an IC chip to which a driving method less influenced by noise is applied. For example, it is preferable to use an IC chip to which a driving method capable of increasing a signal-noise ratio (S/N ratio) is applied.

Although FIG. 1A illustrates, as a touch sensor, the structure of a passive matrix touch sensor in which only the capacitor 603 is provided at the intersection of wirings, an active matrix touch sensor including a transistor and a capacitor may also be used.

Structure Example of In-Cell Touch Panel

An example in which at least one of electrodes included in a touch sensor is formed over a substrate provided with a display element, a transistor, and the like is described below.

A structure example of a touch panel incorporating a touch sensor into a display portion including a plurality of pixels (i.e., an in-cell touch panel) is described below. An example in which a liquid crystal element is used as a display element provided in the pixel is described. However, one embodiment of the present invention is not limited thereto, and any of various display elements can be used.

Figure 2A:
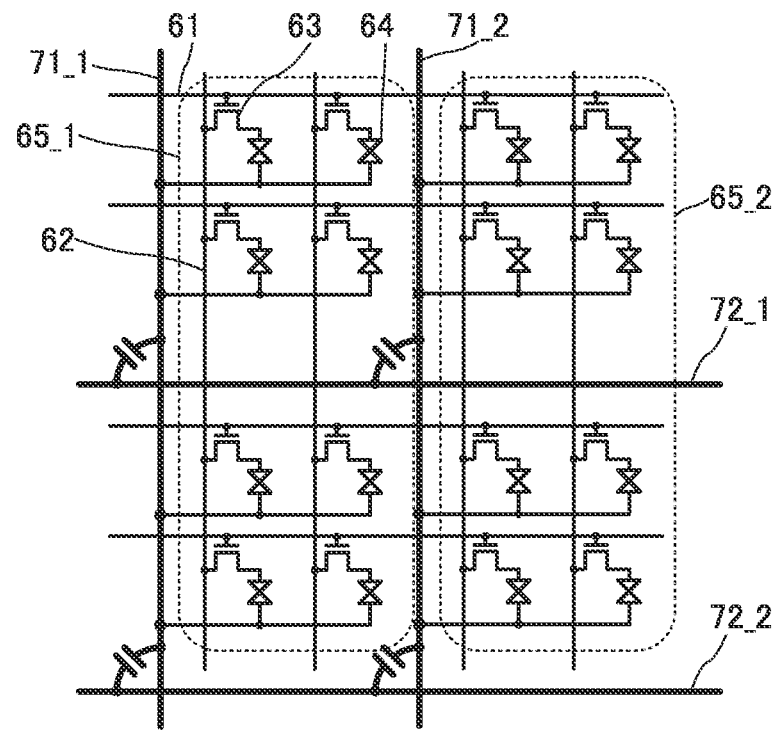
FIGS. 2A and 2B illustrate pixels each provided with a touch sensor of one embodiment.

FIG. 2A is an equivalent circuit diagram of part of a pixel circuit provided in a display portion of a touch panel in this structure example.

Each pixel includes at least a transistor 63 and a liquid crystal element 64. Each pixel further includes a storage capacitor in some cases. A gate of the transistor 63 is electrically connected to a wiring 61, and one of a source and a drain of the transistor 63 is electrically connected to a wiring 62.

The pixel circuit includes a plurality of wirings extending in the X direction (e.g., a wiring 72_1 and a wiring 72_2) and a plurality of wirings extending in the Y direction (e.g., a wiring 71_1 and a wiring 71_2). They are provided to intersect with each other, and capacitance is formed therebetween.

For example, among the pixels provided in the pixel circuit, electrodes on one side of liquid crystal elements of some pixels adjacent to each other are electrically connected to each other to form one block. For example, a plurality of linear blocks extending in the Y direction (e.g., a block 65_1 and a block 65_2) are formed. Although only part of the pixel circuit is illustrated in FIG. 2A, these blocks are repeatedly arranged in the X direction. An electrode on one side of the liquid crystal element is a common electrode or a counter electrode, for example. An electrode on the other side of the liquid crystal element is, for example, a pixel electrode.

With the above structure, the electrode on one side of the liquid crystal element in the pixel circuit can also serve as an electrode included in a touch sensor. In FIG. 2A, the wirings 71_1 and 71_2 each serve as the electrode included in the touch sensor as well as the electrode on one side of the liquid crystal element. In contrast, the wirings 72_1 and 72_2 each function as an electrode included in the touch sensor. In this manner, the structure of the touch panel can be simplified. Although the plurality of wirings extending in the Y direction (e.g., the wirings 71_1 and 71_2) each serve as the electrode included in the touch sensor as well as the electrode on one side of the liquid crystal element in FIG. 2A, one embodiment of the present invention is not limited thereto. For example, the plurality of wirings extending in the X direction (e.g., the wirings 72_1 and 72_2) may each serve as the electrode included in the touch sensor as well as the electrode on one side of the liquid crystal element. An example of a circuit diagram in that case is shown in FIG. 3.

Figure 2B:
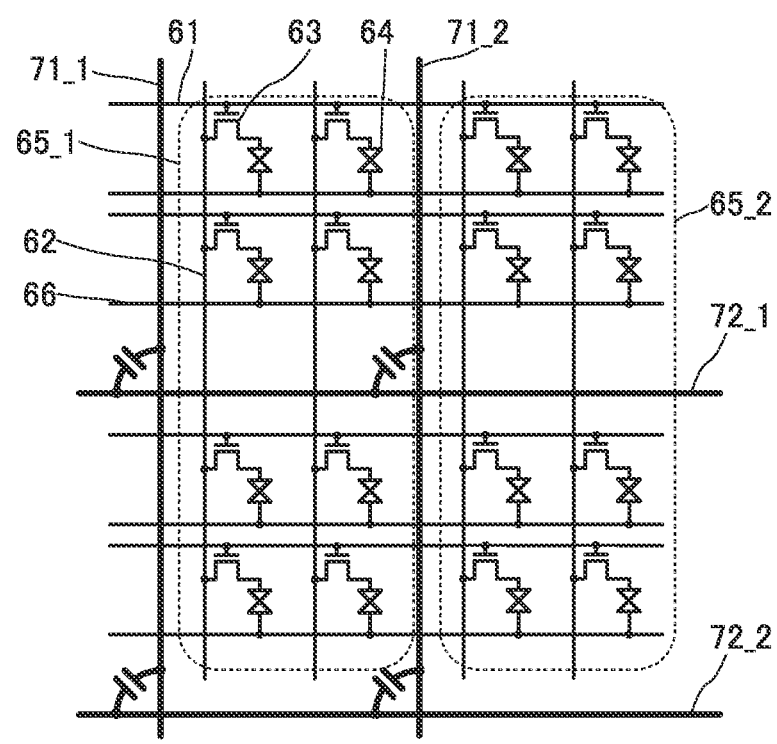
Figure 3:
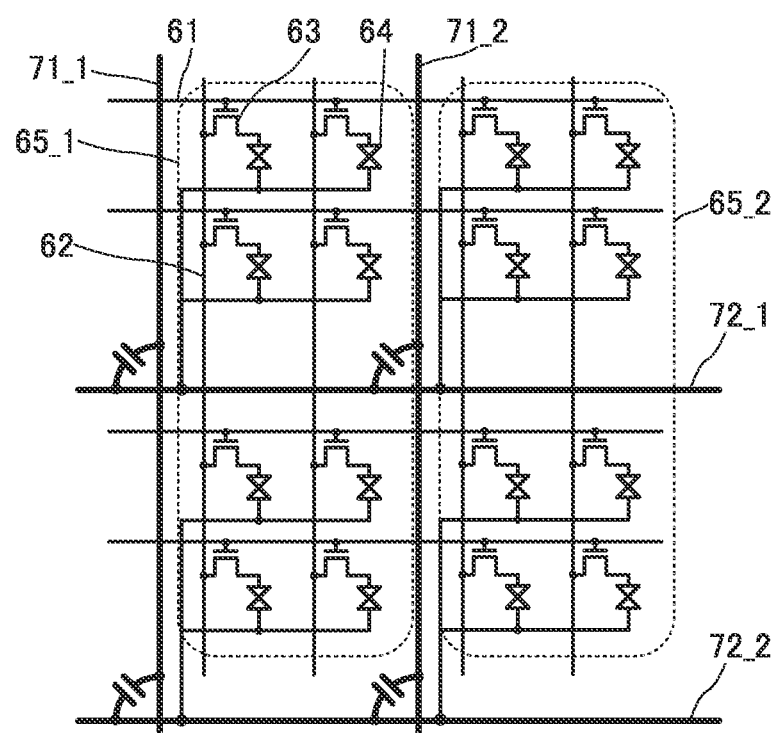
FIG. 3 illustrates pixels each provided with a touch sensor of one embodiment.

Although FIG. 2A and FIG. 3 each illustrate the example in which one wiring serves as the electrode included in the touch sensor as well as the electrode on one side of the liquid crystal element, one embodiment of the present invention is not limited to this example. The electrode on one side of the liquid crystal element and the electrode included in the touch sensor may be formed with separate wirings. For example, as illustrated in FIG. 2B, the electrodes on one side of the liquid crystal elements 64 may be electrically connected to a wiring 66. When at least one of the wiring 66, the electrode on one side of the liquid crystal element 64, and the electrode on the other side of the liquid crystal element 64 and at least one of a wiring extending in the X direction and a wiring extending in the Y direction are formed by processing the same conductive film at the same time, the manufacturing process of the touch panel can be simplified.

For example, the wiring 66, the wiring 71_1, and the wiring 71_2 may be formed at the same time. Alternatively, the wiring 66, the wiring 72_1, and the wiring 72_2 may be formed at the same time.

Figure 4:
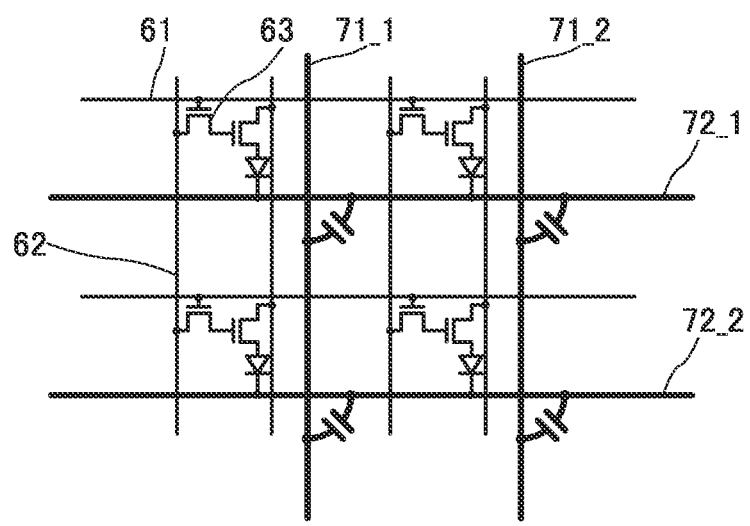
FIG. 4 illustrates pixels each provided with a touch sensor of one embodiment.
Figure 5:
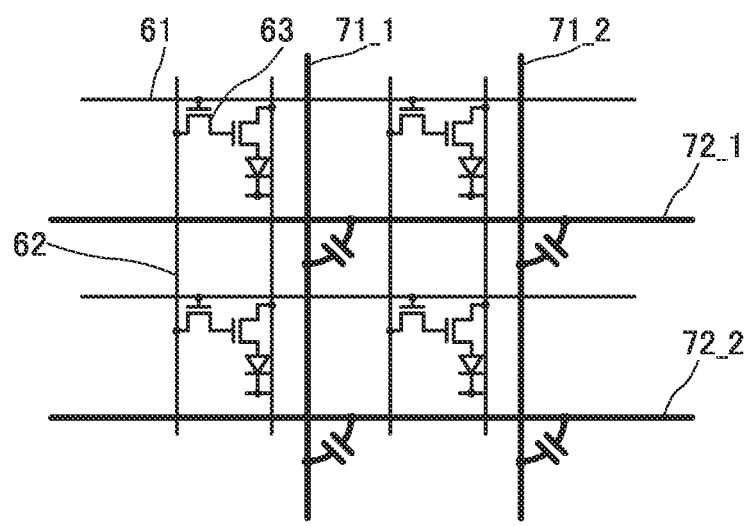
FIG. 5 illustrates pixels each provided with a touch sensor of one embodiment.

Although FIGS. 2A and 2B and FIG. 3 each illustrate the example in which the liquid crystal element is used as a display element, one embodiment of the present invention is not limited thereto. FIG. 4 and FIG. 5 each illustrate an example in which a light-emitting element is used as a display element.

Figure 6A:
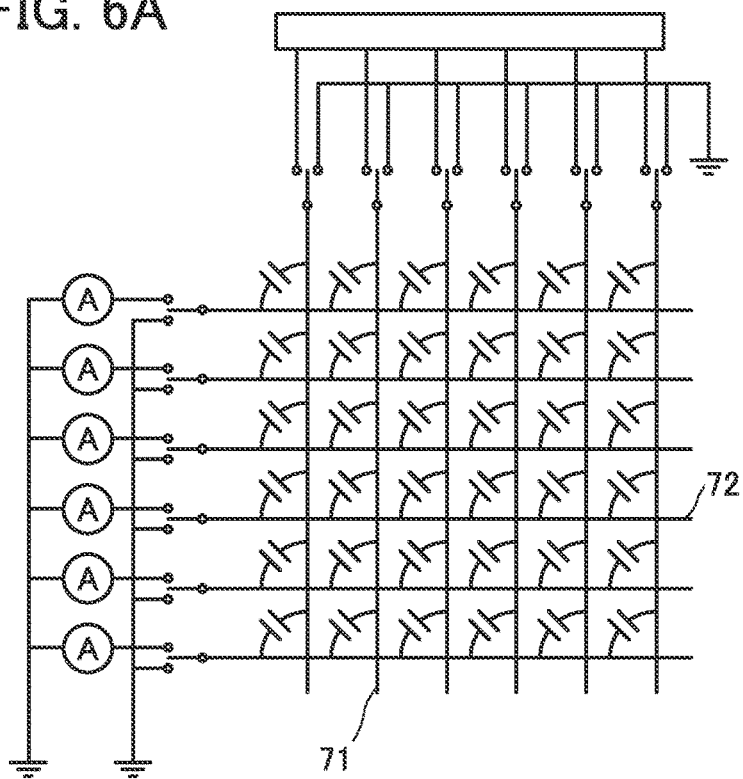
FIGS. 6A to 6C illustrate operation of a touch sensor and a pixel of one embodiment.

FIG. 6A is an equivalent circuit diagram illustrating the connection between a plurality of wirings 72 extending in the X direction and a plurality of wirings 71 extending in the Y direction. In the circuit diagram, the touch sensor is a projected mutual capacitive touch sensor. Input voltage (or selection voltage) or a common potential (or a ground potential or a reference potential) can be input to each of the wirings 71 extending in the Y direction. A ground potential (or a reference potential) can be input to each of the wirings 72 extending in the X direction, or the wirings 72 can be electrically connected to a sensing circuit. Note that the wirings 71 and the wirings 72 can be interchanged with each other. That is, the wirings 71 can be electrically connected to the sensing circuit.

Operation of the above-described touch panel is described below with reference to FIGS. 6B and 6C.

For example, one frame period is divided into a writing period and a sensing period. The writing period is a period during which image data is written to a pixel and the wirings 61 in FIGS. 2A and 2B and the like (also referred to as gate lines or scan lines) are sequentially selected. The sensing period is a period during which sensing is performed by the touch sensor and the wirings 71 extending in the Y direction are sequentially selected and input voltage is input.

Figure 6B:
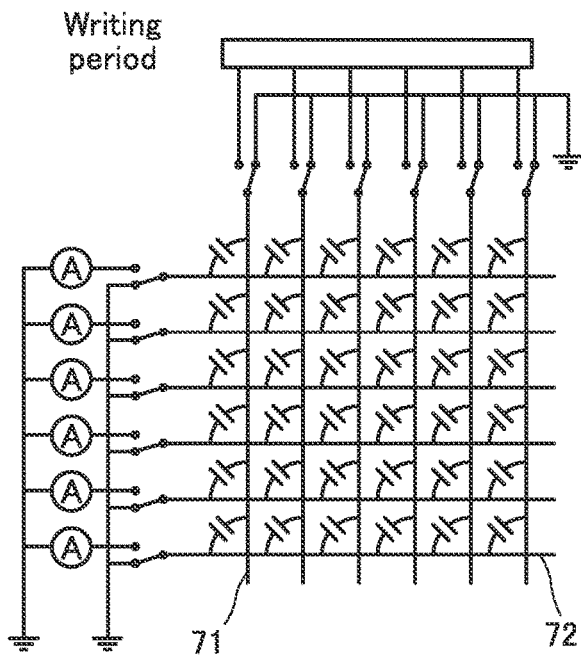

FIG. 6B is an equivalent circuit diagram in the writing period. In the wiring period, a common potential is input to both the wirings 72 extending in the X direction and the wirings 71 extending in the Y direction.

Figure 6C:
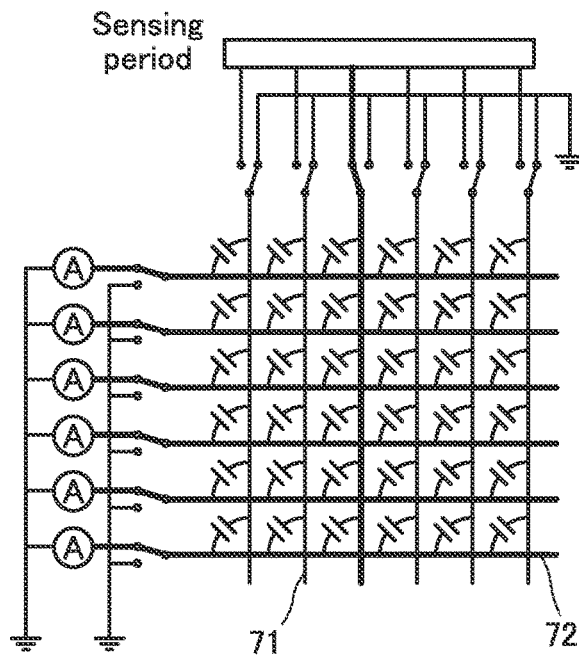

FIG. 6C is an equivalent circuit diagram at some point in time in the sensing period. In the sensing period, each of the wirings 72 extending in the X direction is electrically connected to the sensing circuit. Input voltage is input to the wirings 71 extending in the Y direction which are selected, and a common potential is input to the wirings 71 extending in the Y direction which are not selected.

Note that the driving method described here can be applied not only to the in-cell touch panel but also to the above-described touch panel.

It is preferable that the period during which an image is written and the period during which sensing is performed by the touch sensor be separately provided as described above. For example, sensing is preferably performed in a blanking period. In this manner, a decrease in sensitivity of the touch sensor caused by noise generated when an image is written to a pixel can be suppressed.

Examples of Touch Panel

Examples of a touch panel of one embodiment of the present invention are described below.

Note that in this specification and the like, a touch panel has a function of displaying or outputting an image or the like on or to a display surface and a function of a touch sensor capable of detecting the approach or contact of an object such as a finger or a stylus to the display surface. Therefore, the touch panel is one embodiment of an input/output device.

In this specification and the like, a structure in which a connector such as a flexible printed circuit (FPC) or a tape carrier package (TCP) is attached to a substrate of a touch panel, or a structure in which an integrated circuit (IC) is mounted on a substrate by a chip on glass (COG) method is referred to as a touch panel module or a display module, or simply referred to as a touch panel in some cases.

A capacitive touch sensor that can be used for one embodiment of the present invention includes a pair of conductive layers. Capacitance is formed between the pair of conductive layers. The capacitance between the pair of conductive layers changes when an object touches or approaches the pair of conductive layers. Utilizing this change, detection can be performed.

Examples of the capacitive touch sensor include a surface capacitive touch sensor and a projected capacitive touch sensor. Examples of the projected capacitive touch sensor include a self capacitive touch sensor and a mutual capacitive touch sensor, which differ mainly in the driving method. The use of a mutual capacitive touch sensor is preferable because multiple points can be detected simultaneously. Note that the self capacitive touch sensor can also be used.

As a display element in a touch panel of one embodiment of the present invention, a variety of display elements, for example, a liquid crystal element (using a vertical electric field mode or a horizontal electric field mode), an optical element utilizing micro electro mechanical systems (MEMS), a light-emitting element such as an organic electroluminescence (EL) element or a light-emitting diode (LED), and an electrophoretic element, can be used.

Here, as an example, a transmissive liquid crystal display device including a liquid crystal element using a horizontal electric field mode as a display element is preferably used for the touch panel.

A touch panel of one embodiment of the present invention includes, between a pair of substrates, a pair of electrodes (also referred to as conductive layers or wirings) included in a touch sensor and thus has a structure in which a display panel and the touch sensor are combined. That is, the touch sensor is not formed over another substrate or the like but between the pair of substrates provided with a display element and a transistor. Therefore, the thickness of the touch panel is reduced, leading to a lightweight touch panel.

In addition, in the touch panel of one embodiment of the present invention, a flexible printed circuit (FPC) which supplies a signal for driving a pixel and an FPC which drives the touch sensor are both provided over one of the pair of substrates. In this manner, the touch panel can be easily incorporated into an electronic device, and the number of components can be reduced.

Figure 7A:
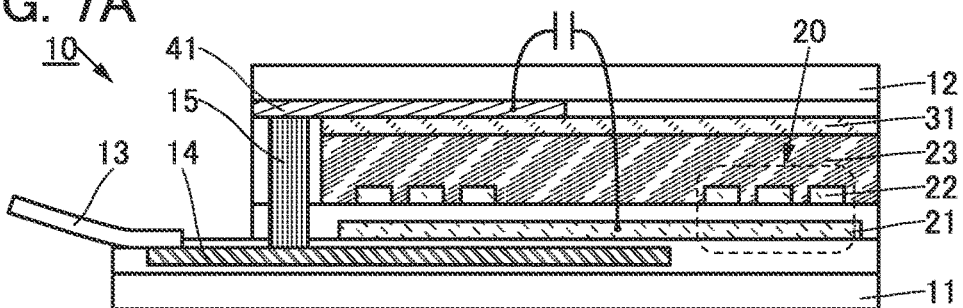
FIGS. 7A to 7E illustrate structure examples of a touch panel of one embodiment.

FIG. 7A is a cross-sectional schematic view of a touch panel 10 of one embodiment of the present invention.

The touch panel 10 includes a substrate 11, a substrate 12, an FPC 13, a conductive layer 14, a liquid crystal element 20, a coloring layer 31, a conductive layer 41, and the like.

The liquid crystal element 20 includes a conductive layer 21, a conductive layer 22, and liquid crystal 23. In the example illustrated here, a liquid crystal element using a fringe field switching (FFS) mode is used as the liquid crystal element 20. The conductive layer 22 is positioned over the conductive layer 21 with an insulating layer provided therebetween. For example, the conductive layer 22 has a comb-like top shape or a top shape provided with a slit (a top shape is also referred to as a planar shape). One of the conductive layers 21 and 22 functions as a common electrode, and the other functions as a pixel electrode. In the case where a light-emitting element or the like is used as a display element, for example, the conductive layer 22 does not have a comb-like top shape or a top shape provided with a slit.

A touch sensor can perform detection by utilizing the capacitance formed between the conductive layer 41 provided on the substrate 12 side and the conductive layer 21 functioning as one of a pair of electrodes of the liquid crystal element 20. In the example illustrated here, the conductive layer 41 is preferably provided on a surface which faces the substrate 11 (a lower surface) of the substrate 12.

The conductive layer 41 provided on the substrate 12 side is electrically connected to the conductive layer 14 provided on the substrate 11 side through a connection layer 15. The conductive layer 14 is electrically connected to the FPC 13 provided on the substrate 11 side. With such a structure, an FPC which drives the touch sensor and an FPC which drives the liquid crystal element 20 can both be provided over one substrate.

In the case where, for example, the conductive layer functioning as the electrode of the touch sensor is provided on a surface which does not face the substrate 11 (an upper surface) of the substrate 12 in the touch panel, an FPC electrically connected to the conductive layer is necessarily attached to the substrate 12. In addition, when the connection layer 15 illustrated in FIG. 7A is not used, the FPC electrically connected to the conductive layer 41 needs to be attached to the substrate 12. Furthermore, when the conductive layer functioning as the electrode of the touch sensor is provided over a substrate which is not the substrate 11 or the substrate 12, an FPC needs to be attached to the substrate. With these structures, the number of components might be increased or there might be a limitation when the touch panel is incorporated into an electronic device because of the position of the FPC. In one embodiment of the present invention, however, the FPCs can be attached only to one of the pair of substrates. Therefore, the number of components can be reduced, leading to a touch panel that is easily incorporated into an electronic device.

When one of the pair of electrodes of the liquid crystal element 20 also serves as at least one of the pair of electrodes included in the touch sensor, the manufacturing process can be simplified, thereby improving the yield and reducing the manufacturing cost.

Figure 7B:
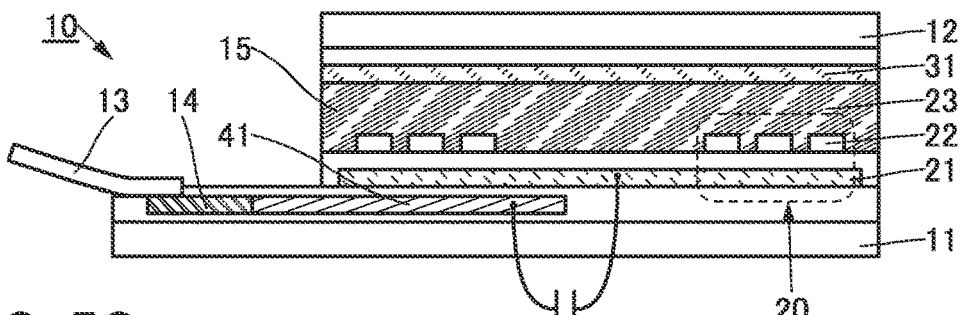

FIG. 7B illustrates an example in which the conductive layer 41 functioning as the electrode of the touch sensor is provided on the substrate 11 side. The conductive layer 41 is electrically connected to the conductive layer 14. The touch sensor can perform detection by utilizing the capacitance formed between the conductive layer 41 and the conductive layer 21 functioning as one of the pair of electrodes (e.g., a common electrode) of the liquid crystal element 20. Also with this structure, the FPC 13 can be provided on the substrate 11 side. A surface on the substrate 11 side is preferably used as a touch surface, because the detection sensitivity of the touch panel can be increased.

Figure 7C:
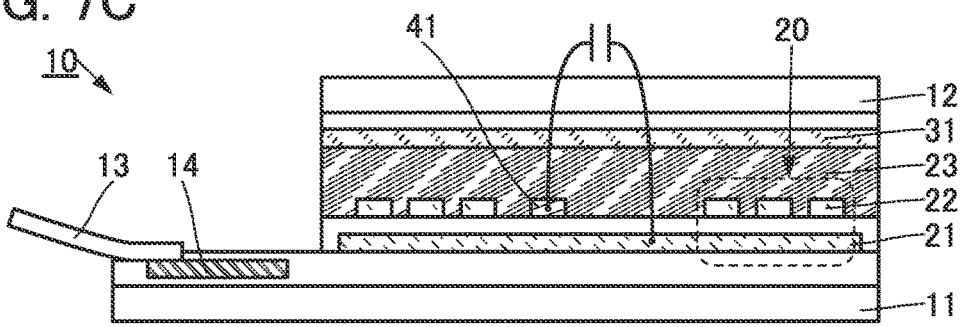

FIG. 7C illustrates an example in which the conductive layer 41 is formed on the same plane as the conductive layer 22. The conductive layer 41 is electrically connected to the conductive layer 14 in a region which is not illustrated in the drawing. The conductive layer 41 and the conductive layer 22 are preferably formed by processing the same conductive film at the same time. The touch sensor can perform detection by utilizing the capacitance formed between the conductive layer 41 and the conductive layer 21. For example, the conductive layer 21 has both a function of the common electrode of the liquid crystal element 20 and a function of the electrode of the touch sensor.

Figure 7D:
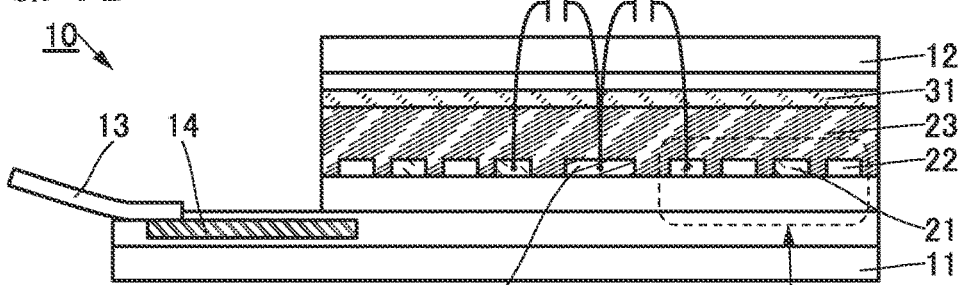

FIG. 7D illustrates an example in which the liquid crystal element 20 is a liquid crystal element using an in-plane switching (IPS) mode.

The conductive layers 21 and 22 included in the liquid crystal element 20 are provided on the same plane. The conductive layers 21 and 22 each have a comb-like shape and are provided so as to be engaged with each other. The touch sensor can perform detection by utilizing the capacitance formed between the conductive layer 41 and the conductive layer 21. For example, the conductive layer 21 has both a function of the common electrode of the liquid crystal element 20 and a function of the electrode of the touch sensor.

The conductive layer 41 functioning as one electrode of the touch sensor is formed on the same plane as the conductive layers 21 and 22. The conductive layer 41 is electrically connected to the conductive layer 14 in a region which is not illustrated in the drawing. The conductive layer 41, the conductive layer 21, and the conductive layer 22 are preferably formed by processing the same conductive film at the same time.

Figure 7E:
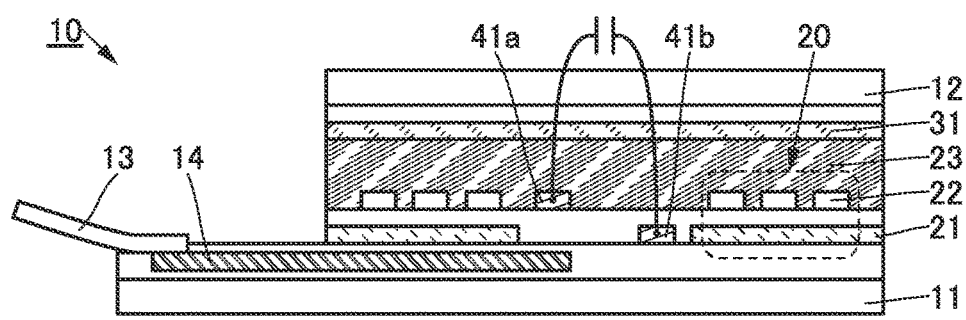

FIG. 7E illustrates another example in which the liquid crystal element 20 is a liquid crystal element using an FFS mode. The touch sensor can perform detection by utilizing the capacitance formed between a conductive layer 41a and a conductive layer 41b. One of the conductive layers 21 and 22 has a function of the common electrode of the liquid crystal element 20, and the other has a function of the pixel electrode of the liquid crystal element 20.

The conductive layer 41a is provided on the same plane as the conductive layer 22. The conductive layer 41b and the conductive layer 21 are provided on the same plane. The conductive layer 41a and the conductive layer 22 are preferably formed by processing the same conductive film at the same time. The conductive layer 41b and the conductive layer 21 are also preferably formed by processing the same conductive film at the same time. With such a structure, the pair of electrodes included in the touch sensor can be formed at the same time as the pair of electrodes of the liquid crystal element 20. Accordingly, the touch panel 10 having a function of the touch sensor can be manufactured without increasing the number of manufacturing steps.

Figure 8A:
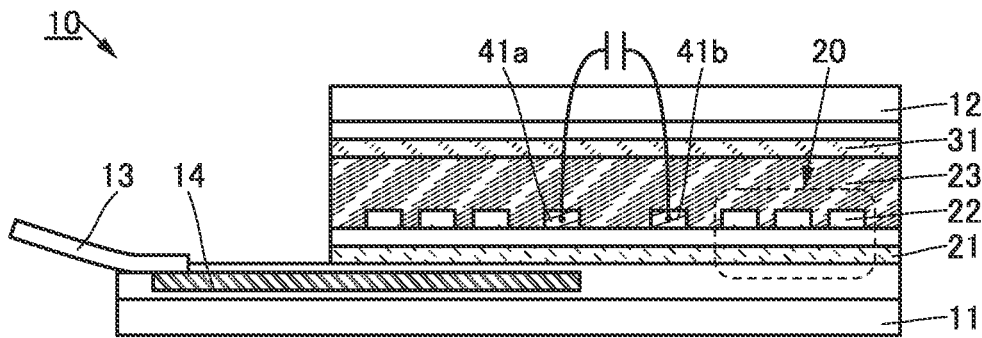
FIGS. 8A to 8C illustrate structure examples of a touch panel of one embodiment.

FIG. 8A illustrates another example in which the liquid crystal element 20 is a liquid crystal element using an FFS mode. The touch sensor can perform detection by utilizing the capacitance formed between the conductive layers 41a and 41b. For example, the conductive layer 21 has a function of the common electrode of the liquid crystal element 20.

The conductive layers 41a and 41b are provided on the same plane as the conductive layer 22. The conductive layers 41a and 41b and the conductive layer 22 are preferably formed by processing the same conductive film at the same time. With such a structure, the pair of electrodes included in the touch sensor can be formed at the same time as one of the pair of electrodes of the liquid crystal element 20. Accordingly, the touch panel 10 having a function of the touch sensor can be manufactured without increasing the number of manufacturing steps.

Although the conductive layer 41a is provided so as to overlap with the conductive layer 21, one embodiment of the present invention is not limited thereto. The conductive layer 21 can be provided so as not to overlap with the conductive layer 41a. Consequently, parasitic capacitance due to the conductive layer 41a can be reduced. In a similar manner, the conductive layer 21 can be provided so as not to to overlap with the conductive layer 41b.

Figure 8B:
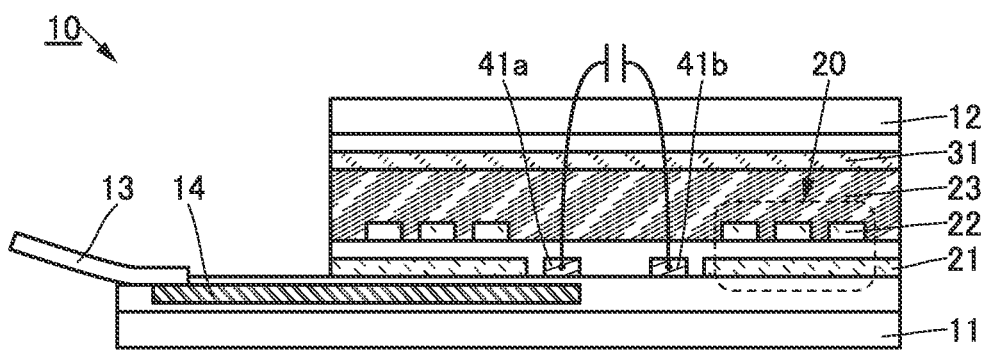

FIG. 8B illustrates another example in which the liquid crystal element 20 is a liquid crystal element using an FFS mode. The touch sensor can perform detection by utilizing the capacitance formed between the conductive layers 41a and 41b. One of the conductive layers 21 and 22 has a function of the common electrode of the liquid crystal element 20, and the other has a function of the pixel electrode of the liquid crystal element 20.

The conductive layers 41a and 41b are provided on the same plane as the conductive layer 21. The conductive layers 41a and 41b and the conductive layer 21 are preferably formed by processing the same conductive film at the same time. With such a structure, the pair of electrodes included in the touch sensor can be formed at the same time one of the pair of electrodes of the liquid crystal element 20. Accordingly, the touch panel 10 having a function of the touch sensor can be manufactured without increasing the number of manufacturing steps.

Figure 8C:
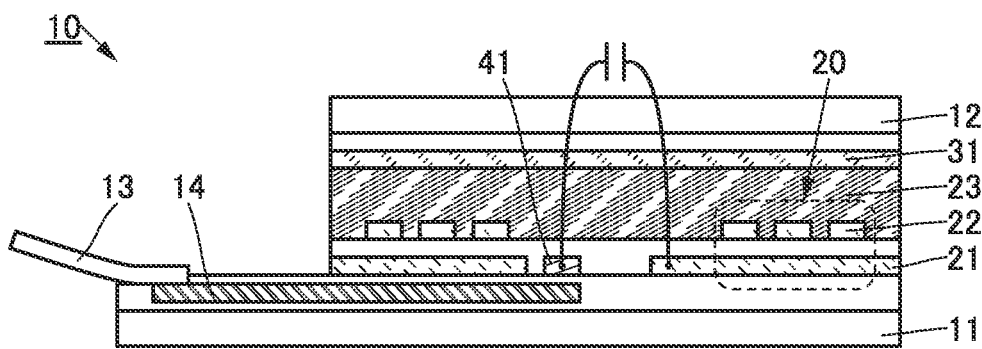

FIG. 8C illustrates another example in which the liquid crystal element 20 is a liquid crystal element using an FFS mode. The touch sensor can perform detection by utilizing the capacitance formed between the conductive layer 41 and the conductive layer 21 functioning as one of the pair of electrodes of the liquid crystal element 20. For example, the conductive layer 21 has both a function of the common electrode of the liquid crystal element 20 and a function of the electrode of the touch sensor.

The conductive layer 41 is provided on the same plane as the conductive layer 21. The conductive layer 41 and the conductive layer 21 are preferably formed by processing the same conductive film at the same time. With such a structure, the pair of electrodes included in the touch sensor can be formed at the same time as one of the pair of electrodes of the liquid crystal element 20. Accordingly, the touch panel 10 having a function of the touch sensor can be manufactured without increasing the number of manufacturing steps.

Figure 9:
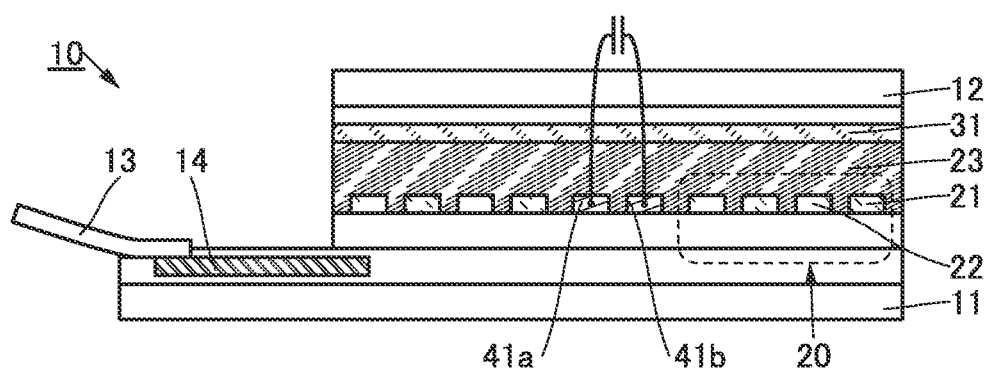
FIG. 9 illustrates a structure example of a touch panel of one embodiment.

FIG. 9 illustrates an example in which the liquid crystal element 20 is a liquid crystal element using an IPS mode.

The conductive layers 21 and 22 included in the liquid crystal element 20 are provided on the same plane. The conductive layers 21 and 22 each have a comb-like shape and are provided so as to be engaged with each other. One of the conductive layers 21 and 22 has a function of the common electrode of the liquid crystal element 20, and the other has a function of the pixel electrode of the liquid crystal element 20.

The conductive layers 41a and 41b functioning as the electrodes of the touch sensor are formed on the same plane as the conductive layers 21 and 22. The conductive layers 41a and 41b and the conductive layers 21 and 22 are preferably formed by processing the same conductive film at the same time. The touch sensor can perform detection by utilizing the capacitance formed between the conductive layers 41a and 41b.

By forming the conductive layer 21 of the liquid crystal element using an FFS mode to have a comb-like top shape or a top shape provided with a slit, a liquid crystal element using an IPS mode can be obtained.

Figure 10A:
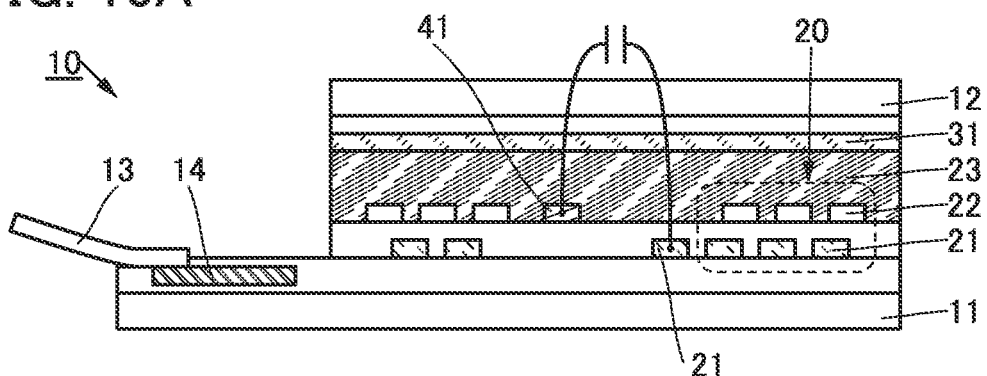
FIGS. 10A and 10B illustrate structure examples of a touch panel of one embodiment.

FIG. 10A illustrates an example that is obtained by changing the liquid crystal element illustrated in FIG. 7C into a liquid crystal element using an IPS mode. For example, the conductive layer 21 has both a function of the common electrode of the liquid crystal element 20 and a function of the electrode of the touch sensor.

Figure 10B:
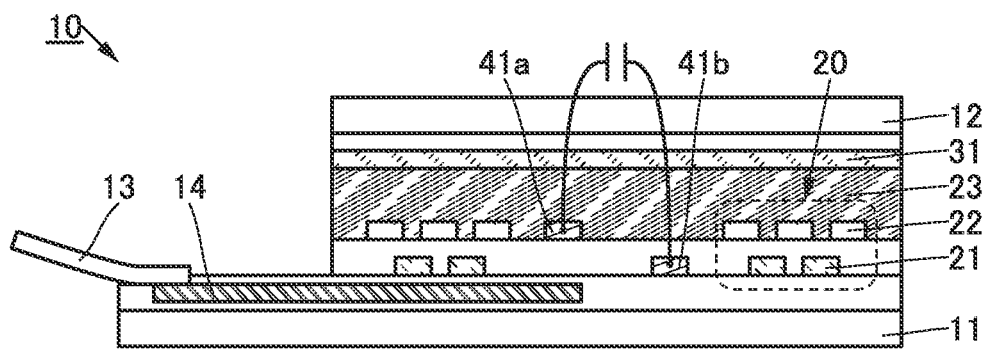

FIG. 10B illustrates an example that is obtained by changing the liquid crystal element illustrated in FIG. 7E into a liquid crystal element using an IPS mode. One of the conductive layers 21 and 22 has a function of the common electrode of the liquid crystal element 20, and the other has a function of the pixel electrode of the liquid crystal element 20.

Figure 11A:
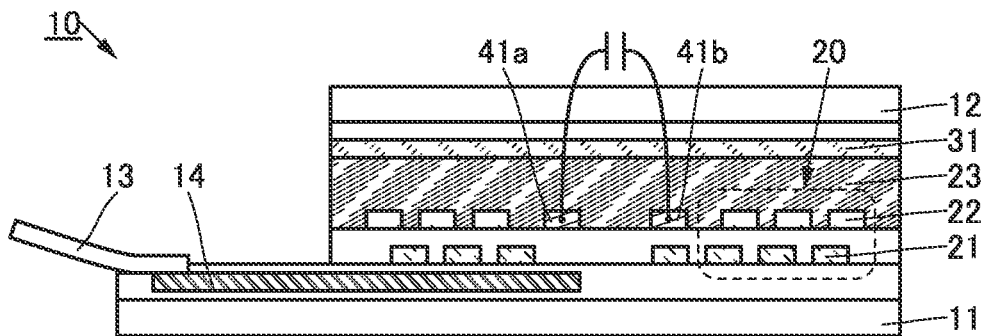
FIGS. 11A to 11C illustrate structure examples of a touch panel of one embodiment.
Figure 11B:
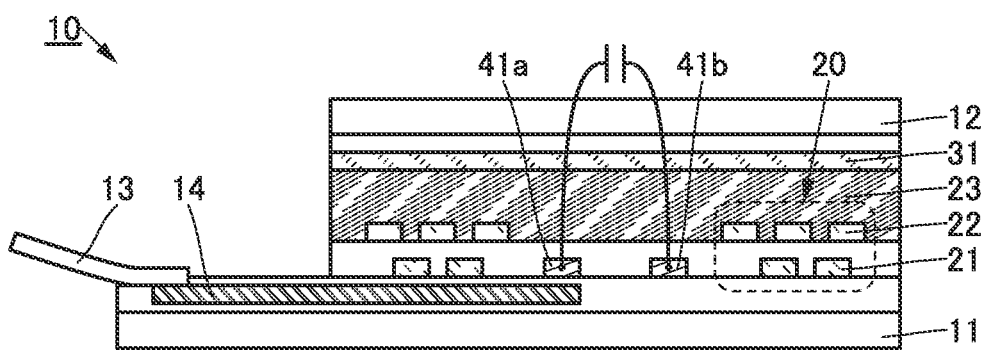

FIG. 11A illustrates an example that is obtained by changing the liquid crystal element illustrated in FIG. 8A into a liquid crystal element using an IPS mode, and FIG. 11B illustrates an example that is obtained by changing the liquid crystal element illustrated in FIG. 8B into a liquid crystal element using an IPS mode. One of the conductive layers 21 and 22 has a function of the common electrode of the liquid crystal element 20, and the other has a function of the pixel electrode of the liquid crystal element 20.

Figure 11C:
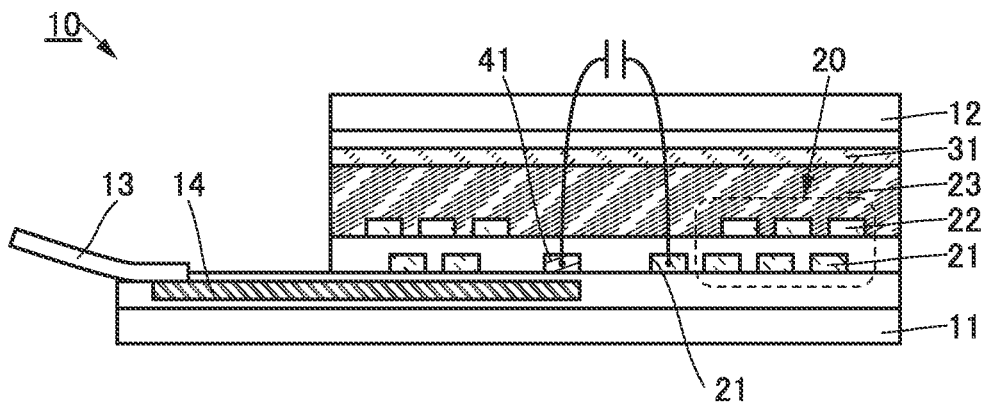

FIG. 11C illustrates an example that is obtained by changing the liquid crystal element illustrated in FIG. 8C into a liquid crystal element using an IPS mode. For example, the conductive layer 21 has both a function of the common electrode of the liquid crystal element 20 and a function of the electrode of the touch sensor.

In many of the above examples, an upper electrode is the pixel electrode of the liquid crystal element 20, and a lower electrode is the common electrode of the liquid crystal element 20; however, one embodiment of the present invention is not limited thereto. The upper electrode can be the common electrode of the liquid crystal element 20, and the lower electrode can be the pixel electrode of the liquid crystal element 20.

Figure 12:
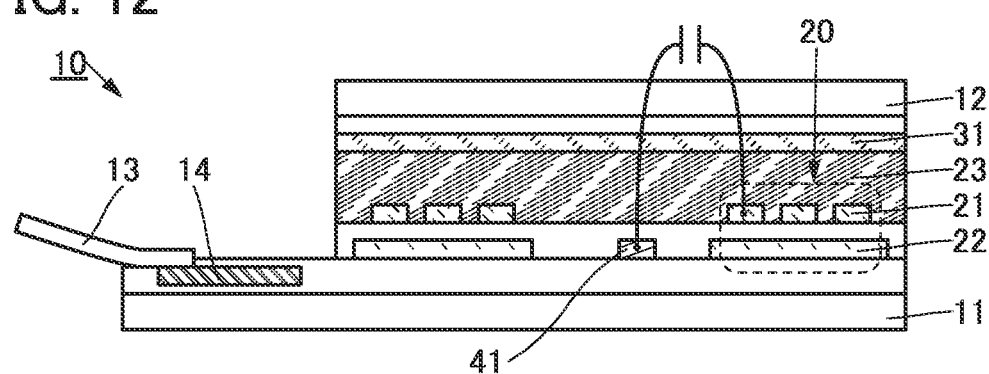
FIG. 12 illustrates a structure example of a touch panel of one embodiment.

FIG. 12 illustrates an example in which an upper electrode in FIG. 7C is used as the common electrode of the liquid crystal element 20. For example, the conductive layer 21 has both a function of the common electrode of the liquid crystal element 20 and a function of the electrode of the touch sensor.

Figure 13A:
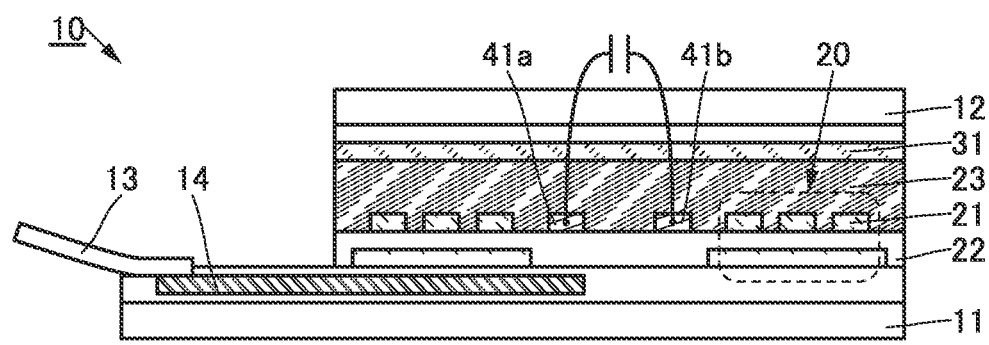
FIGS. 13A and 13B illustrate structure examples of a touch panel of one embodiment.

FIG. 13A illustrates an example in which an upper electrode in FIG. 8A is used as the common electrode of the liquid crystal element 20. For example, the conductive layer 21 has a function of the common electrode of the liquid crystal element 20.

Figure 13B:
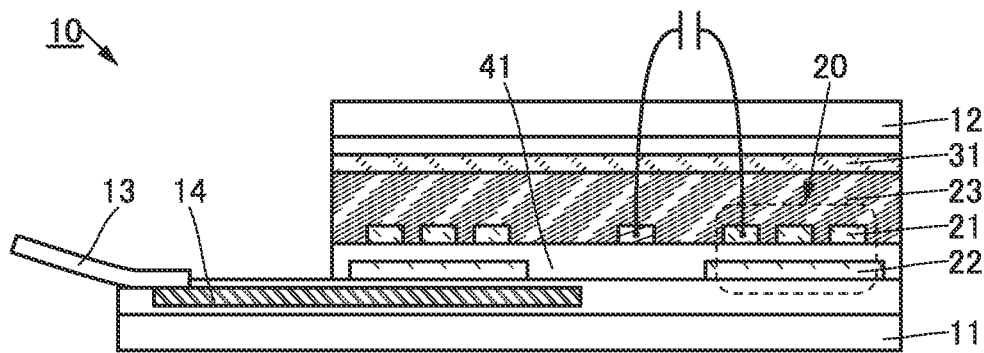

FIG. 13B illustrates an example in which an upper electrode in FIG. 8C is used as the common electrode of the liquid crystal element 20. For example, the conductive layer 21 has both a function of the common electrode of the liquid crystal element 20 and a function of the electrode of the touch sensor.

Figure 14:
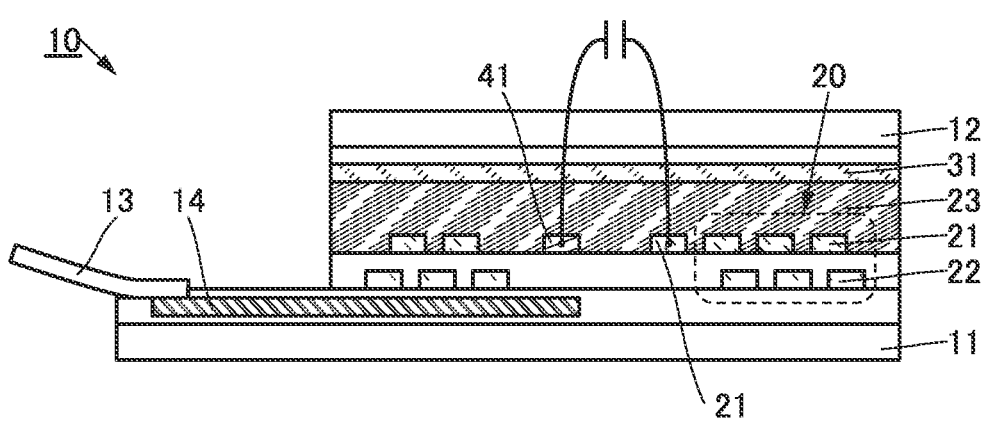
FIG. 14 illustrates a structure example of a touch panel of one embodiment.

FIG. 14 illustrates an example in which an upper electrode in FIG. 11C is used as the common electrode of the liquid crystal element 20. For example, the conductive layer 21 has both a function of the common electrode of the liquid crystal element 20 and a function of the electrode of the touch sensor.

Figure 15A:
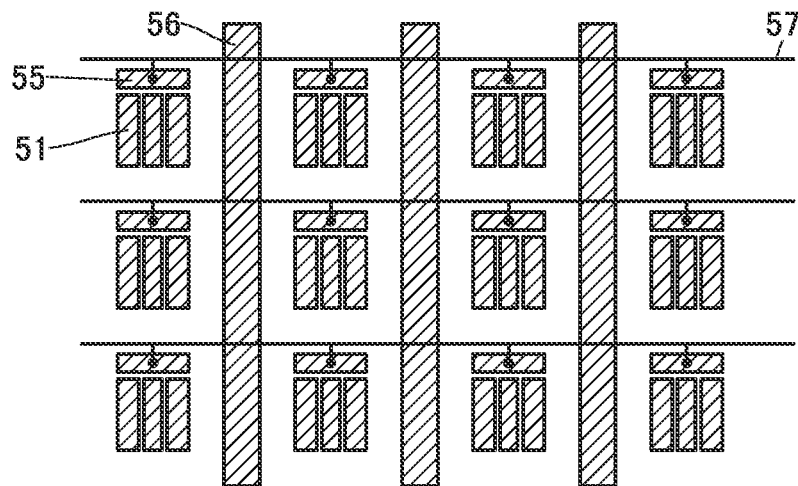
FIGS. 15A to 15C illustrate structure examples of a touch panel of one embodiment.
Figure 15B:
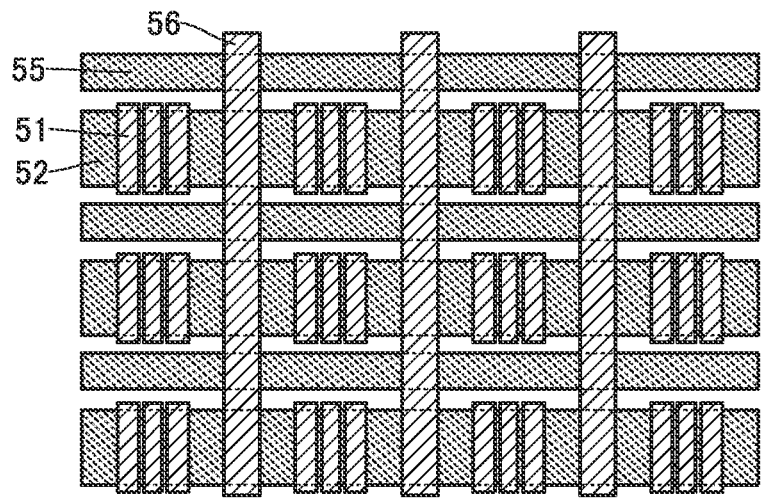
Figure 15C:
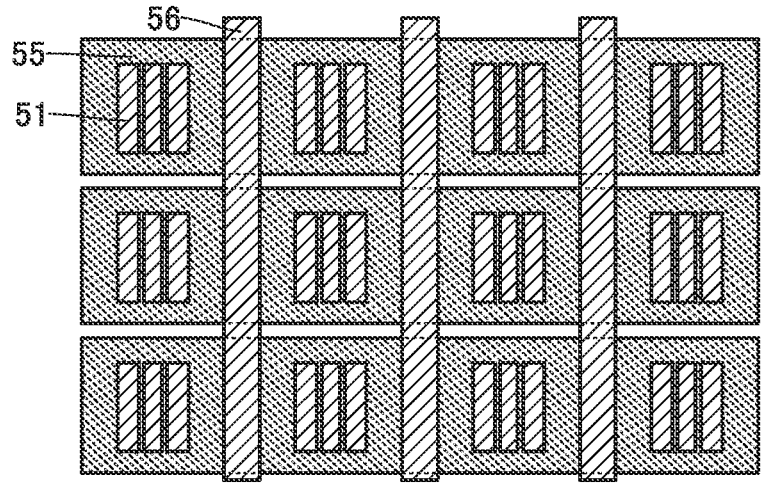

FIGS. 15A to 15C are each a schematic top view illustrating a touch panel of one embodiment of the present invention. Therefore, most components other than those included in a touch sensor are not illustrated. Although not illustrated, a pixel electrode 51 has a comb-like top shape or a top shape provided with a slit in some cases.

In the structure illustrated in FIG. 15A, the touch sensor includes a sensor electrode 55 and a sensor electrode 56. The sensor electrodes 55 and 56 are formed using the same conductive film as the pixel electrode 51. Alternatively, the sensor electrodes 55 and 56 are provided on the same plane as the pixel electrode 51. A plurality of sensor electrodes 55 arranged in the X direction are electrically connected to each other through a wiring 57. The sensor electrode 56 extends in the Y direction. That is, FIG. 15A corresponds to a top view of FIG. 8A. The sensor electrodes 55 and 56 may also be formed using not the same conductive film as the pixel electrode but the same conductive film as a common electrode.

FIG. 15B illustrates an example in which a common electrode 52 and the sensor electrode 55 are formed using the same conductive film. Alternatively, the common electrode 52 and the sensor electrode 55 are provided on the same plane. The common electrode 52 and the sensor electrode 55 each have a band-like shape that extends in the X direction and cross the sensor electrodes 56. That is, FIG. 15B corresponds to a top view of FIG. 8C.

FIG. 15C illustrates an example in which the common electrode 52 in FIG. 15B also serves as the sensor electrode 55. That is, FIG. 15C corresponds to a top view of FIG. 7C.

Figure 16A:
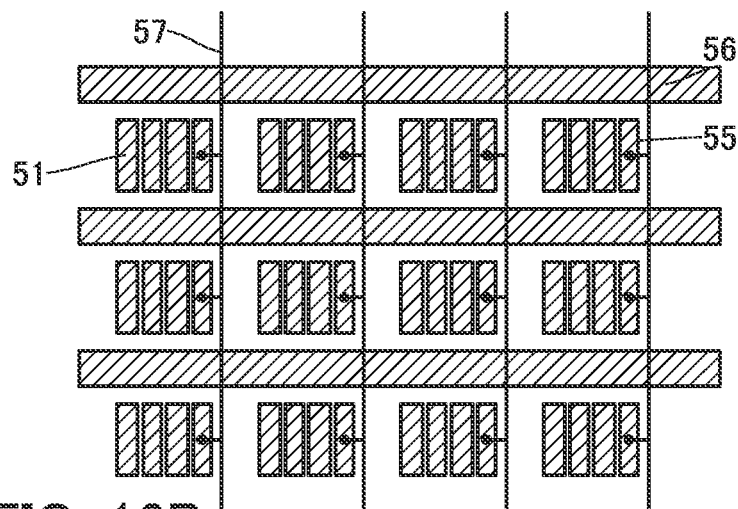
FIGS. 16A to 16C illustrate structure examples of a touch panel of one embodiment.
Figure 16B:
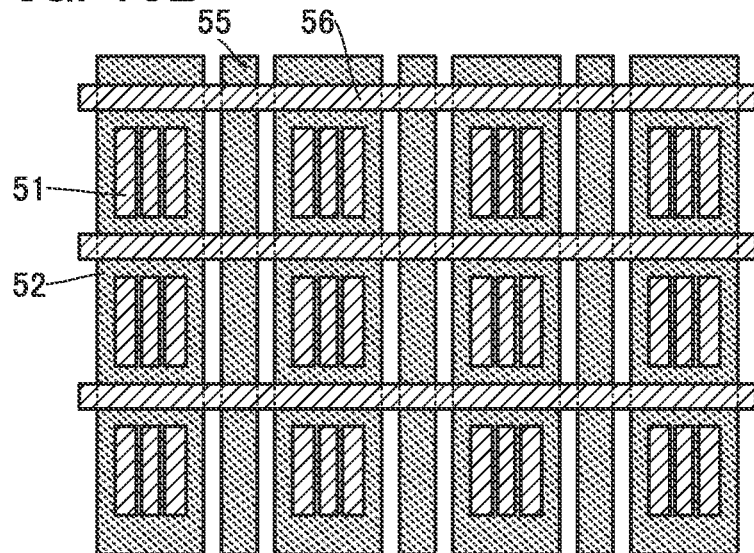
Figure 16C:
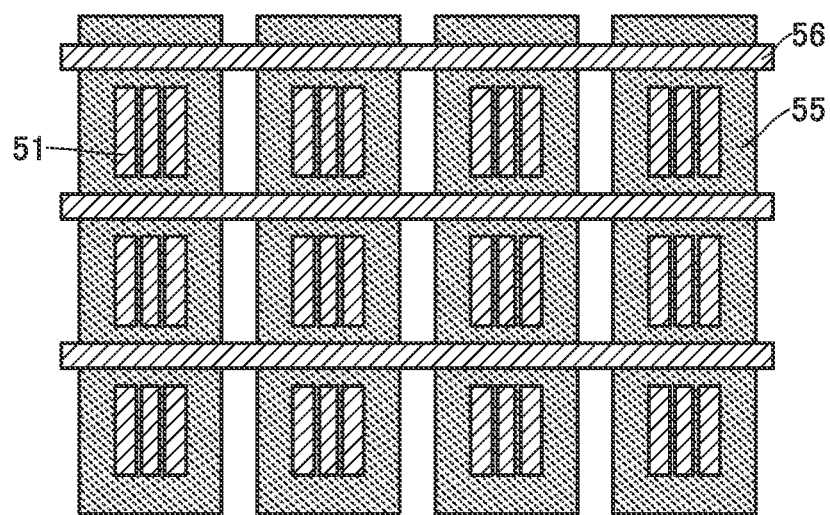

In the above examples, the sensor electrode 56 extends in the Y direction but may extend in the X direction. FIGS. 16A, 16B, and 16C correspond to FIGS. 15A, 15B, and 15C, respectively, in which the sensor electrode 56 extends in the X direction.

Figure 17A:
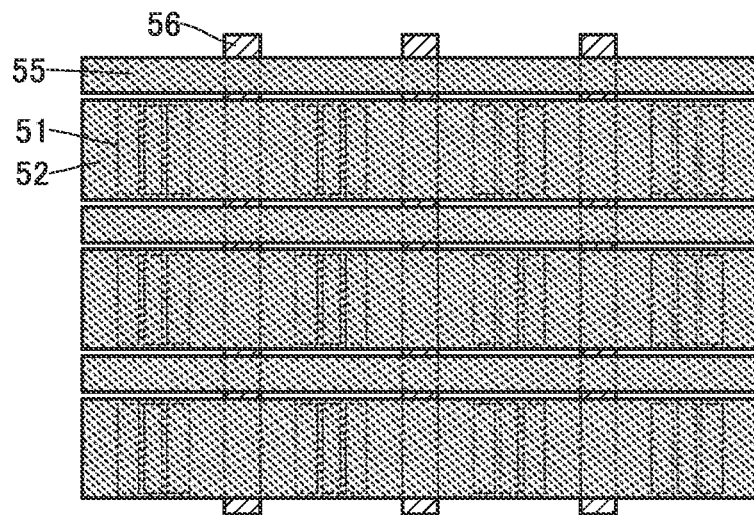
FIGS. 17A and 17B illustrate structure examples of a touch panel of one embodiment.
Figure 17B:
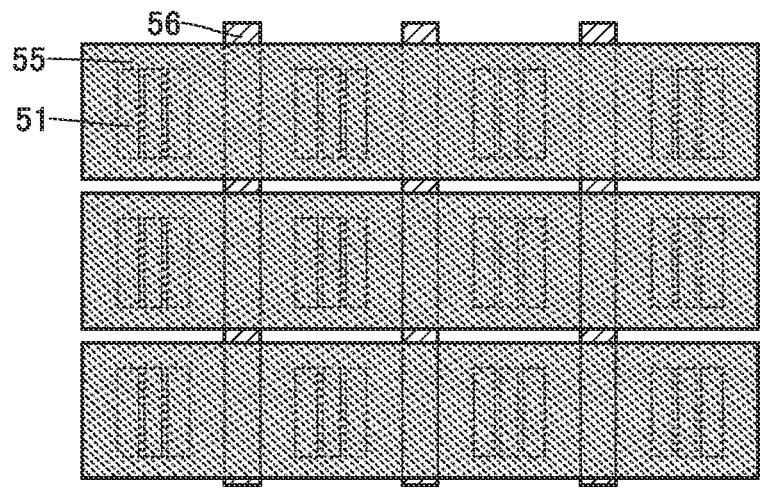

In the examples illustrated in FIGS. 15B and 15C, the upper electrode (the electrode close to the liquid crystal layer, that is, the electrode close to an object such as a finger or a stylus) serves as the pixel electrode, and the lower electrode (the electrode apart from the liquid crystal layer, that is, the electrode apart from an object such as a finger or a stylus) serves as the common electrode; however, one embodiment of the present invention is not limited thereto. The upper electrode (the electrode close to the liquid crystal layer, that is, the electrode close to an object such as a finger or a stylus) can serve as the common electrode, and the lower electrode (the electrode apart from the liquid crystal layer, that is, the electrode apart from an object such as a finger or a stylus) can serve as the pixel electrode. FIGS. 17A and 17B illustrate examples obtained by applying such a structure to FIGS. 15B and 15C, respectively. Although not illustrated, the common electrode 52 has a comb-like top shape or a top shape provided with a slit in some cases.

The above is the description of the touch panel.

Structure Example 1

More specific structure examples of the touch panel are described below.

Figure 18A:
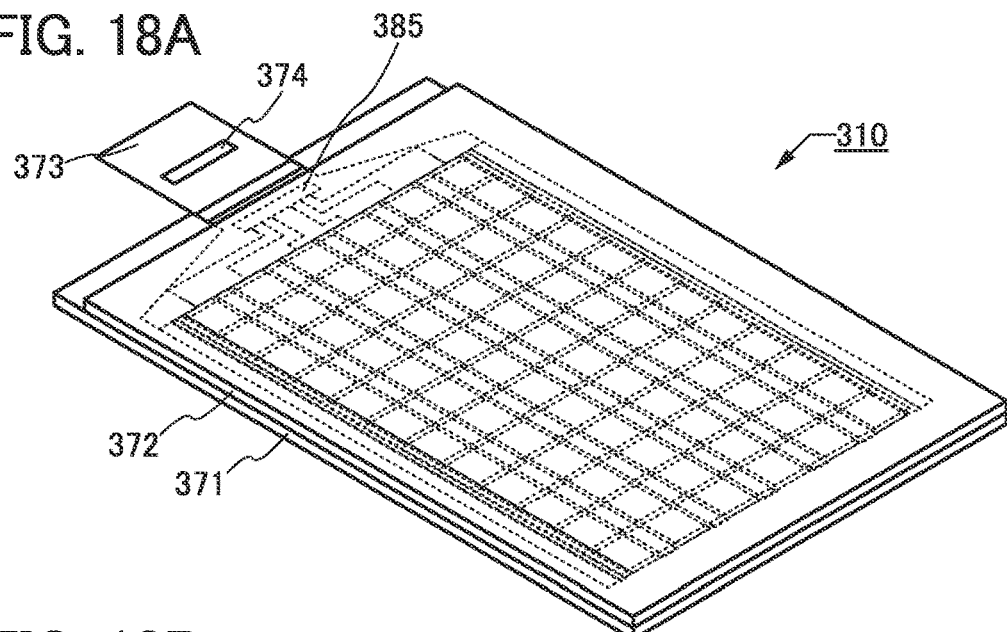
FIGS. 18A and 18B illustrate a structure example of a touch panel of one embodiment.
Figure 18B:
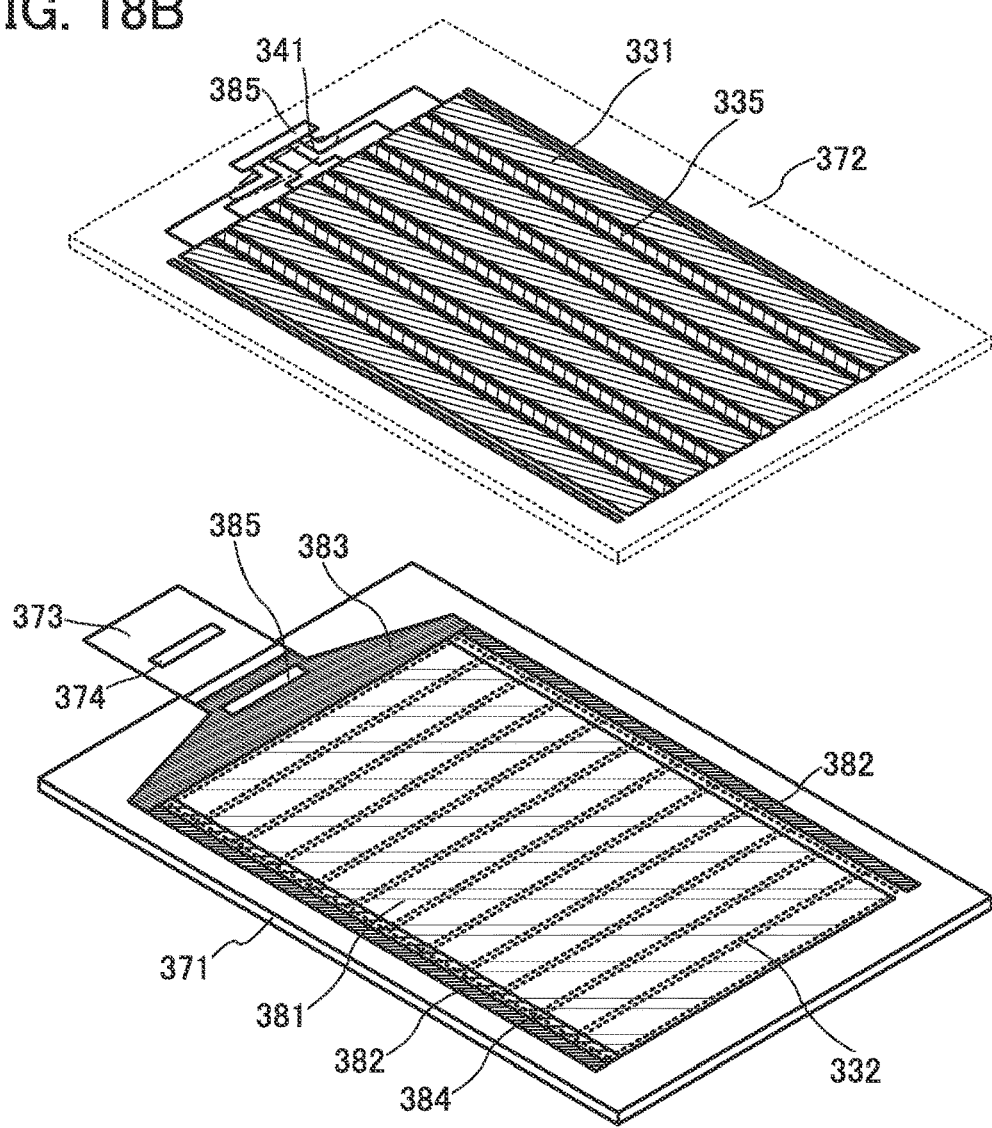

FIG. 18A is a schematic perspective view of a touch panel 310 of one embodiment of the present invention. FIG. 18B is a schematic perspective developed view of FIG. 18A. Note that only main components are illustrated for simplicity. In FIG. 18B, some components (such as a substrate 372) are shown only in dashed outline.

The touch panel 310 includes a substrate 371 and the substrate 372 which are provided so as to face each other.

A display portion 381, a driver circuit 382, a wiring 383, a driver circuit 384, and the like are provided over the substrate 371. A conductive layer 332 is formed in the display portion 381. The substrate 371 is provided with an FPC 373 which is electrically connected to the wiring 383. In the example illustrated in FIGS. 18A and 18B, an IC 374 is provided over the FPC 373.

A surface of the substrate 372 which faces the substrate 371 is provided with a plurality of conductive layers 331, a plurality of conductive layers 335, a plurality of conductive layers 341, and the like. Each of the conductive layers 341 is electrically connected to one of the plurality of conductive layers 331. The conductive layers 341 are electrically connected to the FPC 373 provided over the substrate 371 through a connection portion 385.

The conductive layer 335 is provided between the two conductive layers 331. With the conductive layer 335, the generation of a difference between the transmittance of a region where the conductive layer 331 is provided and the transmittance of a region where the conductive layer 331 is not provided can be suppressed. The conductive layer 335 is preferably electrically floating. With this structure, a change in the potential of one of the conductive layers 331 and 332 can be efficiently transmitted to the other through the conductive layer 335, thereby increasing the detection sensitivity. The conductive layer 335 is not necessarily provided, when it is not needed.

The display portion 381 includes at least a plurality of pixels. Each of the pixels includes at least one display element. It is preferable that each of the pixels include a transistor and a display element. As the display element, typically, a light-emitting element such as an organic EL element, a liquid crystal element, or the like can be used.

As the driver circuit 382, for example, a circuit functioning as a scan line driver circuit or a signal line driver circuit can be used.

The wiring 383 has a function of supplying a signal or electric power to the display portion 381 or the driver circuit 382. The signal or the electric power is input from the outside or the IC 374 to the wiring 383 through the FPC 373.

The driver circuit 384 has a function of sequentially selecting the conductive layers 332. When the touch sensor is driven by sequentially selecting not the conductive layers 332 but the conductive layers 331, the driver circuit 384 has a function of switching a fixed potential and a sensing signal and supplying it to the conductive layers 332. In the case where a signal for driving the touch sensor is supplied from the IC 374 or the outside, the driver circuit 384 is not necessarily provided.

In the example illustrated in FIGS. 18A and 18B, the IC 374 is mounted on the FPC 373 by a chip-on-film (COF) method. As the IC 374, for example, an IC functioning as a scan line driver circuit or a signal line driver circuit can be used. Note that it is possible that the IC 374 is not provided when the touch panel 310 includes circuits functioning as a scan line driver circuit and a signal line driver circuit or when circuits functioning as a scan line driver circuit and a signal line driver circuit are provided outside and a signal for driving the display portion 381 is input through the FPC 373. The IC 374 may also be directly mounted on the substrate 371 by a chip-on-glass (COG) method or the like.

The touch sensor includes the conductive layer 331 provided over the substrate 372 and the conductive layer 332 provided over the substrate 371. The touch sensor can perform detection by utilizing the capacitance formed between the conductive layers 331 and 332.

With the above structure, the FPCs connected to the touch panel 310 can be provided only on one substrate side (on the substrate 371 side in this embodiment). Furthermore, it is preferable that the touch panel 310 be provided with one FPC 373 which has a function of supplying signals to both the display panel and the touch sensor as illustrated in FIGS. 18A and 18B for the simplicity of the structure.

The IC 374 can have a function of driving the touch sensor. Alternatively, an IC for driving the touch sensor may further be provided. Further alternatively, an IC for driving the touch sensor may be mounted on the substrate 371.

Figure 19:
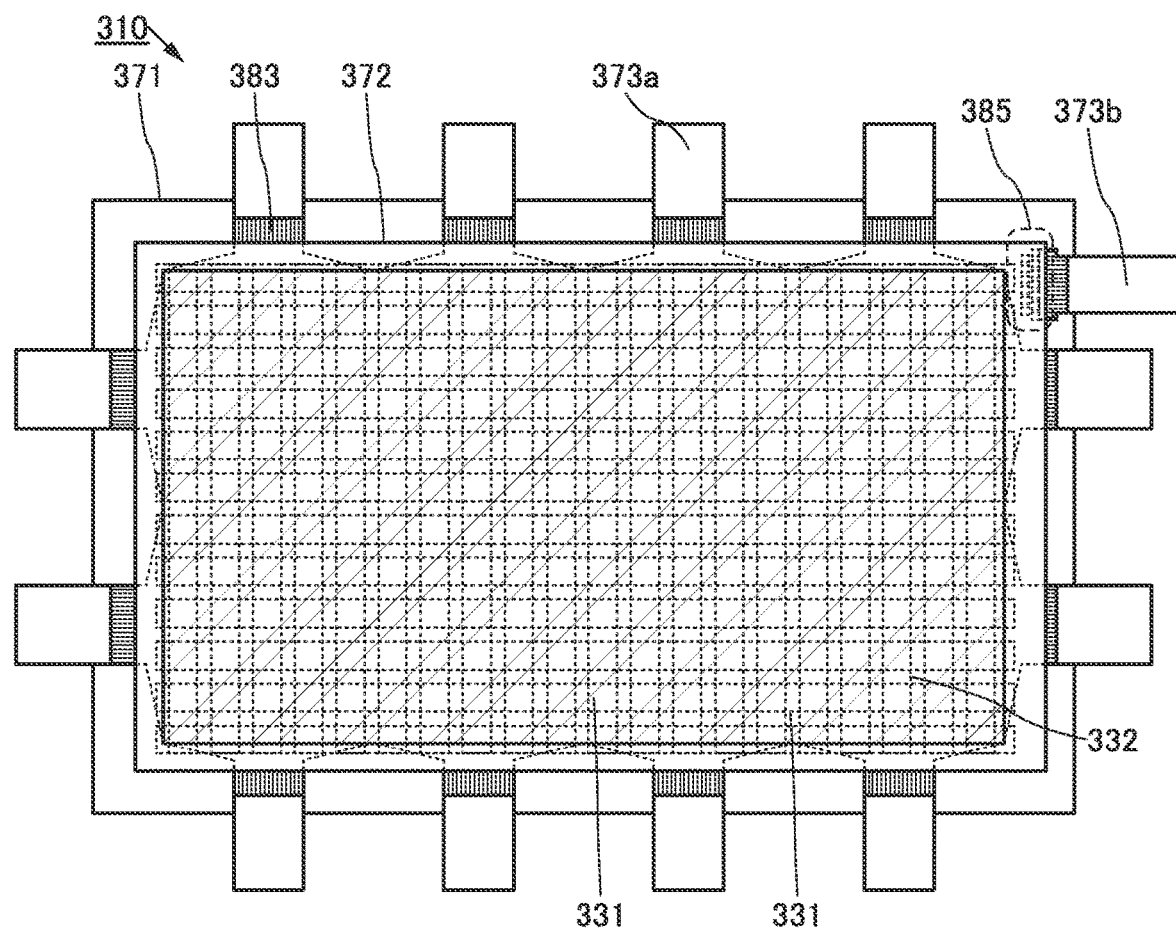
FIG. 19 illustrates a structure example of a touch panel of one embodiment.

FIG. 19 is a schematic top view of the touch panel 310 which has a structure different from that illustrated in FIGS. 18A and 18B.

The touch panel illustrated in FIG. 19 includes a plurality of FPCs 373a and an FPC 373b over the substrate 371. Each of the FPCs 373a has a function of supplying a signal for driving the display portion 381. The FPC 373b has a function of supplying a signal or the like to the conductive layer 331 provided on the substrate 372 side.

The FPCs 373a are provided along two or more sides of the display portion 381 included in the touch panel 310 as described above; in this manner, a lot of signals can be supplied to the touch panel 310. For example, in the case where the display portion 381 has a high resolution, by supplying signals to the display portion 381 from two or more sides as described above, parasitic capacitance between wirings which is generated when the wirings are provided at high density can be reduced. In the case of a large display device, the above structure can shorten the length of the wirings and thus reduce wiring resistance and suppress the influence of signal delay and the like.

Cross-Sectional Structure Example 1

Examples of the cross-sectional structure of a touch panel of one embodiment of the present invention are described below with reference to the drawings.

Cross-Sectional Structure Example 1-1

Figure 20:
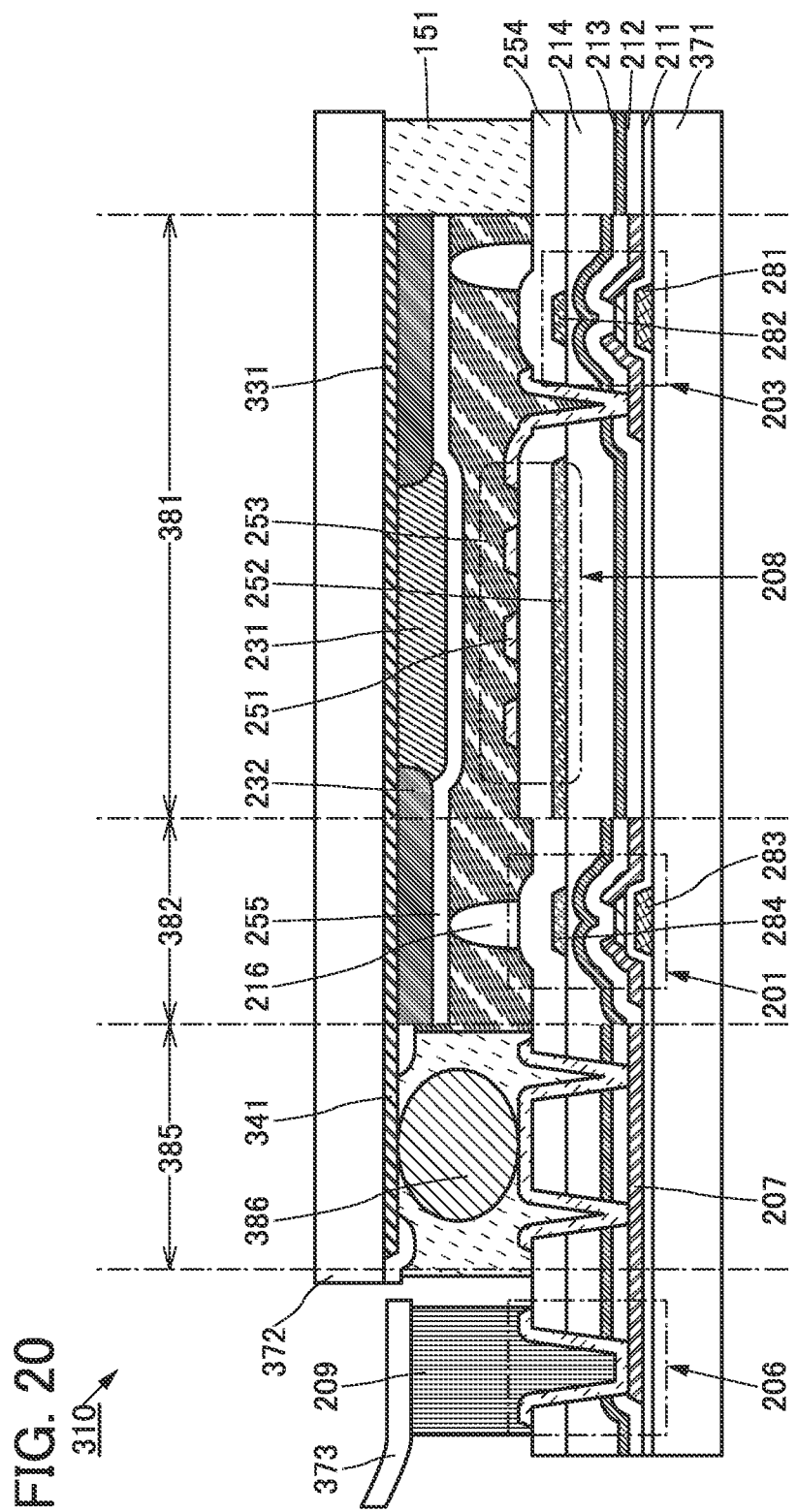
FIG. 20 illustrates a structure example of a touch panel of one embodiment.

FIG. 20 is a schematic cross-sectional view of the touch panel 310. FIG. 20 illustrates the cross sections of a region including the FPC 373, a region including the driver circuit 382, and a region including the display portion 381 in FIG. 18A.

The substrate 371 and the substrate 372 are attached to each other with an adhesive layer 151. A region surrounded by the substrate 371, the substrate 372, and the adhesive layer 151 is filled with liquid crystal 253.

A transistor 201, a transistor 203, a connection portion 206, a conductive layer 207, a conductive layer 251 and a conductive layer 252 included in a liquid crystal element 208, and the like are provided over the substrate 371.

An insulating layer 211, an insulating layer 212, an insulating layer 213, an insulating layer 214, an insulating layer 254, a spacer 216, and the like are provided over the substrate 371. Part of the insulating layer 211 functions as a gate insulating layer of each transistor. The insulating layer 212, the insulating layer 213, and the insulating layer 214 are provided to cover each transistor and the like. The insulating layer 214 functions as a planarization layer, for example. An example in which three insulating layers, the insulating layers 212, 213, and 214, are provided to cover the transistors and the like is described here; however, one embodiment of the present invention is not limited thereto, and four or more insulating layers, a single insulating layer, or two insulating layers may be provided. The insulating layer 214 functioning as a planarization layer is not necessarily provided when it is not needed.

FIG. 20 illustrates the cross section of one sub-pixel as an example of the display portion 381. For example, the sub-pixel is a sub-pixel exhibiting a red color, a sub-pixel exhibiting a green color, or a sub-pixel exhibiting a blue color; thus, full-color display can be achieved. The sub-pixel illustrated in FIG. 20 includes, for example, the transistor 203, the liquid crystal element 208, and a coloring layer 231.

FIG. 20 illustrates, as an example of the driver circuit 382, an example in which the transistor 201 is provided.

For example, in the example illustrated in FIG. 20, the transistor 201 has a structure in which a semiconductor layer where a channel is formed is provided between gate electrodes 283 and 284, and the transistor 203 has a structure in which a semiconductor layer where a channel is formed is provided between gate electrodes 281 and 282. In the case where the gate electrodes 281 and 282 are connected to each other and the gate electrodes 283 and 284 are connected to each other, such transistors can have a higher field-effect mobility and thus have a higher on-state current than other transistors. Consequently, a circuit capable of high-speed operation can be obtained. Furthermore, the area occupied by a circuit portion can be reduced. The use of the transistor having a high on-state current can reduce signal delay in wirings and can suppress display unevenness even in a display panel or a touch panel in which the number of wirings is increased because of increase in size or resolution.

Note that the transistor included in the driver circuit 382 and the transistor included in the display portion 381 may have the same structure. The plurality of transistors included in the driver circuit 382 may have the same structure or different structures. The plurality of transistors included in display portion 381 may have the same structure or different structures.

For example, a material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable touch panel can be achieved.

In the example illustrated in FIG. 20, a liquid crystal element using a fringe field switching (FFS) mode is used as the liquid crystal element 208. The liquid crystal element 208 includes the conductive layer 251, the liquid crystal 253, and the conductive layer 252. Orientation of the liquid crystal 253 can be controlled with an electric field generated between the conductive layer 251 and the conductive layer 252.

The conductive layer 252 is provided over the insulating layer 214. The insulating layer 254 is provided so as to cover the conductive layer 252, and the conductive layer 251 is provided over the insulating layer 254. The conductive layer 251 is electrically connected to one of a source and a drain of the transistor 203 through an opening provided in the insulating layers 254, 214, 213, and 212. With the conductive layers 251 and 252 each formed using a light-transmitting conductive material, the touch panel 310 can be a transmissive liquid crystal display device.

The conductive layer 251 has a comb-like top shape or a top shape provided with a slit (a top shape is also referred to as a planar shape). The conductive layer 252 is provided so as to overlap with the conductive layer 251. In a region overlapping with the coloring layer 231 and the like, there is a portion where the conductive layer 251 is not provided over the conductive layer 252.

In FIG. 20, the conductive layer 251 functions as a pixel electrode, and the conductive layer 252 functions as a common electrode. Alternatively, the conductive layer 251 which is provided in an upper layer and has a comb-like top shape or a top shape provided with a slit may be used as the common electrode, and the conductive layer 252 which is provided in a lower layer may be used as the pixel electrode. In that case, the conductive layer 252 may be electrically connected to one of the source and the drain of the transistor 203.

The connection portion 206 is provided in a region near an end portion of the substrate 371. The connection portion 206 is electrically connected to the FPC 373 through a connection layer 209. In the example illustrated in FIG. 20, the connection portion 206 is formed by stacking part of the conductive layer 207 and a conductive layer which is formed by processing the same conductive film as the conductive layer 251.

A surface of the substrate 372 which faces the substrate 371 is provided with the conductive layer 331, the conductive layer 341, the coloring layer 231, a light-blocking layer 232, an insulating layer 255, and the like.

In FIG. 20, the conductive layer 331 and the conductive layer 341 are formed on the same plane. The conductive layer 331 and the conductive layer 341 are preferably formed by processing the same conductive film at the same time. Alternatively, the conductive layer 331 and the conductive layer 341 may be continuous. In that case, at least a region that overlaps with the display portion 381 corresponds to the conductive layer 331 functioning as one electrode of the touch sensor, and the other region corresponds to the conductive layer 341. That is, FIG. 20 illustrates an example of a cross-sectional view in the case of FIG. 7A.

In the connection portion 385, the conductive layer 341 has a region that is not covered with the insulating layer 255. The conductive layer 341 is electrically connected to the conductive layer 207 provided on the substrate 371 side through a connector 386. Accordingly, the FPC 373 is electrically connected to the conductive layer 331. In the example illustrated in FIG. 20, a region where the connector 386 is in contact with the conductive layer 341 and a region where the connector 386 is in contact with a conductive layer which is formed on the same plane as the conductive layer 251 and is electrically connected to the conductive layer 207 are provided.

As the connector 386, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 386, a material capable of elastic deformation or plastic deformation is preferably used. As illustrated in FIG. 20, the conductive particle has a shape that is vertically crushed in some cases. With the crushed shape, the contact area between the connector 386 and a conductive layer electrically connected to the connector 386 can be increased, thereby reducing contact resistance and suppressing the generation of problems such as disconnection.

The connector 386 is preferably provided so as to be covered with the adhesive layer 151. For example, a paste or the like for forming the adhesive layer 151 may be applied, and then, the connector 386 may be provided in the connection portion 385. A structure in which the connection portion 385 is provided in a region provided with the adhesive layer 151 can be applied to, for example, a structure in which the adhesive layer 151 is provided in the peripheral region, e.g., a display device with a solid sealing structure, a display device with a hollow sealing structure, or the like.

The coloring layer 231 and the light-blocking layer 232 are provided on the conductive layer 331. The insulating layer 255 is provided so as to cover the coloring layer 231 and the light-blocking layer 232.

The insulating layer 255 has a function of an overcoat preventing impurities contained in the coloring layer 231, the light-blocking layer 232, and the like from diffusing into the liquid crystal 253.

The spacer 216 is provided over the insulating layer 254 and has a function of keeping a certain distance between the substrate 371 and the substrate 372. Although FIG. 20 illustrates the example in which the spacer 216 is in contact with components (e.g., the insulating layer 255) on the substrate 372 side, the spacer 216 is not necessarily in contact with them. Moreover, FIG. 20 illustrates the example in which the spacer 216 is provided on the substrate 371 side; however, the spacer 216 may be provided on the substrate 372 side. For example, the spacer 216 can be provided between adjacent two sub-pixels. A particulate spacer may be used as the spacer 216. Although a material such as silica can be used for the particulate spacer, an elastic material such as an organic resin or rubber is preferably used. In that case, the particulate spacer may have a shape that is vertically crushed.

Surfaces of the conductive layer 251, the insulating layer 254, the insulating layer 255, and the like which are in contact with the liquid crystal 253 may be provided with alignment films for controlling the orientation of the liquid crystal 253.

At least a region of the conductive layer 331 which overlaps with the coloring layer 231 is preferably formed using a light-transmitting material.

In the case of the liquid crystal element 208 that is a transmissive liquid crystal element, for example, two polarizing plates which are not illustrated are provided such that the display portion is sandwiched therebetween. Light from a backlight provided on the outer side of the polarizing plate enters through the polarizing plate. At this time, orientation of the liquid crystal 253 is controlled with a voltage applied between the conductive layer 251 and the conductive layer 252, whereby optical modulation of light can be controlled. In other words, the intensity of light emitted through the polarizing plate can be controlled. Light entering from the backlight, excluding light in a particular wavelength range, is absorbed by the coloring layer 231, so that red, blue, or green light is emitted from the liquid crystal element 208.

In addition to the polarizing plate, a circularly polarizing plate can be used, for example. An example of the circularly polarizing plate is a stack including a linear polarizing plate and a quarter-wave retardation plate. With the circularly polarizing plate, the viewing angle dependency can be reduced.

In the example illustrated here, the liquid crystal element 20 is a liquid crystal element using an FFS mode. However, one embodiment of the present invention is not limited thereto, and a liquid crystal element using any of a variety of modes can be used. For example, a liquid crystal element using a vertical alignment (VA) mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

Furthermore, a normally black liquid crystal display device, for example, a transmissive liquid crystal display device using a vertical alignment (VA) mode, may be used as the touch panel 310. Examples of the vertical alignment mode include a multi-domain vertical alignment (MVA) mode, a patterned vertical alignment (PVA) mode, and an advanced super-view (ASV) mode.

The liquid crystal element is an element that controls transmission and non-transmission of light by optical modulation action of the liquid crystal. Note that optical modulation action of the liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, antiferroelectric liquid crystal, or the like can be used. Such a liquid crystal material exhibits a cholesteric phase, a smectic phase, a cubic phase, a chiral nematic phase, an isotropic phase, or the like depending on the conditions.

As the liquid crystal material, either of positive liquid crystal and negative liquid crystal may be used, and an appropriate liquid crystal material can be used depending on the mode or design to be used.

In the case of employing a horizontal electric field mode, liquid crystal exhibiting a blue phase for which an alignment film is unnecessary may be used. A blue phase is one of liquid crystal phases, which is generated just before a cholesteric phase changes into an isotropic phase while the temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and has optical isotropy. In addition, the liquid crystal composition which includes liquid crystal exhibiting a blue phase and a chiral material does not need alignment treatment and has a small viewing angle dependence. An alignment film does not need to be provided and rubbing treatment is thus not necessary; accordingly, electrostatic discharge damage caused by the rubbing treatment can be prevented, and defects and damage of the liquid crystal display device in the manufacturing process can be reduced.

In this structure example, touch operation or the like can be detected by utilizing the capacitance formed between the conductive layer 331 and the conductive layer 252. That is, the conductive layer 252 serves as one of a pair of electrodes of the liquid crystal element 208 as well as one of a pair of electrodes of the touch sensor.

The conductive layer 251, 252, or 331 is preferably formed using a conductive material transmitting visible light. The conductive layer 251, 252, or 331 is formed using, for example, a conductive material containing a metal oxide. For example, a metal oxide among light-transmitting conductive materials described later can be used.

Alternatively, the conductive layer 251, 252, or 331 is preferably formed using a metal oxide containing the same metal element as other conductive layers or a semiconductor layer. In particular, in the case where an oxide semiconductor is used for the semiconductor layer of the transistor in the touch panel 310, a conductive oxide containing a metal element contained in the oxide semiconductor is preferably used. The insulating layer 254 may be formed using a silicon nitride film containing hydrogen. In that case, the conductivity of the conductive layer 252 which is formed using an oxide semiconductor can be improved by hydrogen supplied from the insulating layer 254. That is, the oxide semiconductor can be of an $n^+$-type.

Depending on the conditions, a fixed potential may be supplied to the conductive layer 331. In that case, electromagnetic noise from the outside can be blocked. For example, when sensing is not performed, a constant potential that does not influence the switching of the liquid crystal 253 may be supplied to the conductive layer 331. For example, a ground potential, a common potential, or a predetermined constant potential can be supplied. The conductive layer 331 and the conductive layer 252 may be set at the same potential, for example.

By applying an appropriate potential to the conductive layer 331, a component in the thickness direction in the directions of an electric field (the directions of the lines of electric force) generated between the conductive layer 251 and the conductive layer 252 can be reduced, and an electric field can be effectively applied in the direction substantially perpendicular to the thickness direction (in the lateral direction). Thus, an orientation defect in the liquid crystal 253 can be suppressed, and a malfunction such as light leakage can be prevented.

A substrate which an object such as a finger or a stylus directly touches may be provided above the substrate 372. In that case, a polarizing plate or a circularly polarizing plate is preferably provided between the substrate 372 and the above substrate. In that case, the above substrate is preferably provided with a protective layer (such as a ceramic coat). The protective layer can be formed using an inorganic insulating material such as silicon oxide, aluminum oxide, yttrium oxide, or yttria-stabilized zirconia (YSZ). In addition, tempered glass may be used for the above substrate. The tempered glass which can be used here is one that has been subjected to physical or chemical treatment by an ion exchange method, a thermal tempering method, or the like and has a surface to which compressive stress has been applied.

[Components]

The above components are described below.

[Substrate]

A substrate having a flat surface can be used as the substrate included in the touch panel. The substrate through which light emitted from the display element is extracted is formed using a material that transmits the light. For example, a material such as glass, quartz, ceramics, sapphire, or an organic resin can be used. Alternatively, a single crystal semiconductor substrate or a polycrystalline semiconductor substrate made of silicon, silicon carbide, or the like, a compound semiconductor substrate made of silicon germanium or the like, an SOI substrate, or the like may be used. Still alternatively, any of these substrates provided with a semiconductor element may be used as the substrate.

In the case where a glass substrate is used as the substrate, a large glass substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured. Alternatively, a flexible substrate may be used as the substrate, and a transistor, a capacitor, or the like may be provided directly over the flexible substrate.

The weight and thickness of the touch panel can be decreased by using a thin substrate. Furthermore, a flexible touch panel can be obtained by using a substrate that is thin enough to have flexibility.

As the glass, for example, non-alkali glass, barium borosilicate glass, aluminoborosilicate glass, or the like can be used.

Examples of a material having flexibility and a light-transmitting property with respect to visible light include glass that is thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and thus, a touch panel using this substrate can also be lightweight.

Since the substrate through which light is not extracted does not need to have a light-transmitting property, a metal substrate using a metal material or an alloy material, a ceramic substrate, a semiconductor substrate, or the like can be used as well as the above-described substrates. A metal material and an alloy material, which have high thermal conductivity, are preferable because they can easily conduct heat to the whole sealing substrate and accordingly can prevent a local temperature rise in the touch panel. To obtain flexibility and bendability, the thickness of a metal substrate is preferably greater than or equal to 10 μm and less than or equal to 200 μm, more preferably greater than or equal to 20 μm and less than or equal to 50 μm.

There is no particular limitation on a material of the metal substrate, but it is preferable to use, for example, aluminum, copper, nickel, or a metal alloy such as an aluminum alloy or stainless steel.

It is preferable to use a substrate subjected to insulation treatment in such a manner that a surface of a conductive substrate is oxidized or an insulating film is formed on a surface. An insulating film may be formed by, for example, a coating method such as a spin-coating method or a dipping method, an electrodeposition method, an evaporation method, or a sputtering method. An oxide film may be formed on the substrate surface by an anodic oxidation method, exposing to or heating in an oxygen atmosphere, or the like.

The flexible substrate may have a stacked structure of a layer of any of the above-mentioned materials and a hard coat layer (e.g., a silicon nitride layer) which protects a surface of the touch panel from damage or the like, a layer (e.g., an aramid resin layer) which can disperse pressure, or the like. Furthermore, to suppress a decrease in the lifetime of the display element due to moisture and the like, an insulating film with low water permeability may be provided. For example, a film containing nitrogen and silicon (e.g., a silicon nitride film or a silicon oxynitride film) or a film containing nitrogen and aluminum (e.g., an aluminum nitride film) may be provided.

The substrate may be formed by stacking a plurality of layers. In particular, when a glass layer is used, a barrier property against water and oxygen can be improved, and thus, a highly reliable touch panel can be provided.

A substrate in which a glass layer, an adhesive layer, and an organic resin layer are stacked from the side closer to the display element can be used, for example. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a high flexibility. The thickness of the organic resin layer is greater than or equal to 10 μm and less than or equal to 200 μm, preferably greater than or equal to 20 μm and less than or equal to 50 μm. By providing such an organic resin layer, occurrence of a break or a crack in the glass layer can be inhibited, and the mechanical strength can be improved. With the substrate that includes such a composite material of a glass material and an organic resin, a highly reliable flexible touch panel can be provided.

[Transistor]

The transistor includes a conductive layer functioning as the gate electrode, the semiconductor layer, a conductive layer functioning as the source electrode, a conductive layer functioning as the drain electrode, and the insulating layer functioning as the gate insulating layer. In the above example, a bottom-gate transistor is used.

Note that there is no particular limitation on the structure of the transistor included in the touch panel of one embodiment of the present invention. For example, a planar transistor, a staggered transistor, or an inverted staggered transistor may be used. A top-gate transistor or a bottom-gate transistor may be used. Gate electrodes may be provided above and below a channel. There is no particular limitation on a semiconductor material used for the transistor, and an oxide semiconductor, silicon, or germanium can be used, for example.

There is no particular limitation on the crystallinity of a semiconductor material used for the transistor, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

An oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because the off-state current of the transistor can be reduced.

For example, the oxide semiconductor preferably contains at least indium (In) or zinc (Zn). The oxide semiconductor more preferably includes an In-M-Zn oxide (M is a metal such as Al, Ti, Ga, Ge, Y, Zr, Sn, La, Ce, Hf, or Nd).

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor with crystallinity for the semiconductor layer makes it possible to provide a highly reliable transistor in which a variation in electrical characteristics is suppressed.

A transistor with an oxide semiconductor whose band gap is wider than that of silicon can hold electric charge stored in a capacitor that is series-connected to the transistor for a long time, owing to a low off-state current of the transistor.

When such a transistor is used for a pixel, operation of a driver circuit can be stopped while a gray scale of an image displayed in each display region is maintained. As a result, a display device with an extremely low power consumption can be obtained.

The semiconductor layer preferably includes a film represented by an In-M-Zn oxide that contains, for example, at least indium (In), zinc (Zn), and M (a metal such as Al, Ti, Ga, Y, Zr, La, Ce, Sn, or Hf). In order to reduce variations in electrical characteristics of the transistor including the oxide semiconductor, the oxide semiconductor preferably contains a stabilizer in addition to the above elements.

Examples of the stabilizer, including metals that can be used as M, are gallium (Ga), tin (Sn), hafnium (Hf), aluminum (Al), and zirconium (Zr). Other examples of the stabilizer are lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As an oxide semiconductor included in the semiconductor layer, any of the following oxides can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, an "In—Ga—Zn-based oxide" means an oxide containing In, Ga, and Zn as its main components, and there is no limitation on the ratio of In:Ga:Zn. The In—Ga—Zn-based oxide may contain another metal element in addition to In, Ga, and Zn.

The semiconductor layer and the conductive layer may include the same metal elements contained in the above oxides. The use of the same metal elements for the semiconductor layer and the conductive layer can reduce the manufacturing cost. For example, when metal oxide targets with the same metal composition are used, the manufacturing cost can be reduced, and the same etching gas or the same etchant can be used in processing the semiconductor layer and the conductive layer. Note that even when the semiconductor layer and the conductive layer include the same metal elements, they have different compositions in some cases. For example, a metal element in a film is released during the manufacturing process of the transistor and the capacitor, which might result in different metal compositions.

Note that in the case where the semiconductor layer includes an In-M-Zn oxide, when the summation of In and M is assumed to be 100 atomic %, the atomic proportions of In and M, not taking Zn and O into consideration, are preferably higher than 25 atomic % and lower than 75 atomic %, respectively, more preferably higher than 34 atomic % and lower than 66 atomic %, respectively.

The energy gap of the semiconductor layer is 2 eV or more, preferably 2.5 eV or more, more preferably 3 eV or more. In this manner, the off-state current of the transistor can be reduced by using an oxide semiconductor having a wide energy gap.

The thickness of the semiconductor layer is greater than or equal to 3 nm and less than or equal to 200 nm, preferably greater than or equal to 3 nm and less than or equal to 100 nm, more preferably greater than or equal to 3 nm and less than or equal to 50 nm.

In the case where the semiconductor layer includes an In-M-Zn oxide (M represents Al, Ti, Ga, Ge, Y, Zr, Sn, La, Ce, Hf, or Nd), it is preferable that the atomic ratio of metal elements of a sputtering target used for forming a film of the In-M-Zn oxide satisfy In M and Zn M. As the atomic ratio of the metal elements of such a sputtering target, In:M:Zn=1:1:1, In:M:Zn=1:1:1.2, In:M:Zn=3:1:2, and In:M:Zn=4:2:3 are preferable. Note that the atomic ratio of metal elements in the formed semiconductor layer varies from the above atomic ratio of metal elements of the sputtering target within a range of ±40% as an error.

An oxide semiconductor film with a low carrier density is used as the semiconductor layer. For example, an oxide semiconductor film whose carrier density is lower than or equal to $1\times10^{17}/cm^3$, preferably lower than or equal to $1\times10^{15}/cm^3$, more preferably lower than or equal to $1\times10^{13}/cm^3$, more preferably lower than or equal to $1\times10^{11}/cm^3$ is used as the semiconductor layer.

Note that, without limitation to the compositions and materials described above, a material with an appropriate composition may be used depending on required semiconductor characteristics and electrical characteristics (e.g., field-effect mobility and threshold voltage) of the transistor. Furthermore, to obtain required semiconductor characteristics of the transistor, it is preferable that the carrier density, the impurity concentration, the defect density, the atomic ratio of a metal element to oxygen, the interatomic distance, the density, and the like of the semiconductor layer be set to be appropriate.

When silicon or carbon which is one of elements belonging to Group 14 is contained in the semiconductor layer, oxygen vacancies are increased, and the semiconductor layer has n-type conductivity. Thus, the concentration of silicon or carbon (measured by secondary ion mass spectrometry (SIMS)) of the semiconductor layer is lower than or equal to $2\times10^{18}$ atoms/$cm^3$, preferably lower than or equal to $2\times10^{17}$ atoms/$cm^3$.

Furthermore, the concentration of alkali metal or alkaline earth metal in the semiconductor layer, which is measured by SIMS, is lower than or equal to $1\times10^{18}$ atoms/$cm^3$, preferably lower than or equal to $2\times10^{16}$ atoms/$cm^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal in the semiconductor layer.

When nitrogen is contained in the semiconductor layer, electrons serving as carriers are generated to increase the carrier density, so that the semiconductor layer easily has n-type conductivity. Thus, a transistor including an oxide semiconductor which contains nitrogen is likely to be normally on. For this reason, nitrogen in the oxide semiconductor film is preferably reduced as much as possible; the concentration of nitrogen which is measured by SIMS is preferably set to, for example, lower than or equal to $5\times10^{18}$ atoms/$cm^3$.

The semiconductor layer may have a non-single-crystal structure, for example. The non-single-crystal structure includes a c-axis aligned crystalline oxide semiconductor (CAAC-OS) which is described later, a polycrystalline structure, a microcrystalline structure which is described later, or an amorphous structure, for example. Among the non-single-crystal structures, an amorphous structure has the highest density of defect states, whereas CAAC-OS has the lowest density of defect states.

The semiconductor layer may have an amorphous structure, for example. An oxide semiconductor film having an amorphous structure has disordered atomic arrangement and no crystalline component, for example. Alternatively, an oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, a region of CAAC-OS, and a region having a single-crystal structure. Furthermore, the mixed film has a stacked-layer structure of two or more of the following in some cases: the region having an amorphous structure, the region having a microcrystalline structure, the region having a polycrystalline structure, the region of CAAC-OS, and the region having a single-crystal structure.

Alternatively, silicon is preferably used as a semiconductor in which a channel of the transistor is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has a higher field-effect mobility and a higher reliability than amorphous silicon. When such a polycrystalline semiconductor is used for a pixel, the aperture ratio of the pixel can be improved. Even in the case where pixels are provided at extremely high resolution, a gate driver circuit and a source driver circuit can be formed over a substrate over which the pixels are formed, and the number of components of an electronic device can be reduced.

[Conductive Layer]

As conductive layers such as a gate, a source, and a drain of the transistor and a wiring and an electrode in the touch panel, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may also be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

Alternatively, for the conductive layer, an oxide semiconductor similar to that of the semiconductor layer is preferably used. In that case, it is preferable that the conductive layer be formed to have a lower electric resistance than a region in the semiconductor layer where a channel is formed.

For example, such a conductive layer can be used as the conductive layer functioning as the second gate electrode of the transistor. Alternatively, it can be used as another light-transmitting conductive layer.

[Method for Controlling Resistivity of Oxide Semiconductor]

An oxide semiconductor film that can be used as each of the semiconductor layer and the conductive layer includes a semiconductor material whose resistivity can be controlled by oxygen vacancies in the film and/or the concentration of impurities such as hydrogen or water in the film. Thus, treatment to be performed on the semiconductor layer and the conductive layer is selected from the following to control the resistivity of each of the oxide semiconductor films: treatment for increasing oxygen vacancies and/or the impurity concentration and treatment for reducing oxygen vacancies and/or the impurity concentration.

Specifically, plasma treatment is performed on the oxide semiconductor film used as the conductive layer to increase oxygen vacancies and/or impurities such as hydrogen or water in the oxide semiconductor film, so that the oxide semiconductor film can have a high carrier density and a low resistivity. Furthermore, an insulating film containing hydrogen is formed in contact with the oxide semiconductor film to diffuse hydrogen from the insulating film containing hydrogen to the oxide semiconductor film, so that the oxide semiconductor film can have a high carrier density and a low resistivity.

The semiconductor layer that functions as the channel region of the transistor is not in contact with the insulating films containing hydrogen. With the use of an insulating film containing oxygen, in other words, an insulating film capable of releasing oxygen, for at least one of the insulating films in contact with the semiconductor layer, oxygen can be supplied to the semiconductor layer. The semiconductor layer to which oxygen is supplied is an oxide semiconductor film having a high resistivity because oxygen vacancies in the film or at the interface are compensated. Note that as the insulating film capable of releasing oxygen, a silicon oxide film or a silicon oxynitride film can be used, for example.

To reduce the resistivity of the oxide semiconductor film, an ion implantation method, an ion doping method, a plasma immersion ion implantation method, or the like can be employed to inject hydrogen, boron, phosphorus, or nitrogen into the oxide semiconductor film.

To reduce the resistivity of the oxide semiconductor film, plasma treatment may be performed on the oxide semiconductor film. For the plasma treatment, for example, a gas containing at least one of a rare gas (He, Ne, Ar, Kr, or Xe), hydrogen, and nitrogen is typically used. Specifically, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, plasma treatment in a nitrogen atmosphere, or the like can be employed.

In the oxide semiconductor film subjected to the plasma treatment, an oxygen vacancy is formed in a lattice from which oxygen is released (or in a portion from which oxygen is released). This oxygen vacancy can generate a carrier. When hydrogen is supplied from an insulating film that is in the vicinity of the oxide semiconductor film, specifically, that is in contact with the lower surface or the upper surface of the oxide semiconductor film, and hydrogen is bonded to the oxygen vacancy, an electron serving as a carrier might be generated.

The oxide semiconductor film in which oxygen vacancies are filled with oxygen and the hydrogen concentration is reduced can be referred to as a highly purified intrinsic or substantially highly purified intrinsic oxide semiconductor film. The term "substantially intrinsic" refers to the state where the oxide semiconductor film has a carrier density of lower than $8\times10^{11}/cm^3$, preferably lower than $1\times10^{11}/cm^3$, more preferably lower than $1\times10^{10}/cm^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

The highly purified intrinsic or substantially highly purified intrinsic oxide semiconductor film has an extremely low off-state current; even when an element has a channel width of $1\times10^6$ μm and a channel length of 10 μm, the off-state current can be lower than or equal to the measurement limit of a semiconductor parameter analyzer, i.e., lower than or equal to $1\times10^{-13}$ A, at a voltage (drain voltage) between a source electrode and a drain electrode of from 1 V to 10 V. Accordingly, the transistor in which the channel region is formed in the semiconductor layer that is a highly purified intrinsic or substantially highly purified intrinsic oxide semiconductor film can have a small variation in electrical characteristics and a high reliability.

For example, an insulating film containing hydrogen, in other words, an insulating film capable of releasing hydrogen, typically, a silicon nitride film, is used as the insulating film in contact with the oxide semiconductor film used as the conductive layer, whereby hydrogen can be supplied to the conductive layer. The hydrogen concentration in the insulating film capable of releasing hydrogen is preferably higher than or equal to $1\times10^{22}$ atoms/cm$^3$. Such an insulating film is formed in contact with the conductive layer, whereby hydrogen can be effectively contained in the conductive layer. In this manner, the resistivity of the oxide semiconductor film can be controlled by changing the structures of the insulating films in contact with the semiconductor layer and the conductive layer.

Hydrogen contained in the oxide semiconductor film reacts with oxygen bonded to a metal atom to be water and also causes an oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Accordingly, the conductive layer formed in contact with the insulating film containing hydrogen is an oxide semiconductor film that has a higher carrier density than the semiconductor layer.

Hydrogen in the semiconductor layer of the transistor in which a channel region is formed is preferably reduced as much as possible. Specifically, in the semiconductor layer, the concentration of hydrogen which is measured by SIMS is lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, more preferably lower than $5\times10^{18}$ atoms/cm$^3$, more preferably lower than or equal to $1\times10^{18}$ atoms/cm$^3$, more preferably lower than or equal to $5\times10^{17}$ atoms/cm$^3$, more preferably lower than or equal to $1\times10^{16}$ atoms/cm$^3$.

The conductive layer is an oxide semiconductor film that has a higher hydrogen concentration and/or a larger number of oxygen vacancies (i.e., a lower resistivity) than the semiconductor layer. The hydrogen concentration in the conductive layer is higher than or equal to $8\times10^{19}$ atoms/cm$^3$, preferably higher than or equal to $1\times10^{20}$ atoms/cm$^3$, more preferably higher than or equal to $5\times10^{20}$ atoms/cm$^3$. The hydrogen concentration in the conductive layer is greater than or equal to 2 times, preferably greater than or equal to 10 times the hydrogen concentration in the semiconductor layer. The resistivity of the conductive layer is preferably greater than or equal to $1\times10^{-8}$ times and less than $1\times10^{-1}$ times the resistivity of the semiconductor layer. The resistivity of the conductive layer is typically higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm.

[Insulating Layer]

Examples of an insulating material that can be used for the insulating layers, the overcoat, the spacer, and the like include a resin such as an acrylic or an epoxy, a resin having a siloxane bond, and an inorganic insulating material such as silicon oxide, silicon oxynitride, silicon nitride oxide, silicon nitride, or aluminum oxide.

[Adhesive Layer]

For the adhesive layer, a curable resin such as a heat curable resin, a photocurable resin, or a two-component type curable resin can be used. For example, an acrylic resin, a urethane resin, an epoxy resin, or a resin having a siloxane bond such as silicone can be used.

[Connection Layer]

For the connection layer, an anisotropic conductive film (ACF), an anisotropic conductive paste (ACP), or the like can be used.

[Coloring Layer]

Examples of a material that can be used for the coloring layer include a metal material, a resin material, and a resin material containing a pigment or dye.

The above is the description of the components.

Cross-Sectional Structure Example 1-2

Figure 21:
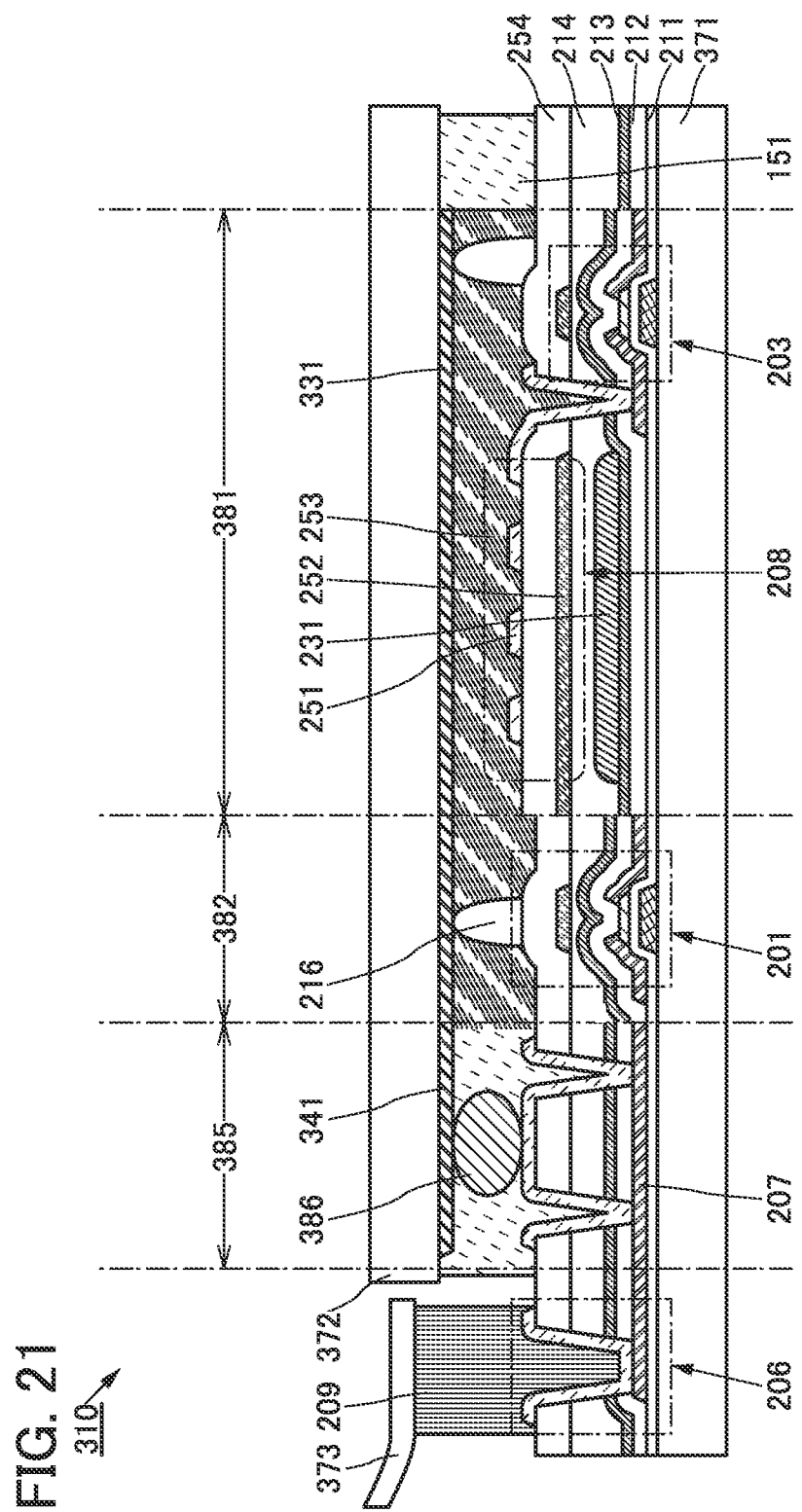
FIG. 21 illustrates a structure example of a touch panel of one embodiment.

FIG. 21 illustrates a cross-sectional structure example of a touch panel which partly differs from the above example. Note that the description of the portions already described is omitted and different portions are described.

FIG. 21 illustrates an example in which the coloring layer 231 is provided on the substrate 371 side. Specifically, the coloring layer 231 is provided in contact with the upper surface of the insulating layer 213. The insulating layer 214 functioning as a planarization layer is provided so as to cover the coloring layer 231.

With such a structure, the structure of the substrate 372 can be more simplified. For example, in FIG. 21, the substrate 372 is provided with only the conductive layers 331 and 341. Note that the substrate 372 may also be provided with an alignment film or the like when it is needed.

Cross-Sectional Structure Example 1-3

Figure 22:
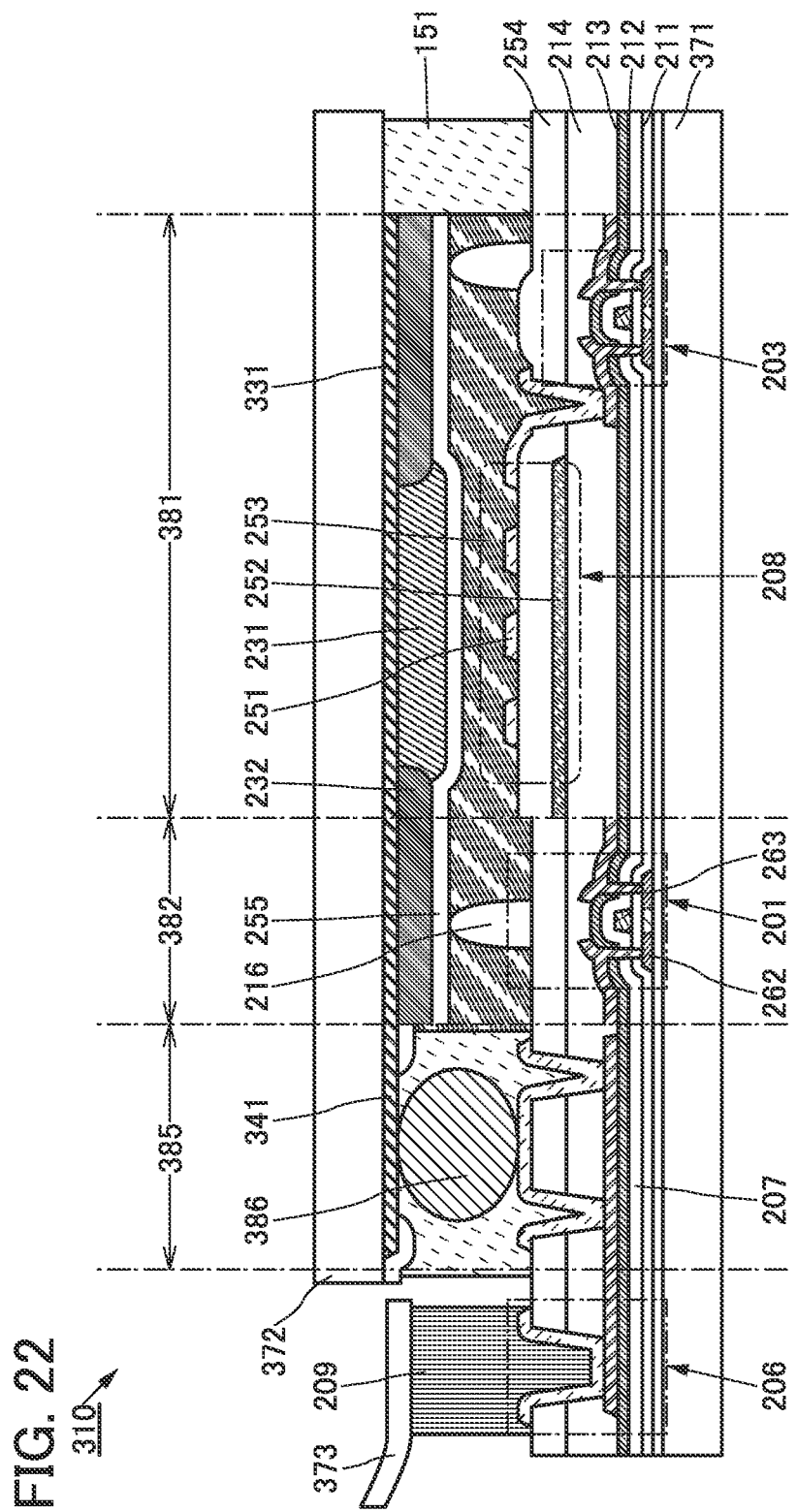
FIG. 22 illustrates a structure example of a touch panel of one embodiment.

FIG. 22 illustrates an example in which the transistors 201 and 203 in FIG. 20 each have a top-gate structure.

Each of the transistors includes a semiconductor layer, and a gate electrode is provided over the semiconductor layer with the insulating layer 211 provided therebetween. The semiconductor layer may include a low-resistance region. The low-resistance region functions as a source or a drain.

The source electrodes and the drain electrodes of the transistors are provided over the insulating layer 213 and electrically connected to the low-resistance regions in the semiconductor layers through openings provided in the insulating layers 213, 212, and 211.

The low-resistance region in the semiconductor layer can be, for example, a region containing more impurities than a region where a channel of the transistor is formed, a region with a high carrier concentration, a region with low crystallinity, or the like. An impurity which can increase the conductivity depends on a semiconductor used for the semiconductor layer; typically, an element that can impart n-type conductivity, such as phosphorus, an element that can impart p-type conductivity, such as boron, a rare gas such as helium, neon, or argon, hydrogen, lithium, sodium, magnesium, aluminum, nitrogen, fluorine, potassium, calcium, or the like can be given. In addition to the above elements, titanium, iron, nickel, copper, zinc, silver, indium, tin, or the like also functions as an impurity which influences the conductivity of the semiconductor. For example, a region 262 and a region 263 contain the above impurity at a higher concentration than the region where a channel of the transistor is formed.

Cross-Sectional Structure Example 1-4

Figure 23:
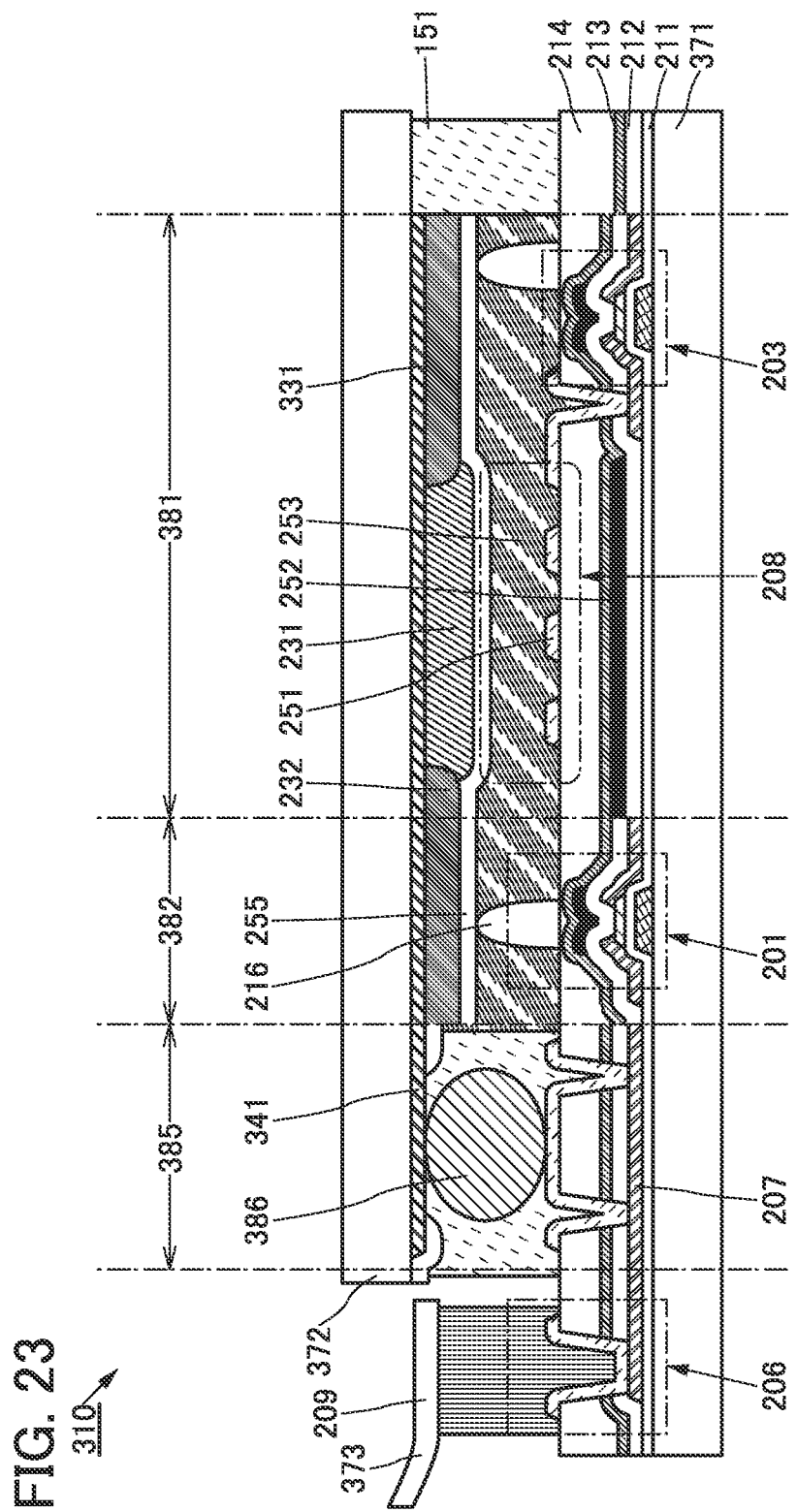
FIG. 23 illustrates a structure example of a touch panel of one embodiment.

FIG. 23 illustrates an example in which the positon of the conductive layer 252 is different from those in FIG. 20 and the like. Specifically, the conductive layer 252 is provided between the insulating layer 212 and the insulating layer 213.

For the conductive layer 252, for example, any of the above-described light-transmitting conductive materials can be used.

In addition, for example, the conductive layer 252 preferably includes a low-resistance oxide semiconductor. In particular, in the case where an oxide semiconductor is used for the semiconductor layer of the transistor in the touch panel 310, the conductive layer 252 is preferably formed using an oxide semiconductor whose resistivity is lower than that of the oxide semiconductor used for the semiconductor layer.

The resistivity of the conductive layer 252 can be reduced, for example, by the method for controlling the resistivity of an oxide semiconductor which is described above.

In that case, the insulating layer containing much hydrogen is preferably used as the insulating layer 213 covering the conductive layer 252. In particular, the insulating layer 213 preferably includes an insulating film containing silicon nitride.

Cross-Sectional Structure Example 2

Cross-sectional structure examples of the touch panel partly different from the above cross-sectional structure examples are described below.

Cross-Sectional Structure Example 2-1

Figure 24:
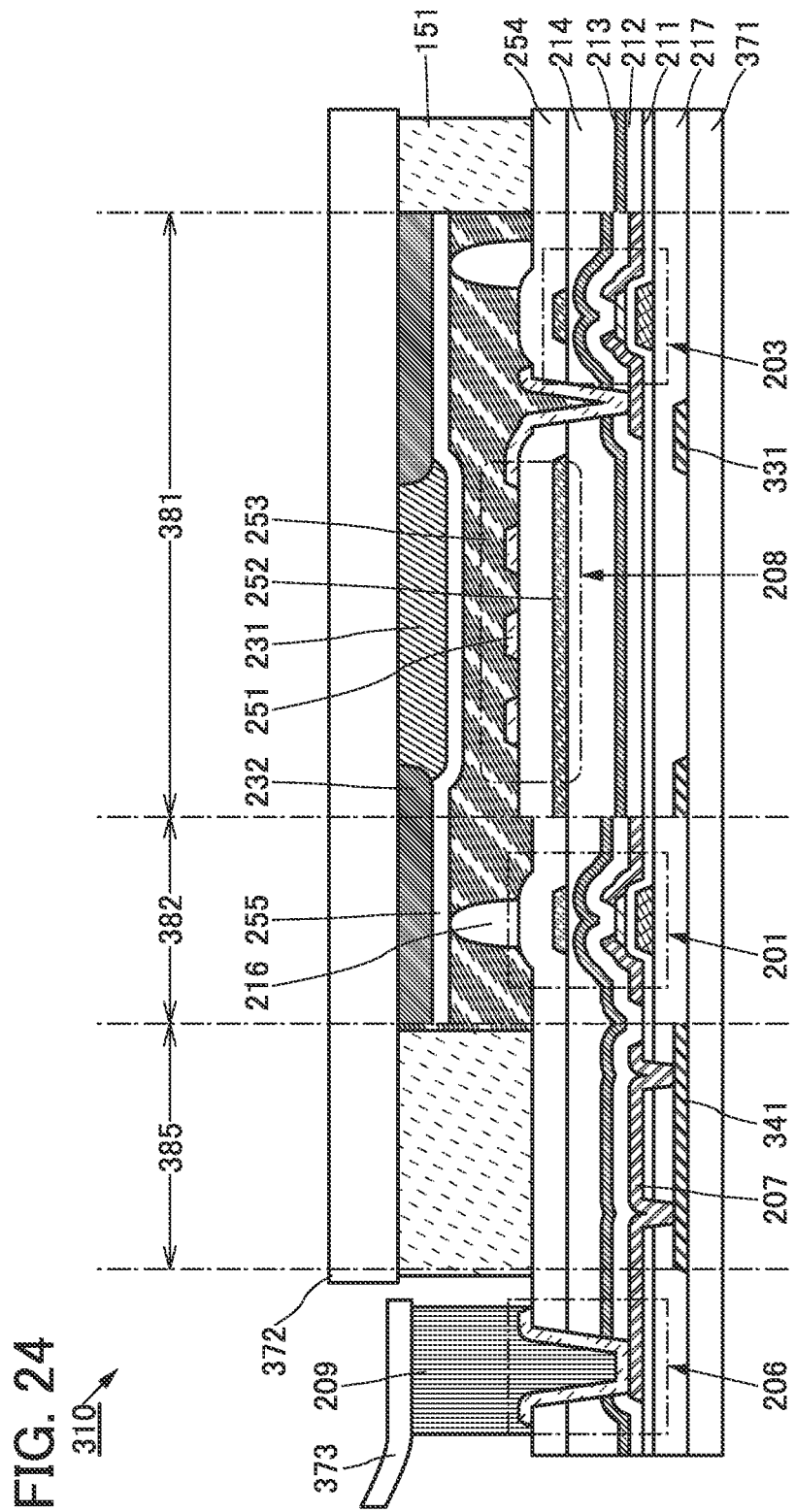
FIG. 24 illustrates a structure example of a touch panel of one embodiment.

A cross-sectional structure example in FIG. 24 is different from the above cross-sectional structure examples in that the conductive layer 331 and the conductive layer 341 are provided on the substrate 371 side.

The conductive layers 331 and 341 are provided over the substrate 371. The insulating layer 217 is provided so as to cover the conductive layers 331 and 341. The transistor 201, the transistor 203, and the like are provided over the insulating layer 217.

In the connection portion 385, the conductive layer 341 is electrically connected to the conductive layer 207 through an opening in the insulating layer 217.

Touch operation can be detected by utilizing the capacitance generated between the conductive layers 331 and 252.

With such a structure, the structure of the substrate 372 can be simplified.

For the conductive layers 331 and 341, a conductive material with high heat resistance is preferably used. In the case where a light-blocking material such as a metal is used for the conductive layer 331, an opening is preferably provided in a region overlapping with the coloring layer 231 as illustrated in FIG. 24.

The conductive layer 331 is preferably provided in a position that does not overlap with the transistor 203 and the like as illustrated in FIG. 24. Alternatively, an opening is preferably provided in the conductive layer 331 in a region overlapping with the transistor 203 and the like. With such a structure, a malfunction of the transistor 203 and the like due to a change in potential of the conductive layer 331 can be suppressed.

Cross-Sectional Structure Example 2-2

Figure 25:
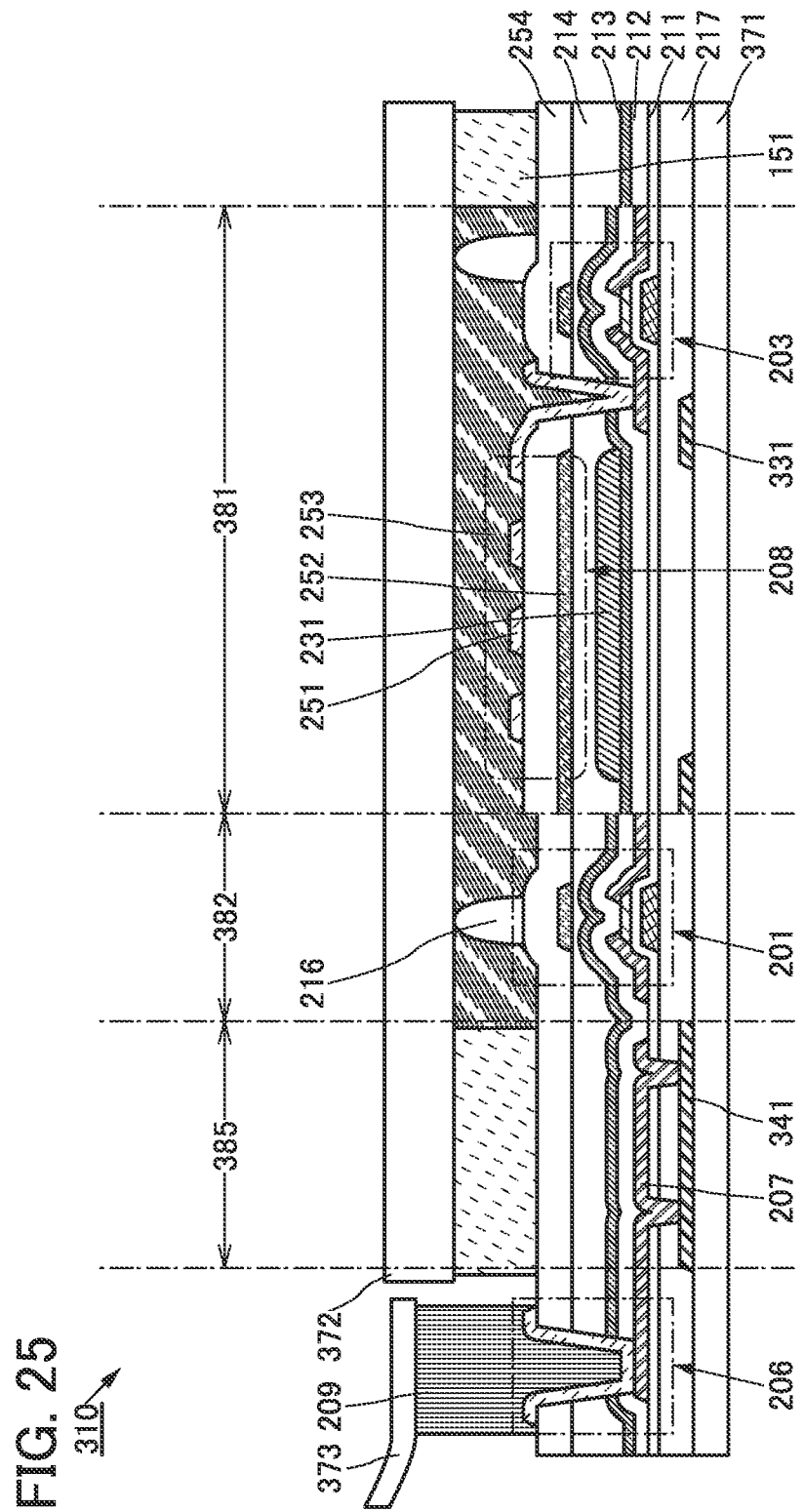
FIG. 25 illustrates a structure example of a touch panel of one embodiment.

FIG. 25 illustrates an example in which, as in FIG. 21, the coloring layer 231 is provided on the substrate 371 side in the structure illustrated in FIG. 24.

Providing the conductive layer 331, the conductive layer 341, and the coloring layer 231 on the substrate 371 side as described above enables a structure in which the substrate 372 is provided with no component. Alignment films may be provided on regions of the substrates 371 and 372 which are in contact with the liquid crystal layer.

Structure Example 2

Structure examples of the touch panel partly different from the structure example 1 are described below with reference to the drawings.

In a touch panel of one embodiment of the present invention which will be described below, at least one of a pair of conductive layers included in a touch sensor is formed of the same conductive film as at least one of a pair of conductive layers included in a liquid crystal element. At least one of the pair of conductive layers included in the touch sensor and at least one of the pair of conductive layers included in the liquid crystal element are provided on the same plane. Alternatively, at least one of the pair of conductive layers included in the touch sensor is provided so as to also serve as at least one of the pair of conductive layers included in the liquid crystal element. That is, one conductive film has both a function of at least one of the pair of conductive layers included in the touch sensor and a function of at least one of the pair of conductive layers included in the liquid crystal element. With such a structure, the manufacturing process of the touch panel can be simplified, thereby more reducing the manufacturing cost.

Structure Example 2-1

Figure 26:
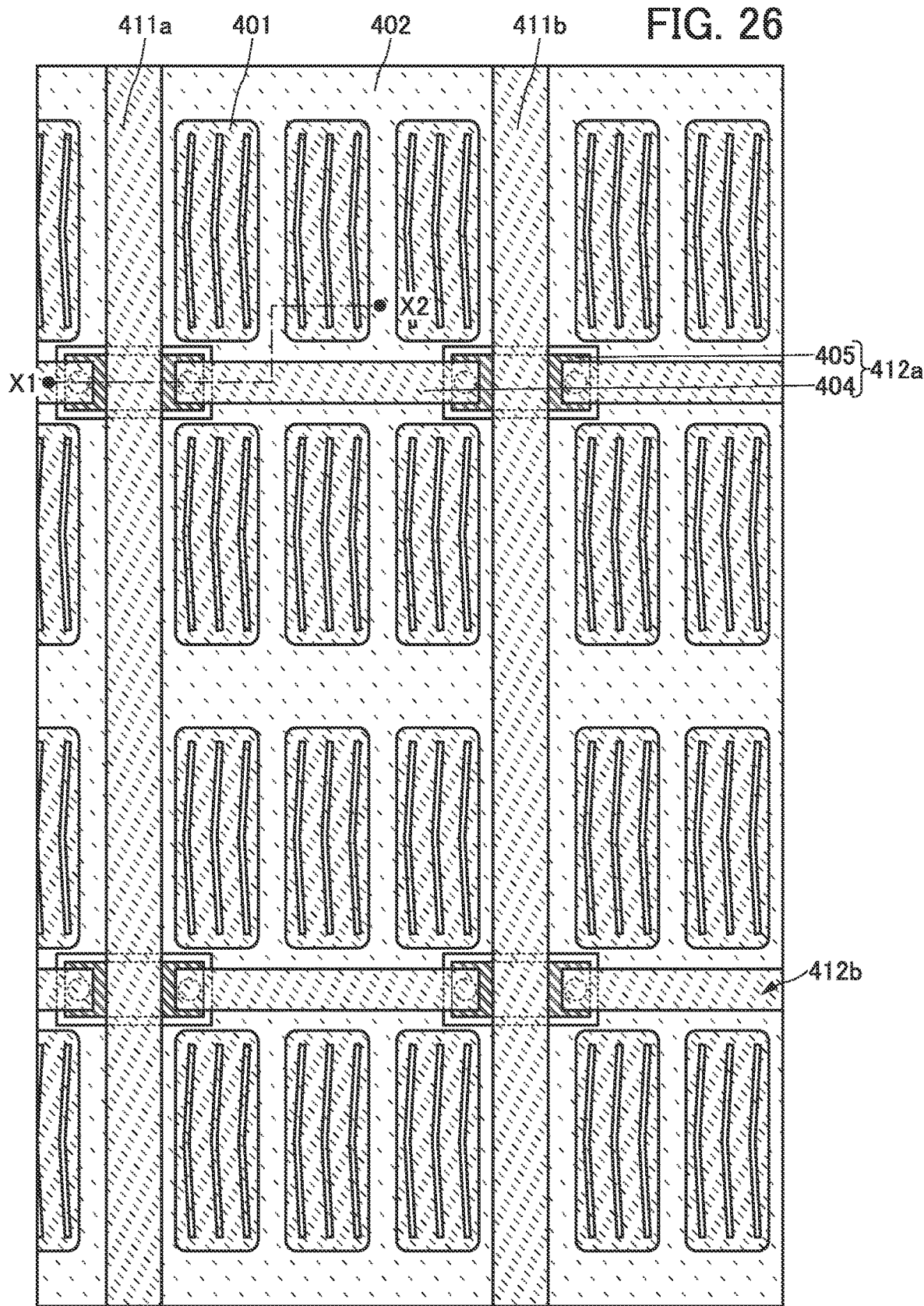
FIG. 26 illustrates a structure example of a touch panel of one embodiment.

FIG. 26 is a schematic top view illustrating an example of the layout of a pair of conductive layers functioning as electrodes of a liquid crystal element and a pair of conductive layers included in a touch sensor. As an example, a liquid crystal element using an FFS mode is described.

Figure 27:
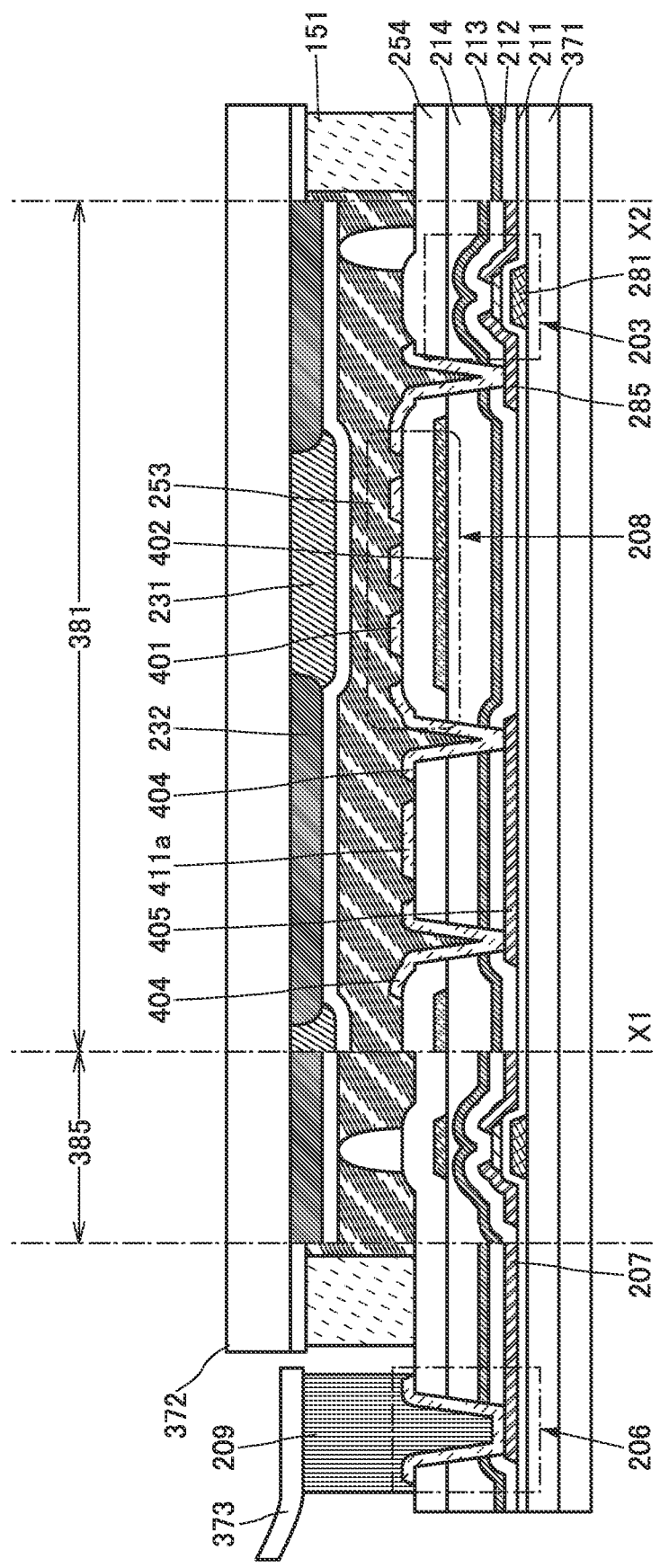
FIG. 27 illustrates a structure example of a touch panel of one embodiment.

FIG. 27 is a schematic cross-sectional view of the touch panel, including the cross section along the section line X1-X2 in FIG. 26. FIG. 26 and FIG. 27 correspond to FIG. 8A.

Conductive layers 401 each have an island shape and are arranged in the X direction and the Y direction in a matrix. Each of the conductive layers 401 includes a slit. A conductive layer 402 is provided so as to overlap with the conductive layers 401. Here, the conductive layer 401 functions as the pixel electrode, and the conductive layer 402 functions as the common electrode. The case where the conductive layer 401 on the upper side is a pixel electrode and the conductive layer 402 on the lower side is a common electrode is described in this example; however, the functions of these conductive layers may be reversed.

A conductive layer 411a and a conductive layer 411b extending in the Y direction are each provided so as to be located between the adjacent two conductive layers 401.

Figure 28:
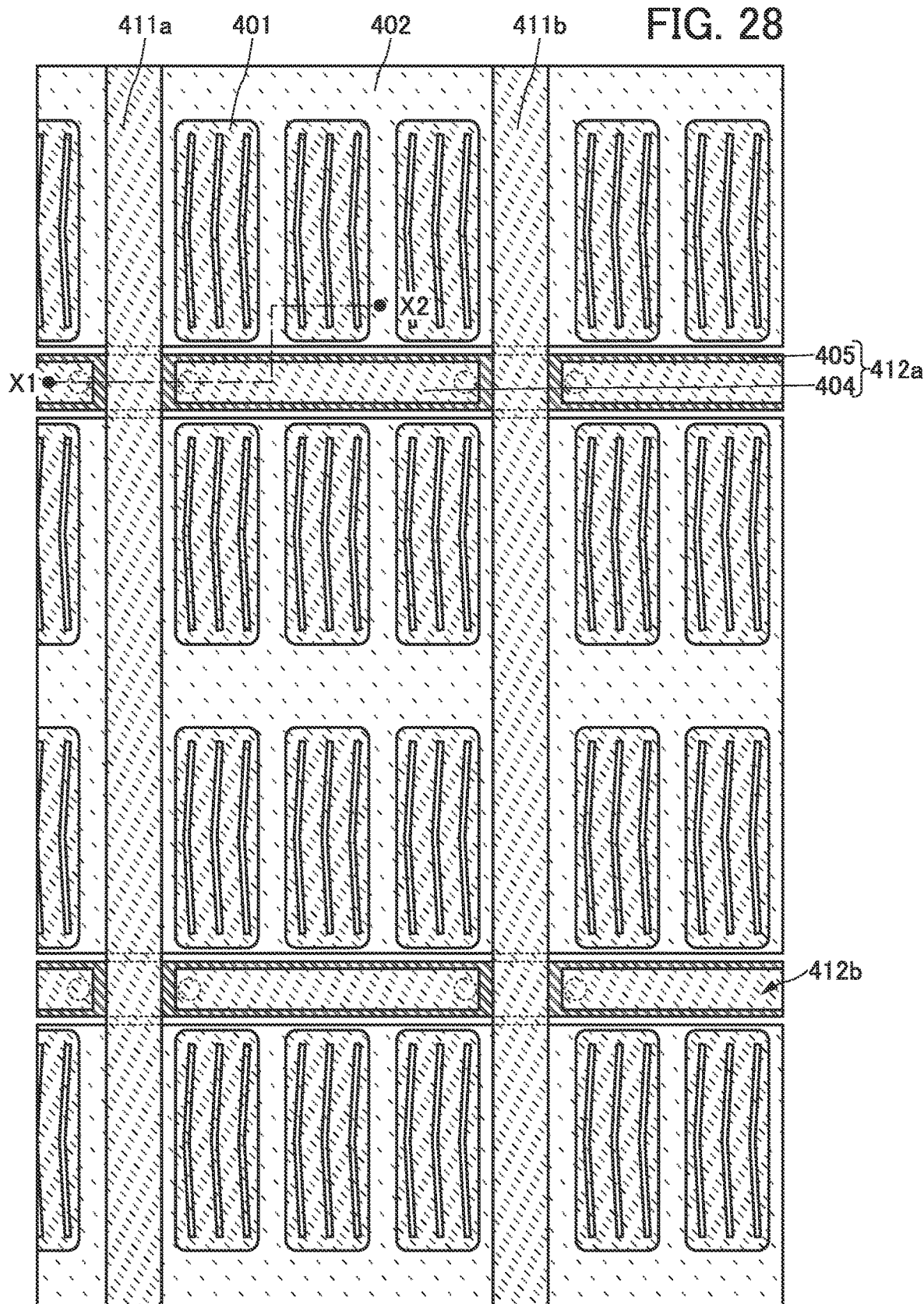
FIG. 28 illustrates a structure example of a touch panel of one embodiment.

A conductive layer 412a extending in the X direction includes a conductive layer 404 and a conductive layer 405. The conductive layer 404 has a band-like shape whose longitudinal direction is parallel to the X direction and is provided, for example, between the conductive layers 411a and 411b. The conductive layer 405 includes a region overlapping with the conductive layer 411a or 411b and electrically connects the two conductive layers 404, which sandwich the conductive layer 411a or 411b, through a contact hole. The conductive layer 405 overlaps with the conductive layer 411a or 411b with an insulating layer that is not illustrated provided therebetween. Alternatively, the conductive layer 405 may extend in the X direction as illustrated in FIG. 28. In this manner, the wiring resistance of the conductive layer 404 can be substantially reduced.

Alternatively, in FIG. 26 or FIG. 28, the conductive layers 411a and 411b may extend in the X direction, and the conductive layers 412a and 412b may extend in the Y direction.

The conductive layers 411a, 411b, 404, and 401 are formed by processing the same conductive film. Therefore, the conductive layers 411a, 411b, 404, and 401 are provided on the same plane.

In this example, the conductive layer 405 is formed by processing the same conductive film as source and drain electrodes 285 of the transistor. In that case, the layout of the conductive layer 405 has no problem even when a gate electrode and the like are provided below the conductive layer 405. Thus, the conductive layer 405 can be provided so as to overlap with the gate electrode or a film formed by processing the same conductive film as the gate electrode. However, one embodiment of the present invention is not limited thereto, and the conductive layer 405 can be formed by processing the same conductive film as the gate electrode 281, the semiconductor layer, or other conductive layers of the transistor.

Figure 29:
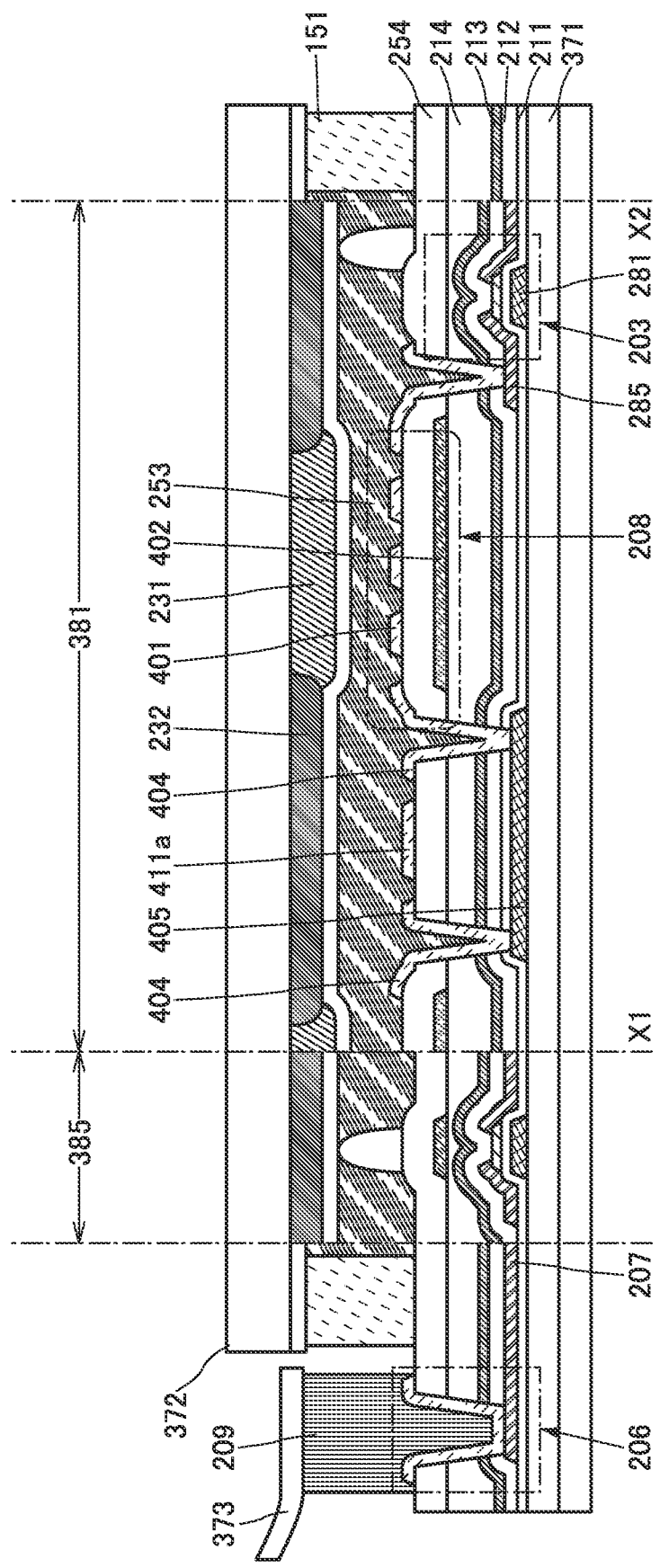
FIG. 29 illustrates a structure example of a touch panel of one embodiment.

FIG. 29 illustrates, as an example, the case where the conductive layer 405 is formed by processing the same conductive film as the gate electrode. In that case, the layout of the conductive layer 405 has no problem even when the source and drain electrodes 285 and the like are provided over the conductive layer 405. Thus, the conductive layer 405 can be provided so as to overlap with or to cross the source and drain electrodes 285 or a film formed by processing the same conductive film as the source and drain electrodes 285. That is, a source signal line (a wiring having a function of supplying a video signal to each pixel) can be provided so as to overlap with the conductive layer 411a or 411b. Thus, the layout area of the conductive layer 401 can be large. That is, the aperture ratio can be increased.

Figure 30:
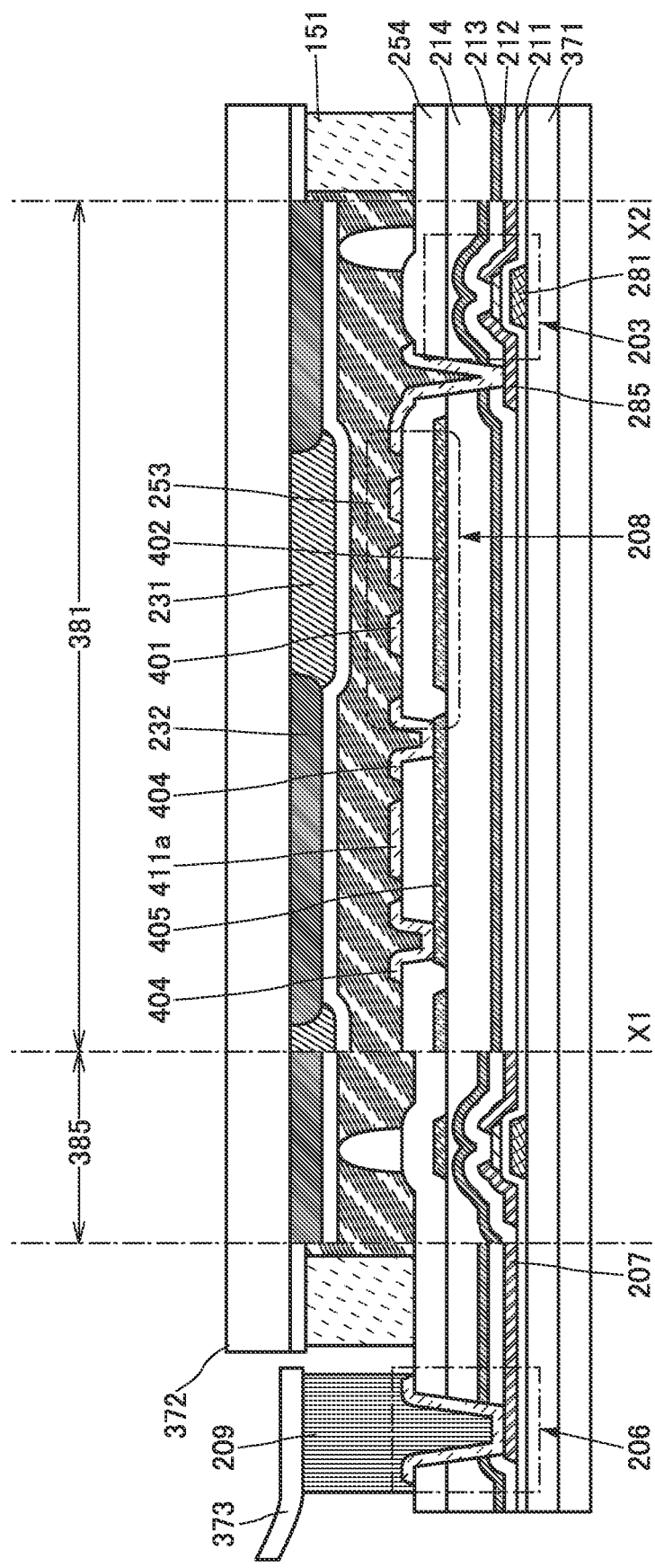
FIG. 30 illustrates a structure example of a touch panel of one embodiment.

FIG. 30 illustrates the case where the conductive layer 405 is formed by processing the same conductive film as the conductive layer 402. In that case, the layout of the conductive layer 405 has no problem even when the source and drain electrodes 285, the gate electrode, and the like are provided below the conductive layer 405. Thus, the conductive layer 405 can be provided so as to overlap with or to cross the gate electrode or the source and drain electrodes 285, a film formed by processing the same conductive film as the gate electrode, or a film formed by processing the same conductive film as the source and drain electrodes 285. That is, the source signal line (a wiring having a function of supplying a video signal to each pixel) can be provided so as to overlap with the conductive layer 411a or 411b. Thus, the layout area of the conductive layer 401 can be large. That is, the aperture ratio can be increased. Alternatively, a gate signal line (a wiring having a function of supplying a signal for selecting a pixel) can be provided so as to overlap with the conductive layer 404 or 405. Thus, the layout area of the conductive layer 401 can be large. That is, the aperture ratio can be increased.

In the case where the conductive layers 411a and 411b extend in the X direction and the conductive layers 412a and 412b extend in the Y direction in FIG. 26 or FIG. 28, the directions in which the conductive layers extend are changed; thus, the conductive layers 412a and 412b are provided so as not to overlap with the gate signal line but to overlap with the source signal line, whereas the conductive layers 411a and 411b are provided so as not to overlap with the source signal line but to overlap with the gate signal line.

Figure 31:
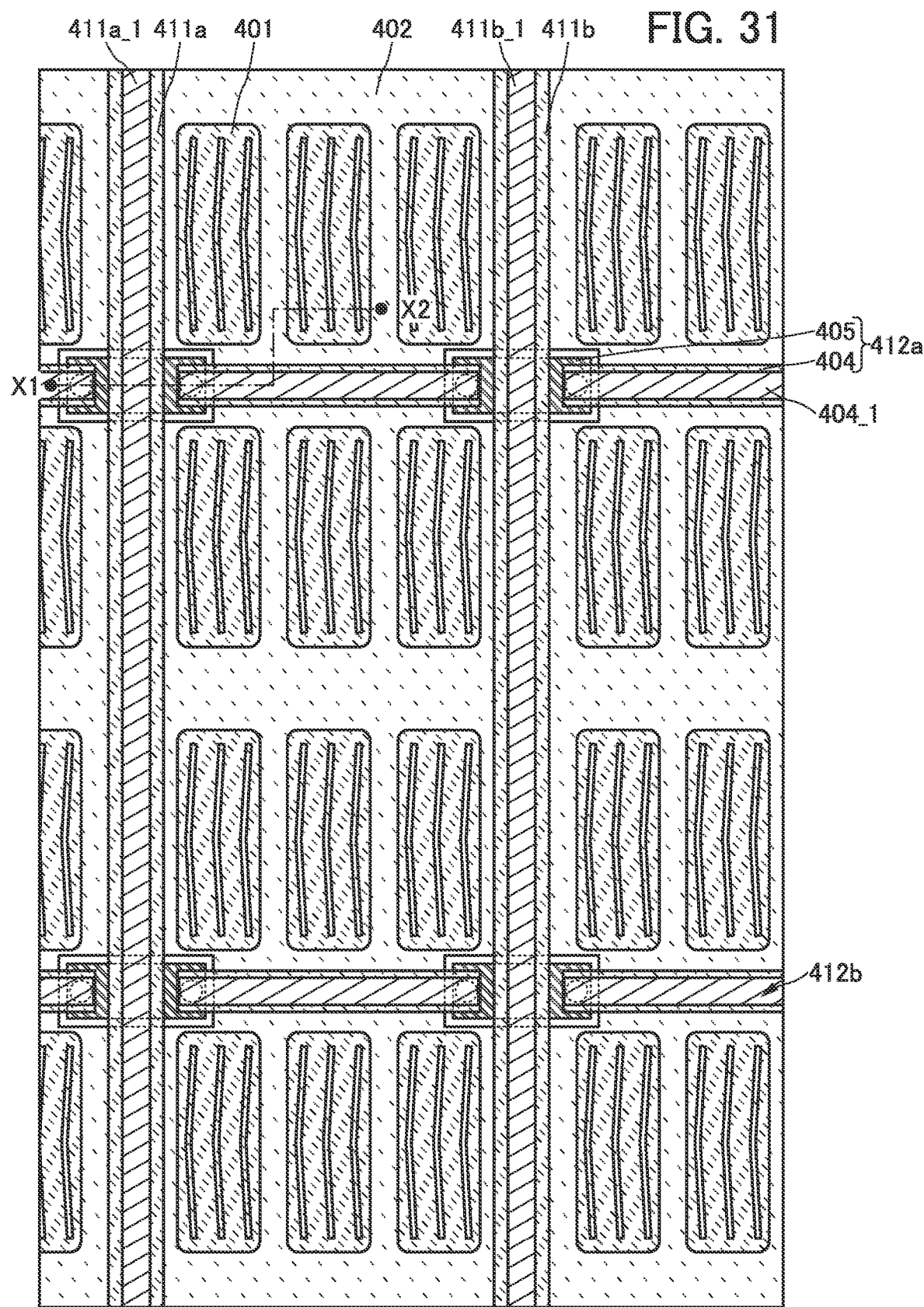
FIG. 31 illustrates a structure example of a touch panel of one embodiment.
Figure 32:
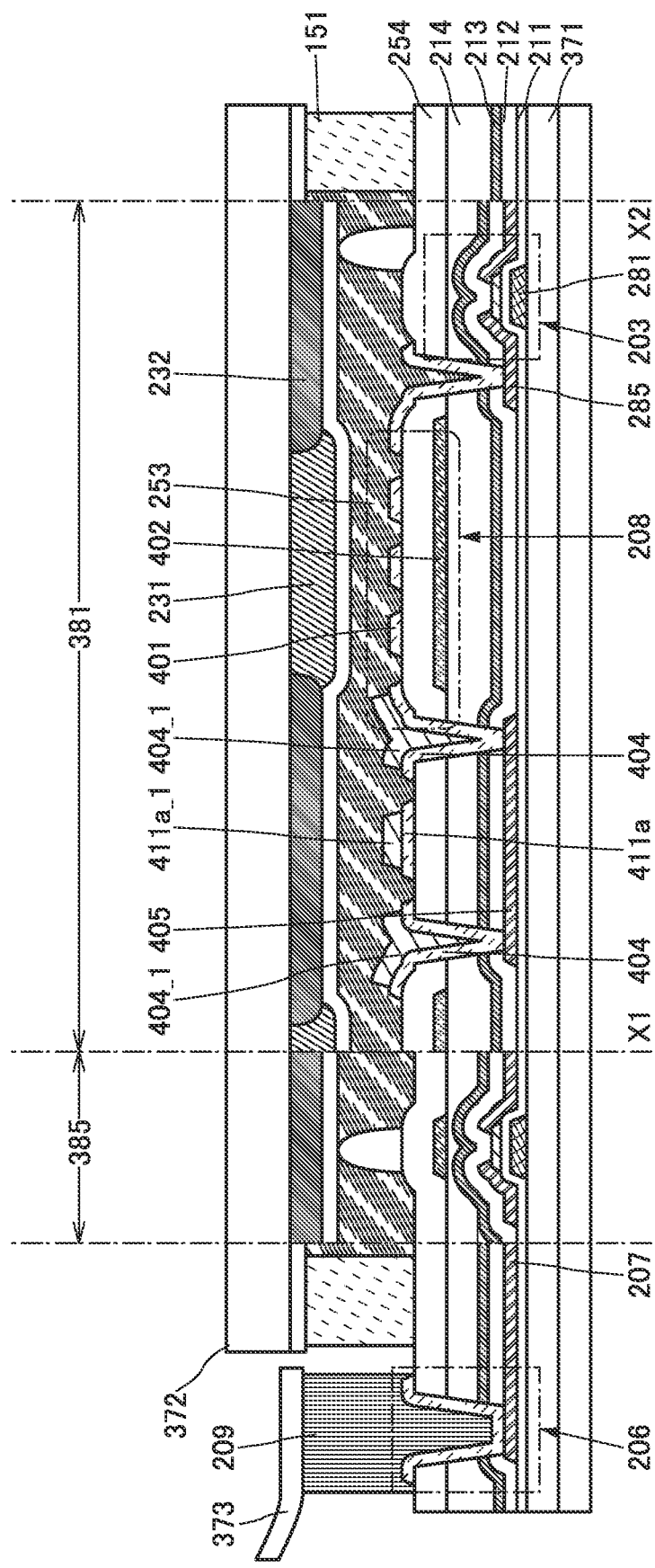
FIG. 32 illustrates a structure example of a touch panel of one embodiment.

In the case where the resistance of the conductive layers 411a, 411b, and 404 is desired to be reduced, low-resistance conductive layers 411a_1, 411b_1, and 404_1 may be provided above or below the conductive layers 411a, 411b, and 404, respectively. For example, a layer of aluminum, copper, titanium, molybdenum, or tungsten, or a stacked layer of any of these metals may be provided above or below the conductive layers 411a, 411b, and 404. Alternatively, at least one of the conductive layers 411a_1, 411b_1, and 404_1 may be formed of a meshed metal film. Alternatively, at least one of the conductive layers 411a_1, 411b_1, and 404_1 may be formed using a metal nanowire, a carbon nanotube, or the like. The conductive layer 401 preferably has a light-transmitting property. Therefore, it is preferable that a low-resistance conductive layer be not provided above or below the conductive layer 401. An example in that case is illustrated in FIG. 31 and FIG. 32.

Figure 33:
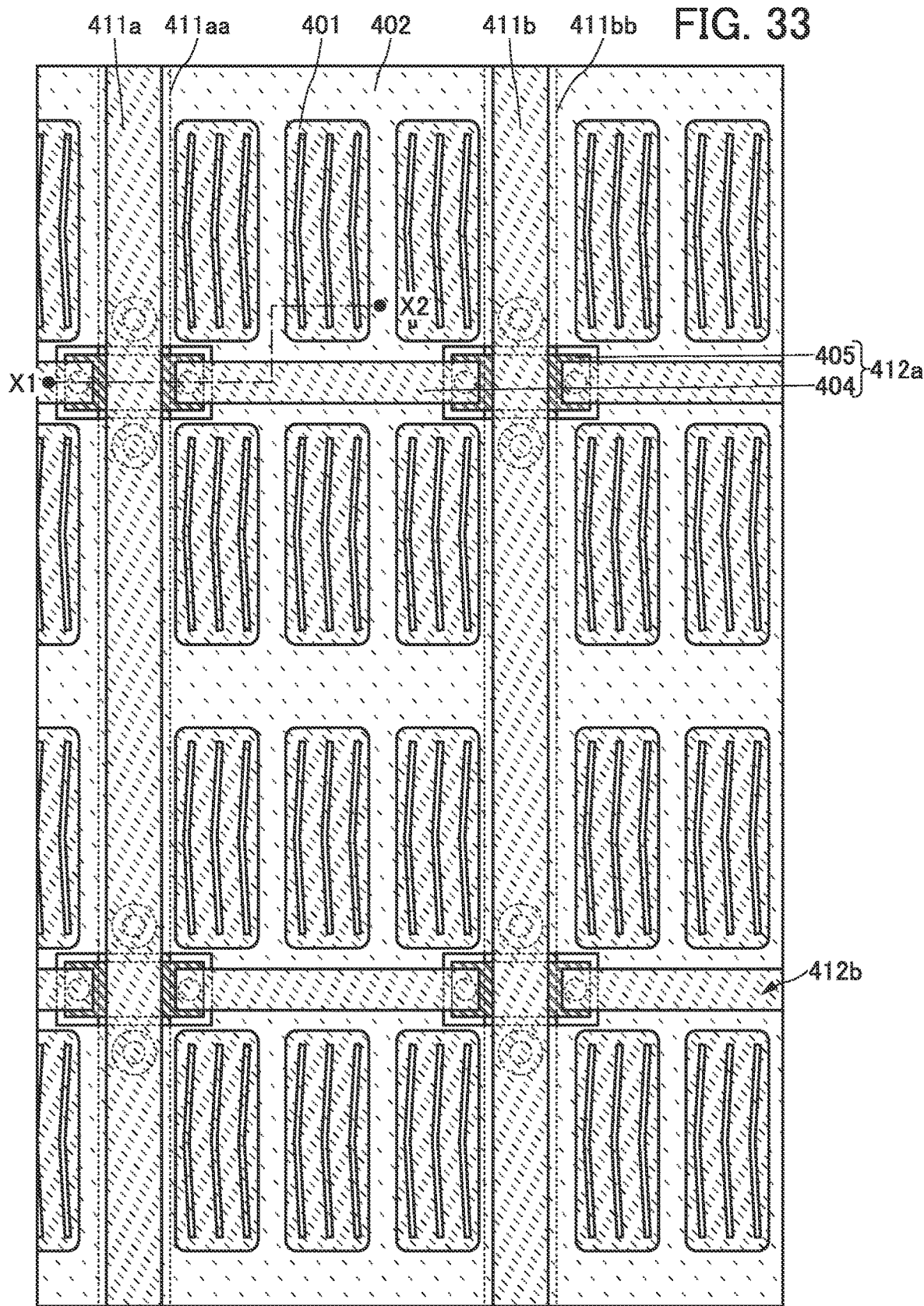
FIG. 33 illustrates a structure example of a touch panel of one embodiment.
Figure 34:
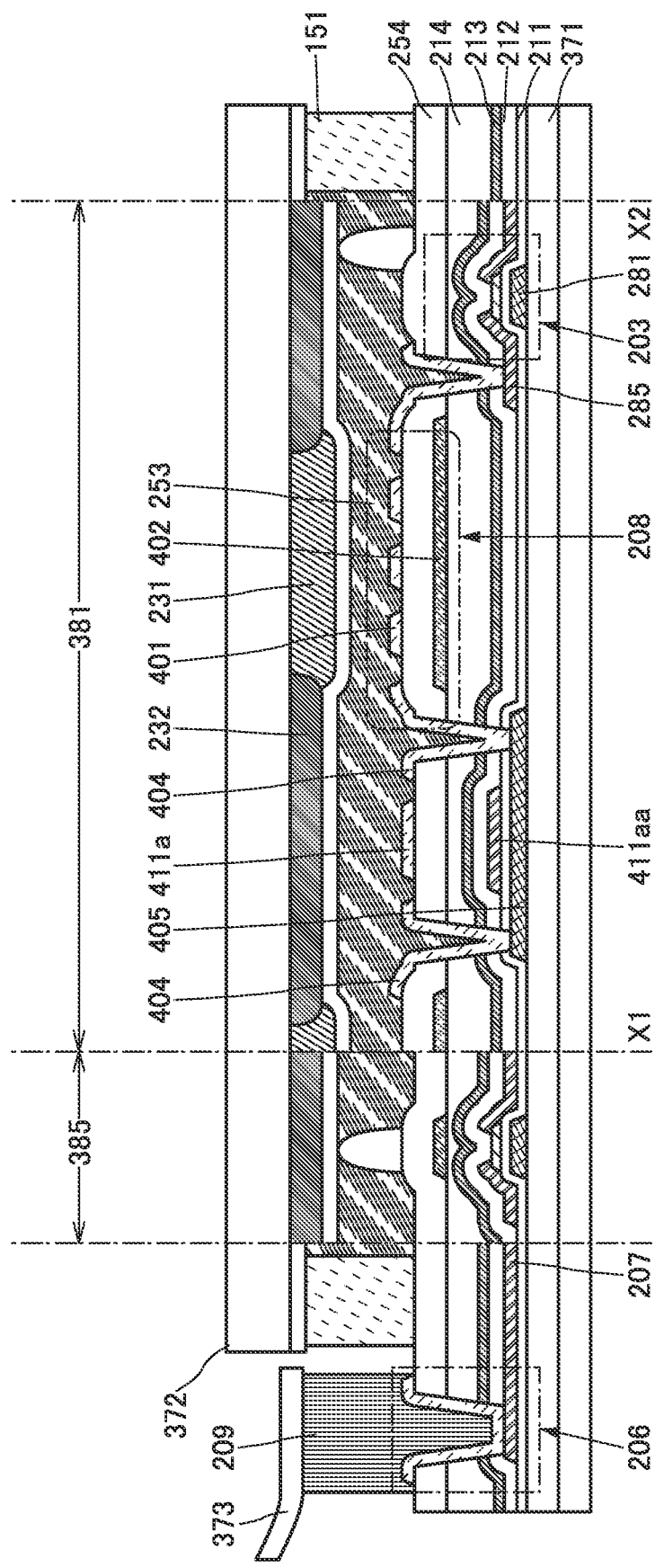
FIG. 34 illustrates a structure example of a touch panel of one embodiment.

In the case where the resistance values of the conductive layers 411a and 411b are desired to be substantially reduced, conductive layers 411aa and 411bb may be provided. The conductive layer 411a (the conductive layer 411b) is connected to the conductive layer 411aa (the conductive layer 411bb) through a contact hole. An example in that case is illustrated in FIG. 33 and FIG. 34.

Note that only the conductive layer 405 may be formed separately but is preferably formed at the same time as other conductive layers.

Structure Example 2-2

Figure 35:
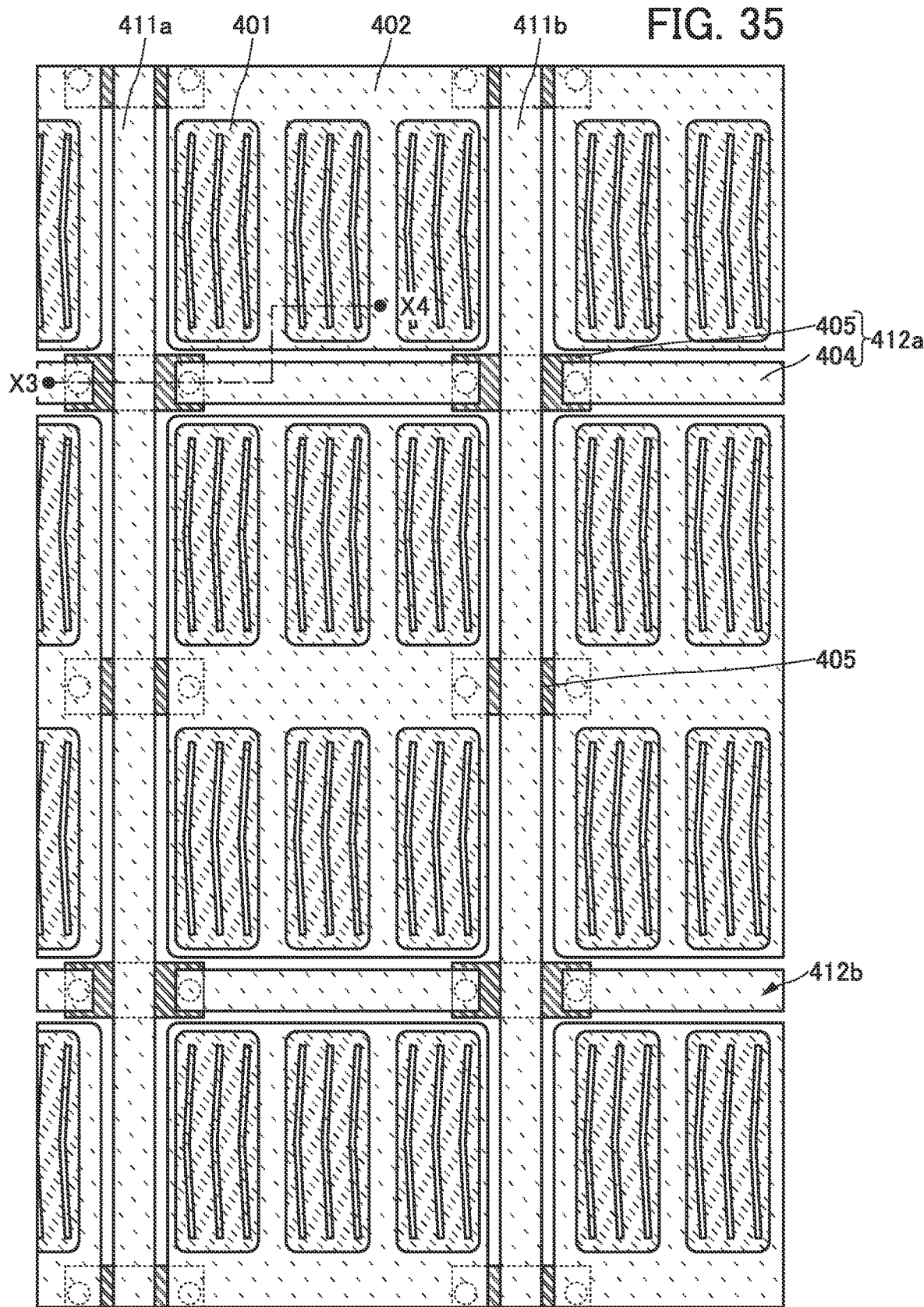
FIG. 35 illustrates a structure example of a touch panel of one embodiment.
Figure 36:
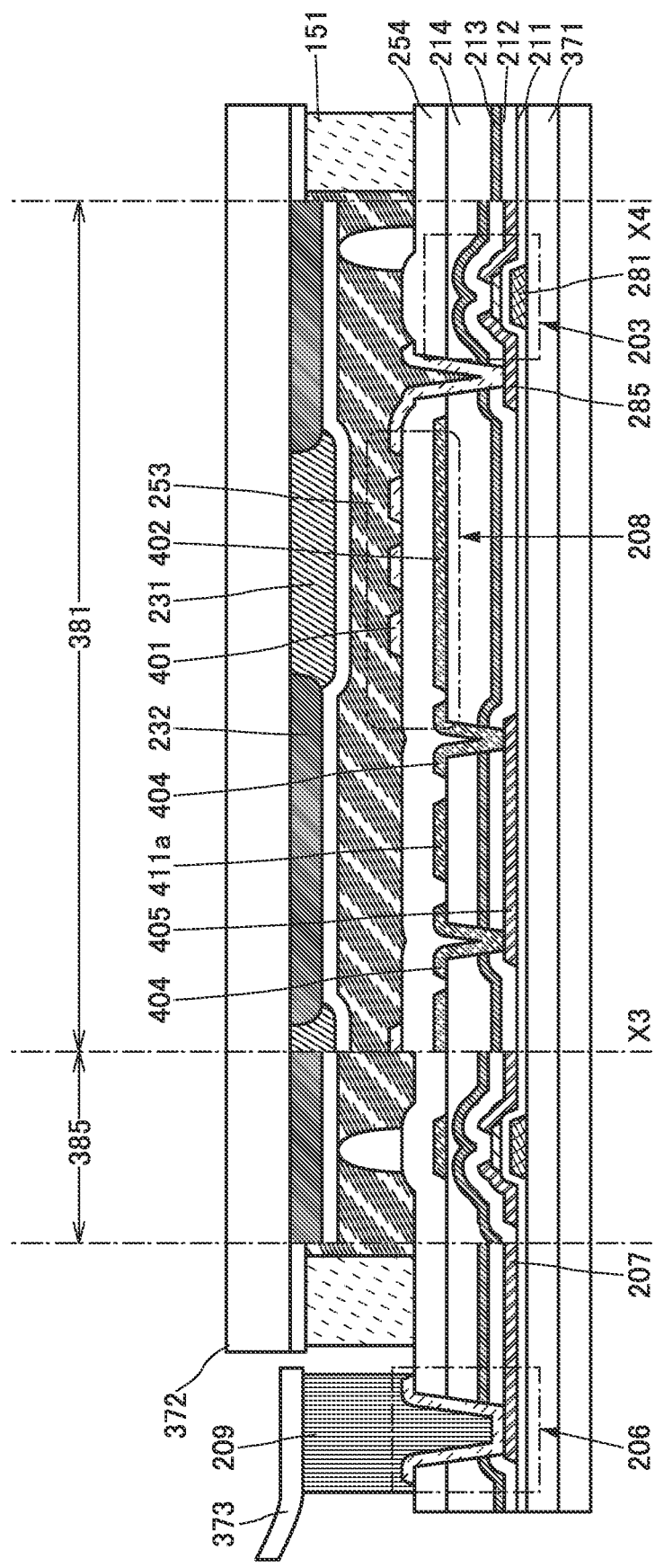
FIG. 36 illustrates a structure example of a touch panel of one embodiment.

FIG. 35 illustrates an example in which the conductive layers 411a, 411b, and 404 are formed by processing the same conductive film as the conductive layer 402. Therefore, the conductive layers 411a, 411b, 404, and 402 are provided on the same plane. FIG. 36 is a schematic cross-sectional view of the touch panel, including the cross section along the section line X3-X4 in FIG. 35. FIG. 35 and FIG. 36 correspond to FIG. 8B.

As illustrated in FIG. 35, the conductive layer 402 has an island-shape. Like the conductive layers 412a, the two adjacent conductive layers 402 which sandwich the conductive layer 411a or 411b are electrically connected to each other through the conductive layer 405. Here is illustrated an example in which the two conductive layers 402 adjacent to each other in the Y direction are not electrically connected to each other. However, the plurality of conductive layers 402 may be electrically connected to each other through the conductive layer 405 in the Y direction or both in the X direction and in the Y direction. The case where the conductive layer 401 on the upper side is a pixel electrode and the conductive layer 402 on the lower side is a common electrode is described in this example; however, the functions of these conductive layers may be reversed.

Figure 37:
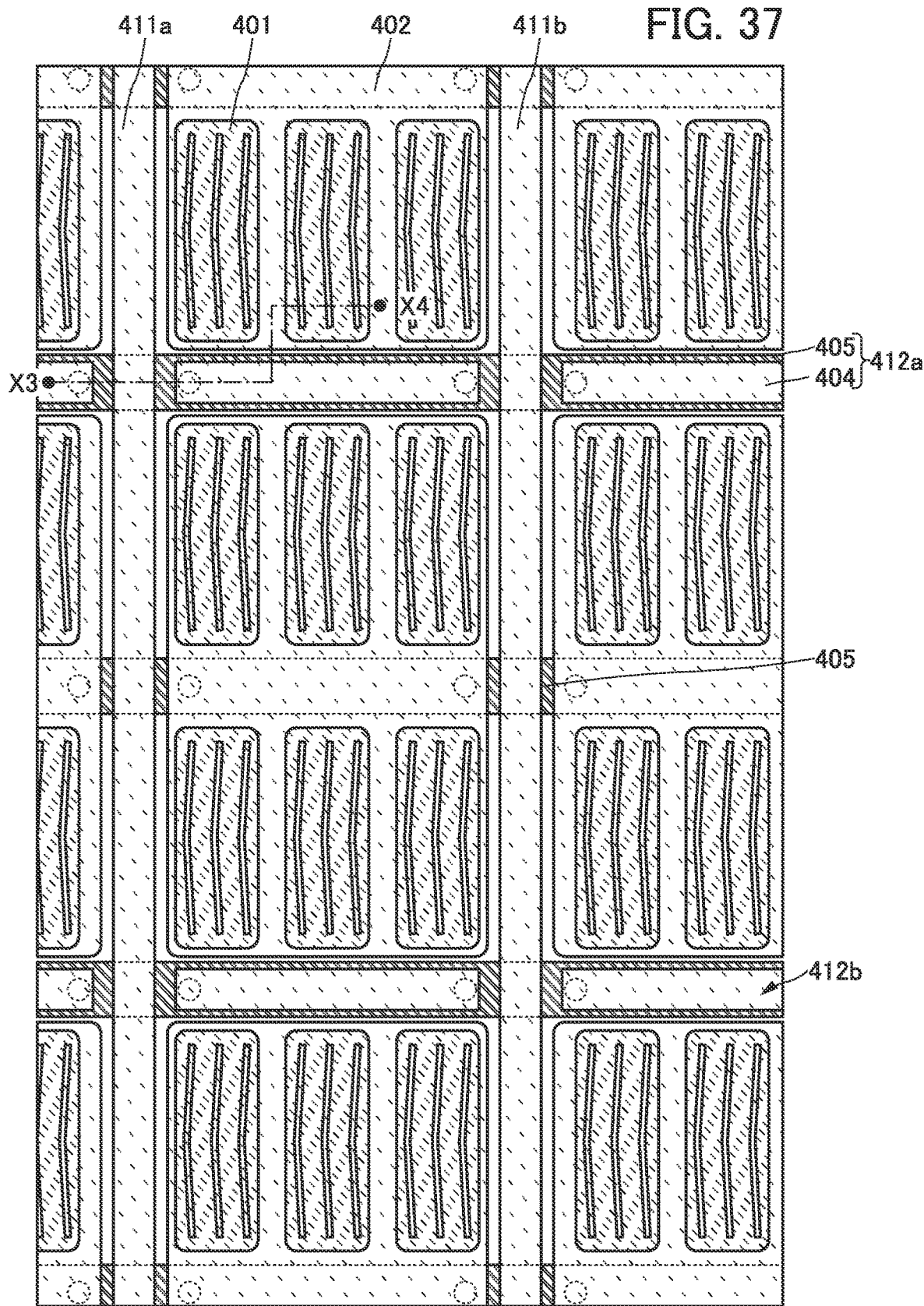
FIG. 37 illustrates a structure example of a touch panel of one embodiment.

Alternatively, the conductive layer 405 may extend in the X direction as illustrated in FIG. 37. In this manner, the wiring resistance of the conductive layer 404 can be substantially reduced.

Alternatively, in FIG. 35 or FIG. 37, the conductive layers 411a and 411b may extend in the X direction, and the conductive layers 412a and 412b may extend in the Y direction.

In FIG. 36, the conductive layer 405 is formed by processing the same conductive film as the source and drain electrodes 285 of the transistor. In that case, the layout of the conductive layer 405 has no problem even when the gate electrode and the like are provided below the conductive layer 405. Thus, the conductive layer 405 can be provided so as to overlap with the gate electrode or a film formed by processing the same conductive film as the gate electrode. However, one embodiment of the present invention is not limited thereto, and the conductive layer 405 can be formed by processing the same conductive film as the gate electrode 281, the semiconductor layer, or other conductive layers of the transistor.

Figure 38:
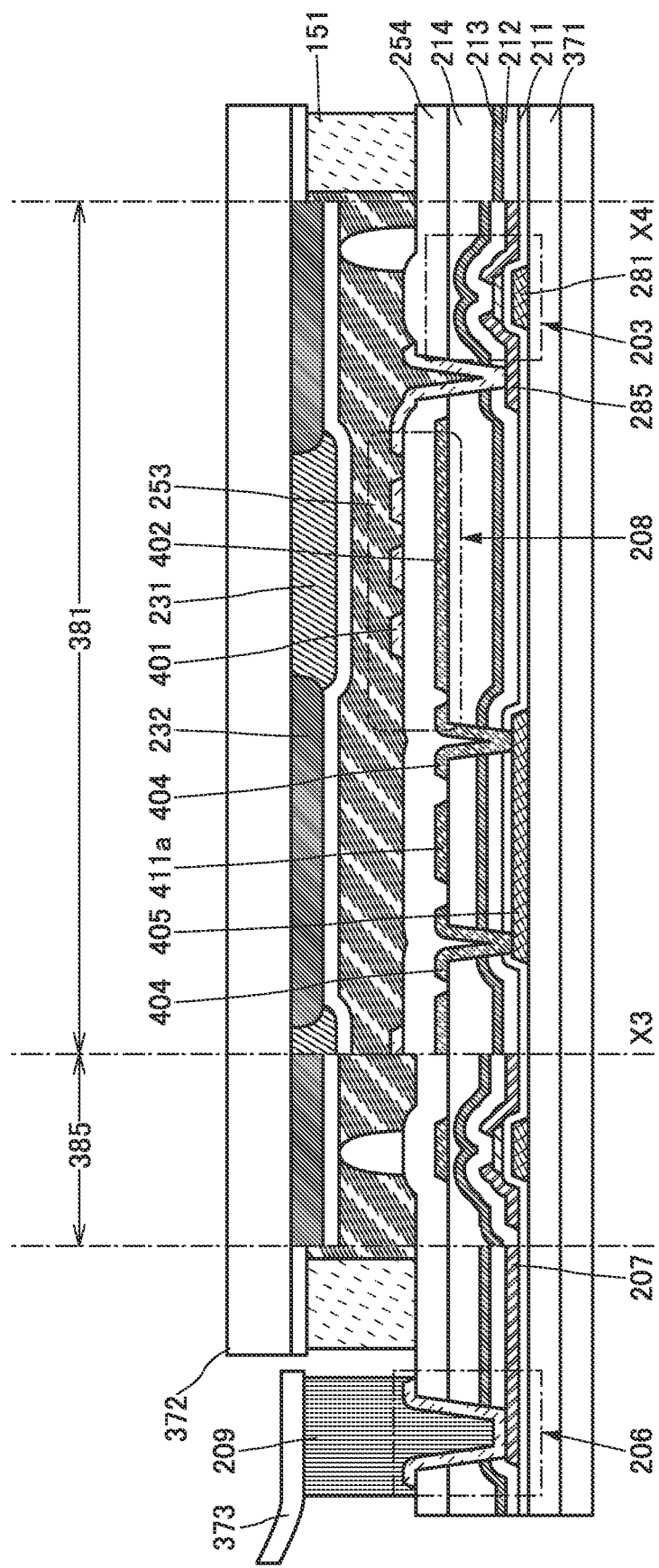
FIG. 38 illustrates a structure example of a touch panel of one embodiment.

FIG. 38 illustrates, as an example, the case where the conductive layer 405 is formed by processing the same conductive film as the gate electrode 281. In that case, the layout of the conductive layer 405 has no problem even when the source and drain electrodes 285 and the like are provided over the conductive layer 405. Thus, the conductive layer 405 can be provided so as to overlap with or to cross the source and drain electrodes 285 or a film formed by processing the same conductive film as the source and drain electrodes 285. That is, the source signal line can be provided so as to overlap with the conductive layer 411a or 411b. Thus, the layout area of the conductive layer 401 can be large. That is, the aperture ratio can be increased.

Figure 39:
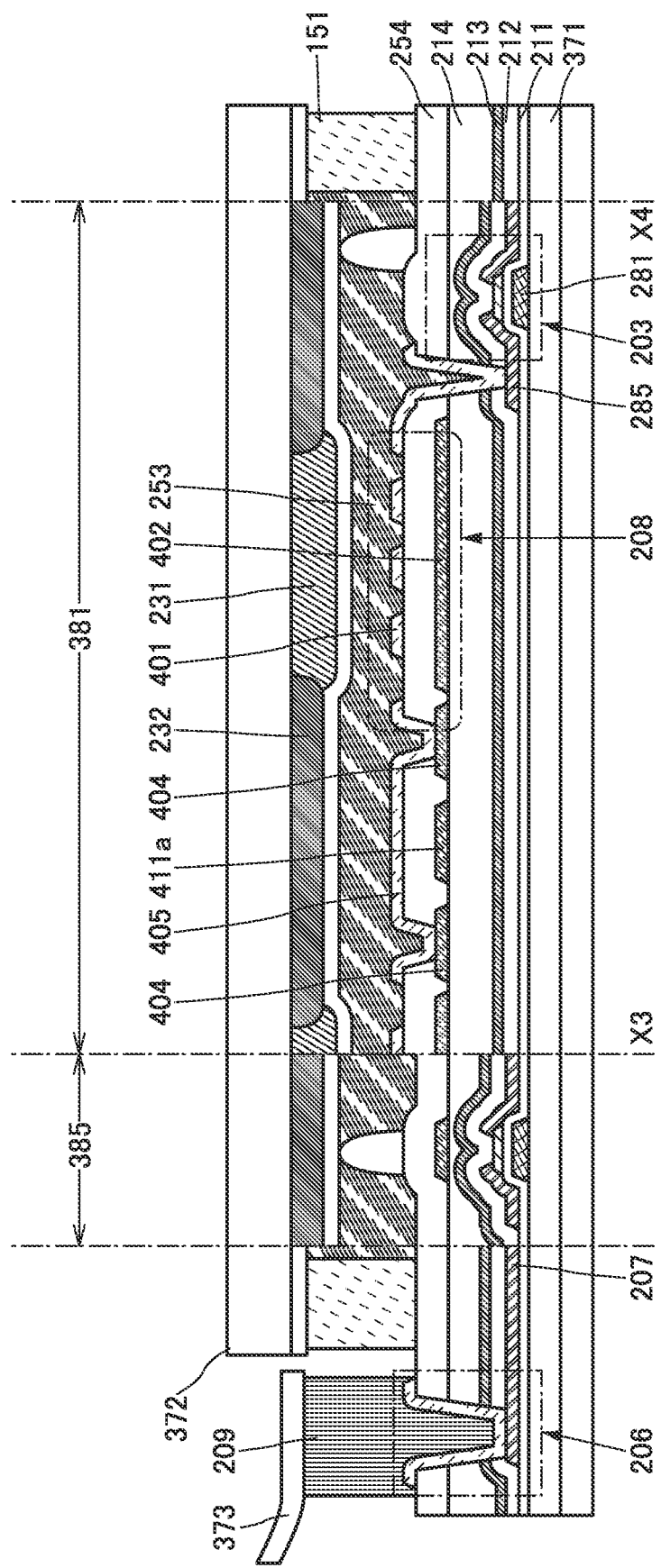
FIG. 39 illustrates a structure example of a touch panel of one embodiment.

FIG. 39 illustrates the case where the conductive layer 405 is formed by processing the same conductive film as the conductive layer 401. In that case, the layout of the conductive layer 405 has no problem even when the source and drain electrodes 285, the gate electrode, and the like are provided below the conductive layer 405. Thus, the conductive layer 405 can be provided so as to overlap with or to cross the gate electrode or the source and drain electrodes 285, a film formed by processing the same conductive film as the gate electrode, or a film formed by processing the same conductive film as the source and drain electrodes 285. That is, the source signal line can be provided so as to overlap with the conductive layer 411a or 411b. Thus, the layout area of the conductive layer 401 can be large. That is, the aperture ratio can be increased. Alternatively, the gate signal line can be provided so as to overlap with the conductive layer 404 or 405. Thus, the layout area of the conductive layer 401 can be large. That is, the aperture ratio can be increased.

In the case where the conductive layers 411a and 411b extend in the X direction and the conductive layers 412a and 412b extend in the Y direction in FIG. 35 or FIG. 37, the directions in which the conductive layers extend are changed; thus, the conductive layers 412a and 412b are provided so as not to overlap with the gate signal line but to overlap with the source signal line, whereas the conductive layers 411a and 411b are provided so as not to overlap with the source signal line but to overlap with the gate signal line.

FIG. 36, FIG. 38, and FIG. 39 each illustrate the example in which the conductive layer 401 on the upper side is a pixel electrode and the conductive layer 402 on the lower side is a common electrode. However, one embodiment of the present invention is not limited thereto. The conductive layer 401 on the upper side may be a common electrode, and the conductive layer 402 on the lower side may be a pixel electrode. Examples in that case are illustrated in FIG. 40, FIG. 41, and FIG. 42.

Figure 40:
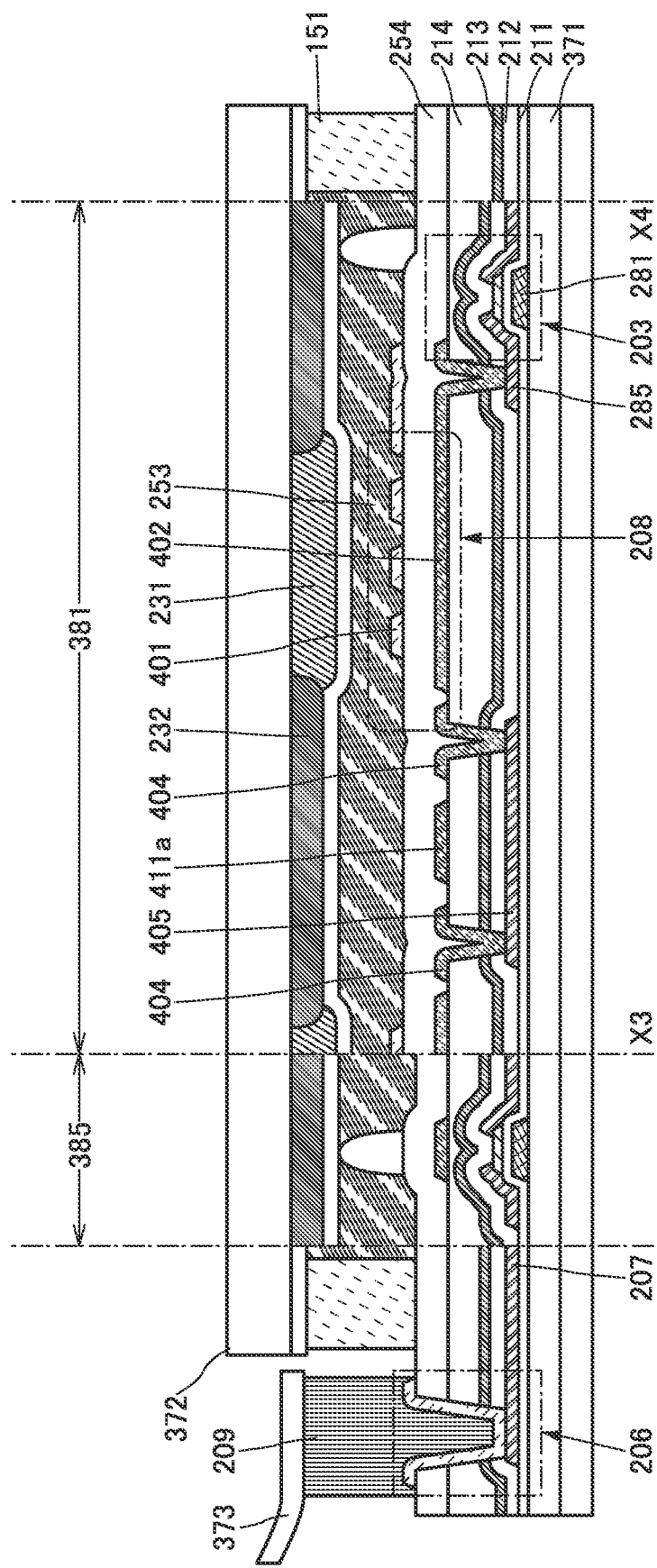
FIG. 40 illustrates a structure example of a touch panel of one embodiment.
Figure 41:
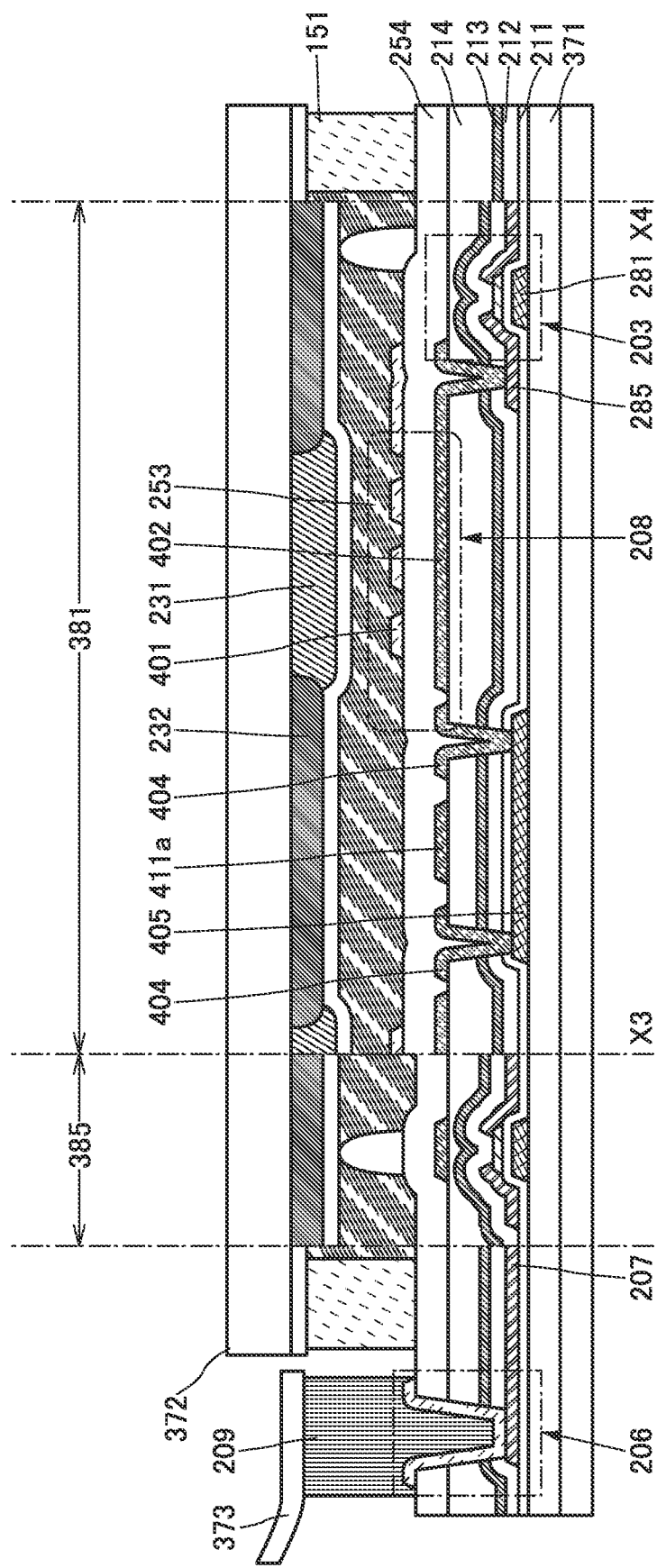
FIG. 41 illustrates a structure example of a touch panel of one embodiment.
Figure 42:
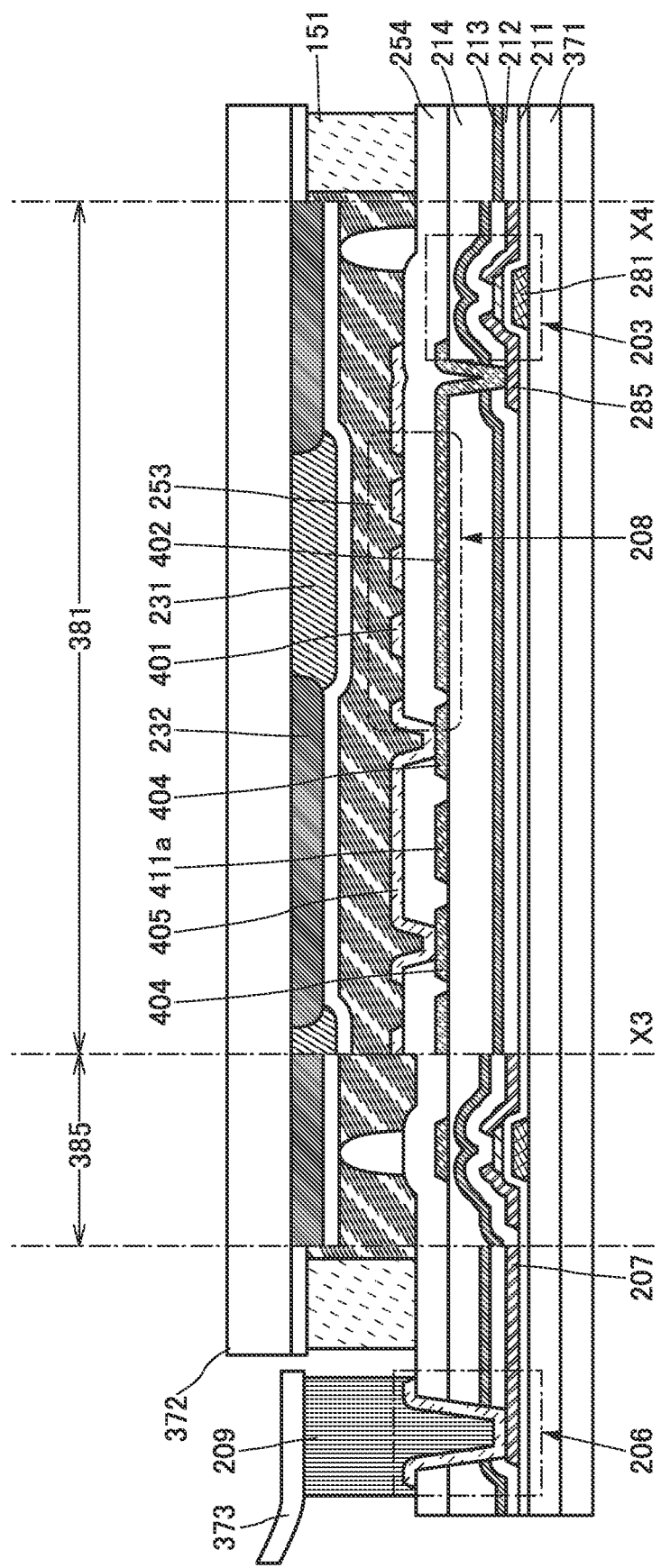
FIG. 42 illustrates a structure example of a touch panel of one embodiment.
Figure 43:
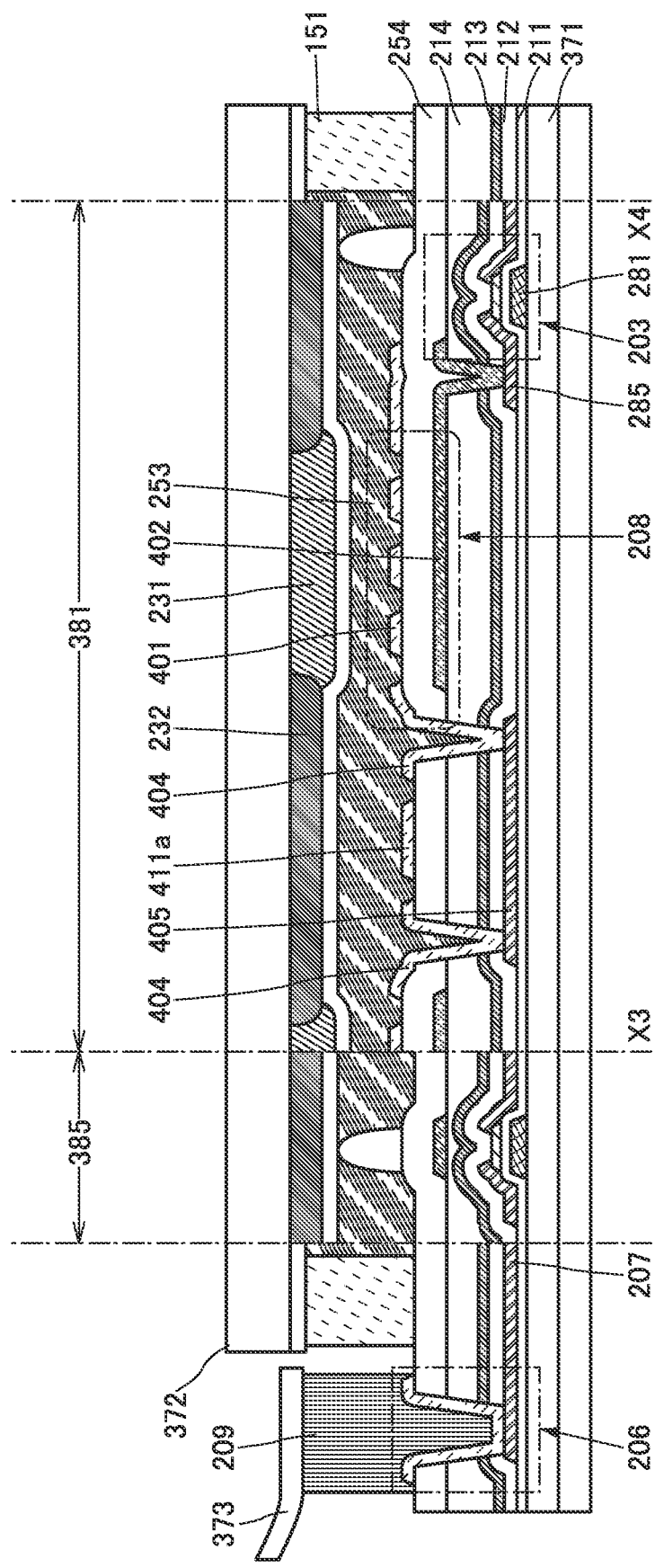
FIG. 43 illustrates a structure example of a touch panel of one embodiment.
Figure 44:
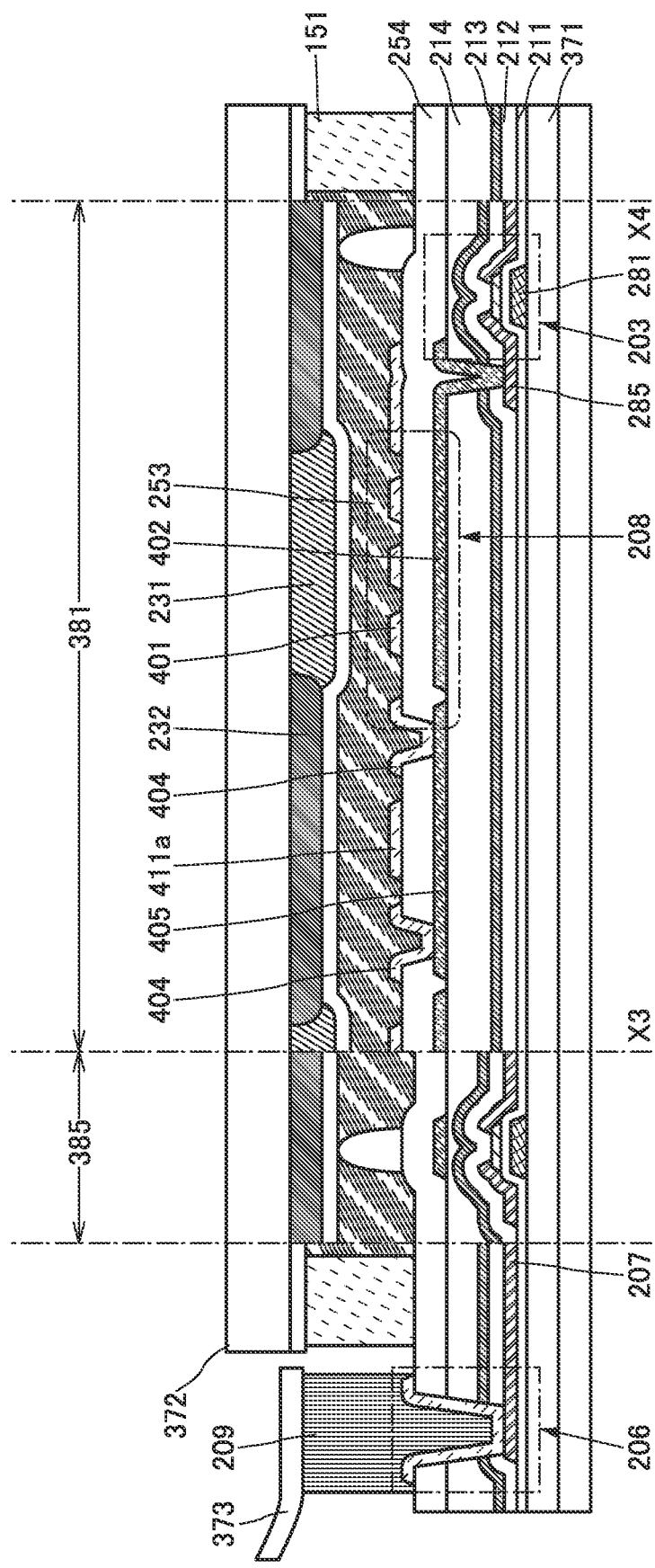
FIG. 44 illustrates a structure example of a touch panel of one embodiment.
Figure 45:
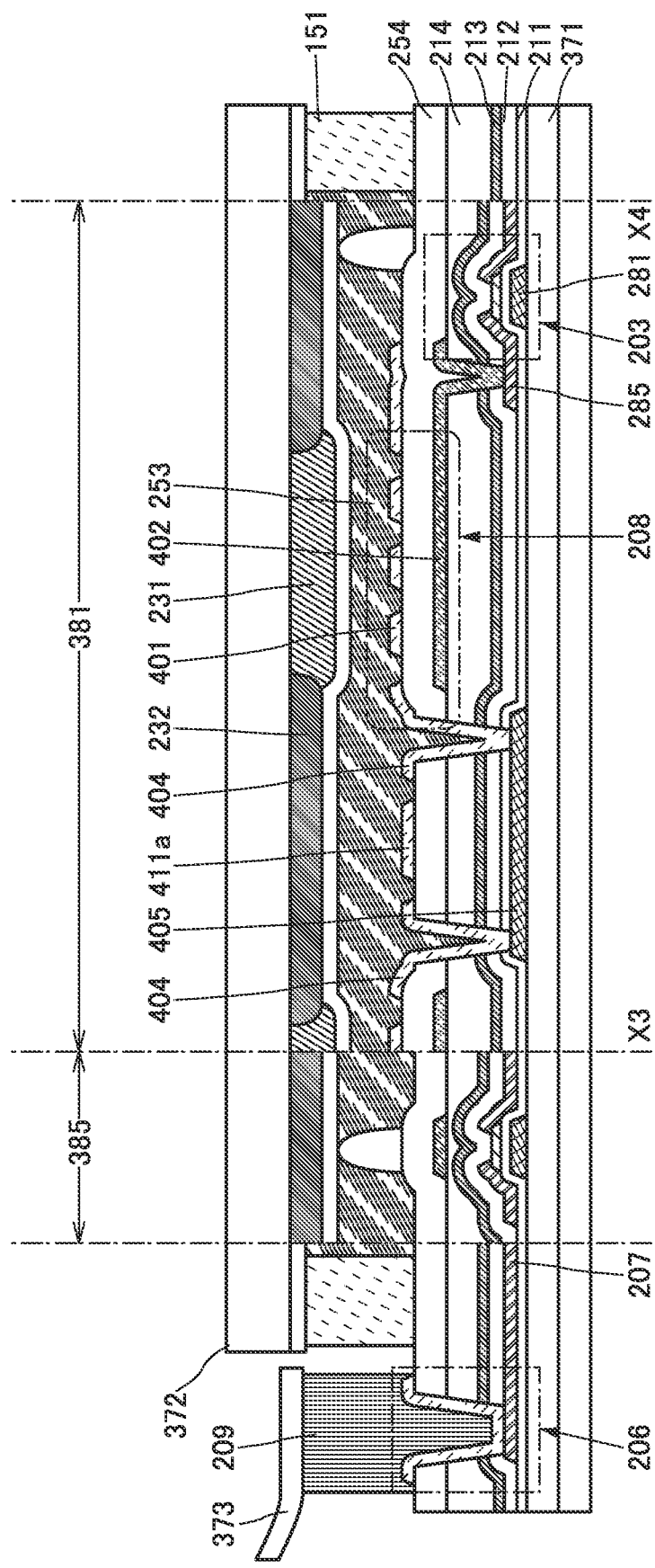
FIG. 45 illustrates a structure example of a touch panel of one embodiment.

FIG. 40, FIG. 41, FIG. 42, and the like each illustrate an example in which the conductive layers 411a, 411b, and 404 are formed by processing the same conductive film as the conductive layer 402. However, one embodiment of the present invention is not limited thereto. The conductive layers 411a, 411b, and 404 may also be formed by processing the same conductive film as the conductive layer 401. Therefore, the conductive layers 411a, 411b, 404, and 401 may also be provided on the same plane. Examples in that case are illustrated in FIG. 43, FIG. 44, and FIG. 45.

Figure 46:
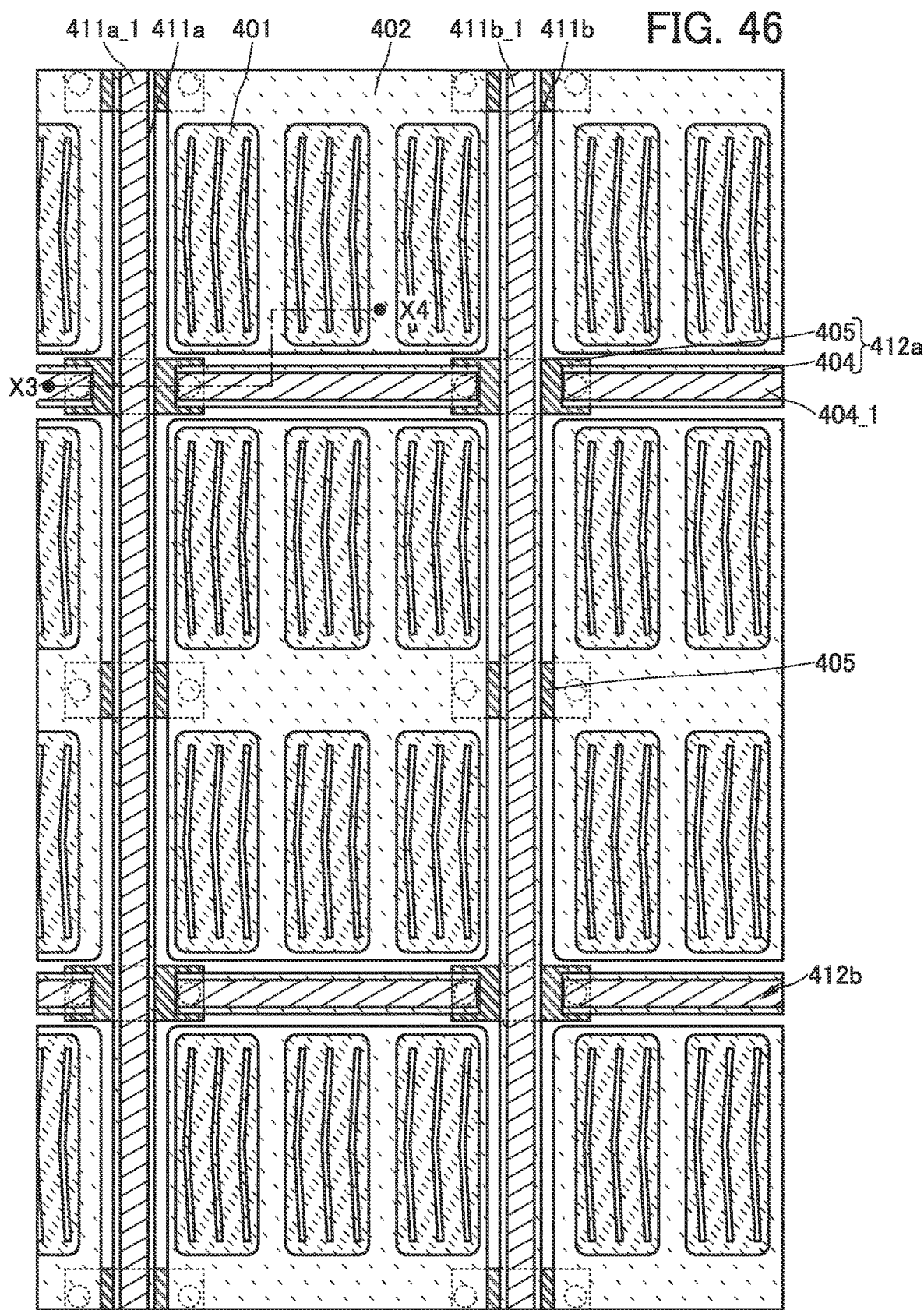
FIG. 46 illustrates a structure example of a touch panel of one embodiment.
Figure 47:
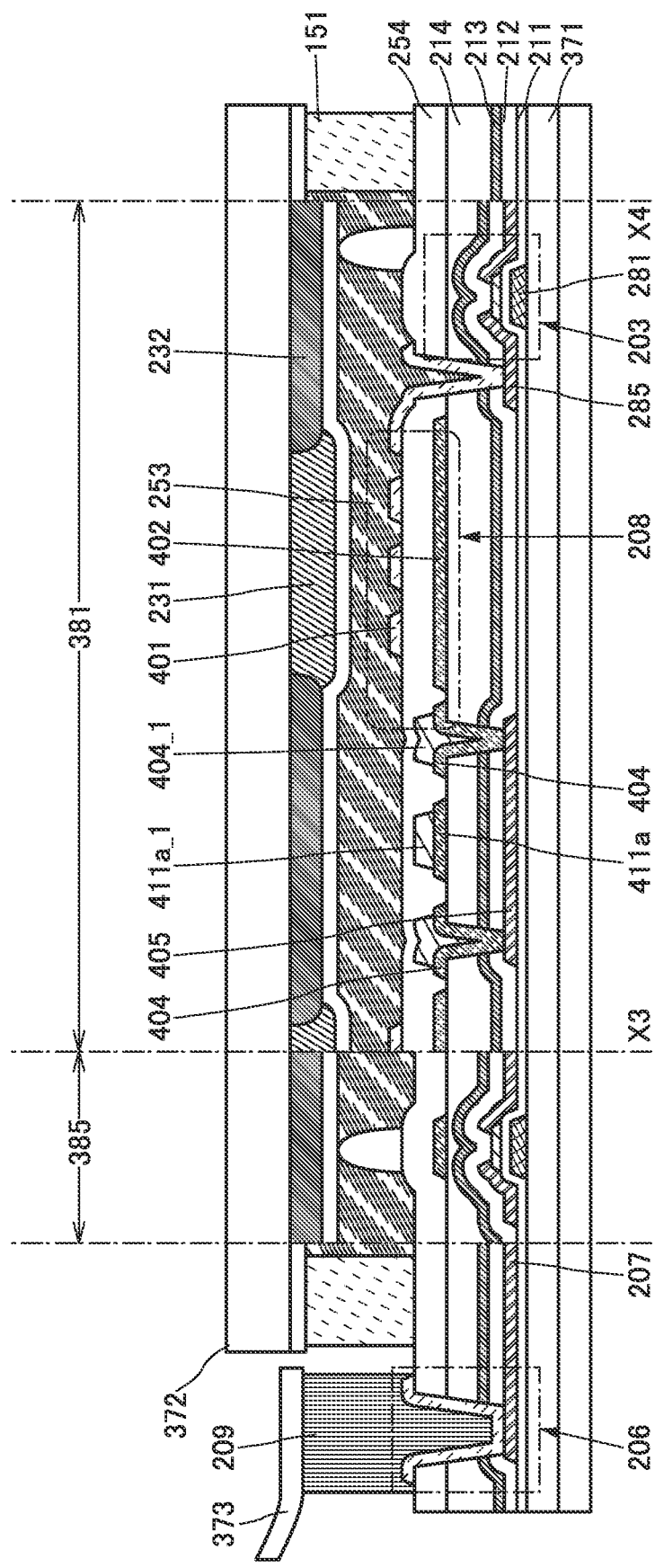
FIG. 47 illustrates a structure example of a touch panel of one embodiment.

In the case where the resistance of the conductive layers 411a, 411b, and 404 is desired to be reduced, low-resistance conductive layers 411a_1, 411b_1, and 404_1 may be provided above or below the conductive layers 411a, 411b, and 404, respectively. For example, a layer of aluminum, copper, titanium, molybdenum, or tungsten, or a stacked layer of any of these metals may be provided above or below the conductive layers 411a, 411b, and 404. Alternatively, at least one of the conductive layers 411a_1, 411b_1, and 404_1 may be formed of a meshed metal film. Alternatively, at least one of the conductive layers 411a_1, 411b_1, and 404_1 may be formed using a metal nanowire, a carbon nanotube, or the like. The conductive layer 402 preferably has a light-transmitting property. Therefore, it is preferable that a low-resistance conductive layer be not provided above or below the conductive layer 402. An example in that case is illustrated in FIG. 46 and FIG. 47.

In the case where the resistance values of the conductive layers 411a and 411b are desired to be substantially reduced, the conductive layers 411aa and 411bb may be provided.

Figure 48:
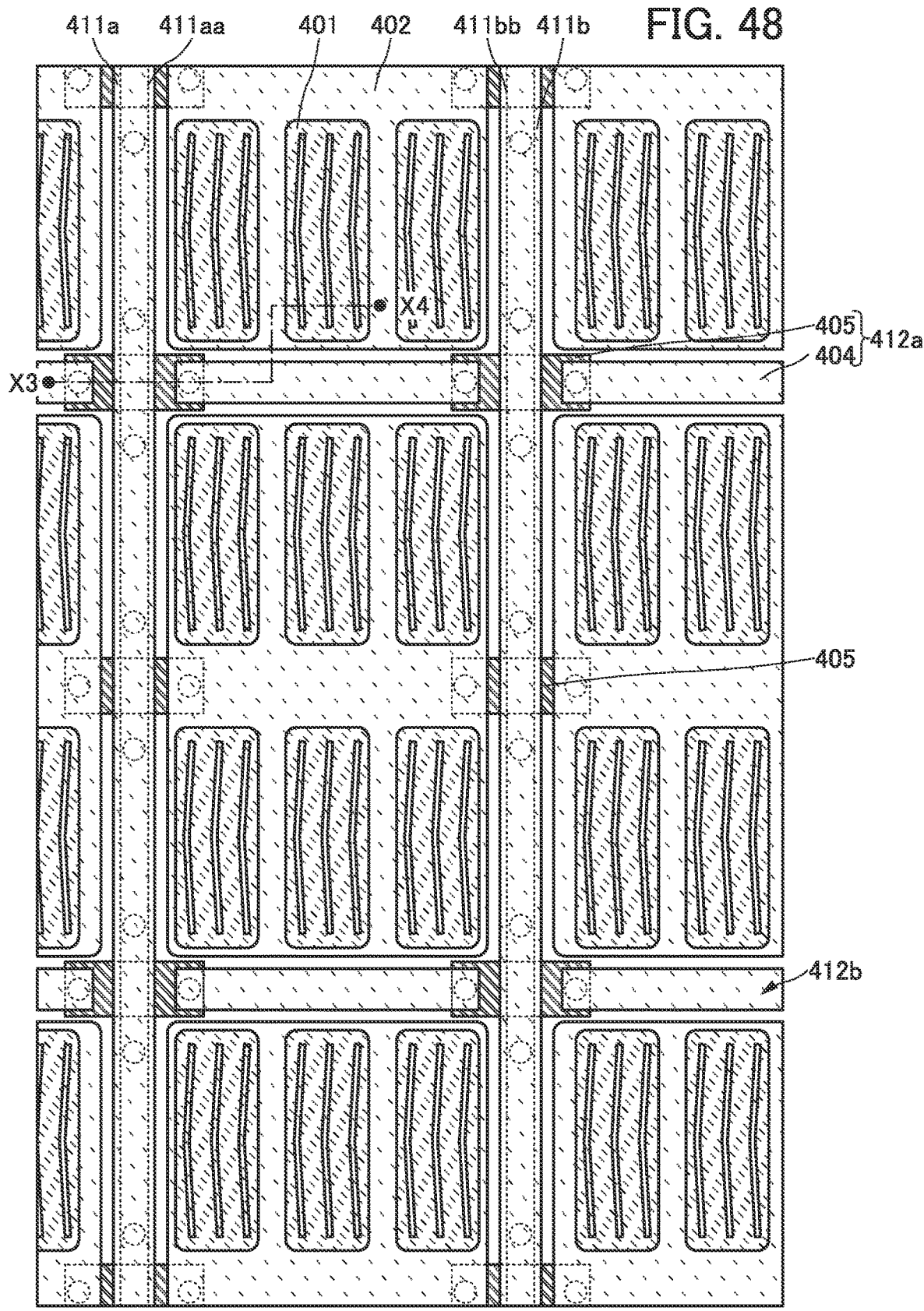
FIG. 48 illustrates a structure example of a touch panel of one embodiment.
Figure 49:
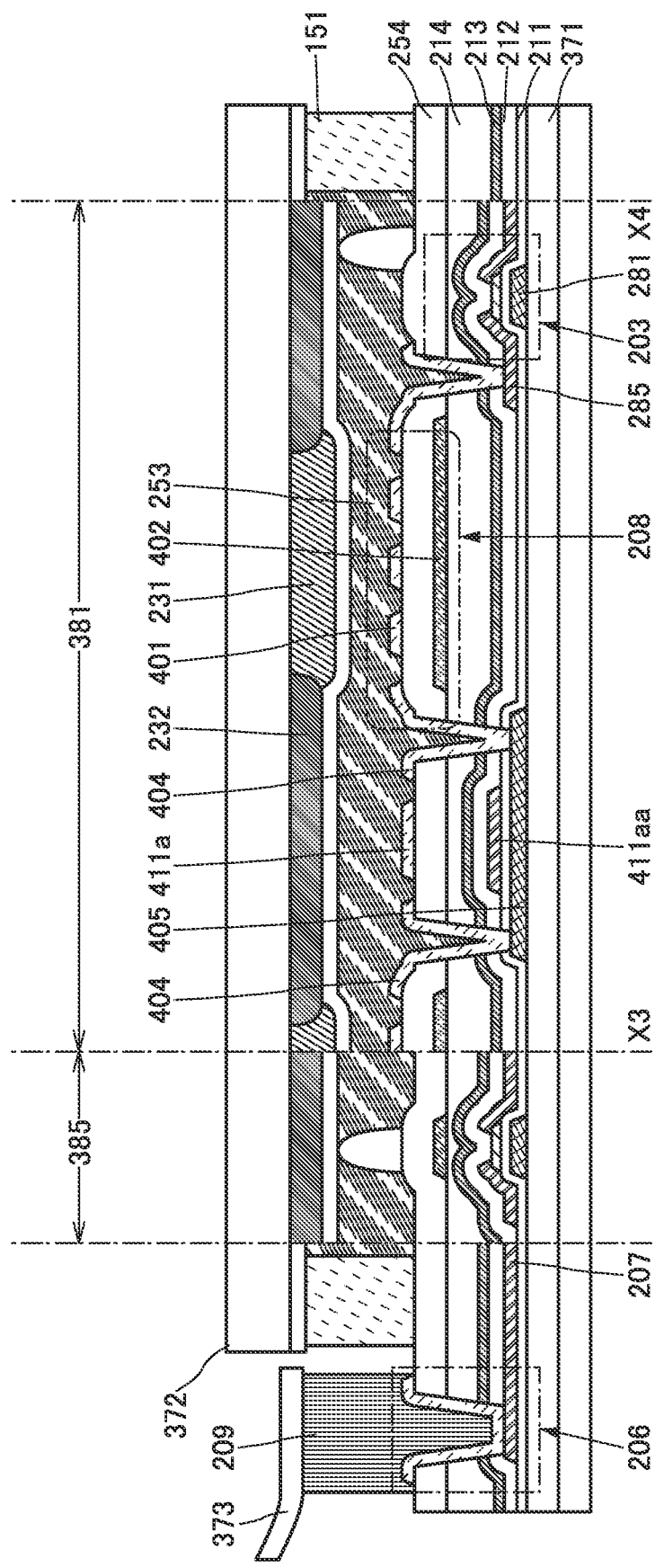
FIG. 49 illustrates a structure example of a touch panel of one embodiment.

The conductive layer 411a (the conductive layer 411b) is connected to the conductive layer 411aa (the conductive layer 411bb) through a contact hole. An example in that case is illustrated in FIG. 48 and FIG. 49.

Structure Example 2-3

Figure 50:
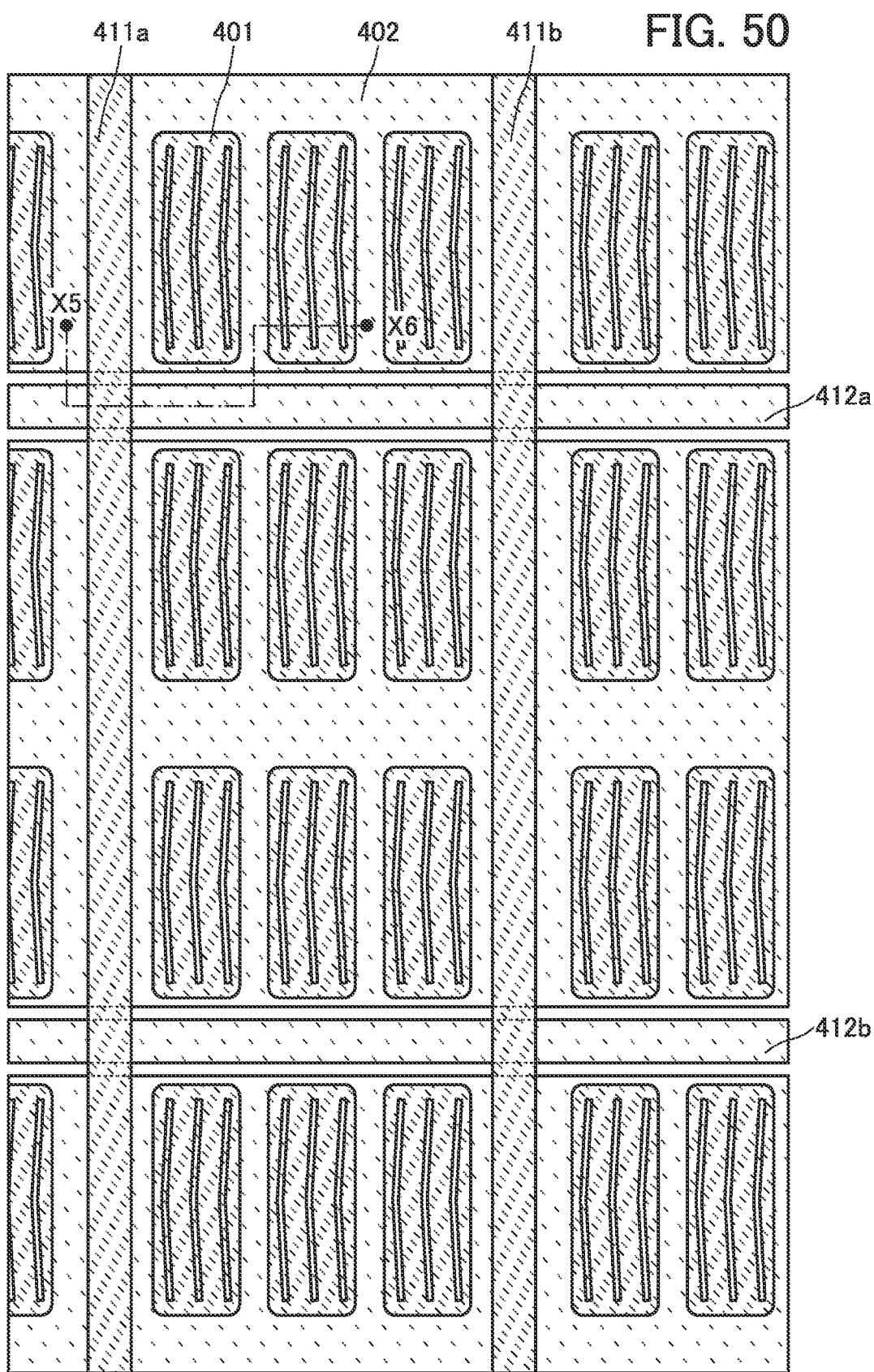
FIG. 50 illustrates a structure example of a touch panel of one embodiment.
Figure 51:
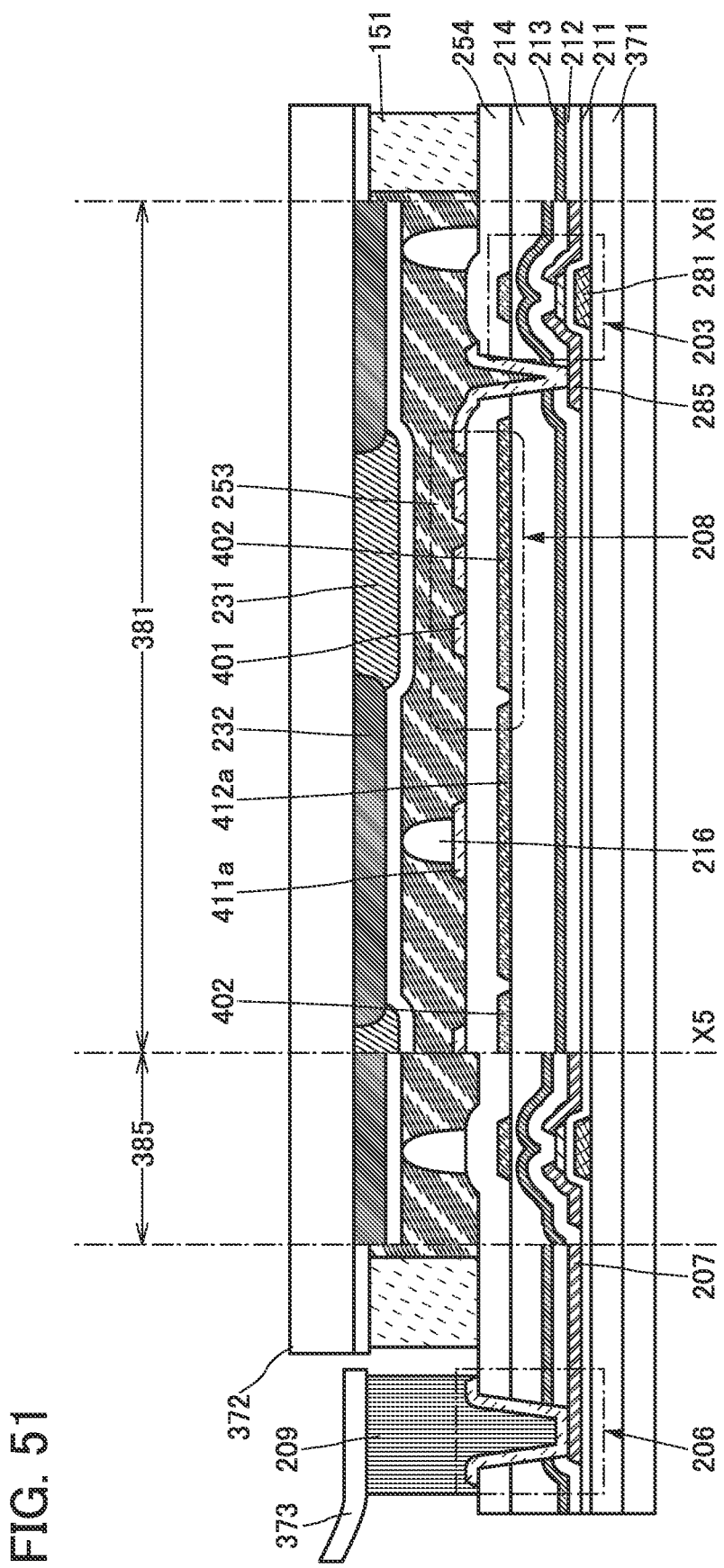
FIG. 51 illustrates a structure example of a touch panel of one embodiment.

FIG. 50 illustrates an example in which the conductive layers 411a and 411b are formed by processing the same conductive film as the conductive layer 401 and the conductive layers 412a and 412b are formed by processing the same conductive film as the conductive layer 402. Therefore, the conductive layers 411a, 411b, and 401 are provided on the same plane. Similarly, the conductive layers 412a, 412b, and 402 are provided on the same plane. FIG. 51 is a schematic cross-sectional view of the touch panel, including the cross section along the section line X5-X6 in FIG. 50. FIG. 50 and FIG. 51 correspond to FIG. 7E.

Two conductive layers functioning as a pair of electrodes of the touch sensor (such as the conductive layers 411a and 412a or the conductive layers 411b and 412b) are formed in different layers as described above, in which case these two conductive layers can cross each other. Therefore, a bridge portion using the conductive layer 405 is not needed, and the structure can be more simplified compared to the structure examples 1 and 2. Accordingly, the manufacturing yield can be improved. In addition, the layout of the conductive layer 411a, 412a, 411b, or 412b has no problem even when the source and drain electrodes 285, the gate electrode 281, and the like are provided below the conductive layer 411a, 412a, 411b, or 412b. Thus, the conductive layer 411a, 412a, 411b, or 412b can be provided so as to overlap with or to cross the gate electrode 281 or the source and drain electrodes 285, a film formed by processing the same conductive film as the gate electrode 281, or a film formed by processing the same conductive film as the source and drain electrodes 285. That is, the source signal line can be provided so as to overlap with the conductive layer 411a, 412a, 411b, or 412b. Thus, the layout area of the conductive layer 401 can be large. That is, the aperture ratio can be increased. Alternatively, the gate signal line can be provided so as to overlap with the conductive layer 411a, 412a, 411b, or 412b. Thus, the layout area of the conductive layer 401 can be large. That is, the aperture ratio can be increased.

The case where the conductive layer 401 on the upper side is a pixel electrode and the conductive layer 402 on the lower side is a common electrode is illustrated in FIG. 51; however, the functions of these conductive layers may be reversed.

Alternatively, in FIG. 50, the conductive layers 411a and 411b may extend in the X direction, and the conductive layers 412a and 412b may extend in the Y direction.

Figure 52:
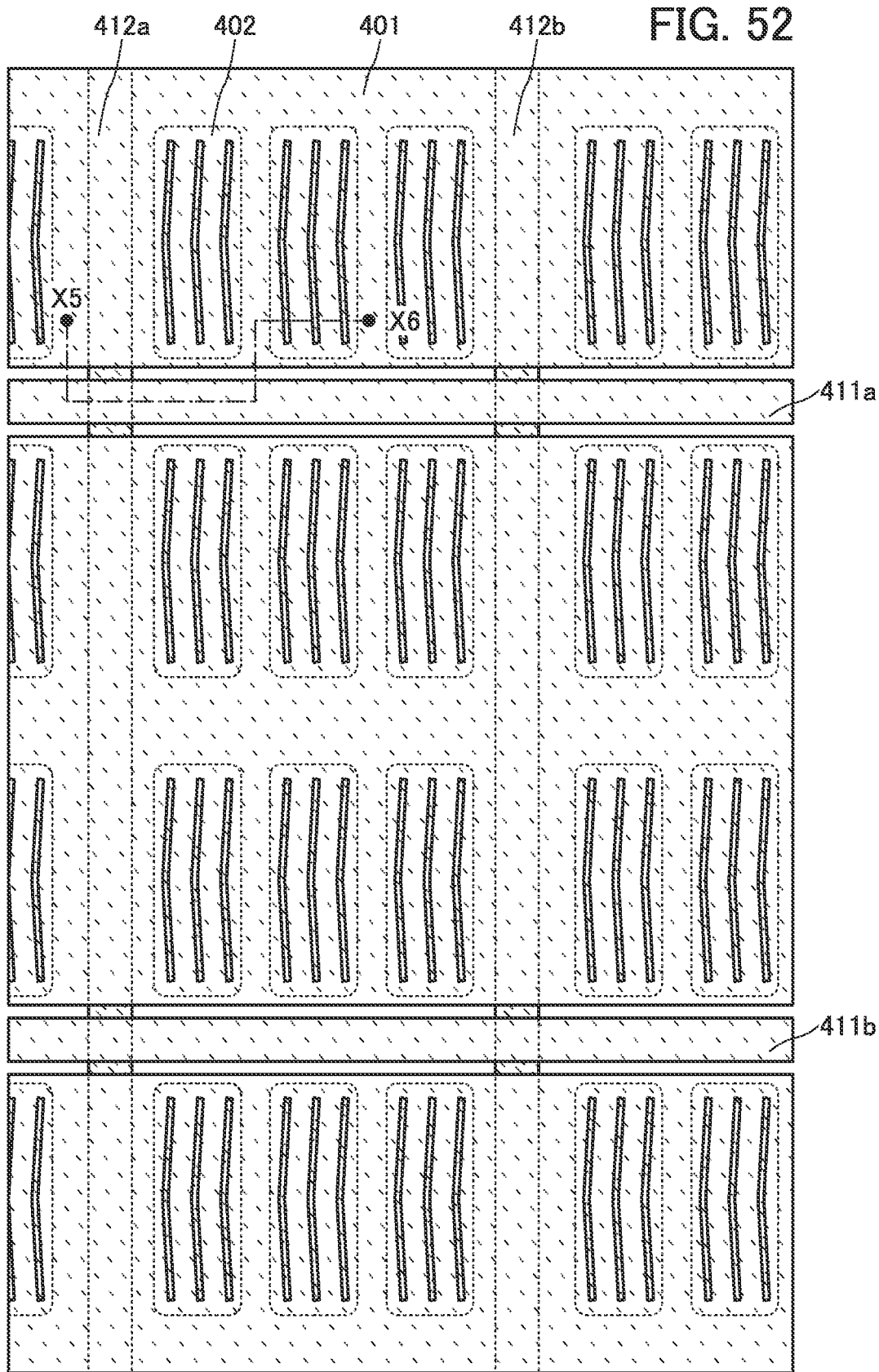
FIG. 52 illustrates a structure example of a touch panel of one embodiment.
Figure 53:
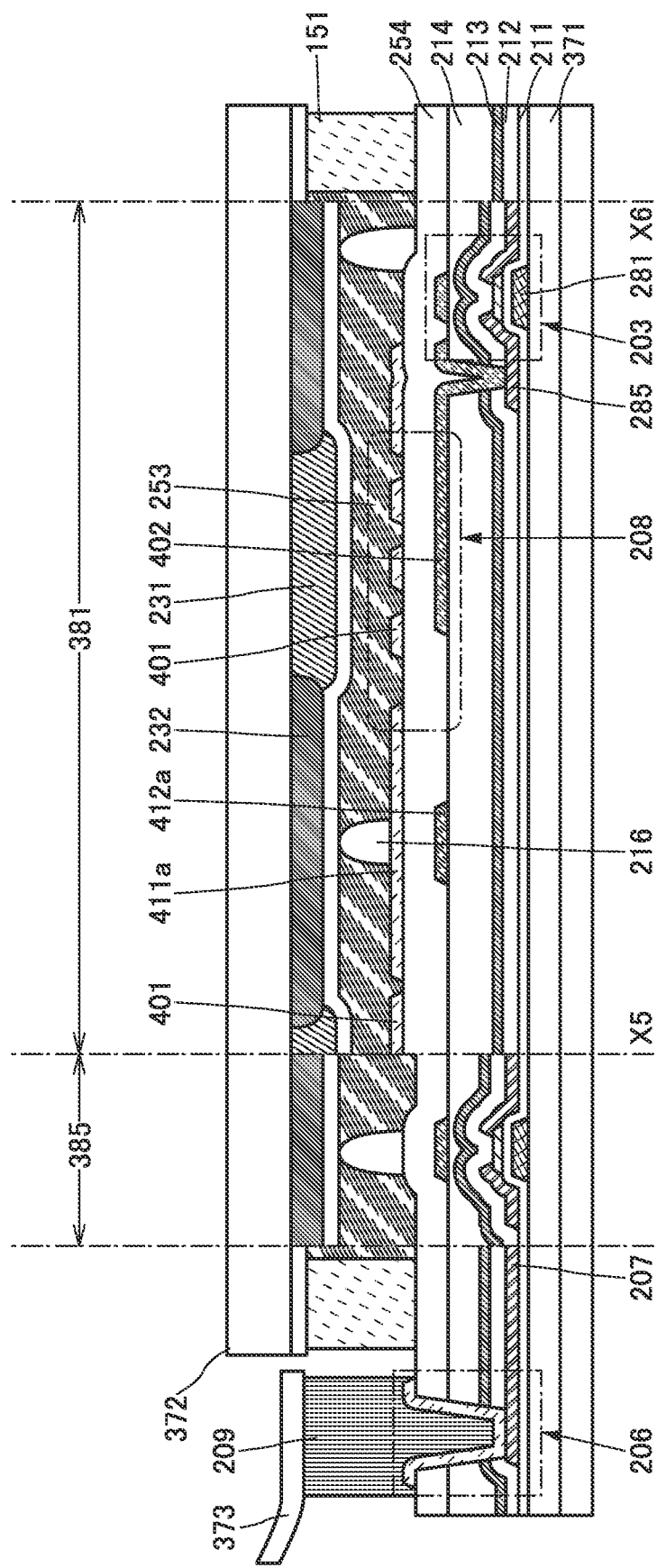
FIG. 53 illustrates a structure example of a touch panel of one embodiment.

FIG. 50 and FIG. 51 each illustrate the example in which the conductive layer 401 on the upper side is a pixel electrode and the conductive layer 402 on the lower side is a common electrode. However, one embodiment of the present invention is not limited thereto. The conductive layer 401 on the upper side may be a common electrode, and the conductive layer 402 on the lower side may be a pixel electrode. An example in that case is illustrated in FIG. 52 and FIG. 53.

In the case where the resistance of the conductive layers 411a, 411b, 412a, and 412b is desired to be reduced, low-resistance conductive layers 411a_1 and 411b_1 and low-resistance conductive layers 412a_1 and 412b_1 may be provided above or below the conductive layers 411a and 411b and the conductive layers 412a and 412b, respectively.

Figure 54:
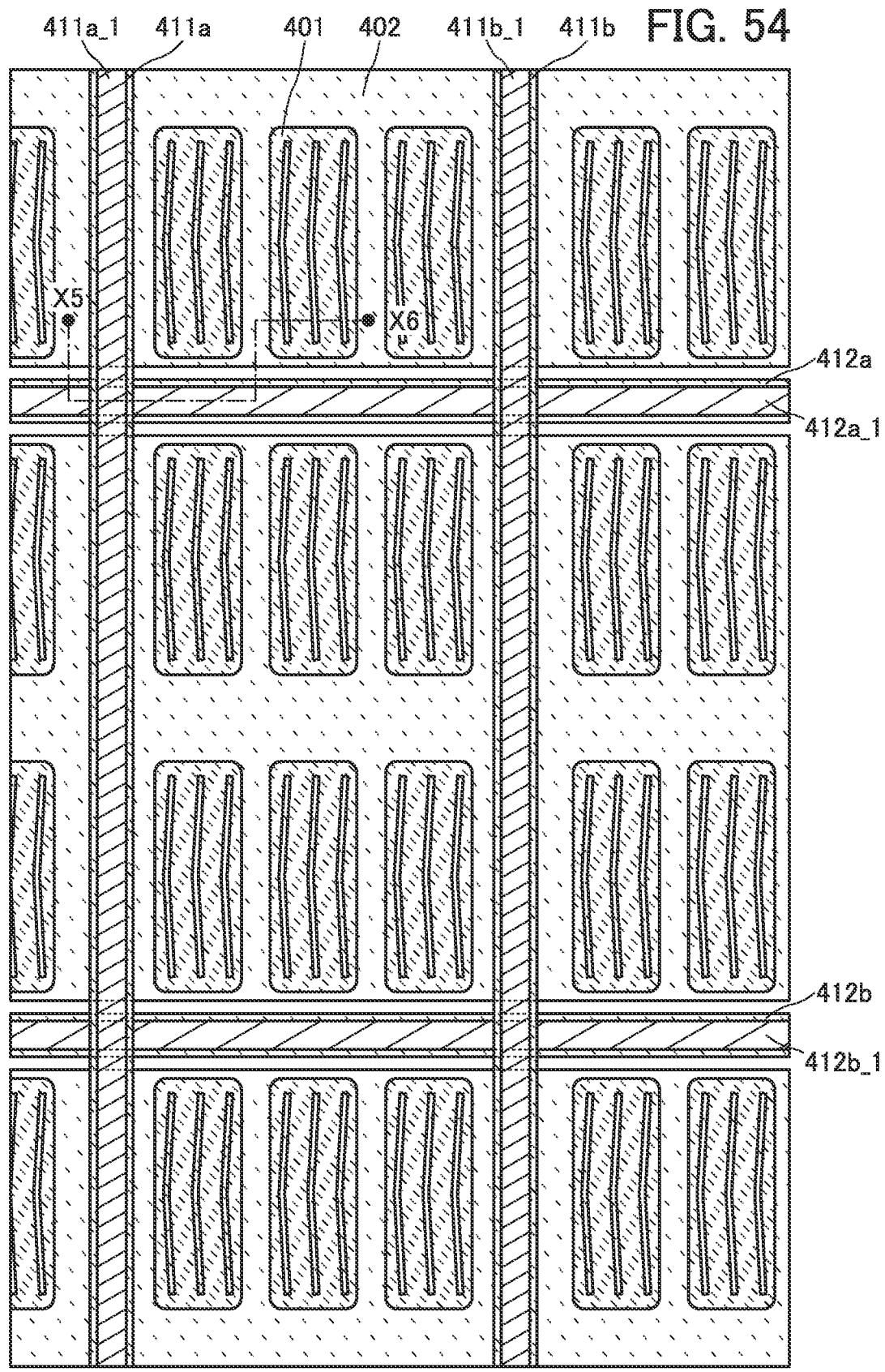
FIG. 54 illustrates a structure example of a touch panel of one embodiment.
Figure 55:
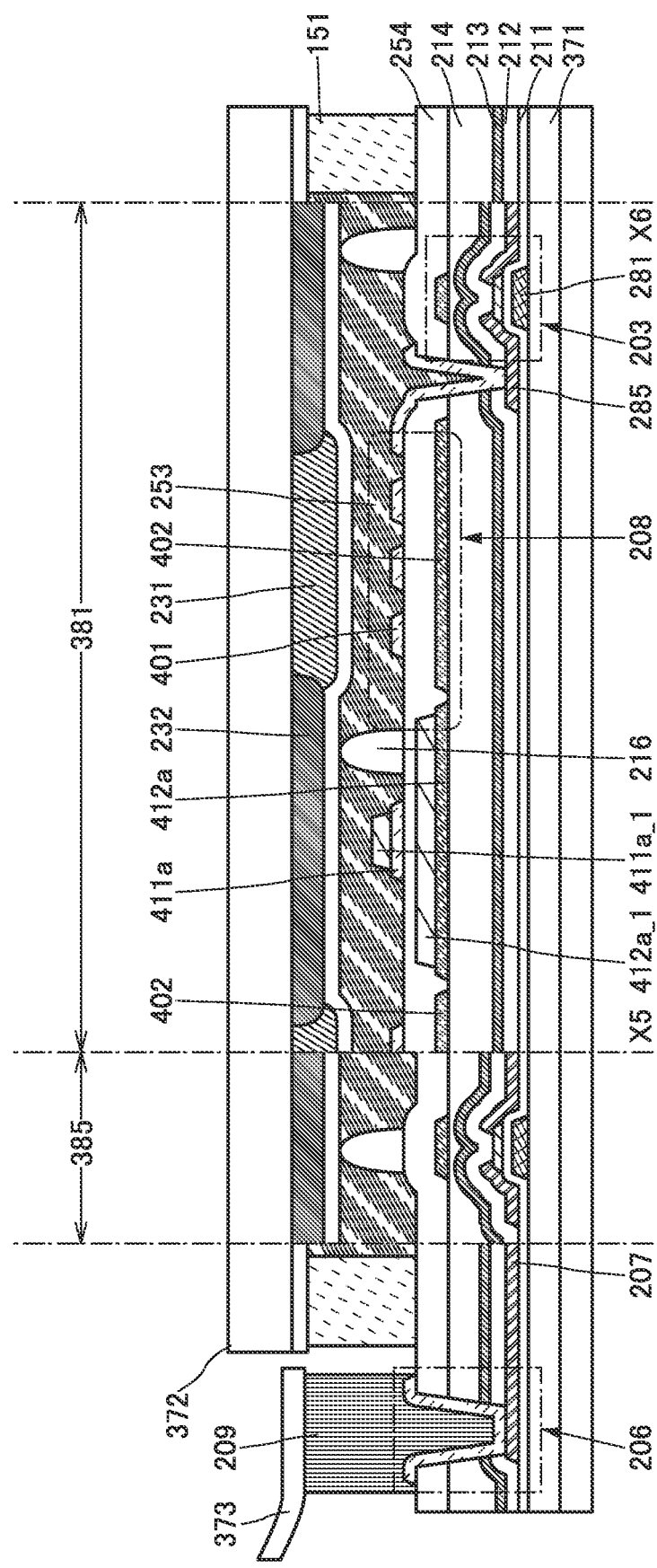
FIG. 55 illustrates a structure example of a touch panel of one embodiment.

For example, a layer of aluminum, copper, titanium, molybdenum, or tungsten, or a stacked layer of any of these metals may be provided above or below the conductive layers 411*a*, 411*b*, 412*a*, and 412*b*. Alternatively, at least one of the conductive layers 411*a*_1, 411*b*_1, 412*a*_1, and 412*b*_1 may be formed of a meshed metal film. Alternatively, at least one of the conductive layers 411*a*_1, 411*b*_1, 412*a*_1, and 412*b*_1 may be formed using a metal nanowire, a carbon nanotube, or the like. The conductive layers 401 and 402 preferably have a light-transmitting property. Therefore, it is preferable that, in an opening, a low-resistance conductive layer be not provided above or below the conductive layers 401 and 402. An example in that case is illustrated in FIG. 54 and FIG. 55.

Figure 56:
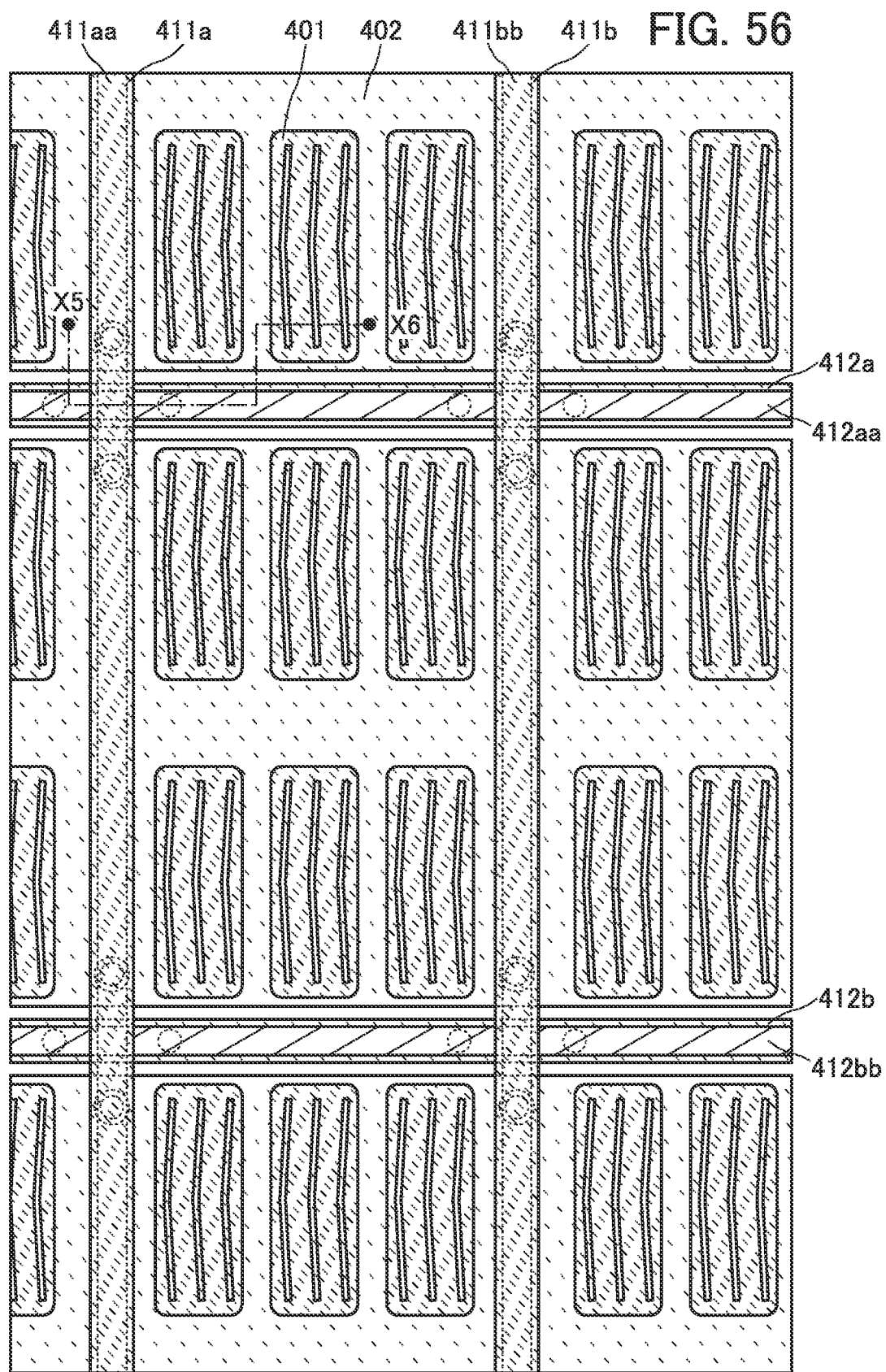
FIG. 56 illustrates a structure example of a touch panel of one embodiment.
Figure 57:
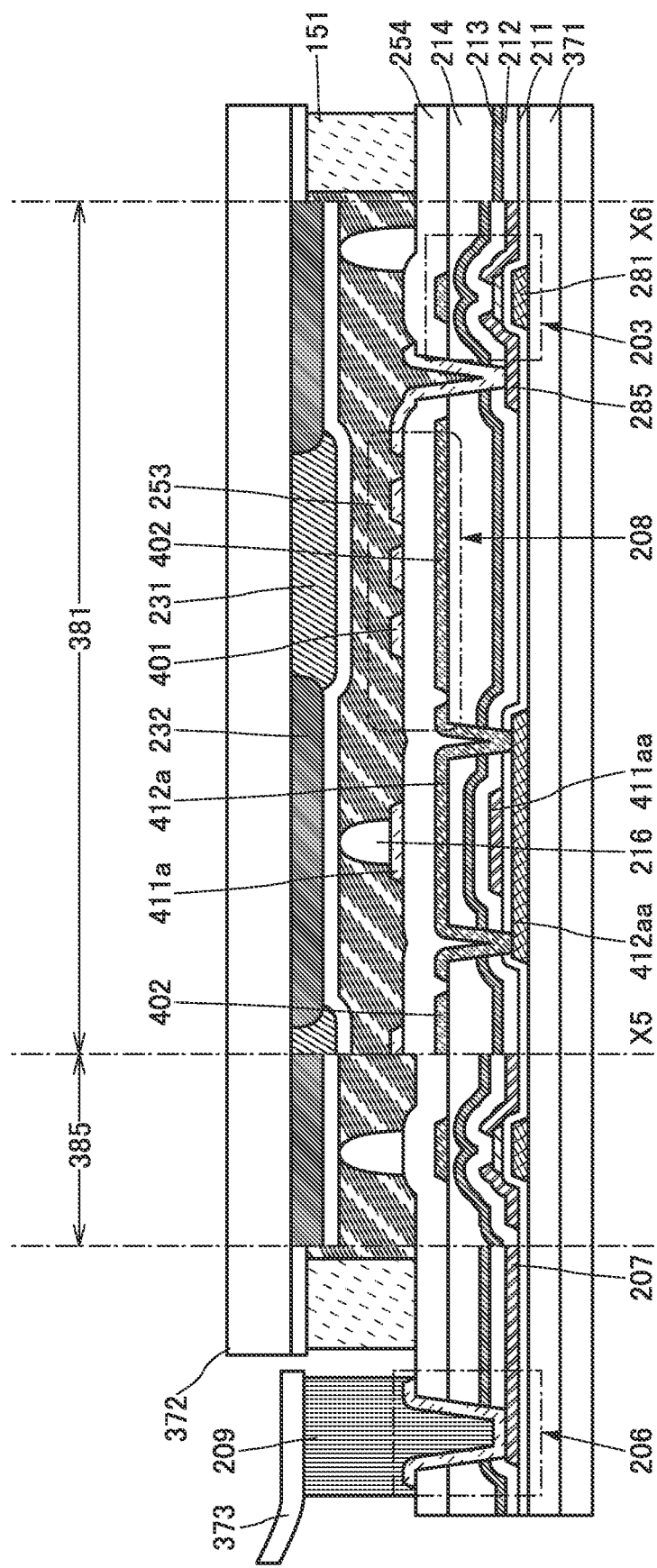
FIG. 57 illustrates a structure example of a touch panel of one embodiment.

In the case where the resistance values of the conductive layers 411*a*, 411*b*, 412*a*, and 412*b* are desired to be substantially reduced, the conductive layers 411*aa* and 411*bb* and the conductive layers 412*aa* and 412*bb* may be provided. The conductive layer 411*a* (the conductive layer 411*b*, 412*a*, or 412*b*) is connected to the conductive layer 411*aa* (the conductive layer 411*bb*, 412*aa*, or 412*bb*) through a contact hole. An example in that case is illustrated in FIG. 56 and FIG. 57. In the case where, for example, the conductive layer 411*a* is connected to the conductive layer 411*aa*, they may be connected through a hole provided in the conductive layer 402. That is, in the case where conductive layers that are stacked with the conductive layer 402 provided therebetween are connected to each other, a hole or the like is provided in the conductive layer 402.

Figure 58:
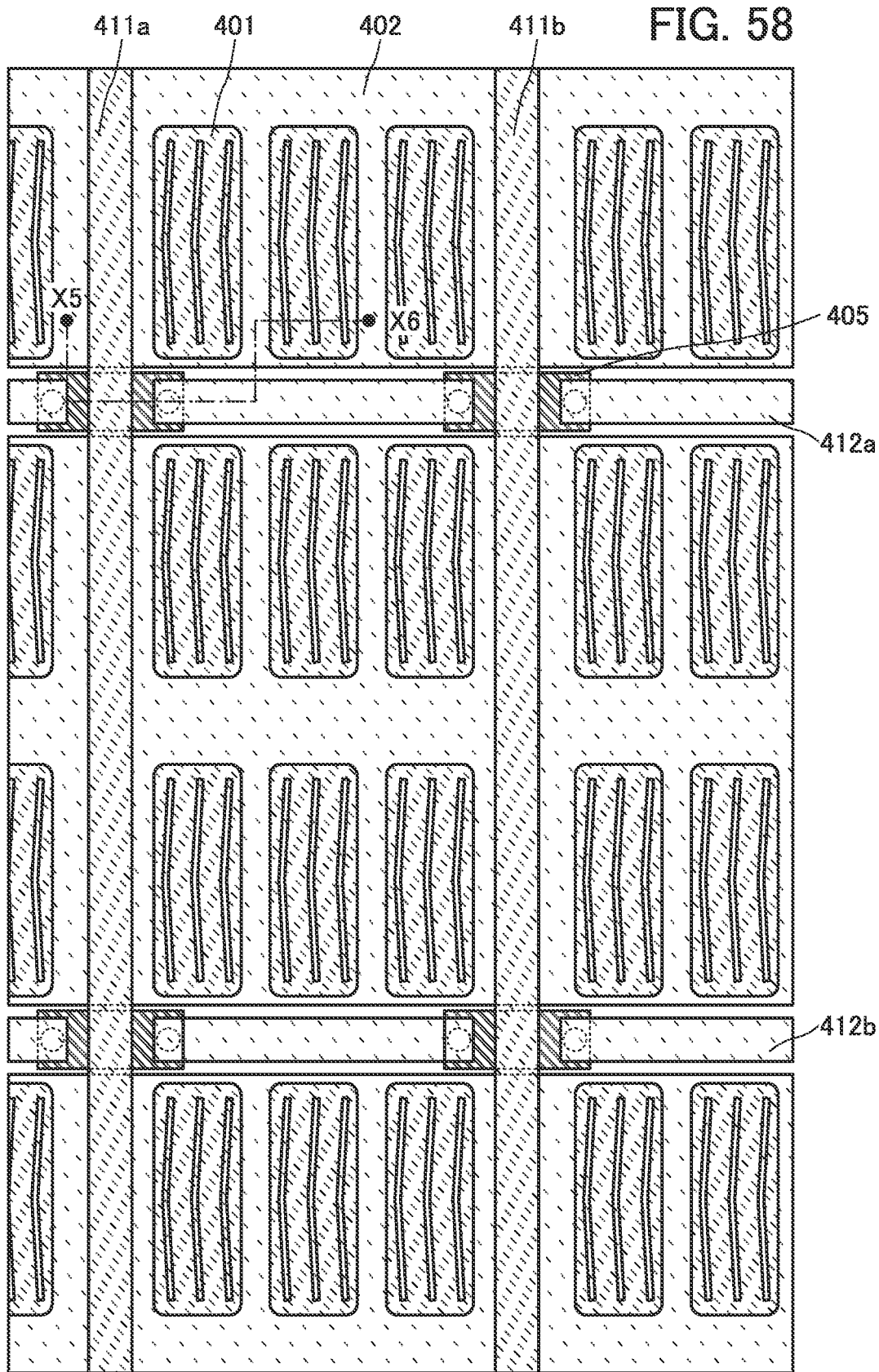
FIG. 58 illustrates a structure example of a touch panel of one embodiment.
Figure 59:
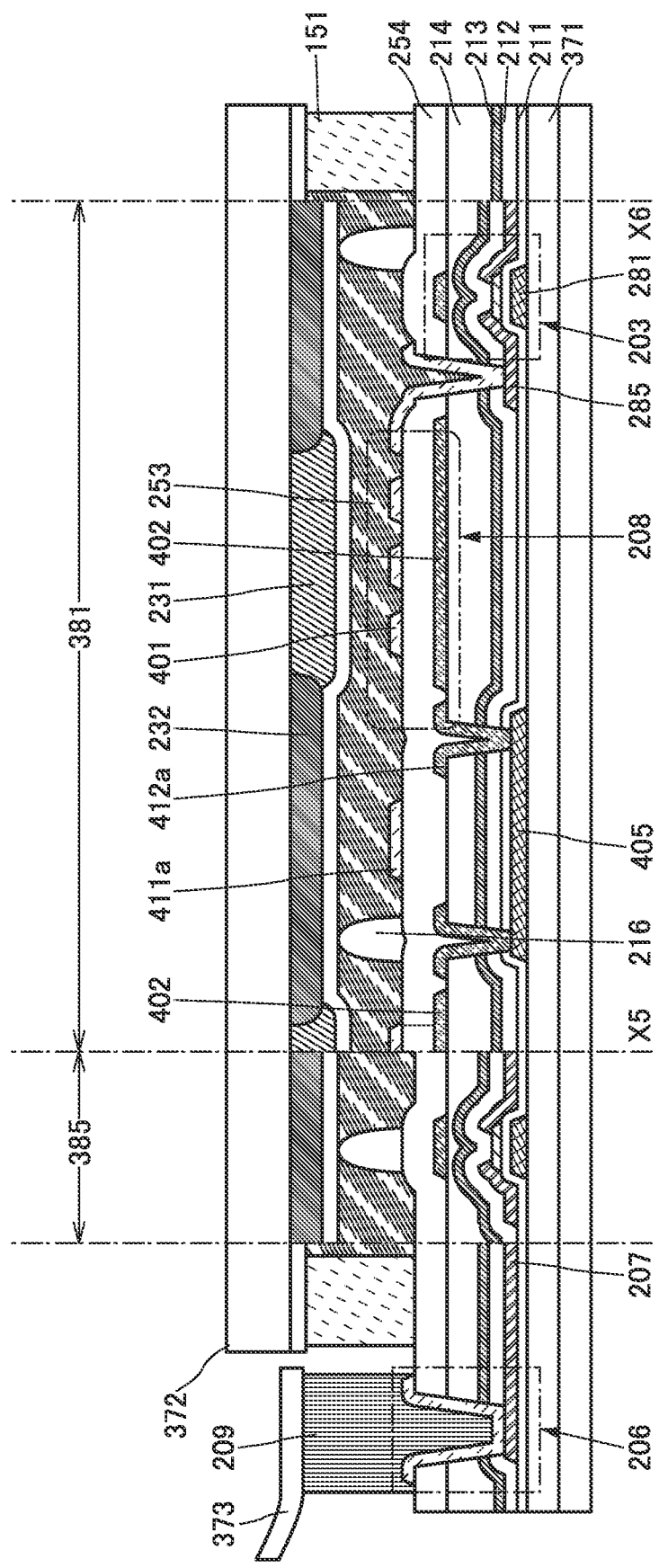
FIG. 59 illustrates a structure example of a touch panel of one embodiment.

Capacitance is formed at the intersection of the conductive layers 411*a* and 411*b* and the conductive layers 412*a* and 412*b*. In some cases, however, this capacitance is desired to be small. To reduce this capacitance formed at the intersection, the conductive layers may be connected to each other through another conductive layer and a contact hole. An example in that case is illustrated in FIG. 58 and FIG. 59. In FIG. 58 and FIG. 59, the conductive layers 412*a* (the conductive layers 412*b*) are connected to each other through a contact hole and the conductive layer 405. For example, the conductive layer 405 can be formed of a film formed by processing the same conductive film as the gate electrode 281 or a film formed by processing the same conductive film as the source and drain electrodes 285. In this manner, the parasitic capacitance due to the electrode in the touch sensor can be reduced. As a result, the sensitivity of the touch sensor can be improved.

Structure Example 2-4

In the above structures, the pair of conductive layers of the liquid crystal element and the pair of conductive layers of the touch sensor are provided separately. A structure in which one of the pair of conductive layers of the liquid crystal element also serves as one of the pair of conductive layers of the touch sensor can also be employed.

Figure 60:
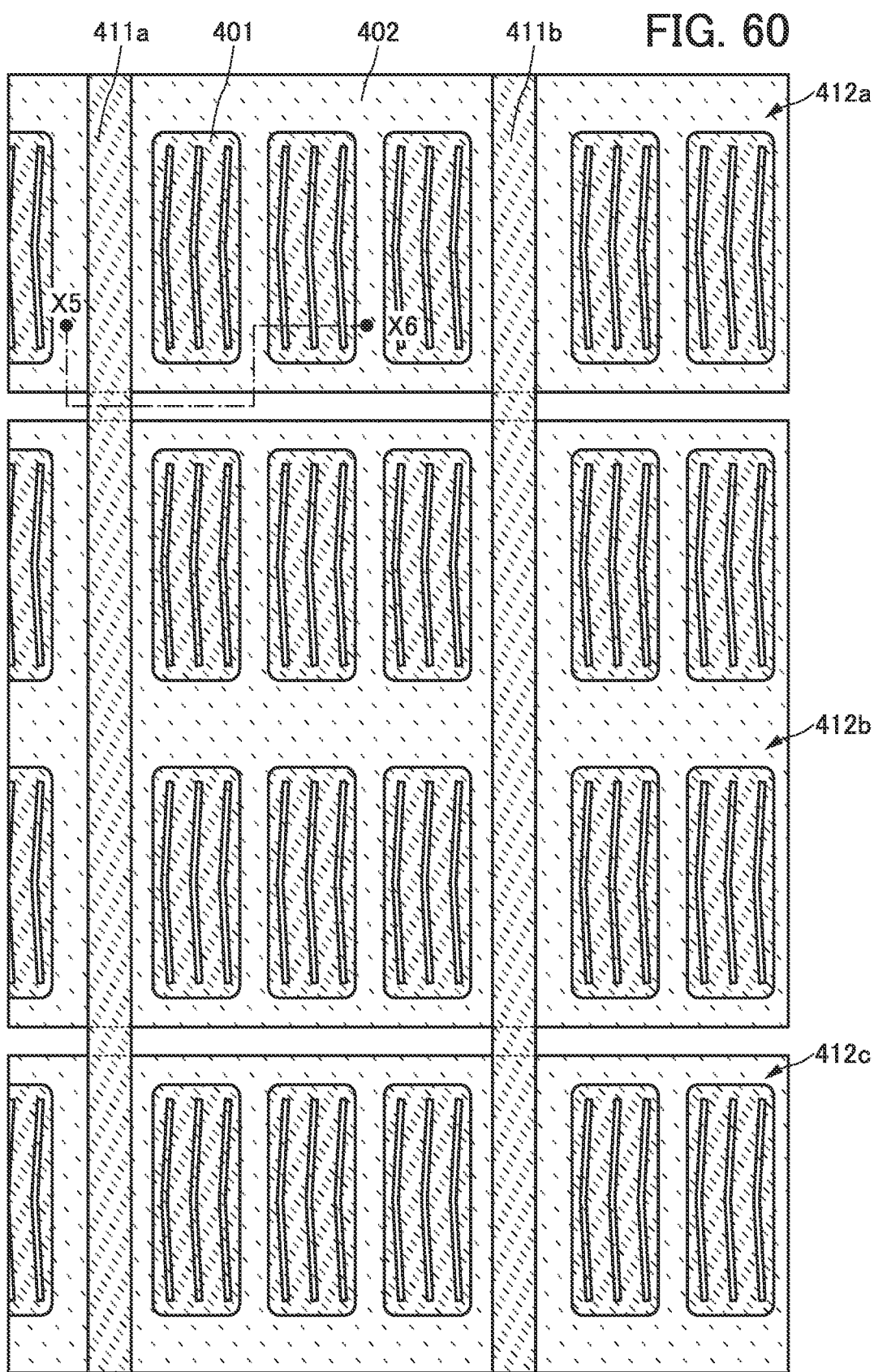
FIG. 60 illustrates a structure example of a touch panel of one embodiment.
Figure 61:
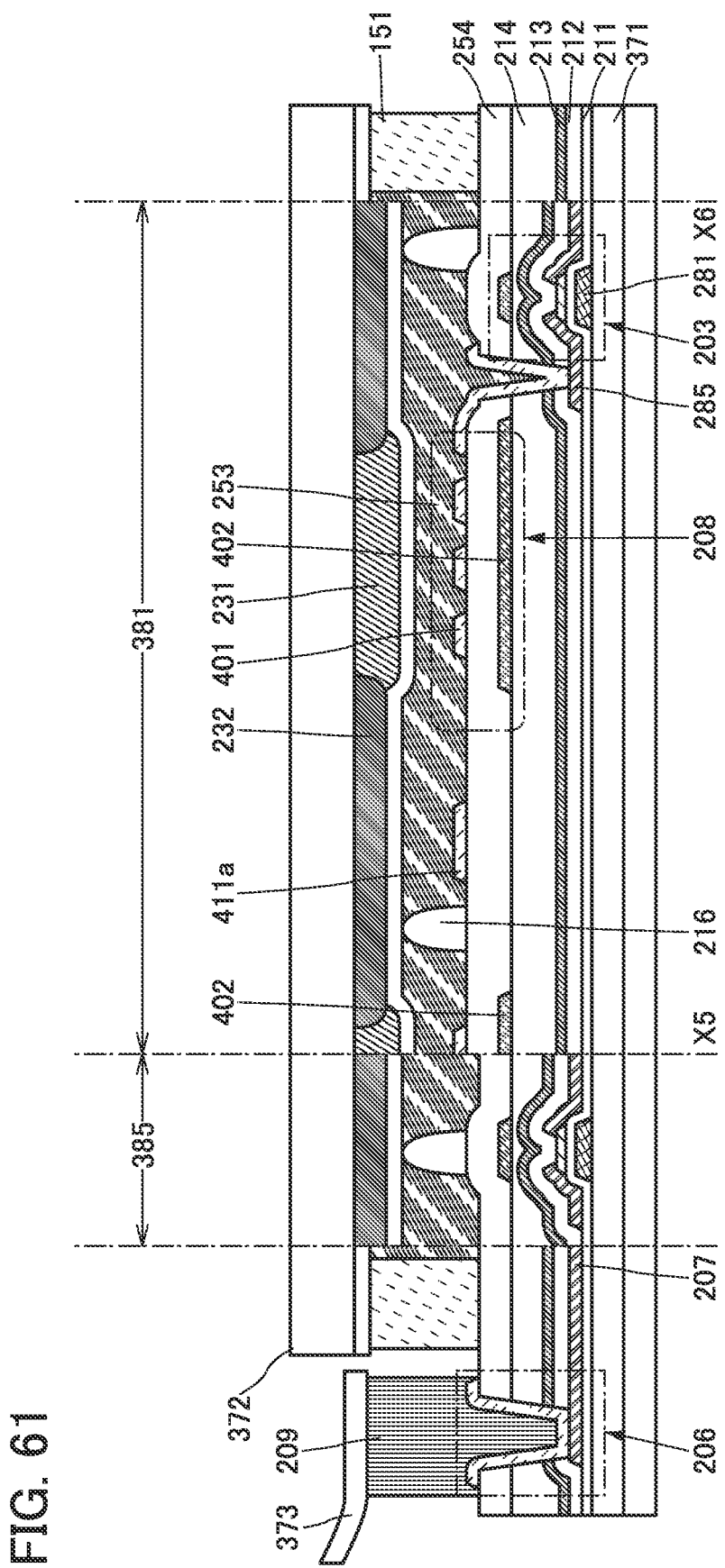
FIG. 61 illustrates a structure example of a touch panel of one embodiment.

FIG. 60 illustrates an example in which the conductive layers 402 each have a band-like shape extending in the X direction and are divided in the Y direction. One of the conductive layers 402 functions as the conductive layer 412*a*, 412*b*, or 412*c* having a function of the electrode of the touch sensor and also functions as one of the pair of conductive layers, e.g. the common electrode, of the liquid crystal element. FIG. 61 is a schematic cross-sectional view of the touch panel, including the cross section along the section line X5-X6 in FIG. 60. FIG. 60 and FIG. 61 correspond to FIG. 7C.

When the conductive layer (such as the conductive layer 412*a* or 412*b*) and the conductive layer 402 functioning as the pair of electrodes of the touch sensor are formed in different layers, these conductive layers can cross each other. Therefore, a bridge portion using the conductive layer 405 is not needed, and the structure can be more simplified compared to the structure examples 1 and 2. Accordingly, the manufacturing yield can be improved. In addition, the layout of the conductive layer 411*a*, 412*a*, 411*b*, or 412*b* has no problem even when the source and drain electrodes 285, the gate electrode 281, and the like are provided below the conductive layer 411*a*, 412*a*, 411*b*, or 412*b*. Thus, the conductive layer 411*a*, 412*a*, 411*b*, or 412*b* can be provided so as to overlap with or to cross the gate electrode 281 or the source and drain electrodes 285, a film formed by processing the same conductive film as the gate electrode 281, or a film formed by processing the same conductive film as the source and drain electrodes 285. That is, the source signal line can be provided so as to overlap with the conductive layer 411*a*, 412*a*, 411*b*, or 412*b*. Thus, the layout area of the conductive layer 401 can be large. That is, the aperture ratio can be increased. Alternatively, the gate signal line can be provided so as to overlap with the conductive layer 411*a*, 412*a*, 411*b*, or 412*b*. Thus, the layout area of the conductive layer 401 can be large. That is, the aperture ratio can be increased.

Figure 62:
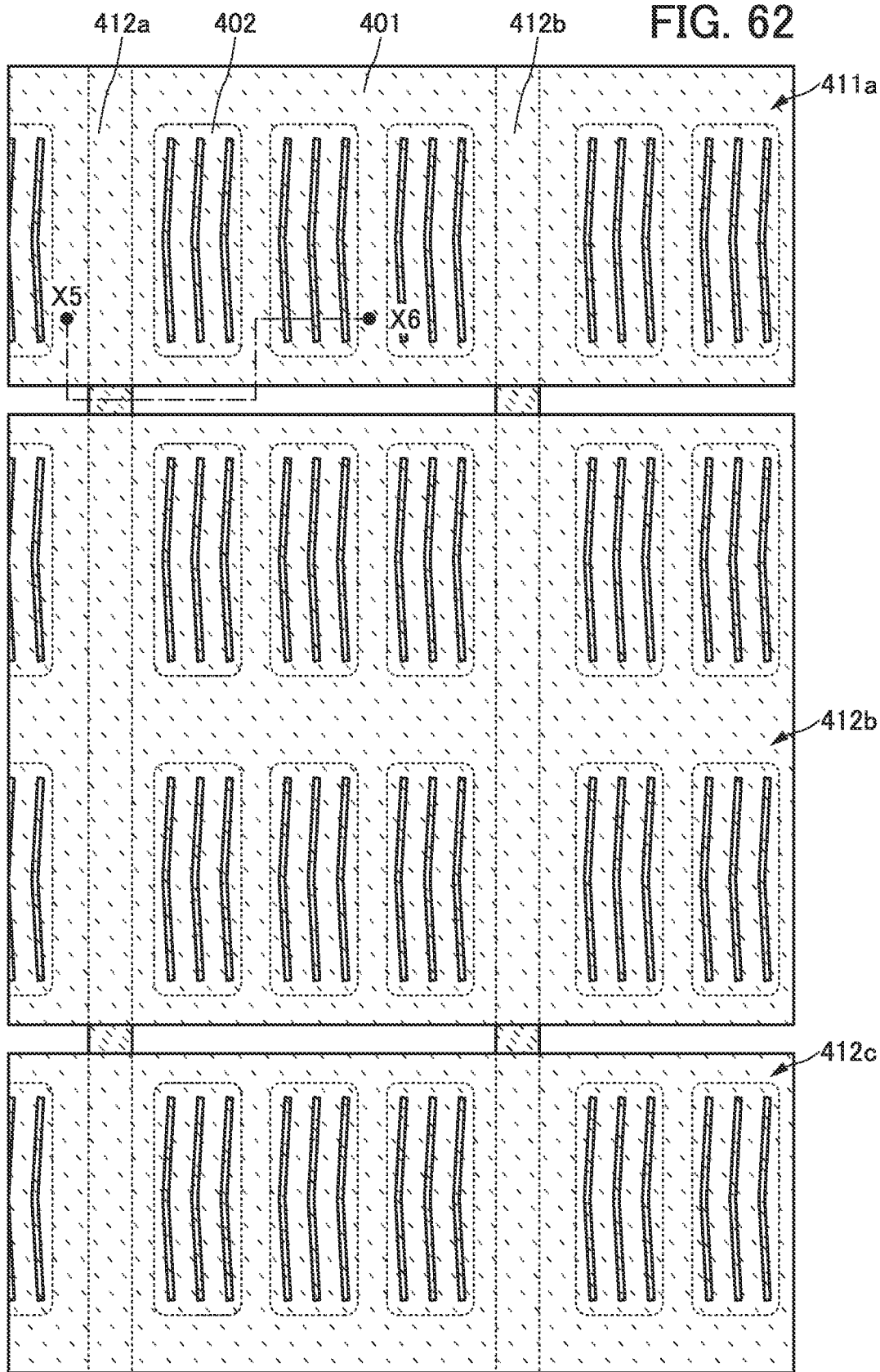
FIG. 62 illustrates a structure example of a touch panel of one embodiment.
Figure 63:
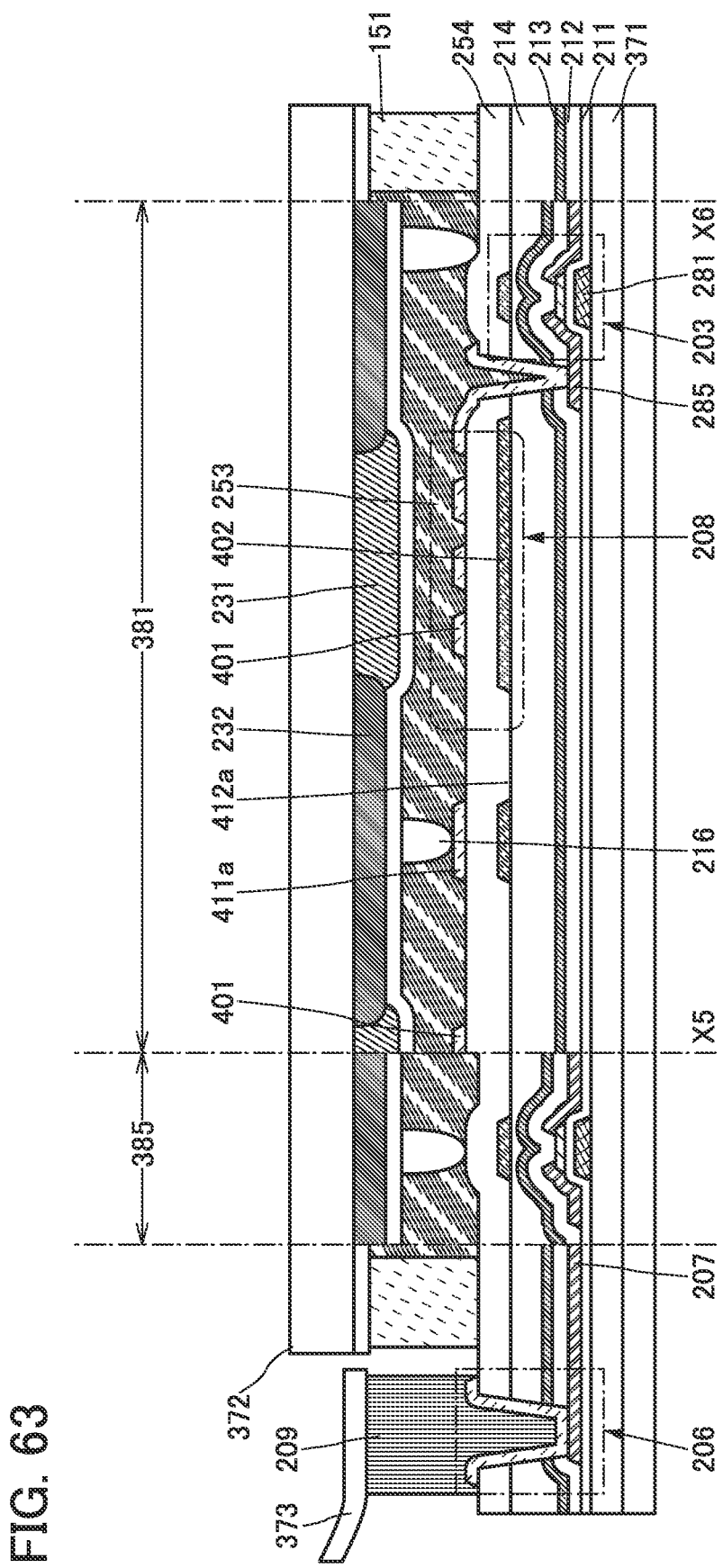
FIG. 63 illustrates a structure example of a touch panel of one embodiment.

FIG. 60 and FIG. 61 each illustrate the example in which the conductive layer 401 on the upper side is a pixel electrode and the conductive layer 402 on the lower side is a common electrode. However, one embodiment of the present invention is not limited thereto. The conductive layer 401 on the upper side may be a common electrode, and the conductive layer 402 on the lower side may be a pixel electrode. An example in that case is illustrated in FIG. 62 and FIG. 63.

Figure 64:
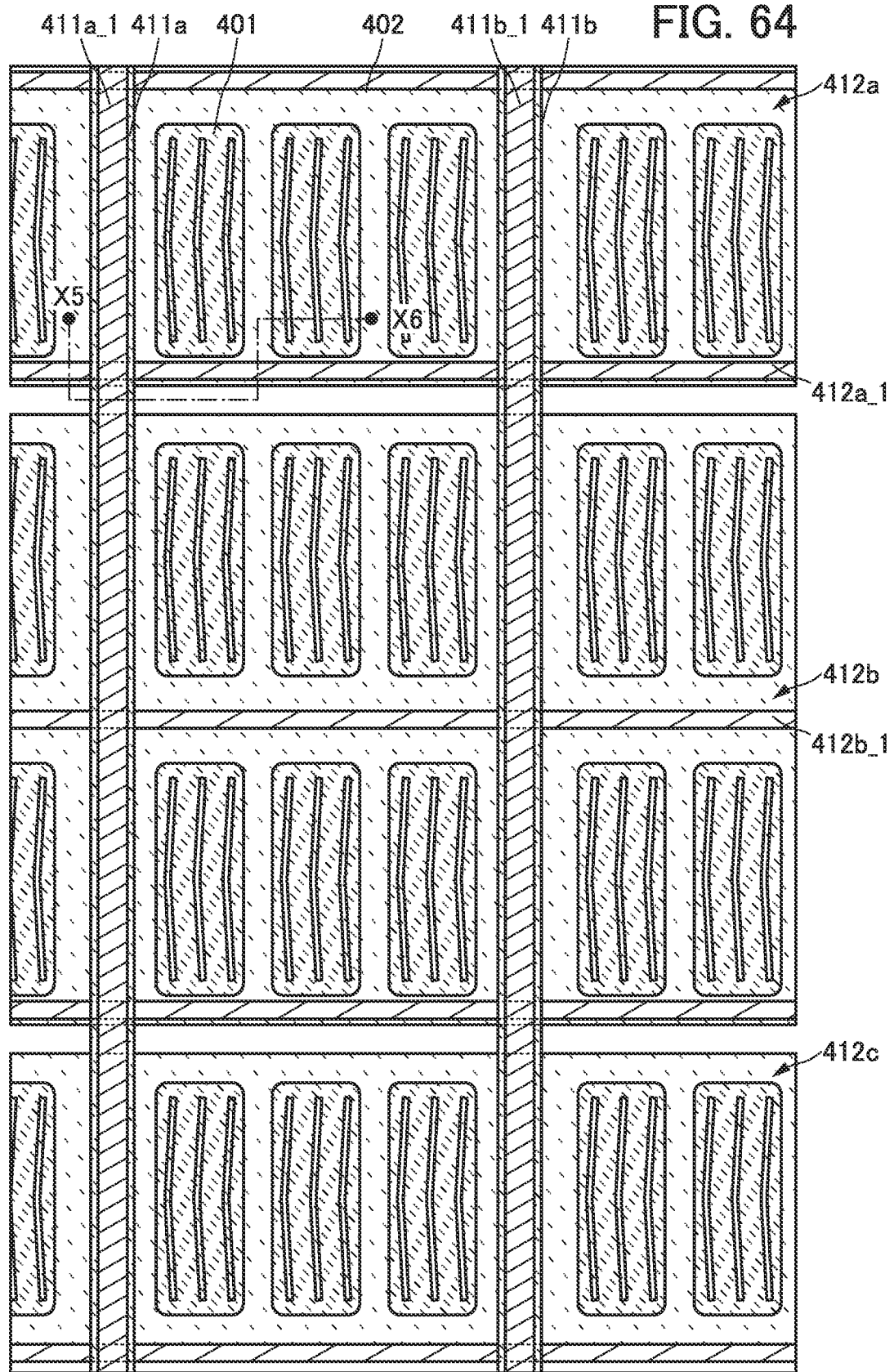
FIG. 64 illustrates a structure example of a touch panel of one embodiment.
Figure 65:
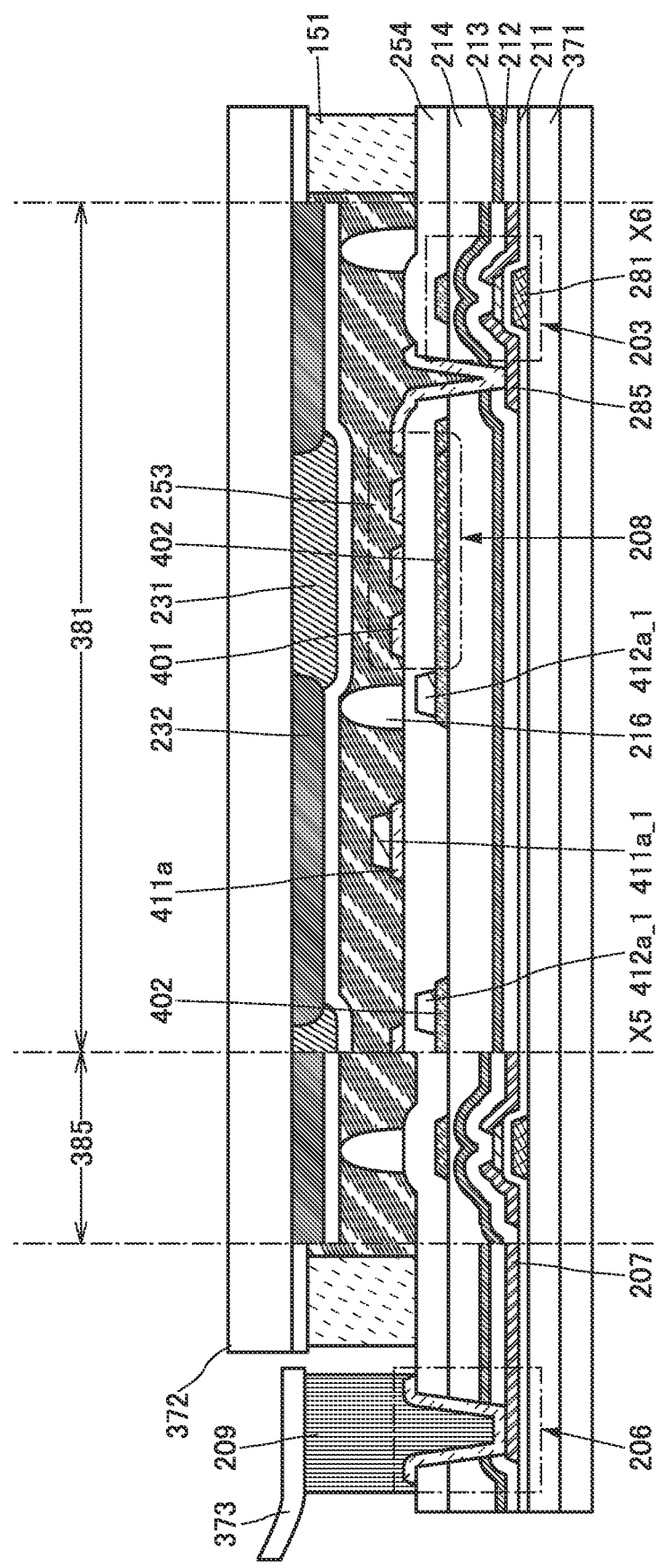
FIG. 65 illustrates a structure example of a touch panel of one embodiment.

In the case where the resistance of the conductive layers 411*a*, 411*b*, 412*a*, and 412*b* is desired to be reduced, low-resistance conductive layers 411*a*_1 and 411*b*_1 and low-resistance conductive layers 412*a*_1 and 412*b*_1 may be provided above or below the conductive layers 411*a* and 411*b* and the conductive layers 412*a* and 412*b*, respectively. For example, a layer of aluminum, copper, titanium, molybdenum, or tungsten, or a stacked layer of any of these metals may be provided above or below the conductive layers 411*a*, 411*b*, 412*a*, and 412*b*. Alternatively, at least one of the conductive layers 411*a*_1, 411*b*_1, 412*a*_1, and 412*b*_1 may be formed of a meshed metal film. Alternatively, at least one of the conductive layers 411*a*_1, 411*b*_1, 412*a*_1, and 412*b*_1 may be formed using a metal nanowire, a carbon nanotube, or the like. The conductive layers 401 and 402 preferably have a light-transmitting property. Therefore, it is preferable that, in an opening, a low-resistance conductive layer be not provided above or below the conductive layers 401 and 402. An example in that case is illustrated in FIG. 64 and FIG. 65.

Figure 66:
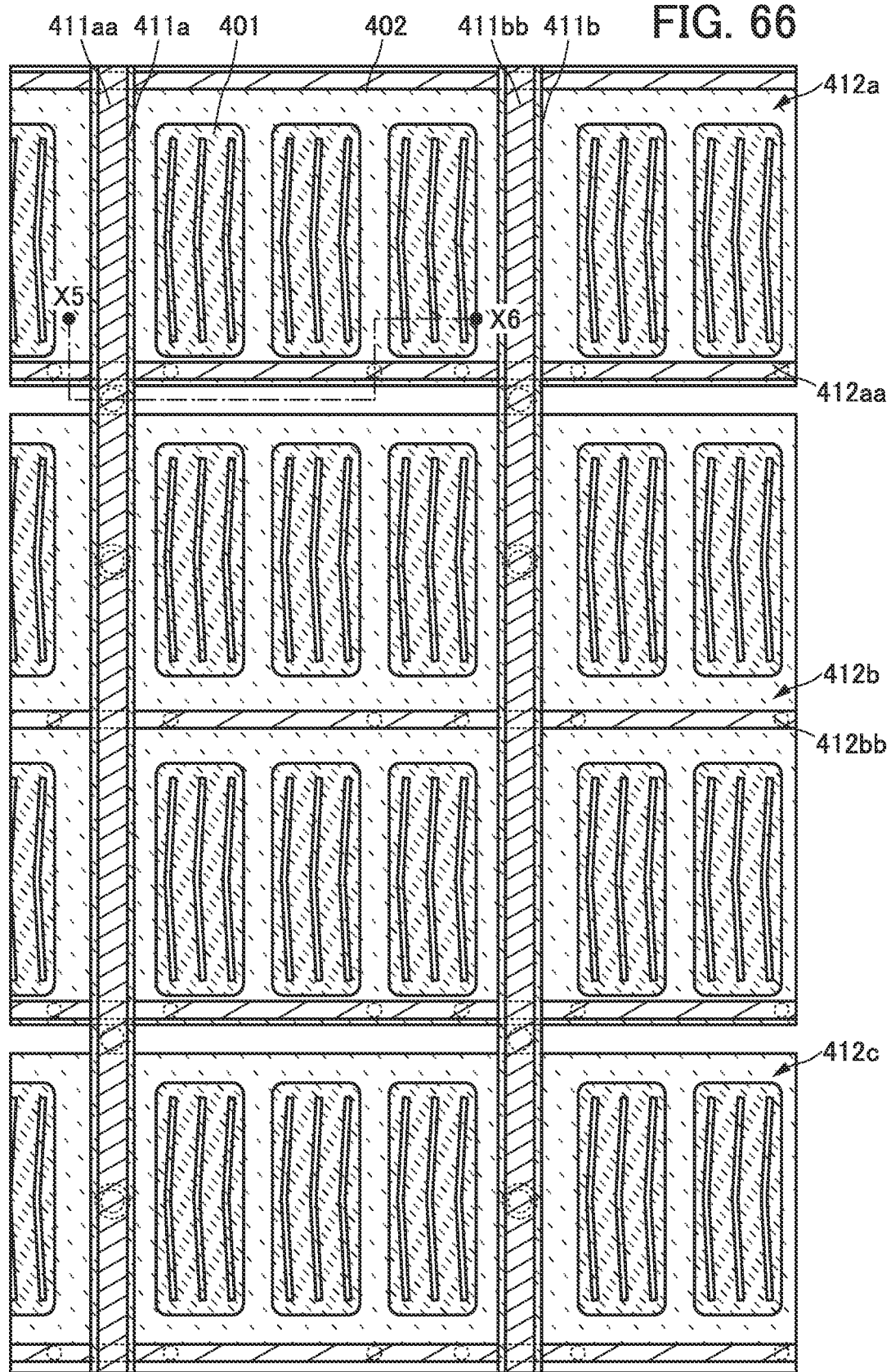
FIG. 66 illustrates a structure example of a touch panel of one embodiment.
Figure 67:
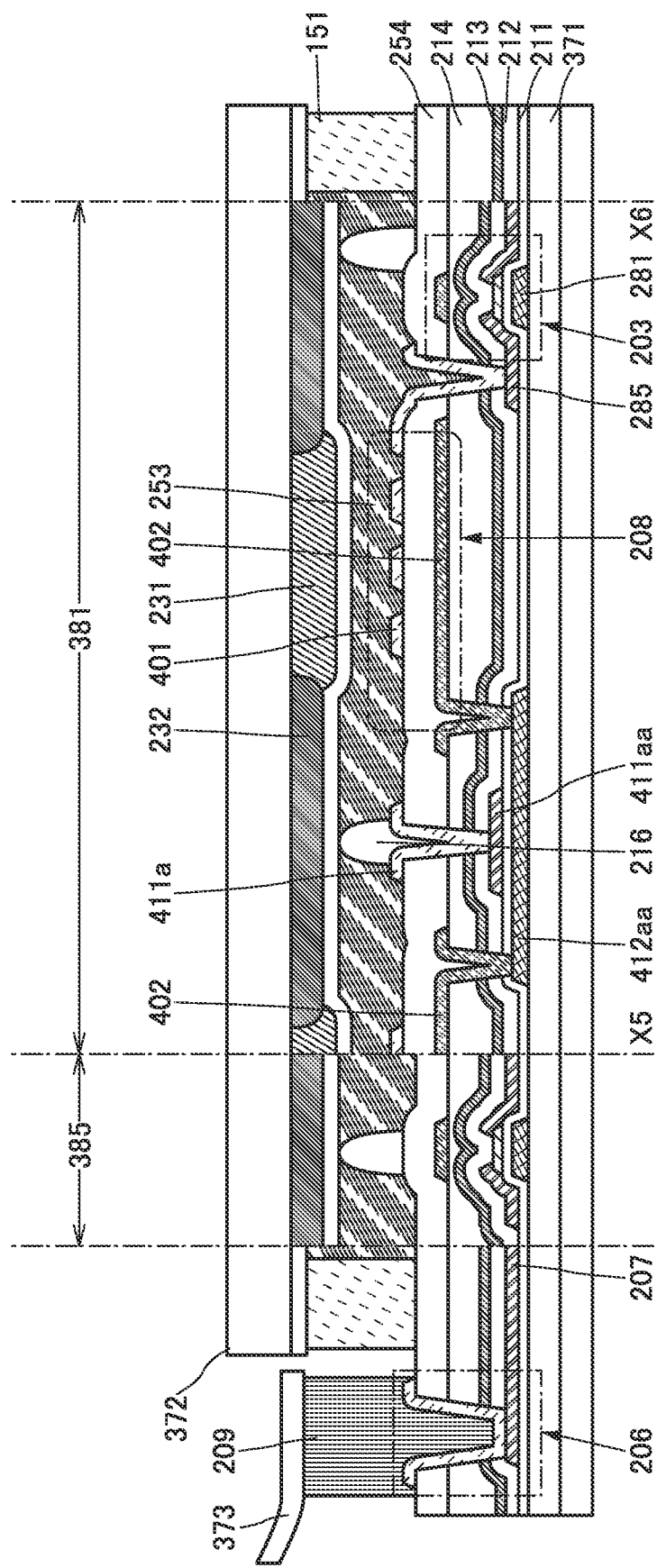
FIG. 67 illustrates a structure example of a touch panel of one embodiment.

In the case where the resistance values of the conductive layers 411*a*, 411*b*, 412*a*, and 412*b* are desired to be substantially reduced, the conductive layers 411*aa* and 411*bb* and the conductive layers 412*aa* and 412*bb* may be provided. The conductive layer 411*a* (the conductive layer 411*b*, 412*a*, or 412*b*) is connected to the conductive layer 411*aa* (the conductive layer 411*bb*, 412*aa*, or 412*bb*) through a contact hole. An example in that case is illustrated in FIG. 66 and FIG. 67. In the case where, for example, the conductive layer 411*a* is connected to the conductive layer 411*aa*, they may be connected through a hole provided in the conductive layer 402. That is, in the case where conductive layers that are stacked with the conductive layer 402 provided therebetween are connected to each other, a hole or the like is provided in the conductive layer 402.

Figure 68:
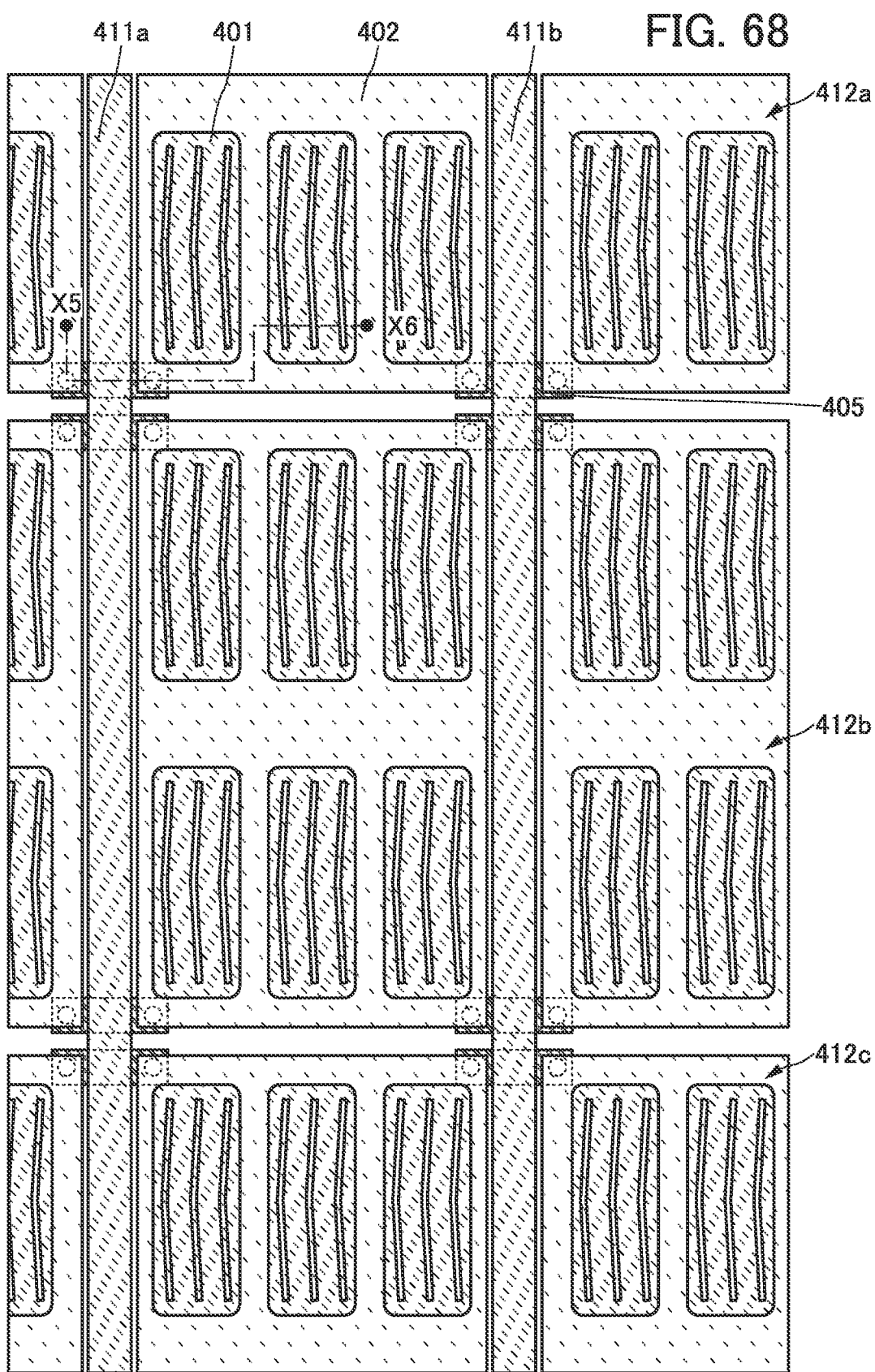
FIG. 68 illustrates a structure example of a touch panel of one embodiment.
Figure 69:
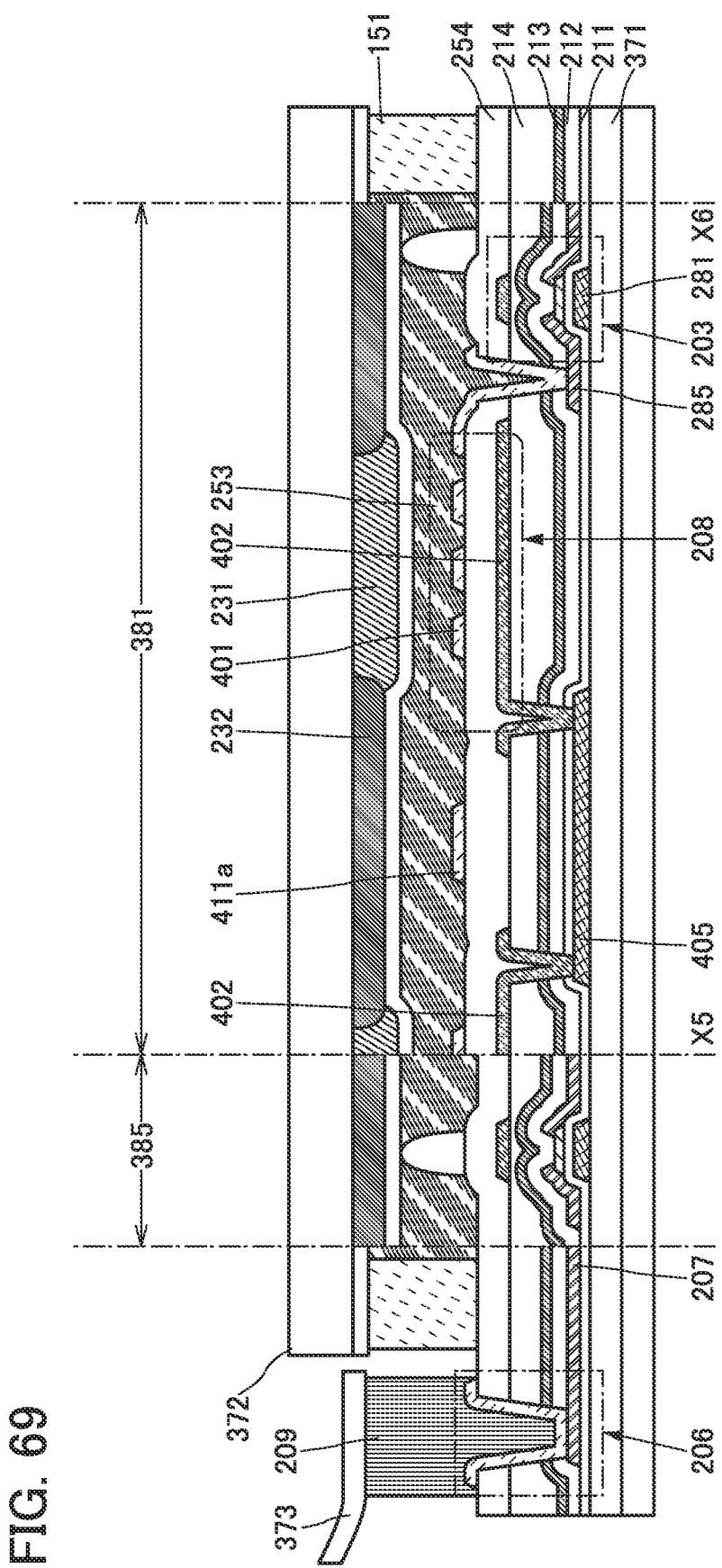
FIG. 69 illustrates a structure example of a touch panel of one embodiment.

Capacitance is formed at the intersection of the conductive layers 411a and 411b and the conductive layers 412a and 412b. In some cases, however, this capacitance is desired to be small. To reduce this capacitance formed at the intersection, the conductive layers may be connected to each other through another conductive layer and a contact hole. An example in that case is illustrated in FIG. 68 and FIG. 69. In FIG. 68 and FIG. 69, the conductive layers 402 are connected to each other through a contact hole and the conductive layer 405. For example, the conductive layer 405 can be formed of a film formed by processing the same conductive film as the gate electrode 281 or a film formed by processing the same conductive film as the source and drain electrodes 285. In this manner, the parasitic capacitance due to the electrode in the touch sensor can be reduced. As a result, the sensitivity of the touch sensor can be improved.

Alternatively, in FIG. 60, the conductive layers 411a and 411b may extend in the X direction, and the conductive layers 412a and 412b may extend in the Y direction.

Figure 70:
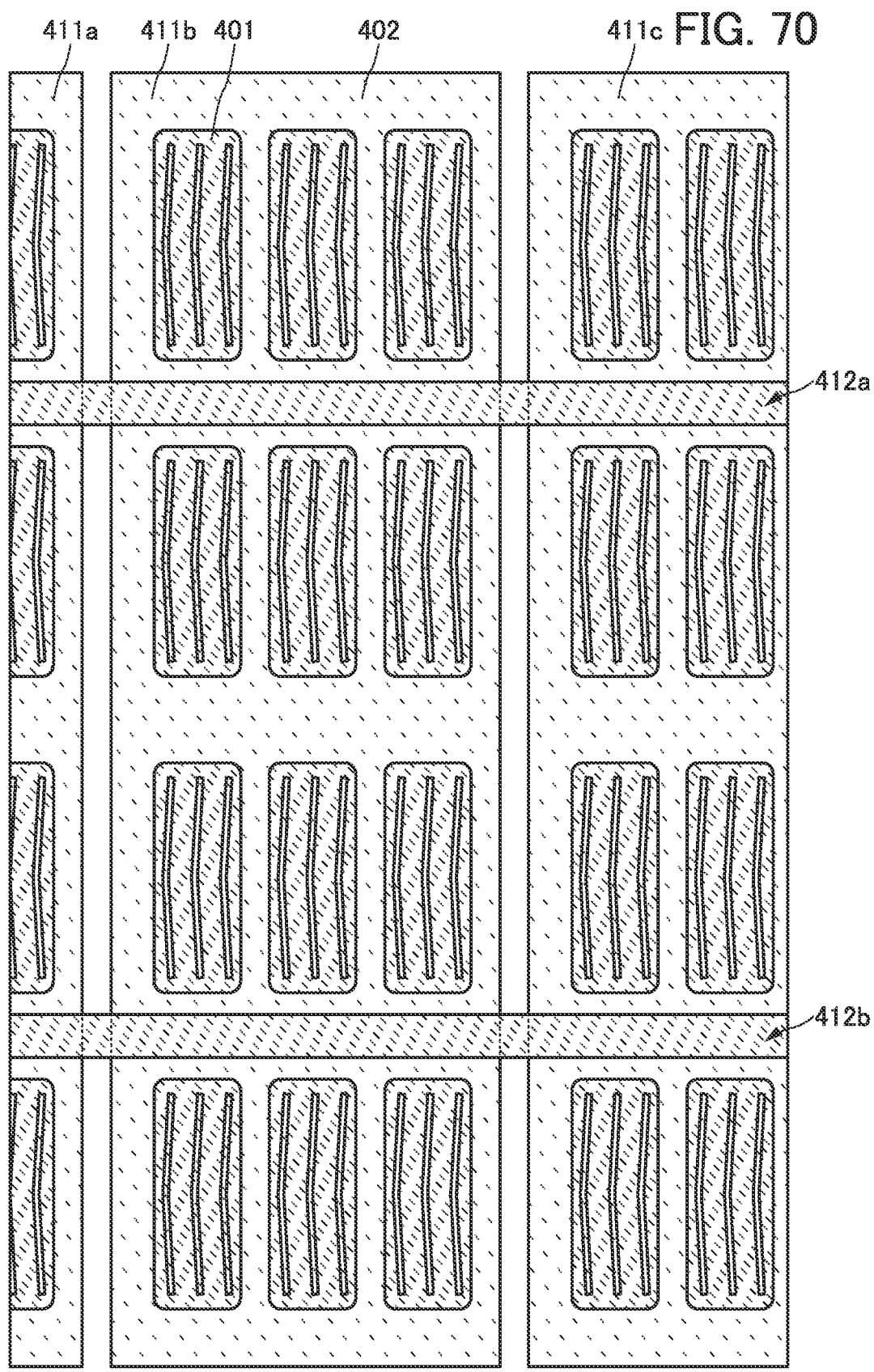
FIG. 70 illustrates a structure example of a touch panel of one embodiment.

FIG. 70 illustrates an example in which the conductive layers 402 each have a band-like shape extending in the Y direction and are divided in the X direction. One of the conductive layers 402 functions as the conductive layer 411a, 411b, or 411c having a function of the electrode of the touch sensor and also functions as one of the pair of conductive layers, e.g. the common electrode, of the liquid crystal element.

Such a structure is preferable because the structure of the touch panel can be more simplified.

Although an example of the liquid crystal element using an FFS mode has been described, for example, a structure with a liquid crystal element using an IPS mode can also be employed. In that case, the conductive layers 401 and 402 may be formed by processing the same conductive film. Alternatively, both the conductive layers 401 and 402 may be formed to have a comb-like shape when seen from the above. Alternatively, the conductive layer 402 functioning as a common electrode is preferably formed into a band-like shape extending in the X direction or the Y direction so as to function as one electrode of the touch sensor.

Structure Example 3

Structure examples of the touch panel partly different from the structure examples 1 and 2 are described below with reference to the drawings.

In a touch panel of one embodiment of the present invention which will be described below, an organic EL element is used as a display element.

Structure Example 3-1

Figure 71:
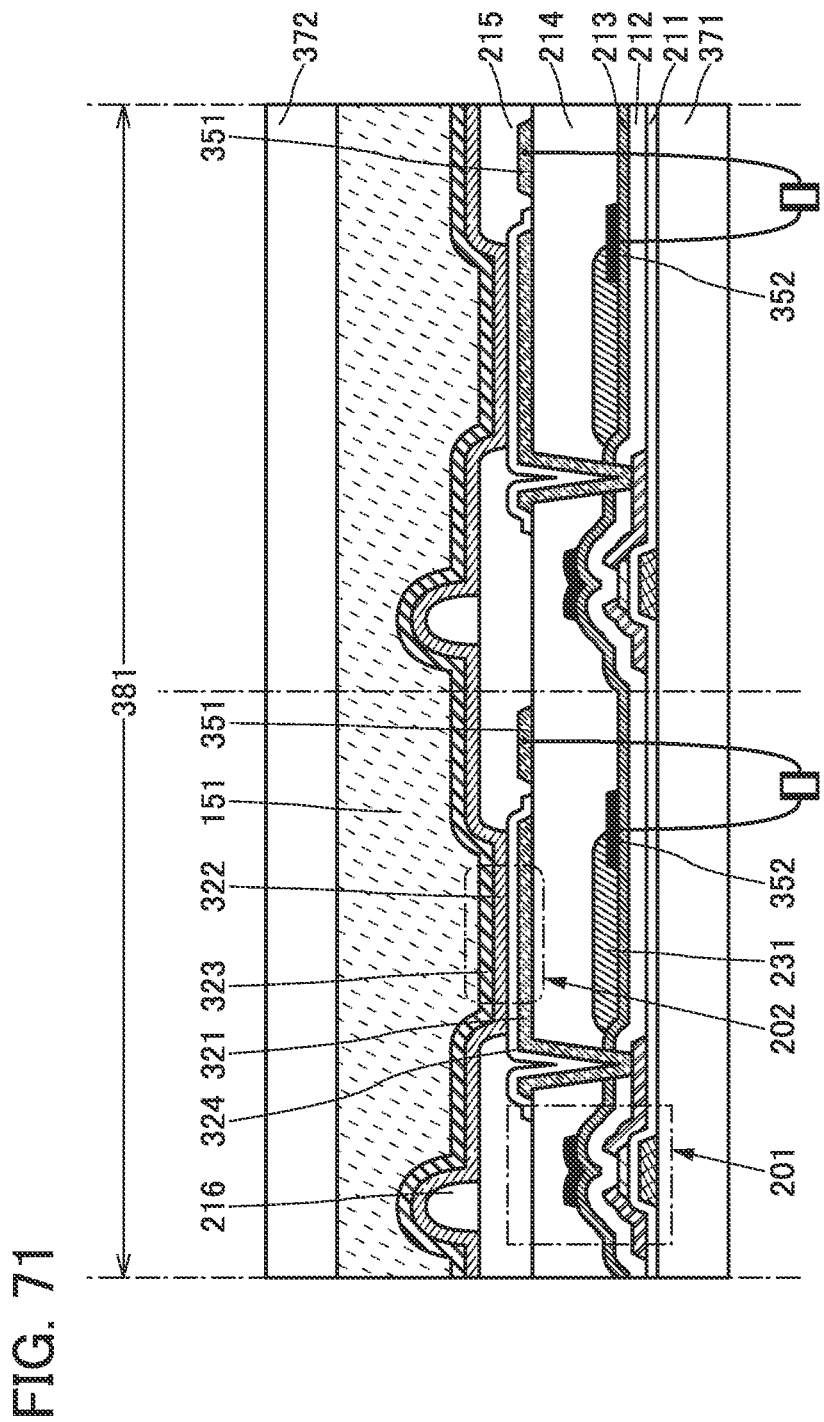
FIG. 71 illustrates a structure example of a touch panel of one embodiment.

FIG. 71 illustrates a cross-sectional structure example of a region including two sub-pixels. A touch panel illustrated in FIG. 71 includes a bottom emission light-emitting device which emits light through a substrate that is provided with the transistor 201 and the like.

The touch panel includes a light-emitting element 202. The light-emitting element 202 includes a conductive layer 321, an EL layer 322, and a conductive layer 323 which are stacked. An optical adjustment layer 324 may be provided between the conductive layer 321 and the conductive layer 323. Light is emitted from the light-emitting element 202 through the substrate 371. An insulating layer 215 is provided so as to cover an end portion of the conductive layer 321 and an end portion of the optical adjustment layer 324.

The conductive layer 321 preferably has a light-transmitting property. The conductive layer 323 preferably has reflectivity.

The coloring layer 231 is provided closer to the substrate 371 than the light-emitting element 202. In the structure illustrated in FIG. 71, the coloring layer 231 is provided over the insulating layer 213.

One of a conductive layer 351 and a conductive layer 352 functions as one electrode of the touch sensor, and the other functions as the other electrode of the touch sensor. The conductive layer 351 is formed on the same plane as the conductive layer 321. The conductive layer 352 is formed on the same plane as one of two gate electrodes of the transistor 201. Accordingly, the touch panel can be manufactured without an increase in manufacturing steps.

As illustrated in FIG. 71, detection can be performed by utilizing the capacitance formed between the conductive layers 351 and 352 on the substrate 371 side.

[Light-Emitting Element]

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top emission, bottom emission, or dual emission light-emitting element. A conductive film that transmits visible light is used as an electrode through which light is extracted. A conductive film that reflects visible light is preferably used as an electrode through which light is not extracted.

The EL layer includes at least a light-emitting layer. In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

Either a low molecular compound or a high molecular compound can be used for the EL layer, and an inorganic compound may also be used. The layers included in the EL layer can be formed by any of the following methods: an evaporation method (including a vacuum evaporation method), a transfer method, a printing method, an inkjet method, a coating method, and the like.

When a voltage higher than the threshold voltage of the light-emitting element is applied between an anode and a cathode, holes are injected to the EL layer from the anode side, and electrons are injected to the EL layer from the cathode side. The injected electrons and holes are recombined in the EL layer, so that a light-emitting substance contained in the EL layer emits light.

In the case where a light-emitting element emitting white light is used as the light-emitting element, the EL layer preferably contains two or more kinds of light-emitting substances. For example, light-emitting substances are selected so that two or more light-emitting substances emit light of complementary colors to obtain white light emission. Specifically, it is preferable to contain two or more light-emitting substances selected from light-emitting substances emitting light of red (R), green (G), blue (B), yellow (Y), orange (O), and the like and light-emitting substances emitting light containing two or more of spectral components of R, G, and B. The light-emitting element preferably emits light with a spectrum having two or more peaks in the wavelength range of a visible light region (e.g., 350 nm to 750 nm). An emission spectrum of a material emitting light having a peak in the wavelength range of yellow light preferably includes spectral components also in the wavelength ranges of green light and red light.

More preferably, a light-emitting layer containing a light-emitting material emitting light of one color and a light-emitting layer containing a light-emitting material emitting light of another color are stacked in the EL layer. For example, the plurality of light-emitting layers in the EL layer may be stacked in contact with each other or may be stacked with a separation layer provided therebetween. For example, the separation layer may be provided between a fluorescent layer and a phosphorescent layer.

The separation layer can be provided, for example, to prevent energy transfer by the Dexter mechanism (particularly, triplet energy transfer) from a phosphorescent material or the like in an excited state which is generated in the phosphorescent layer to a fluorescent material or the like in the fluorescent layer. The thickness of the separation layer may be several nanometers. Specifically, the thickness of the separation layer is greater than or equal to 0.1 nm and less than or equal to 20 nm, greater than or equal to 1 nm and less than or equal to 10 nm, or greater than or equal to 1 nm and less than or equal to 5 nm. The separation layer contains a single material (preferably, a bipolar substance) or a plurality of materials (preferably, a hole-transport material and an electron-transport material).

The separation layer may be formed using a material contained in a light-emitting layer in contact with the separation layer. This facilitates the manufacture of the light-emitting element and reduces the drive voltage. For example, in the case where the phosphorescent layer contains a host material, an assist material, and the phosphorescent material (a guest material), the separation layer may contain the host material and the assist material. In other words, the separation layer includes a region that does not contain the phosphorescent material, and the phosphorescent layer includes a region that contains the phosphorescent material in the above structure. Accordingly, the separation layer and the phosphorescent layer can be evaporated separately depending on whether the phosphorescent material is contained or not. With such a structure, the separation layer and the phosphorescent layer can be formed in the same chamber. Thus, the manufacturing cost can be reduced.

The light-emitting element may be a single element including one EL layer or a tandem element in which a plurality of EL layers are stacked with a charge generation layer provided therebetween.

Structure Example 3-2

Figure 72:
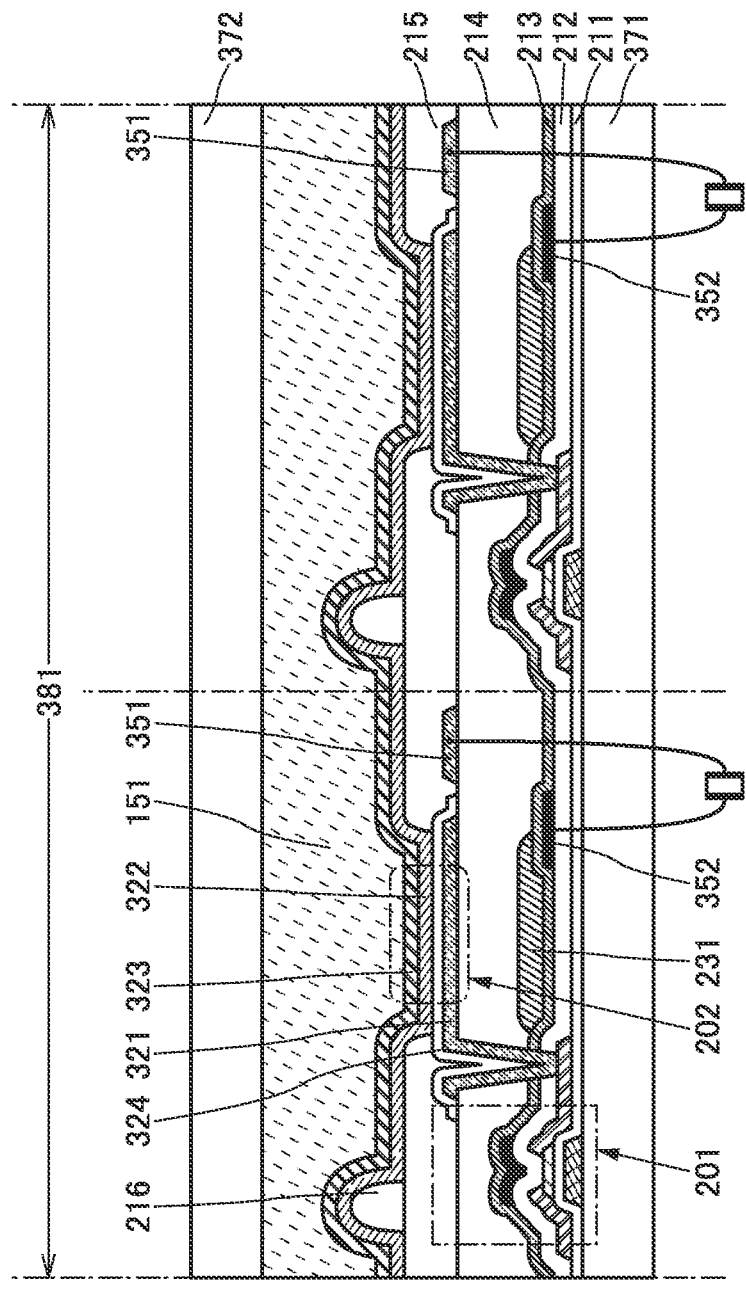
FIG. 72 illustrates a structure example of a touch panel of one embodiment.

FIG. 72 is different from FIG. 71 in the position of the conductive layer 352. In FIG. 72, the conductive layer 352 and one of the gate electrodes of the transistor 201 are provided between the insulating layer 212 and the insulating layer 213.

The conductive layer 352 and one of the gate electrodes of the transistor 201 preferably include the low-resistance oxide semiconductor.

Figure 73:
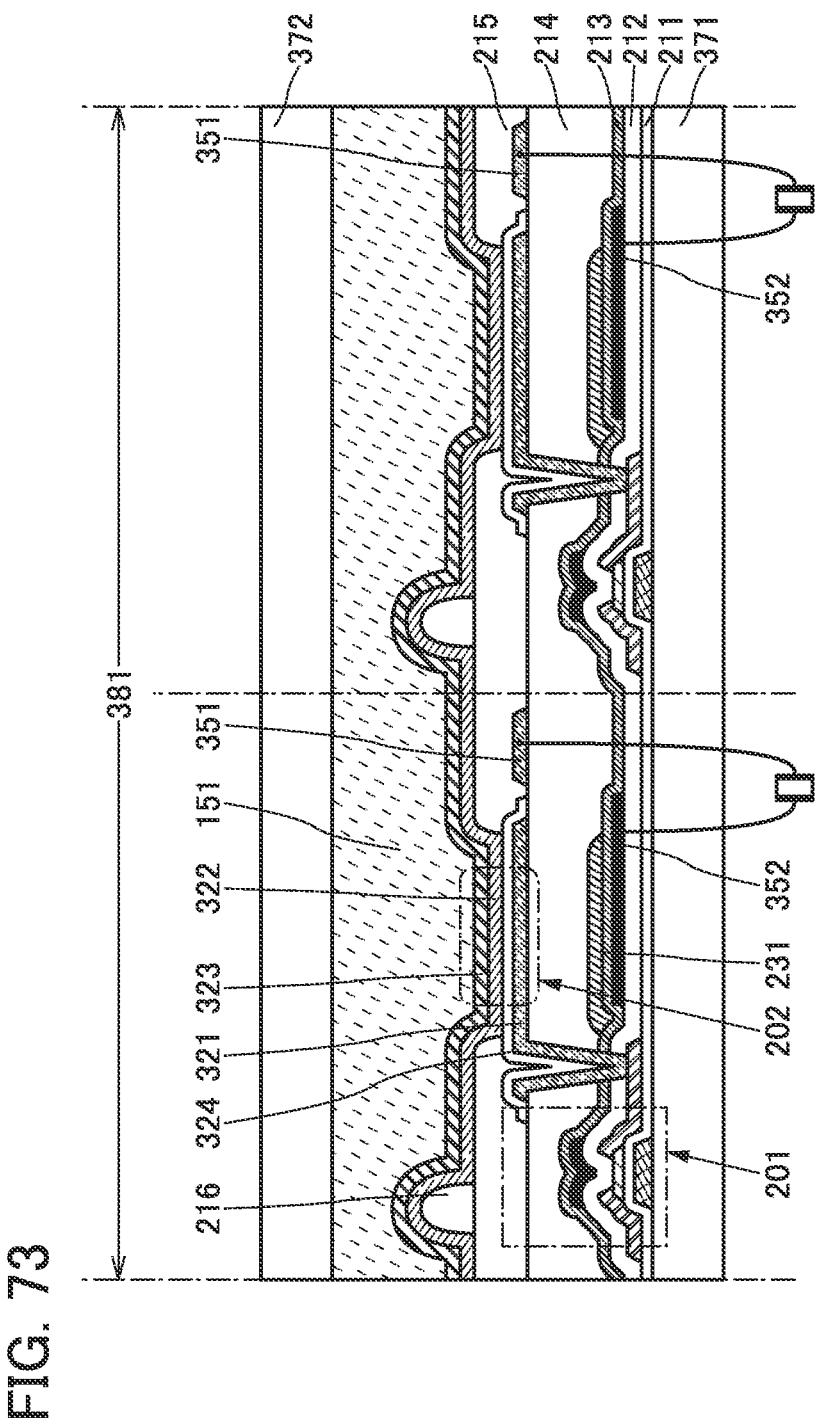
FIG. 73 illustrates a structure example of a touch panel of one embodiment.
Figure 74:
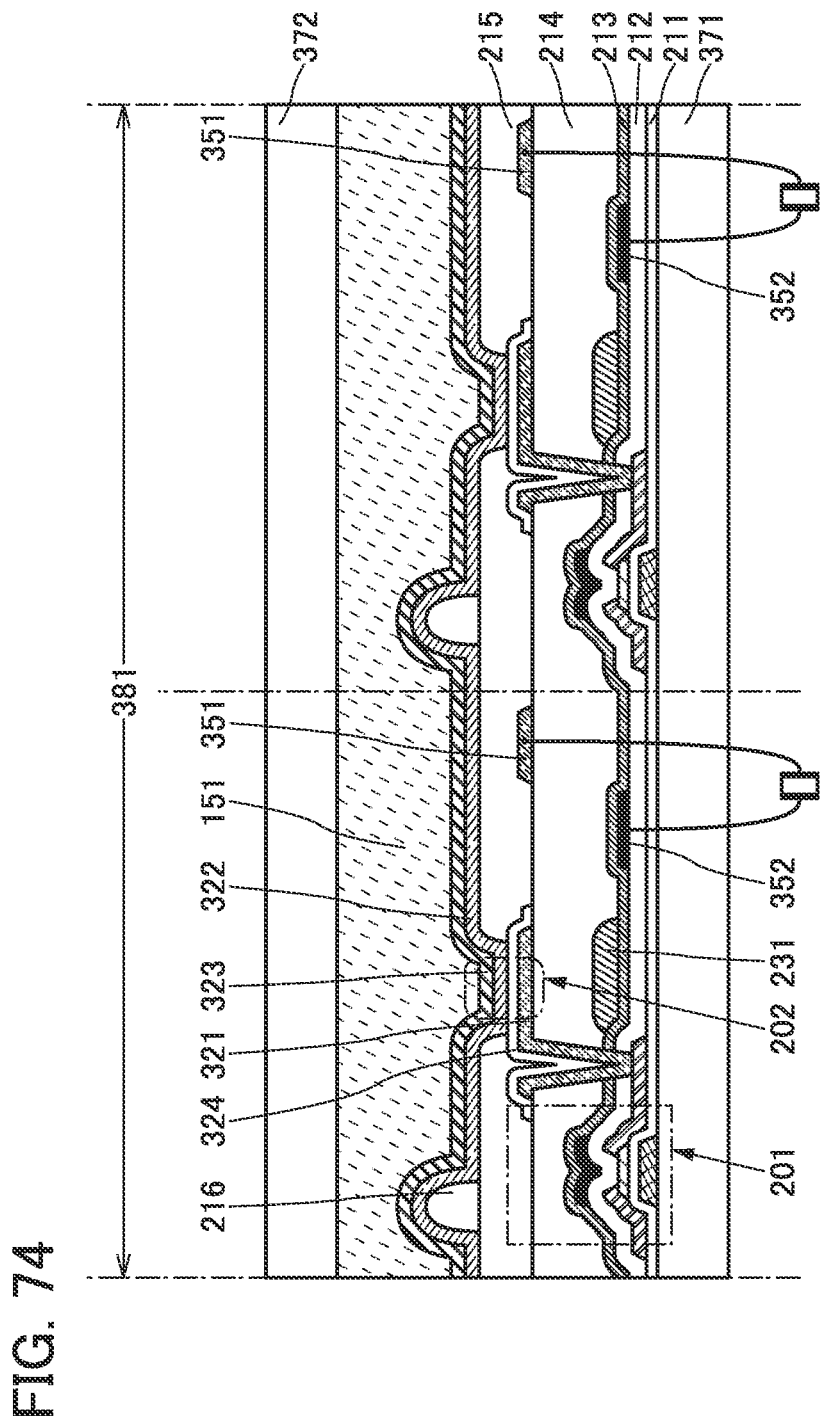
FIG. 74 illustrates a structure example of a touch panel of one embodiment.

As illustrated in FIG. 73, the conductive layer 352 may be provided so as to overlap with at least one of the conductive layer 321, the optical adjustment layer 324, the EL layer 322, the conductive layer 323, and the coloring layer 231. As illustrated in FIG. 74, the conductive layer 352 may be provided so as not to overlap with the conductive layer 321, the optical adjustment layer 324, the EL layer 322, the conductive layer 323, and the coloring layer 231.

Cross-Sectional Structure Example 3-2

Figure 75:
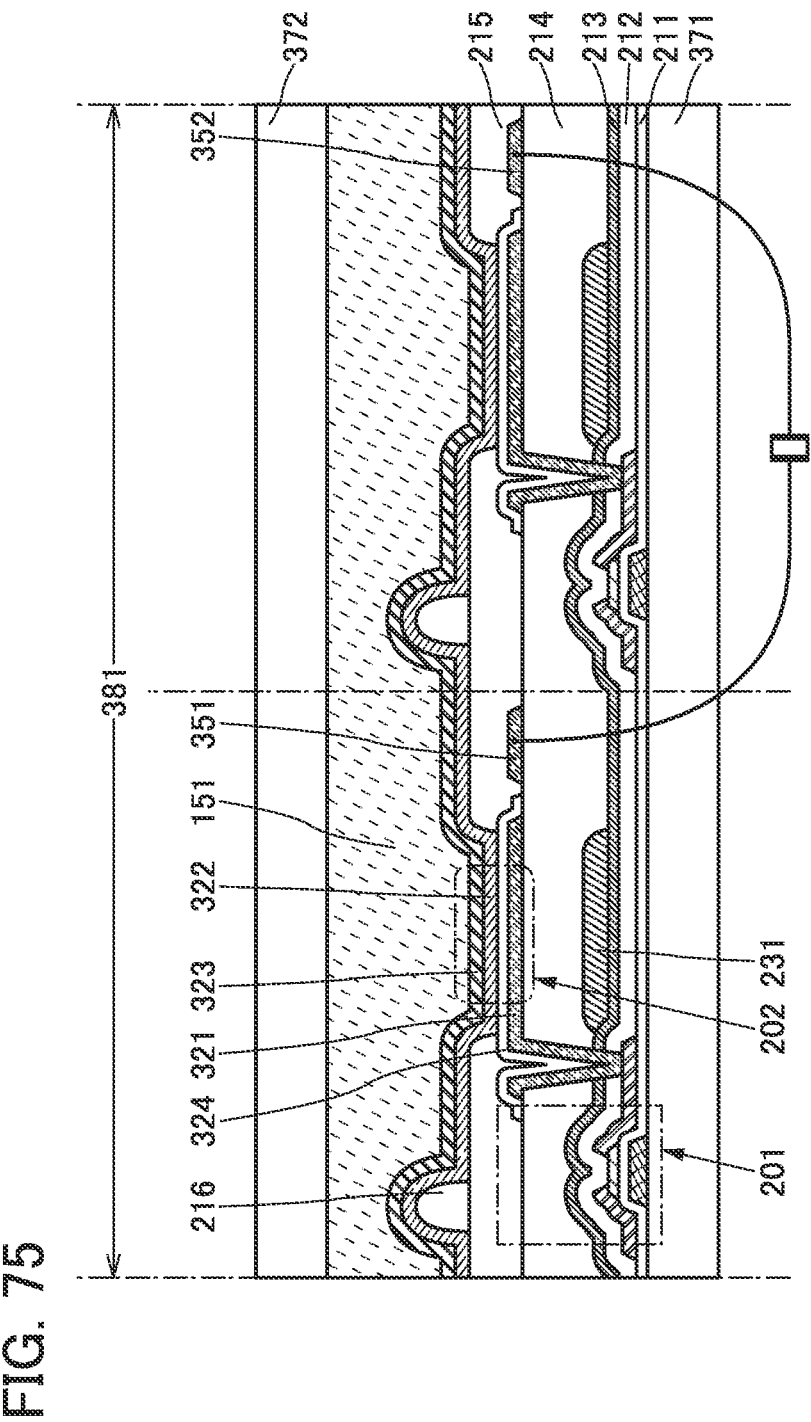
FIG. 75 illustrates a structure example of a touch panel of one embodiment.

In an example illustrated in FIG. 75, both the conductive layers 351 and 352 included in the touch sensor are formed on the same plane as the conductive layer 321.

Here, detection can be performed by utilizing the capacitance formed between the conductive layer 351 in one sub-pixel and the conductive layer 352 in another sub-pixel.

Cross-Sectional Structure Example 3-3

Figure 76:
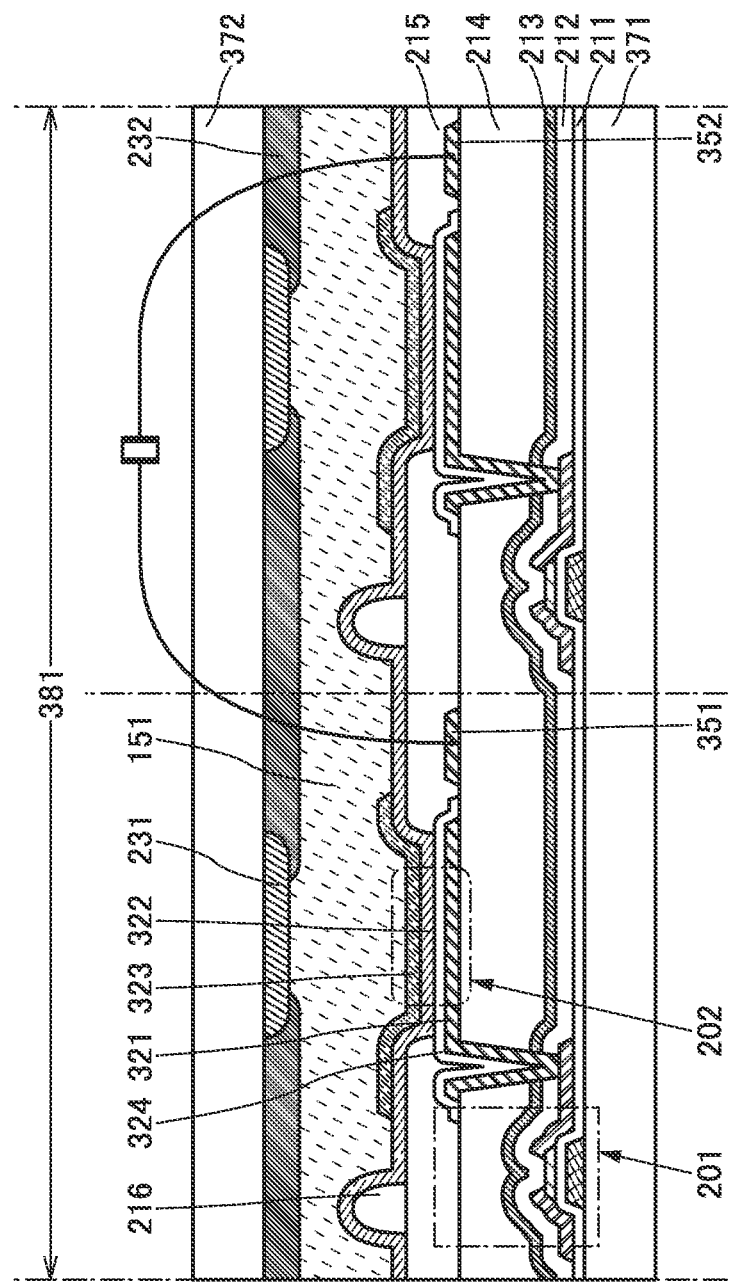
FIG. 76 illustrates a structure example of a touch panel of one embodiment.

FIG. 76 illustrates a cross-sectional structure example of a touch panel including a top emission light-emitting device which emits light through the substrate 372.

In the light-emitting element 202, the conductive layer 321 has reflectivity, and the conductive layer 323 has a light-transmitting property.

The conductive layer 323 includes an opening at least in a region which overlaps with part of the conductive layer 351. The conductive layer 323 may have a slit or an opening, or may have a comb-like shape.

The conductive layers 351 and 352 are formed on the same plane as the conductive layer 321.

In the example illustrated in FIG. 76, detection can be performed by utilizing the capacitance formed between the conductive layer 351 in one sub-pixel and the conductive layer 352 in another sub-pixel.

Figure 77:
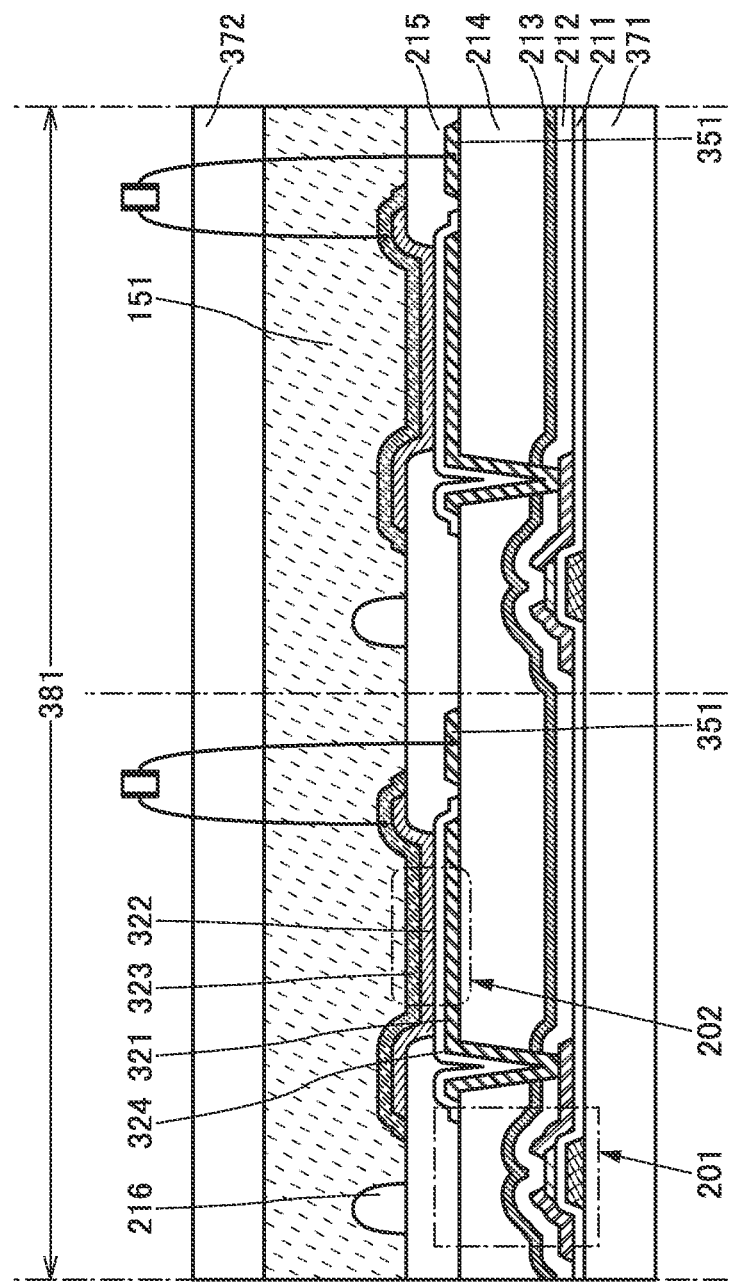
FIG. 77 illustrates a structure example of a touch panel of one embodiment.

As illustrated in FIG. 77, the conductive layer 323 can be used as the electrode of the touch sensor. That is, detection can be performed by utilizing the capacitance formed between the conductive layers 351 and 323.

FIG. 77 illustrates an example in which the EL layer 322 is formed by a separate coloring method. In that case, an end portion of the EL layer 322 is covered with the conductive layer 323 as illustrated in FIG. 77, so that the diffusion of impurities into the EL layer 322 can be suppressed, leading to a higher reliability. In the example illustrated in FIG. 77, the coloring layer 231 and the like are not provided.

Other Structure Examples

Note that one embodiment of the present invention is not limited to the above-described structures and can have various structures.

[Positions of Sensor Electrode and Wiring for Pixel]

Figure 78:
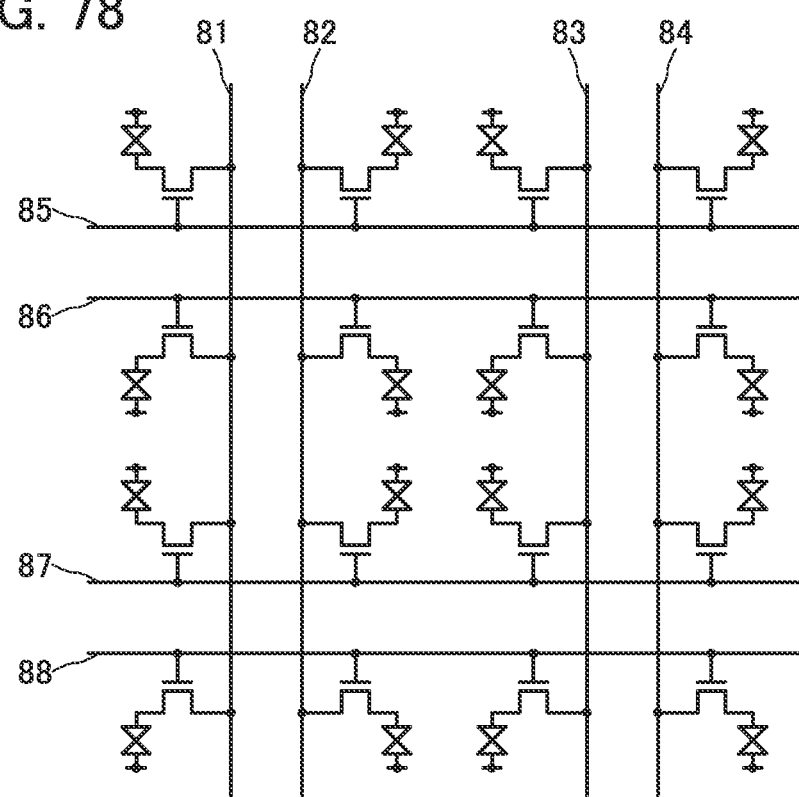
FIG. 78 illustrates a structure example of a touch panel of one embodiment.

For example, whether a source line (signal line) is positioned on the right side or the left side of a pixel can be determined depending on whether the pixel is provided in an even-numbered column or an odd-numbered column. As a result, two source lines are adjacent to each other. A conductive layer (electrode) for a touch sensor can be provided thereover. In a similar manner, gate lines of vertically adjacent pixels are provided close to each other, and the electrode for the touch sensor can be provided thereover. FIG. 78 illustrates an example in that case. Two source lines 81 and 82 are adjacent to each other, and two source lines 83 and 84 are adjacent to each other. In addition, two gate lines 85 and 86 are adjacent to each other, and two gate lines 87 and 88 are adjacent to each other.

[Peripheral Circuit]

A peripheral circuit can be formed outside a substrate over which pixels are formed. That is, a circuit for driving a touch sensor and a circuit for driving a pixel can be separately formed. Note that one circuit can also have both the functions.

A driver circuit for selecting one of the conductive layers (electrodes) in the X direction or one of the conductive layers (electrodes) in the Y direction of the touch sensor can be formed with a TFT over a substrate over which pixels are formed.

The circuit for driving a touch sensor may be provided on the gate driver side for driving a pixel or the source driver side.

An IC is preferably used as a circuit that has a sensing function and is one of two circuits, a circuit electrically connected to the conductive layers (electrodes) in the X direction and a circuit electrically connected to the conductive layers (electrodes) in the Y direction, of the touch sensor. In that case, the conductive layers are preferably controlled with the IC via an FPC.

[Material for Conductive Layer (Electrode) of Touch Sensor]

At least one of the pair of conductive layers of the touch sensor is preferably formed using the same material as the common electrode, the pixel electrode, or the like of the liquid crystal element.

Alternatively, at least one of the conductive layers of the touch sensor may be formed of a meshed metal film (also referred to as a metal mesh).

By providing a metal film directly on or below at least one of the conductive layer (electrode) in the X direction and the conductive layer (electrode) in the Y direction of the touch sensor, the resistance of the conductive layer can be reduced. In that case, a stacked structure of a conductive film including a metal oxide and a conductive film including a metal is preferably used, because these conductive films can be formed by a patterning technique using a half tone mask and thus the process can be simplified.

[Wiring for Connecting Conductive Layers (Electrodes) of Touch Sensor]

In a region of the touch sensor where the conductive layer in the X direction crosses the conductive layer in the Y direction, a bridge structure for connecting conductive layers using another conductive layer is formed in such a manner that, for example, by using a conductive layer on the same plane as the gate electrode of the transistor, conductive layers in the X direction are connected in the lateral direction parallel to the gate line throughout the pixels. Alternatively, by using a conductive layer on the same plane as the source electrode and the drain electrode of the transistor, the conductive layers in the Y direction are connected in the vertical direction parallel to the source line throughout the pixels. In that case, a contact portion can be formed in the pixel. Alternatively, the same conductive layer as the conductive layer functioning as the common electrode or a conductive layer on the same plane as the conductive layer functioning as the pixel electrode may also be used.

[Conductive Layer (Electrode) of Touch Sensor and Conductive Layer (Electrode) of Liquid Crystal Element]

A conductive layer (electrode) having a slit on the upper side can be used as the pixel electrode, and a conductive layer (electrode) provided in a plurality of pixels on the lower side can be used as the common electrode.

Alternatively, a conductive layer (electrode) which is provided in a plurality of pixels and has a slit on the upper side can be used as the common electrode, and a conductive layer (electrode) provided in each of the plurality of pixels on the lower side can be used as the pixel electrode.

The conductive layer in the X direction of the touch sensor can also serve as the conductive layer functioning as the pixel electrode or the conductive layer functioning as the common electrode. Alternatively, the conductive layer in the Y direction of the touch sensor can also serve as the conductive layer functioning as the pixel electrode or the conductive layer functioning as the common electrode.

In addition, the conductive layer in the X direction of the touch sensor may be one of a conductive layer to which a pulse voltage is applied and a conductive layer for sensing a current. In that case, the conductive layer in the Y direction of the touch sensor may be the other of the conductive layers.

In a region of the touch sensor where the conductive layer in the X direction crosses the conductive layer in the Y direction, one of these conductive layers can have a shape different from that in other regions. For example, in the case where only the conductive layer functioning as the pixel electrode and a conductive layer on the same plane as the conductive layer functioning as the pixel electrode are used to form a pair of conductive layers of the touch sensor, the conductive layer functioning as the common electrode on the lower side is not provided below the conductive layers of the touch sensor. However, with a structure in which all conductive layers functioning as the common electrode are not provided below the conductive layers of the touch sensor, the conductive layers functioning as the common electrode have an island-shape. Therefore, a shape with a slit is preferably used so that two adjacent conductive layers functioning as the common electrode can be partly connected to each other.

The conductive layer functioning as the common electrode may be provided in a plurality of pixels. For example, the conductive layer functioning as the common electrode may be electrically connected to a common wiring formed using a conductive layer on the same plane as the gate electrode of the transistor. In that case, one conductive layer functioning as the common electrode may have an island-shape.

[Counter Substrate]

When a substrate (also referred to as a counter substrate) that faces the substrate provided with the transistor and the like is provided with the conductive layer in the X direction or the conductive layer in the Y direction of the touch sensor, a light-blocking layer is preferably provided closer to the viewing side than the conductive layer.

In the case where the counter substrate is provided with one electrode of a liquid crystal element (in the case of a liquid crystal element using a TN mode, an MVA mode, or the like), the one electrode of the liquid crystal element may have a slit in a region which overlaps with the conductive layer of the touch sensor provided on the counter substrate.

In the case where a pair of electrodes of a liquid crystal element are provided over a substrate over which a transistor and the like are provided as in the case of a liquid crystal element using an FFS mode, an IPS mode, or the like, the counter substrate may be provided with a conductive layer for controlling the orientation of liquid crystal. In a manner similar to the above, the conductive layer for controlling the orientation of liquid crystal may also have a slit in a region which overlaps with the conductive layer of the touch sensor.

[Driving Method]

As a method for driving the touch sensor, for example, a method in which sensing (scanning) of the corresponding row is performed in a period between horizontal periods (gate selection periods) for the driving of the pixel can be used. Alternatively, one frame period may be divided in two periods; writing to all pixels may be performed in the former period, and sensing may be performed in the latter period.

[Transistor]

In this specification and the like, for example, a transistor with any of a variety of structures can be used as the transistor, without limitation to a certain type. For example, a transistor including single-crystal silicon or a non-single-crystal semiconductor film typified by amorphous silicon, polycrystalline silicon, microcrystalline (also referred to as microcrystal, nanocrystal, or semi-amorphous) silicon, or the like can be used as the transistor. Alternatively, a thin film transistor (TFT) whose semiconductor film is thinned or the like can be used. In the case of using the TFT, there are various advantages. For example, since the TFT can be formed at a temperature lower than that of the case of using single-crystal silicon, the manufacturing cost can be reduced or a manufacturing apparatus can be made larger. Since the manufacturing apparatus is made larger, the TFT can be formed using a large substrate. Therefore, many display devices can be formed at the same time at low cost. In addition, a substrate having low heat resistance can be used because of low manufacturing temperature. Therefore, the transistor can be formed using a light-transmitting substrate. Transmission of light in a display element can be controlled by using the transistor formed using a light-transmitting substrate. In addition, part of a film included in the transistor can transmit light because the thickness of the transistor is small. Therefore, the aperture ratio can be improved.

Note that when a catalyst (e.g., nickel) is used in the case of forming polycrystalline silicon, crystallinity can further be improved, and a transistor having excellent electric characteristics can be formed. Accordingly, a gate driver circuit (a scan line driver circuit), a source driver circuit (a signal line driver circuit), and a signal processing circuit (e.g., a signal generation circuit, a gamma correction circuit, or a DA converter circuit) can be formed over a substrate over which pixels are formed.

Note that when a catalyst (e.g., nickel) is used in the case of forming microcrystalline silicon, crystallinity can further be improved, and a transistor having excellent electric characteristics can be formed. In that case, crystallinity can be improved by just performing heat treatment without performing laser irradiation. Accordingly, a gate driver circuit (a scan line driver circuit) and part of a source driver circuit (an analog switch) can be formed over a substrate over which pixels are formed. Note that when laser irradiation for crystallization is not performed, unevenness in crystallinity of silicon can be suppressed. Therefore, high-quality images can be displayed. Note that it is possible to form polycrystalline silicon or microcrystalline silicon without a catalyst (e.g., nickel).

Note that although crystallinity of silicon is preferably improved to polycrystal, microcrystal, or the like in the whole panel, one embodiment of the present invention is not limited thereto. Crystallinity of silicon may be improved only in part of the panel. Selective increase in crystallinity can be achieved by selective laser irradiation or the like. For example, only a peripheral circuit region excluding pixels may be irradiated with laser light. Alternatively, only a region of a gate driver circuit, a source driver circuit, or the like may be irradiated with laser light. Alternatively, only part of a source driver circuit (e.g., an analog switch) may be irradiated with laser light. Accordingly, crystallinity of silicon can be improved only in a region where a circuit needs to operate at high speed. Since a pixel region is not particularly needed to operate at high speed, even if crystallinity is not improved, the pixel circuit can operate without problems. Thus, a region whose crystallinity is improved is small, so that manufacturing steps can be decreased. Thus, throughput can be increased and the manufacturing cost can be reduced. Alternatively, since the number of necessary manufacturing apparatuses is small, the manufacturing cost can be reduced.

Examples of the transistor include a transistor including a compound semiconductor (e.g., SiGe or GaAs) or an oxide semiconductor (e.g., Zn—O, In—Ga—Zn—O, In—Zn—O, In—Sn—O (ITO), Sn—O, Ti—O, Al—Zn—Sn—O (AZTO), or In—Sn—Zn—O) and a thin film transistor including a thin film of such a compound semiconductor or oxide semiconductor. Since manufacturing temperature can be lowered, such a transistor can be formed at room temperature, for example. Accordingly, the transistor can be formed directly over a substrate having low heat resistance, such as a plastic substrate or a film substrate. Note that such a compound semiconductor or oxide semiconductor can be used not only for a channel portion of the transistor but also for other applications. For example, such a compound semiconductor or oxide semiconductor can be used for a wiring, a resistor, a pixel electrode, a light-transmitting electrode, or the like. Since such an element can be formed at the same time as the transistor, cost can be reduced.

Note that for example, a transistor or the like formed by an inkjet method or a printing method can be used as the transistor. Accordingly, the transistor can be formed at room temperature, can be formed at a low vacuum, or can be formed using a large substrate. Therefore, the transistor can be formed without use of a mask (reticle), so that the layout of the transistor can be easily changed. Alternatively, since the transistor can be formed without use of a resist, the material cost is reduced, and the number of steps can be reduced. Furthermore, since a film can be formed where needed, a material is not wasted compared to a manufacturing method by which etching is performed after the film is formed over the entire surface; thus, cost can be reduced.

Note that for example, a transistor or the like including an organic semiconductor or a carbon nanotube can be used as the transistor. Such a transistor can be formed using a substrate which can be bent. A device including a transistor which includes an organic semiconductor or a carbon nanotube can resist a shock.

Note that a transistor with any of a variety of other structures can also be used as the transistor. For example, a MOS transistor, a junction transistor, a bipolar transistor, or the like can be used as the transistor. By using a MOS transistor as the transistor, the size of the transistor can be reduced. Thus, a large number of transistors can be mounted. By using a bipolar transistor as the transistor, a large amount of current can flow. Thus, a circuit can operate at high speed. Note that a MOS transistor and a bipolar transistor may be formed over one substrate. Thus, a reduction in power consumption, a reduction in size, high speed operation, and the like can be realized.

Note that in this specification and the like, for example, a transistor with a multi-gate structure having two or more gate electrodes can be used as the transistor. With the multi-gate structure, a structure in which a plurality of transistors are connected in series is provided because channel regions are connected in series. Thus, with the multi-gate structure, the amount of off-state current can be reduced, and the withstand voltage of the transistor can be increased (the reliability can be improved). Alternatively, with the multi-gate structure, drain-source current does not change very much even if drain-source voltage changes when the transistor operates in a saturation region, so that a flat slope of voltage-current characteristics can be obtained. By utilizing the flat slope of the voltage-current characteristics, an ideal current source circuit or an active load having an extremely high resistance value can be realized. Accordingly, a differential circuit, a current mirror circuit, or the like having excellent properties can be realized.

Note that, for example, a transistor with a structure in which gate electrodes are formed above and below a channel can be used as the transistor. With the structure in which the gate electrodes are formed above and below the channel, a circuit structure in which a plurality of transistors are connected in parallel is provided. Thus, a channel region is increased, so that the amount of current can be increased. Alternatively, by using the structure in which the gate electrodes are formed above and below the channel, a depletion layer can be easily formed, so that subthreshold swing can be improved.

Note that as the transistor, for example, it is possible to use a transistor with a structure in which a gate electrode is formed above a channel region, a structure in which a gate electrode is formed below a channel region, a staggered structure, an inverted staggered structure, a structure in which a channel region is divided into a plurality of regions, a structure in which channel regions are connected in parallel or in series, or the like. A transistor with any of a variety of structures such as a planar type, a FIN-type, a Tri-Gate type, a top-gate type, a bottom-gate type, a double-gate type (with gates above and below a channel), and the like can be used.

Note that for example, a transistor with a structure in which a source electrode or a drain electrode overlaps with a channel region (or part of it) can be used as the transistor. By using the structure in which the source electrode or the drain electrode overlaps with the channel region (or part of it), unstable operation due to accumulation of electric charge in part of the channel region can be prevented.

Note that for example, a transistor with a structure in which an LDD region is provided can be used as the transistor. By providing the LDD region, the amount of off-state current can be reduced or the withstand voltage of the transistor can be increased (the reliability can be improved). Alternatively, by providing the LDD region, drain current does not change very much even if drain-source voltage changes when the transistor operates in a saturation region, so that a flat slope of voltage-current characteristics can be obtained.

Figure 79:
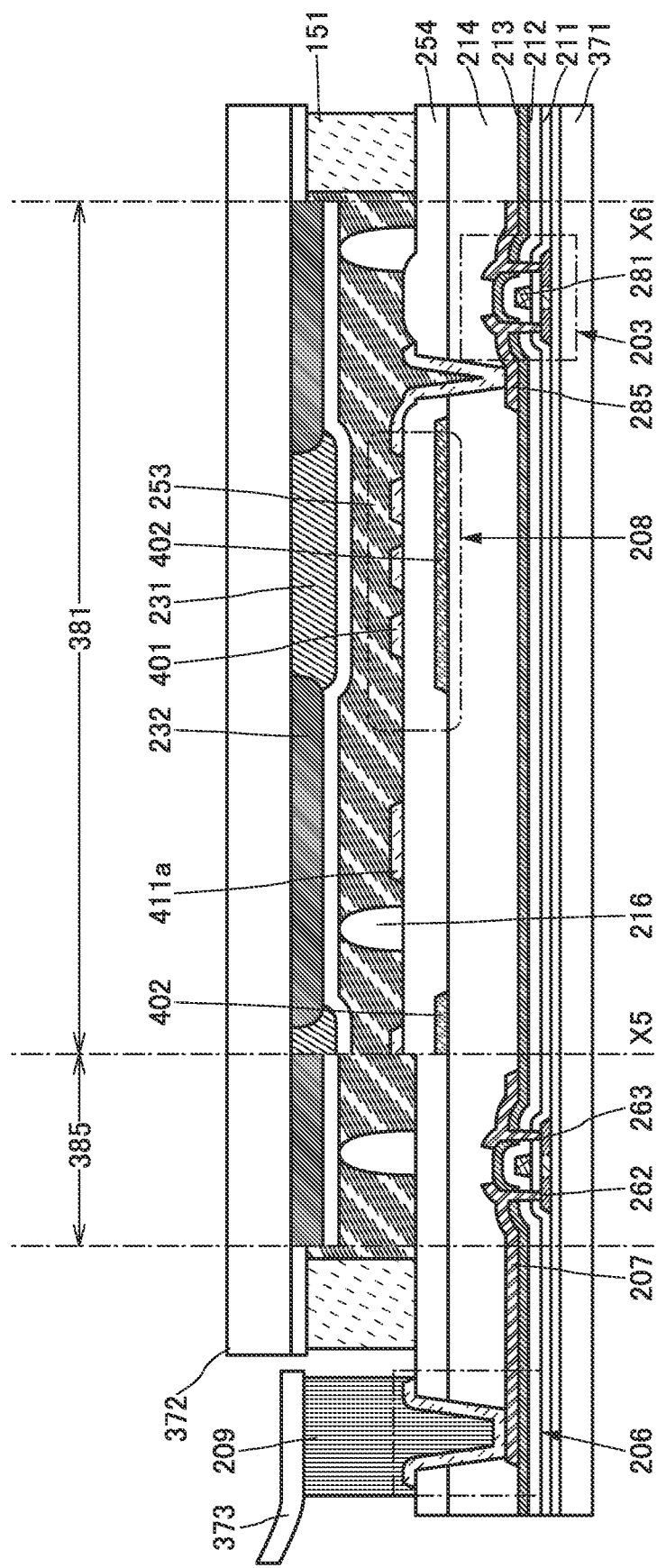
FIG. 79 illustrates a structure example of a touch panel of one embodiment.

For example, FIG. 79 illustrates the case where a top-gate transistor is used in the structure of FIG. 61.

[Connection]

For example, in this specification and the like, an explicit description "X and Y are connected" means that X and Y are electrically connected, X and Y are functionally connected, and X and Y are directly connected. Accordingly, another element may be provided between elements having a connection relation illustrated in drawings and texts, without limitation on a predetermined connection relation, for example, the connection relation illustrated in the drawings and the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and a control circuit) can be connected between X and Y. For example, when a signal output from X is transmitted to Y, it can be said that X and Y are functionally connected even if another circuit is provided between X and Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

Example of the expression include "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected to each other in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expression include "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through the transistor, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes, in its category, such a case where one conductive film has functions of a plurality of components.

[Substrate]

Note that in this specification and the like, a transistor can be formed using any of a variety of substrates, for example. The type of a substrate is not limited to a certain type. Examples of the substrate include a semiconductor substrate (e.g., a single crystal substrate or a silicon substrate), an SOI substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, a base film, and the like. Examples of a glass substrate include a barium borosilicate glass substrate, an aluminoborosilicate glass substrate, and a soda lime glass substrate. Examples of the flexible substrate, the attachment film, the base film, and the like include substrates of plastics typified by polyethylene terephthalate (PET), polyethylene naphthalate (PEN), polyether sulfone (PES), and polytetrafluoroethylene (PTFE). Another example is a synthetic resin such as acrylic. Other examples are polypropylene, polyester, polyvinyl fluoride, and polyvinyl chloride. Other examples are polyamide, polyimide, aramid, epoxy, an inorganic vapor deposition film, and paper. Specifically, the use of a semiconductor substrate, a single crystal substrate, an SOI substrate, or the like enables the manufacture of small-sized transistors with a small variation in characteristics, size, shape, or the like and with high current capability. A circuit using such transistors achieves lower power consumption or higher integration.

Alternatively, a flexible substrate may be used as the substrate, and the transistor may be formed directly over the flexible substrate. Further alternatively, a separation layer may be provided between the substrate and the transistor. The separation layer can be used when part or the whole of a semiconductor device formed over the separation layer is separated from the substrate and transferred to another substrate. In such a case, the transistor can be transferred to a substrate having low heat resistance or a flexible substrate as well. For the above separation layer, a stack including inorganic films, a tungsten film and a silicon oxide film, or an organic resin film of polyimide or the like formed over a substrate can be used, for example.

In other words, a transistor may be formed using one substrate and then transferred to another substrate. Examples of a substrate to which a transistor is transferred include, in addition to the above substrate over which the transistor can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, and a rubber substrate. When such a substrate is used, a transistor with excellent properties or a transistor with low power consumption can be formed, a device with high durability can be manufactured, high heat resistance can be provided, or a reduction in weight or thickness can be achieved.

At least part of this embodiment can be implemented in combination with any of the other embodiments or at least another part of this embodiment described in this specification as appropriate.

Embodiment 2

In this embodiment, examples of the display device described in the above embodiment in which a driver IC is used will be described with reference to FIGS. 80A and 80B.

A display device 500A illustrated in FIG. 80A includes a pixel portion 510, a gate driver 520_1, a gate driver 520_2, and a source driver 530. The pixel portion 510 includes pixels 511 each connected to a gate line GL and a source line SL. The source driver 530 includes a plurality of TAB (tape automated bonding) tapes 531 and source driver ICs 532_1 to 532_k (k is a natural number of 2 or more).

In the pixel portion 510, for example, the pixels 511 are provided in a matrix in the long-side direction (X direction in FIG. 80A) and the short-side direction (Y direction in FIG. 80A). Therefore, in the structure of this embodiment, the number of the pixels 511 which are connected to the same source line SL and provided in the long-side direction is larger than the number of the pixels 511 which are connected to the same gate line GL and provided in the short-side direction.

The gate driver 520_1 and the gate driver 520_2 are provided on two sides in the long-side direction. The gate driver 520_1 drives gate lines (GL1 and GL3) in odd-numbered rows, and the gate driver 520_2 drives gate lines (GL2 and GL4) in even-numbered rows. The larger the number of the pixels, the larger the number of the gate lines GL arranged in the long-side direction. With the gate driver 520_1 and the gate driver 520_2, a selection period for one gate line GL can be longer.

The gate drivers 520_1 and 520_2 are not needed to operate at high speed compared to the source driver 530. Therefore, the gate drivers 520_1 and 520_2 each preferably include a transistor fabricated in a manner similar to that in the pixel 511. When the gate drivers 520_1 and 520_2 are incorporated in the display device 500A, cost can be reduced. In addition, the display device 500A can have a narrower frame.

The source driver ICs 532_1 to 532_k (k is a natural number of 2 or more) are mounted on the TAB tapes 531 with anisotropic conductive adhesive or the like. The plurality of TAB tapes 531 mounted with the source driver ICs 532_1 to 532_k are attached to the display device 500A; in this way, the plurality of source lines (SL1 and SL2) are driven.

The source driver ICs 532_1 to 532_k operate at higher speed than the gate drivers 520_1 and 520_2. Therefore, unlike the gate drivers 520_1 and 520_2, the source driver ICs 532_1 to 532_k are incorporated into the display device 500A with difficulty. When the source driver 530 is provided on the short side as in this embodiment, the number of the source driver ICs can be reduced, leading to a reduction in cost.

A reduction in the number of the source driver ICs is very effective particularly for a display device with a large number of pixels, e.g., a display device with 8K×4K pixels. The display device with a large number of pixels can be fabricated at low cost, which enables fabrication of a display device that has a high pixel resolution and can display more realistic images at low cost.

FIG. 80B illustrates a structure different from the structure in FIG. 80A. A display device 500B illustrated in FIG. 80B is different from the display device in FIG. 80A in that the number of the gate lines GL for pixels in one row is increased and the number of the source lines SL for pixels in one column is reduced.

In FIG. 80B, the gate drivers 520_1 and 520_2 are provided on two sides in the long-side direction as in FIG. 80A. The gate driver 520_1 drives gate lines (GL1, GL3, GL5, and GL7) in odd-numbered rows, and the gate driver 520_2 drives gate lines (GL2, GL4, GL6, and GL8) in even-numbered rows.

The source driver ICs 532_1 to 532_k/2 in FIG. 80B only have to drive the source lines (e.g., SL1) whose number is a half of that in FIG. 80A. Accordingly, the number of the source driver ICs can be further reduced, leading to a further reduction in cost.

To achieve a display device whose screen diagonal is particularly 50 inches or more, or 60 inches or more, a transistor in each pixel preferably has a relatively high mobility. Although polycrystalline silicon or the like can be used for a semiconductor layer of a transistor, an oxide semiconductor is preferably used for example, because the transistor can be easily formed over a large substrate. In the case of using an In-M-Zn oxide for the oxide semiconductor, an oxide containing a larger amount of In than that of M is preferably used. For example, an oxide semiconductor film in which an oxide film with a ratio of In:Ga:Zn=4:2:3 and an oxide film with a ratio of In:Ga:Zn=1:1:1 are stacked is used for the semiconductor layer of the transistor; in this way, the transistor can have a high mobility.

At least part of this embodiment can be implemented in combination with any of the other embodiments described in this specification as appropriate.

Embodiment 3

In this embodiment, an example of a transistor which can be used as the transistor described in the above embodiment will be described with reference to the drawings.

The touch panel of one embodiment of the present invention can be fabricated by using a transistor with any of various structures, such as a bottom-gate transistor, a top-gate transistor, or the like. Therefore, a material for a semiconductor layer or the structure of a transistor can be easily changed depending on the existing production line.

[Bottom-Gate Transistor]

FIG. 81A1 is a cross-sectional view of a transistor 810 that is a channel-protective transistor, which is a type of bottom-gate transistor. In FIG. 81A1, the transistor 810 is formed over a substrate 771. The transistor 810 includes an electrode 746 over the substrate 771 with an insulating layer 772 provided therebetween. The transistor 810 includes a semiconductor layer 742 over the electrode 746 with an insulating layer 726 provided therebetween. The electrode 746 can function as a gate electrode. The insulating layer 726 can function as a gate insulating layer.

The transistor 810 includes an insulating layer 741 over a channel formation region in the semiconductor layer 742. The transistor 810 includes an electrode 744a and an electrode 744b which are partly in contact with the semiconductor layer 742 and over the insulating layer 726. The electrode 744a can function as one of a source electrode and a drain electrode. The electrode 744b can function as the other of the source electrode and the drain electrode. Part of the electrode 744a and part of the electrode 744b are formed over the insulating layer 741.

The insulating layer 741 can function as a channel protective layer. With the insulating layer 741 provided over the channel formation region, the semiconductor layer 742 can be prevented from being exposed at the time of forming the electrodes 744a and 744b. Thus, the channel formation region in the semiconductor layer 742 can be prevented from being etched at the time of forming the electrodes 744a and 744b. In accordance with one embodiment of the present invention, a transistor with favorable electrical characteristics can be provided.

The transistor 810 includes an insulating layer 728 over the electrode 744*a*, the electrode 744*b*, and the insulating layer 741 and further includes an insulating layer 729 over the insulating layer 728.

The electrode, the semiconductor layer, the insulating layer, and the like used in the transistor disclosed in this embodiment can be formed using a material and a method disclosed in any of the other embodiments.

In the case where an oxide semiconductor is used for the semiconductor layer 742, a material capable of removing oxygen from part of the semiconductor layer 742 to generate oxygen vacancies is preferably used for regions of the electrodes 744*a* and 744*b* that are in contact with at least the semiconductor layer 742. The carrier concentration in the regions of the semiconductor layer 742 where oxygen vacancies are generated is increased, so that the regions become n-type regions (n$^+$ layers). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrodes 744*a* and 744*b*. Accordingly, the electric characteristics of the transistor, such as the field-effect mobility and the threshold voltage, can be favorable.

In the case where a semiconductor such as silicon is used for the semiconductor layer 742, a layer that functions as an n-type semiconductor or a p-type semiconductor is preferably provided between the semiconductor layer 742 and the electrode 744*a* and between the semiconductor layer 742 and the electrode 744*b*. The layer that functions as an n-type semiconductor or a p-type semiconductor can function as the source region or the drain region in the transistor.

The insulating layer 729 is preferably formed using a material that can prevent or reduce diffusion of impurities into the transistor from the outside. The formation of the insulating layer 729 may also be omitted.

When an oxide semiconductor is used for the semiconductor layer 742, heat treatment may be performed before and/or after the insulating layer 729 is formed. The heat treatment can fill oxygen vacancies in the semiconductor layer 742 by diffusing oxygen contained in the insulating layer 729 or other insulating layers into the semiconductor layer 742. Alternatively, the insulating layer 729 may be formed while the heat treatment is performed, so that oxygen vacancies in the semiconductor layer 742 can be filled.

Note that a CVD method can be generally classified into a plasma enhanced CVD (PECVD) method using plasma, a thermal CVD (TCVD) method using heat, and the like. A CVD method can further be classified into a metal CVD (MCVD) method, a metal organic CVD (MOCVD) method, and the like according to a source gas to be used.

Furthermore, an evaporation method can be generally classified into a resistance heating evaporation method, an electron beam evaporation method, a molecular beam epitaxy (MBE) method, a pulsed laser deposition (PLD) method, an ion beam assisted deposition (IAD) method, an atomic layer deposition (ALD) method, and the like.

By using a PECVD method, a high-quality film can be formed at a relatively low temperature. By using a deposition method that does not use plasma for deposition, such as an MOCVD method or an evaporation method, a film with few defects can be formed because damage is not easily caused on a surface on which the film is deposited.

A sputtering method is generally classified into a DC sputtering method, a magnetron sputtering method, an RF sputtering method, an ion beam sputtering method, an electron cyclotron resonance (ECR) sputtering method, a facing-target sputtering method, and the like.

In a facing-target sputtering method, plasma is confined between targets; thus, plasma damage to a substrate can be reduced. Furthermore, step coverage can be improved because the incident angle of a sputtered particle to a substrate can be made smaller depending on the inclination of a target.

A transistor 811 illustrated in FIG. 81A2 is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is positioned between a gate electrode and the back gate electrode. Thus, the back gate electrode can function in a manner similar to that of the gate electrode. The potential of the back gate electrode may be the same as that of the gate electrode or may be a ground (GND) potential or a predetermined potential. By changing the potential of the back gate electrode independently of the potential of the gate electrode, the threshold voltage of the transistor can be changed.

The electrode 746 and the electrode 723 can each function as a gate electrode. Thus, the insulating layers 726, 728, and 729 can each function as a gate insulating layer. The electrode 723 may also be provided between the insulating layers 728 and 729.

In the case where one of the electrode 746 and the electrode 723 is simply referred to as a "gate electrode", the other can be referred to as a "back gate electrode". For example, in the transistor 811, in the case where the electrode 723 is referred to as a "gate electrode", the electrode 746 is referred to as a "back gate electrode". In the case where the electrode 723 is used as a "gate electrode", the transistor 811 is a kind of top-gate transistor. Alternatively, one of the electrode 746 and the electrode 723 may be referred to as a "first gate electrode", and the other may be referred to as a "second gate electrode".

By providing the electrode 746 and the electrode 723 with the semiconductor layer 742 provided therebetween and setting the potentials of the electrode 746 and the electrode 723 to be the same, a region of the semiconductor layer 742 through which carriers flow is enlarged in the film thickness direction; thus, the number of transferred carriers is increased. As a result, the on-state current and field-effect mobility of the transistor 811 are increased.

Therefore, the transistor 811 has a comparatively high on-state current for its area. That is, the area of the transistor 811 can be small for a required on-state current. In accordance with one embodiment of the present invention, the area of a transistor can be reduced. Therefore, in accordance with one embodiment of the present invention, a semiconductor device having a high degree of integration can be provided.

The gate electrode and the back gate electrode are formed using conductive layers and thus each have a function of preventing an electric field generated outside the transistor from influencing the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

Since the electrode 746 and the electrode 723 each have a function of blocking an electric field generated outside, electric charge of charged particles and the like generated on the insulating layer 772 side or above the electrode 723 do not influence the channel formation region in the semiconductor layer 742. Thus, degradation by a stress test (e.g., a negative gate bias temperature (−GBT) stress test in which negative electric charge is applied to a gate) can be reduced. Furthermore, a change in gate voltage (rising voltage) at which on-state current starts flowing depending on drain voltage can be reduced. Note that this effect is obtained when the electrodes 746 and 723 have the same potential or different potentials.

The BT stress test is one kind of acceleration test and can evaluate, in a short time, a change by long-term use (i.e., a change over time) in characteristics of a transistor. In particular, the amount of change in threshold voltage of a transistor before and after the BT stress test is an important indicator when examining the reliability of the transistor. As the change in the threshold voltage is smaller, the transistor has higher reliability.

By providing the electrodes 746 and 723 and setting the potentials of the electrodes 746 and 723 to be the same, the amount of change in threshold voltage is reduced. Accordingly, variations in electrical characteristics among a plurality of transistors are also reduced.

A transistor including a back gate electrode has a smaller change in threshold voltage before and after a positive GBT stress test, in which positive electric charge is applied to a gate, than a transistor including no back gate electrode.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

In accordance with one embodiment of the present invention, a transistor with high reliability can be provided. Moreover, a semiconductor device with high reliability can be provided.

FIG. 81B1 is a cross-sectional view of a channel-protective transistor 820 that is a type of bottom-gate transistor. The transistor 820 has substantially the same structure as the transistor 810 but is different from the transistor 810 in that the insulating layer 741 covers the semiconductor layer 742. The semiconductor layer 742 is electrically connected to the electrode 744a through an opening formed by selectively removing part of the insulating layer 741 which overlaps with the semiconductor layer 742. The semiconductor layer 742 is electrically connected to the electrode 744b through another opening formed by selectively removing part of the insulating layer 741 which overlaps with the semiconductor layer 742. A region of the insulating layer 741 which overlaps with the channel formation region can function as a channel protective layer.

A transistor 821 illustrated in FIG. 81B2 is different from the transistor 820 in that the electrode 723 that can function as a back gate electrode is provided over the insulating layer 729.

With the insulating layer 741, the semiconductor layer 742 can be prevented from being exposed at the time of forming the electrodes 744a and 744b. Thus, the semiconductor layer 742 can be prevented from being reduced in thickness at the time of forming the electrodes 744a and 744b.

The length between the electrode 744a and the electrode 746 and the length between the electrode 744b and the electrode 746 in the transistors 820 and 821 are larger than those in the transistors 810 and 811. Thus, the parasitic capacitance generated between the electrode 744a and the electrode 746 can be reduced. Moreover, the parasitic capacitance generated between the electrode 744b and the electrode 746 can be reduced. In accordance with one embodiment of the present invention, a transistor with favorable electrical characteristics can be provided.

A transistor 825 illustrated in FIG. 81C1 is a channel-etched transistor that is a type of bottom-gate transistor. In the transistor 825, the electrodes 744a and 744b are formed without providing the insulating layer 741. Thus, part of the semiconductor layer 742 that is exposed at the time forming the electrodes 744a and 744b is etched in some cases. However, since the insulating layer 741 is not provided, the productivity of the transistor can be increased.

A transistor 826 illustrated in FIG. 81C2 is different from the transistor 825 in that the electrode 723 which can function as a back gate electrode is provided over the insulating layer 729.

[Top-Gate Transistor]

FIG. 82A1 is a cross-sectional view of a transistor 830 that is a type of top-gate transistor. The transistor 830 includes the semiconductor layer 742 over the insulating layer 772, the electrodes 744a and 744b that are over the semiconductor layer 742 and the insulating layer 772 and in contact with part of the semiconductor layer 742, the insulating layer 726 over the semiconductor layer 742 and the electrodes 744a and 744b, and the electrode 746 over the insulating layer 726.

Since the electrode 746 overlaps with neither the electrode 744a nor the electrode 744b in the transistor 830, the parasitic capacitance generated between the electrodes 746 and 744a and the parasitic capacitance generated between the electrodes 746 and 744b can be reduced. After the formation of the electrode 746, an impurity 755 is introduced into the semiconductor layer 742 using the electrode 746 as a mask, so that an impurity region can be formed in the semiconductor layer 742 in a self-aligned manner (see FIG. 82A3). In accordance with one embodiment of the present invention, a transistor with favorable electrical characteristics can be provided.

The introduction of the impurity 755 can be performed with an ion implantation apparatus, an ion doping apparatus, or a plasma treatment apparatus.

As the impurity 755, for example, at least one kind of element of Group 13 elements and Group 15 elements can be used. In the case where an oxide semiconductor is used for the semiconductor layer 742, it is possible to use at least one kind of element of a rare gas, hydrogen, and nitrogen as the impurity 755.

A transistor 831 illustrated in FIG. 82A2 is different from the transistor 830 in that the electrode 723 and the insulating layer 727 are included. The transistor 831 includes the electrode 723 formed over the insulating layer 772 and the insulating layer 727 formed over the electrode 723. The electrode 723 can function as a back gate electrode. Thus, the insulating layer 727 can function as a gate insulating layer. The insulating layer 727 can be formed using a material and a method similar to those of the insulating layer 726.

Like the transistor 811, the transistor 831 has a high on-state current for its area. That is, the area of the transistor 831 can be small for a required on-state current. In accordance with one embodiment of the present invention, the area of a transistor can be reduced. Therefore, in accordance with one embodiment of the present invention, a semiconductor device having a high degree of integration can be provided.

A transistor 840 illustrated in FIG. 82B1 is a type of top-gate transistor. The transistor 840 is different from the transistor 830 in that the semiconductor layer 742 is formed after the formation of the electrodes 744a and 744b. A transistor 841 illustrated in FIG. 82B2 is different from the transistor 840 in that the electrode 723 and the insulating layer 727 are included. In the transistors 840 and 841, part of the semiconductor layer 742 is formed over the electrode 744a and another part of the semiconductor layer 742 is formed over the electrode 744b.

Like the transistor 811, the transistor 841 has a high on-state current for its area. That is, the area of the transistor 841 can be small for a required on-state current. In accordance with one embodiment of the present invention, the area of a transistor can be reduced. Therefore, in accordance with one embodiment of the present invention, a semiconductor device having a high degree of integration can be provided.

A transistor 842 illustrated in FIG. 83A1 is a type of top-gate transistor. The transistor 842 is different from the transistor 830 or 840 in that the electrodes 744a and 744b are formed after the formation of the insulating layer 729. The electrodes 744a and 744b are electrically connected to the semiconductor layer 742 through openings formed in the insulating layers 728 and 729.

Part of the insulating layer 726 that does not overlap with the electrode 746 is removed, and the impurity 755 is introduced into the semiconductor layer 742 using the electrode 746 and the insulating layer 726 that is left as a mask, so that an impurity region can be formed in the semiconductor layer 742 in a self-aligned manner (see FIG. 83A3). The transistor 842 includes a region where the insulating layer 726 extends beyond an end portion of the electrode 746. The semiconductor layer 742 in a region into which the impurity 755 is introduced through the insulating layer 726 has a lower impurity concentration than the semiconductor layer 742 in a region into which the impurity 755 is introduced without through the insulating layer 726. Thus, a lightly doped drain (LDD) region is formed in a region adjacent to a region of the semiconductor layer 742 which overlaps with the electrode 746.

A transistor 843 illustrated in FIG. 83A2 is different from the transistor 842 in that the electrode 723 is included. The transistor 843 includes the electrode 723 that is formed over the substrate 771 and overlaps with the semiconductor layer 742 with the insulating layer 772 provided therebetween. The electrode 723 can function as a back gate electrode.

As in a transistor 844 illustrated in FIG. 83B1 and a transistor 845 illustrated in FIG. 83B2, the insulating layer 726 in a region that does not overlap with the electrode 746 may be completely removed. Alternatively, as in a transistor 846 illustrated in FIG. 83C1 and a transistor 847 illustrated in FIG. 83C2, the insulating layer 726 may be left in a region which does not overlap with the electrode 746.

In the transistors 842 to 847, after the formation of the electrode 746, the impurity 755 is introduced into the semiconductor layer 742 using the electrode 746 as a mask, so that an impurity region can be formed in the semiconductor layer 742 in a self-aligned manner. In accordance with one embodiment of the present invention, a transistor with favorable electrical characteristics can be provided. Furthermore, in accordance with one embodiment of the present invention, a semiconductor device having a high degree of integration can be provided.

[S-Channel Transistor]

Figure 84A:
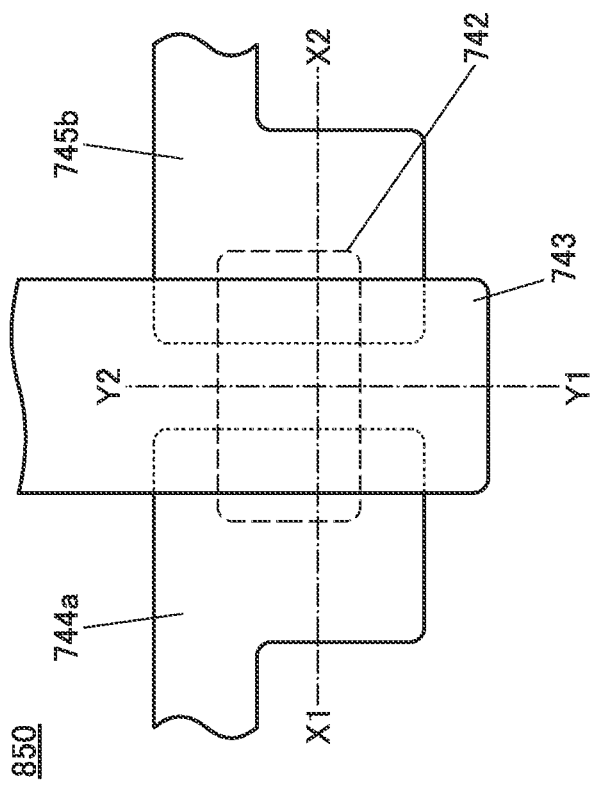
FIGS. 84A to 84C are a plan view and cross-sectional views illustrating one embodiment of a transistor.
Figure 84C:
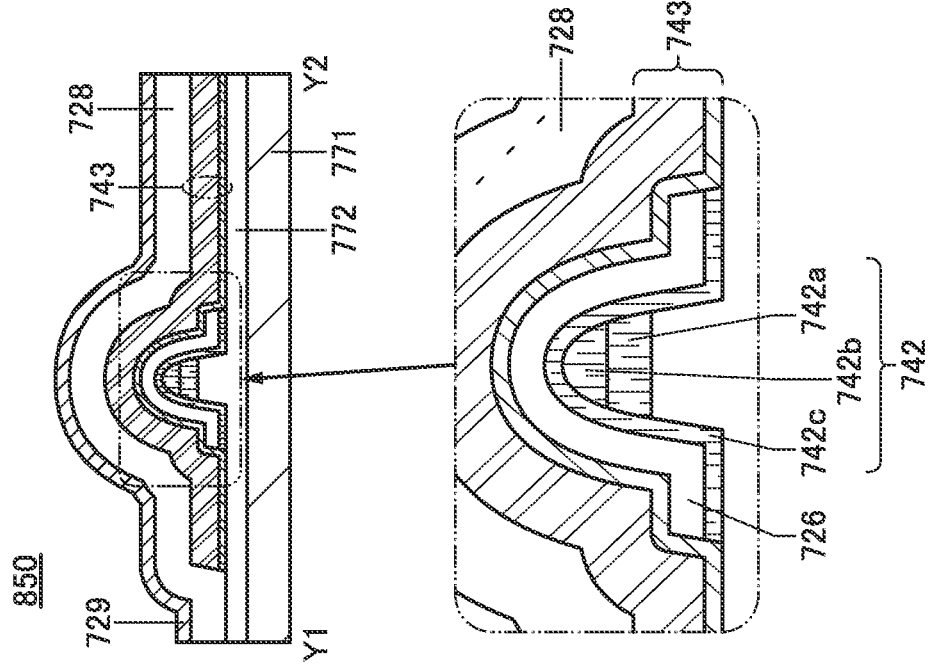
Figure 84B:
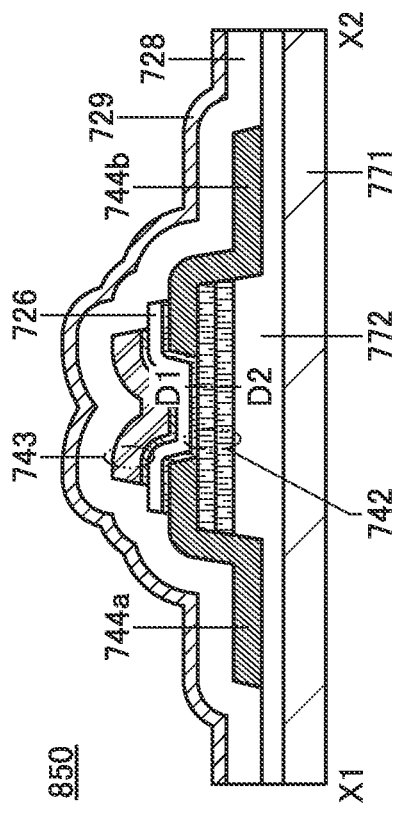

FIGS. 84A to 84C illustrate an example of the structure of a transistor using an oxide semiconductor for the semiconductor layer 742. In a transistor 850 illustrated in FIGS. 84A to 84C, a semiconductor layer 742b is formed over a semiconductor layer 742a, and a semiconductor layer 742c covers a top surface and a side surface of the semiconductor layer 742b and a side surface of the semiconductor layer 742a. FIG. 84A is a top view of the transistor 850. FIG. 84B is a cross-sectional view (in the channel length direction) taken along the dashed-dotted line X1-X2 in FIG. 84A. FIG. 84C is a cross-sectional view (in the channel width direction) taken along the dashed-dotted line Y1-Y2 in FIG. 84A.

The transistor 850 includes the electrode 743 functioning as a gate electrode. The electrode 743 can be formed using a material and a method similar to those of the electrode 746. The electrode 743 is formed of two conductive layers in this embodiment.

Each of the semiconductor layer 742a, the semiconductor layer 742b, and the semiconductor layer 742c is formed using a material containing either In or Ga or both of them. Typical examples are an In—Ga oxide (an oxide containing In and Ga), an In—Zn oxide (an oxide containing In and Zn), and an In-M-Zn oxide (an oxide containing In, an element M, and Zn). The element M is one or more kinds of elements selected from Al, Ti, Ga, Y, Zr, La, Ce, Nd, and Hf and has a higher strength of bonding with oxygen than that of In.

The semiconductor layer 742a and the semiconductor layer 742c are preferably formed using a material containing one or more kinds of metal elements contained in the semiconductor layer 742b. With the use of such a material, interface states are less likely to be generated at the interface between the semiconductor layer 742a and the semiconductor layer 742b and at the interface between the semiconductor layer 742c and the semiconductor layer 742b. Accordingly, carriers are not likely to be scattered or captured at the interfaces, which results in an improvement in field-effect mobility of the transistor. Furthermore, variation in threshold voltage of the transistor can be reduced. Thus, a semiconductor device having favorable electrical characteristics can be obtained.

Each of the thicknesses of the semiconductor layers 742a and 742c is greater than or equal to 3 nm and less than or equal to 100 nm, preferably greater than or equal to 3 nm and less than or equal to 50 nm. The thickness of the semiconductor layer 742b is greater than or equal to 3 nm and less than or equal to 700 nm, preferably greater than or equal to 3 nm and less than or equal to 100 nm, more preferably greater than or equal to 3 nm and less than or equal to 50 nm.

In the case where the semiconductor layer 742b includes an In-M-Zn oxide and the semiconductor layers 742a and 742c each also include an In-M-Zn oxide, the semiconductor layers 742a and 742c each have the atomic ratio where In:M:Zn=$x_1$:$y_1$:$z_1$, and the semiconductor layer 742b has an atomic ratio where In:M:Zn=$x_2$:$y_2$:$z_2$, for example. In that case, the compositions of the semiconductor layers 742a, 742c, and 742b can be determined so that $y_1/x_1$ is larger than $y_2/x_2$. It is preferable that the compositions of the semiconductor layers 742a, 742c, and 742b be determined so that $y_1/x_1$ is 1.5 times or more as large as $y_2/x_2$. It is more preferable that the compositions of the semiconductor layers 742a, 742c, and 742b be determined so that $y_1/x_1$ is twice or more as large as $y_2/x_2$. It is more preferable that the compositions of the semiconductor layers 742a, 742c, and 742b be determined so that $y_1/x_1$ is three times or more as large as $y_2/x_2$. It is preferable that $y_1$ be greater than or equal to $x_1$ because the transistor can have stable electrical characteristics. However, when $y_1$ is three times or more as large as $x_1$, the field-effect mobility of the transistor is reduced; accordingly, $y_1$ is preferably smaller than three times $x_1$. When the semiconductor layer 742a and the semiconductor layer 742c have the above compositions, the semiconductor layer 742a and the semiconductor layer 742c can each be a layer in which oxygen vacancies are less likely to be generated than in the semiconductor layer 742b.

In the case where the semiconductor layer 742a and the semiconductor layer 742c each include an In-M-Zn oxide, the percentages of In and the element M, not taking Zn and O into consideration, are preferably as follows: the percentage of In is lower than 50 atomic % and the percentage of the element M is higher than or equal to 50 atomic %. The percentages of In and the element M are more preferably as follows: the percentage of In is lower than 25 atomic % and the percentage of the element M is higher than or equal to 75 atomic %. In the case where the semiconductor layer 742b includes an In-M-Zn oxide, the percentages of In and the element M, not taking Zn and O into consideration, are preferably as follows: the percentage of In is higher than or equal to 25 atomic % and the percentage of the element M is lower than 75 atomic %. The percentages of In and the element M are more preferably as follows: the percentage of In is higher than or equal to 34 atomic % and the percentage of the element M is lower than 66 atomic %.

For example, an In—Ga—Zn oxide that is formed using a target having an atomic ratio of In:Ga:Zn=1:3:2, 1:3:4, 1:3:6, 1:6:4, or 1:9:6, an In—Ga oxide that is formed using a target having an atomic ratio of In:Ga=1:9, or gallium oxide can be used for each of the semiconductor layers 742a and 742c containing In or Ga. Furthermore, an In—Ga—Zn oxide that is formed using a target having an atomic ratio of In:Ga:Zn=3:1:2, 1:1:1, 5:5:6, or 4:2:4.1 can be used for the semiconductor layer 742b. Note that the atomic ratio of each of the semiconductor layers 742a, 742b, and 742c may vary within a range of ±20% of any of the above-described atomic ratios as an error.

To give stable electrical characteristics to the transistor including the semiconductor layer 742b, it is preferable that impurities and oxygen vacancies in the semiconductor layer 742b be reduced to obtain a highly purified oxide semiconductor layer and accordingly the semiconductor layer 742b can be regarded as an intrinsic or substantially intrinsic oxide semiconductor layer. Furthermore, it is preferable that at least the channel formation region of the semiconductor layer 742b be regarded as an intrinsic or substantially intrinsic oxide semiconductor layer.

Note that the substantially intrinsic oxide semiconductor layer refers to an oxide semiconductor layer in which the carrier density is higher than or equal to $1\times10^{-9}/cm^3$ and lower than $8\times10^{11}/cm^3$, preferably lower than $1\times10^{11}/cm^3$, more preferably lower than $1\times10^{10}/cm^3$.

Figure 85C:
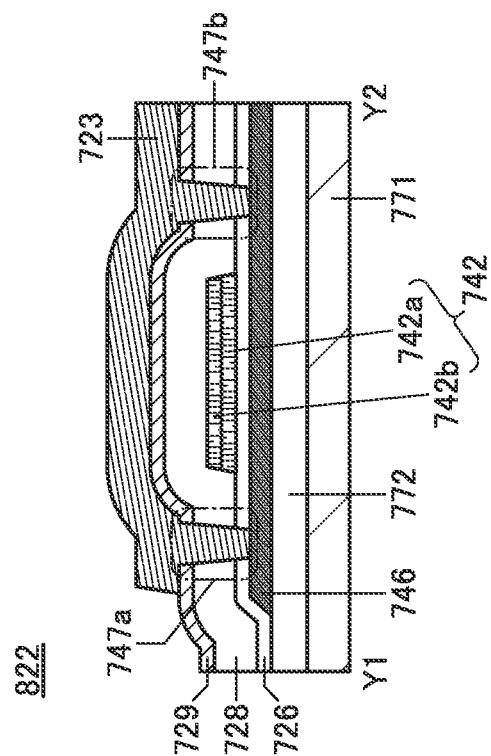
FIGS. 85A to 85C are a plan view and cross-sectional views illustrating one embodiment of a transistor.
Figure 85A:
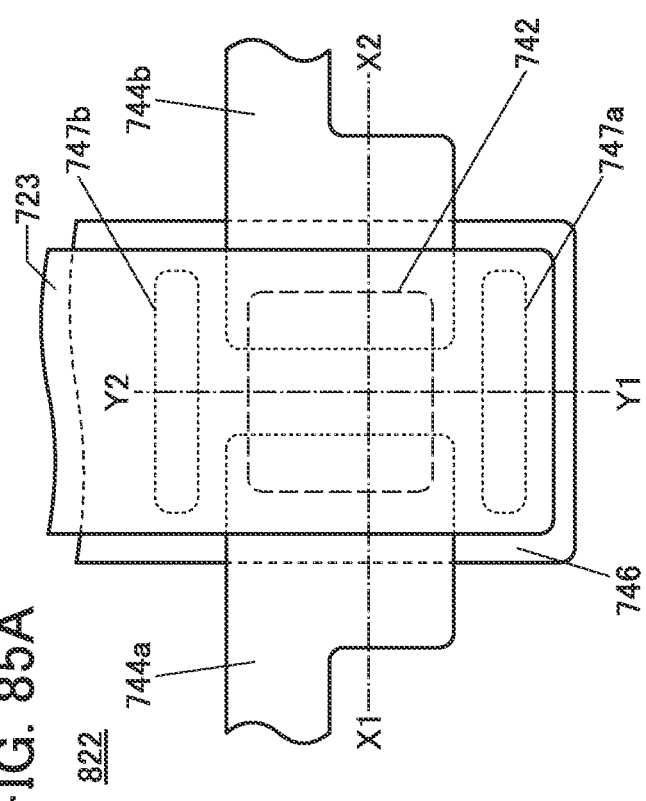
Figure 85B:
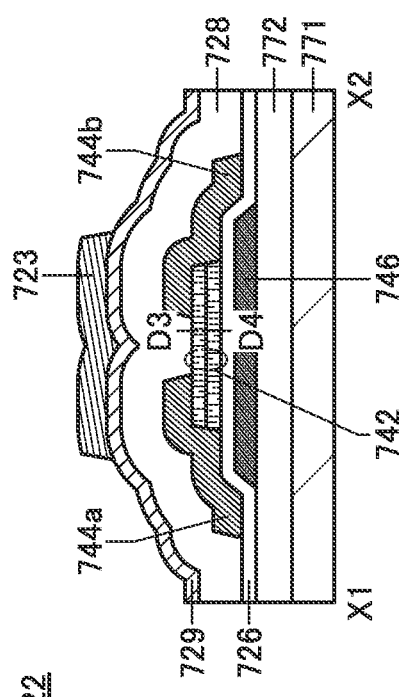

FIGS. 85A to 85C illustrate an example of the structure of a transistor using an oxide semiconductor for the semiconductor layer 742. In a transistor 822 illustrated in FIGS. 85A to 85C, the semiconductor layer 742b is formed over the semiconductor layer 742a. The transistor 822 is a kind of bottom-gate transistor including a back gate electrode. FIG. 85A is a top view of the transistor 822. FIG. 85B is a cross-sectional view (in the channel length direction) taken along the dashed-dotted line X1-X2 in FIG. 85A. FIG. 85C is a cross-sectional view (in the channel width direction) taken along the dashed-dotted line Y1-Y2 in FIG. 85A.

The electrode 723 provided over the insulating layer 729 is electrically connected to the electrode 746 through an opening 747a and an opening 747b provided in the insulating layers 726, 728, and 729. Thus, the same potential is supplied to the electrodes 723 and 746. Furthermore, either or both of the openings 747a and 747b may be omitted. In the case where both the openings 747a and 747b are omitted, different potentials can be supplied to the electrodes 723 and 746.

[Energy Band Structure of Oxide Semiconductor]

Figure 89A:
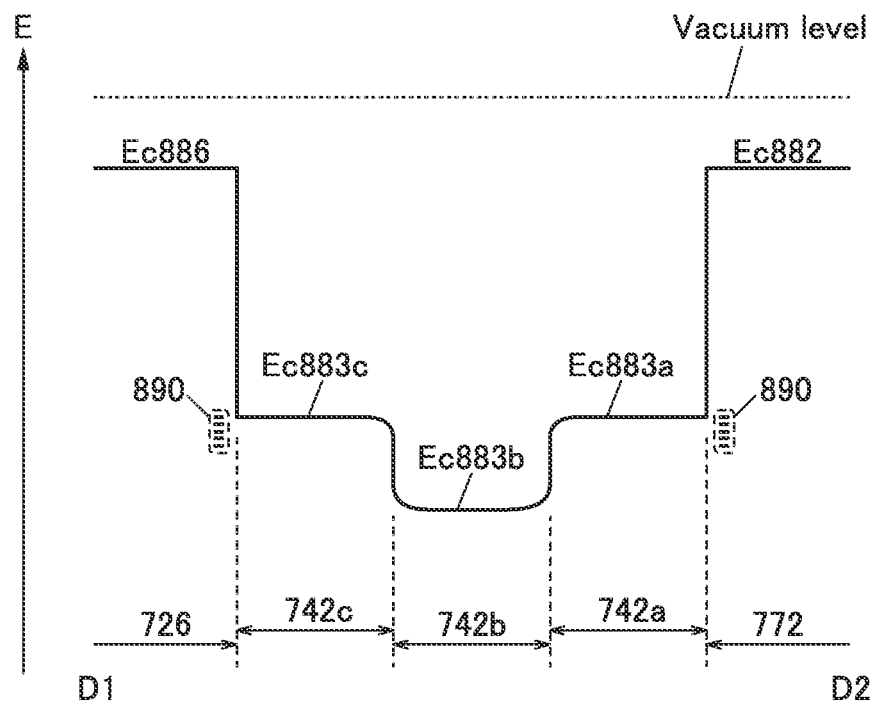
FIGS. 89A and 89B each show an energy band structure.
Figure 89B:
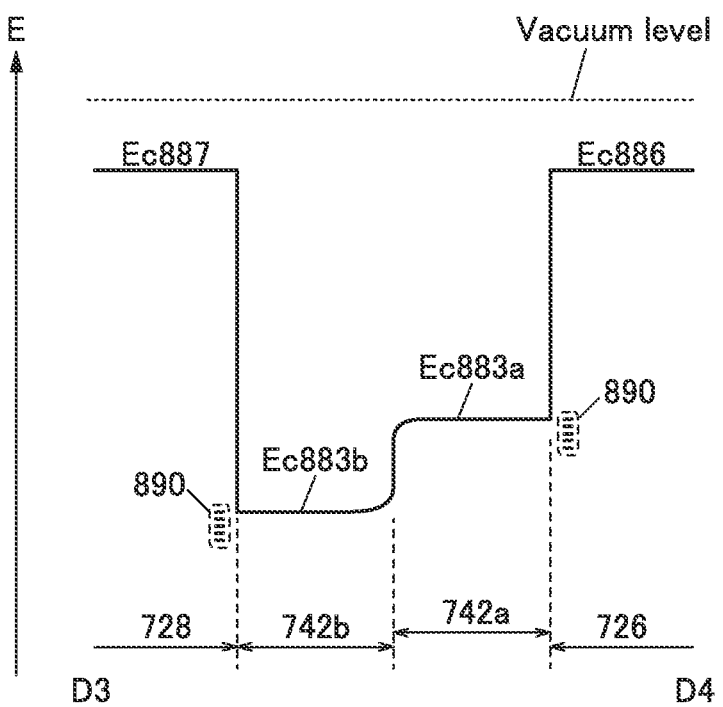

The function and effect of the semiconductor layer 742 that is a stacked layer including the semiconductor layers 742a, 742b, and 742c are described with an energy band structure diagram shown in FIGS. 89A and 89B. FIG. 89A is the energy band structure diagram showing a portion along the dashed-dotted line D1-D2 in FIG. 84B. FIG. 89A illustrates the energy band structure of a channel formation region of the transistor 850.

In FIG. 89A, Ec882, Ec883a, Ec883b, Ec883c, and Ec886 indicate the energy of the conduction band minimum of the insulating layer 772, the semiconductor layer 742a, the semiconductor layer 742b, the semiconductor layer 742c, and the insulating layer 726, respectively.

Here, a difference in energy between the vacuum level and the conduction band minimum (the difference is also referred to as "electron affinity") corresponds to a value obtained by subtracting an energy gap from a difference in energy between the vacuum level and the valence band maximum (the difference is also referred to as an ionization potential). Note that the energy gap can be measured with a spectroscopic ellipsometer (e.g., UT-300 by HORIBA JOBIN YVON S.A.S.). The energy difference between the vacuum level and the valence band maximum can be measured with an ultraviolet photoelectron spectroscopy (UPS) device (e.g., VersaProbe by ULVAC-PHI, Inc.).

Note that an In—Ga—Zn oxide which is formed using a target having an atomic ratio of In:Ga:Zn=1:3:2 has an energy gap of approximately 3.5 eV and an electron affinity of approximately 4.5 eV. An In—Ga—Zn oxide which is formed using a target having an atomic ratio of In:Ga:Zn=1:3:4 has an energy gap of approximately 3.4 eV and an electron affinity of approximately 4.5 eV. An In—Ga—Zn oxide which is formed using a target having an atomic ratio of In:Ga:Zn=1:3:6 has an energy gap of approximately 3.3 eV and an electron affinity of approximately 4.5 eV. An In—Ga—Zn oxide which is formed using a target having an atomic ratio of In:Ga:Zn=1:6:2 has an energy gap of approximately 3.9 eV and an electron affinity of approximately 4.3 eV. An In—Ga—Zn oxide which is formed using a target having an atomic ratio of In:Ga:Zn=1:6:8 has an energy gap of approximately 3.5 eV and an electron affinity of approximately 4.4 eV. An In—Ga—Zn oxide which is formed using a target having an atomic ratio of In:Ga:Zn=1:6:10 has an energy gap of approximately 3.5 eV and an electron affinity of approximately 4.5 eV. An In—Ga—Zn oxide which is formed using a target having an atomic ratio of In:Ga:Zn=1:1:1 has an energy gap of approximately 3.2 eV and an electron affinity of approximately 4.7 eV. An In—Ga—Zn oxide which is formed using a target having an atomic ratio of In:Ga:Zn=3:1:2 has an energy gap of approximately 2.8 eV and an electron affinity of approximately 5.0 eV.

Since the insulating layer 772 and the insulating layer 726 are insulators, Ec882 and Ec886 are closer to the vacuum level (have a smaller electron affinity) than Ec883a, Ec883b, and Ec883c.

Ec883a is closer to the vacuum level than Ec883b. Specifically, Ec833a is preferably closer to the vacuum level than Ec883b by 0.05 eV or more, 0.07 eV or more, 0.1 eV or more, or 0.15 eV or more and 2 eV or less, 1 eV or less, 0.5 eV or less, or 0.4 eV or less.

Ec883c is closer to the vacuum level than Ec883b. Specifically, Ec883c is preferably closer to the vacuum level than Ec883b by 0.05 eV or more, 0.07 eV or more, 0.1 eV or more, or 0.15 eV or more and 2 eV or less, 1 eV or less, 0.5 eV or less, or 0.4 eV or less.

In the vicinity of the interface between the semiconductor layer 742a and the semiconductor layer 742b and the vicinity of the interface between the semiconductor layer 742b and the semiconductor layer 742c, mixed regions are formed; thus, the energy of the conduction band minimum continuously changes. In other words, no state or few states exist at these interfaces.

Accordingly, electrons transfer mainly through the semiconductor layer 742b in the stacked-layer structure having the above energy band structure. Therefore, even when states exist at the interface between the semiconductor layer 742a and the insulating layer 724 or at the interface between the semiconductor layer 742c and the insulating layer 726, the states hardly influence the transfer of the electrons. In addition, the states do not exist or hardly exist at the interface between the semiconductor layer 742a and the semiconductor layer 742b and at the interface between the semiconductor layer 742c and the semiconductor layer 742b; thus, transfer of electrons is not prohibited in the regions. Consequently, a high field-effect mobility can be obtained in the transistor having the stacked-layer structure of the above oxide semiconductors.

Note that although trap states 890 due to impurities or defects might be formed in the vicinity of the interface between the semiconductor layer 742a and the insulating layer 772 and in the vicinity of the interface between the semiconductor layer 742c and the insulating layer 726 as shown in FIG. 89A, the semiconductor layer 742b can be apart from the trap states owing to the existence of the semiconductor layer 742a and the semiconductor layer 742c.

In particular, in the transistor described in this embodiment, an upper surface and a side surface of the semiconductor layer 742b are in contact with the semiconductor layer 742c, and a lower surface of the semiconductor layer 742b is in contact with the semiconductor layer 742a. In this manner, the semiconductor layer 742b is covered by the semiconductor layers 742a and 742c, whereby the influence of the trap states can further be reduced.

Note that in the case where the energy difference between Ec883a and Ec883b or between Ec883c and E883b is small, electrons in the semiconductor layer 742b might reach the trap states by passing over the energy difference. The electrons are captured by the trap states, which generates negative fixed electric charge at the interface with the insulating layer, causing the threshold voltage of the transistor to be shifted in the positive direction.

Therefore, each of the energy differences between Ec883a and Ec883b and between Ec883c and Ec883b is set to be greater than or equal to 0.1 eV, preferably greater than or equal to 0.15 eV, in which case a variation in the threshold voltage of the transistor can be reduced and the transistor can have favorable electrical characteristics.

Each of the band gaps of the semiconductor layer 742a and the semiconductor layer 742c is preferably wider than that of the semiconductor layer 742b.

FIG. 89B is the energy band structure diagram showing a portion along the dashed-dotted line D3-D4 in FIG. 85B. FIG. 89B shows the energy band structure of a channel formation region of the transistor 822.

In FIG. 89B, Ec887 represents the energy of the conduction band minimum of the insulating layer 728. The semiconductor layer 742 is formed using two layers, the semiconductor layers 742a and 742b; thus, the transistor can be manufactured with improved productivity. Since the semiconductor layer 742c is not provided, the transistor including the two semiconductor layers is easily affected by the trap states 890 but can have a higher field-effect mobility than a transistor including one semiconductor layer as the semiconductor layer 742.

In accordance with one embodiment of the present invention, a transistor with a small variation in electrical characteristics can be provided. Accordingly, a semiconductor device with a small variation in electrical characteristics can be provided. In accordance with one embodiment of the present invention, a transistor with high reliability can be provided. Accordingly, a semiconductor device with high reliability can be provided.

An oxide semiconductor has an energy gap as wide as 3.0 eV or more and a high visible-light transmissivity. In a transistor obtained by processing an oxide semiconductor under appropriate conditions, the off-state current at ambient temperature (e.g., 25° C.) can be lower than or equal to 100 zA ($1\times10^{-19}$ A), lower than or equal to 10 zA ($1\times10^{-20}$ A), and further lower than or equal to 1 zA ($1\times10^{-21}$ A). Therefore, a semiconductor device with low power consumption can be achieved.

In accordance with one embodiment of the present invention, a transistor with low power consumption can be provided. Accordingly, a display element or a semiconductor device such as a display device with low power consumption can be provided. Moreover, a display element or a semiconductor device such as a display device with high reliability can be provided.

The transistor 850 illustrated in FIGS. 84A to 84C is described again. When the semiconductor layer 742b is provided over the projection of the insulating layer 772, the side surface of the semiconductor layer 742b can also be covered with the electrode 743. Thus, the transistor 850 has a structure in which the semiconductor layer 742b can be electrically surrounded by an electric field of the electrode 743. Such a structure of a transistor in which a semiconductor layer in which a channel is formed is electrically surrounded by an electric field of a conductive film is called a surrounded channel (s-channel) structure. A transistor with an s-channel structure is referred to as an s-channel transistor.

In an s-channel structure, a channel can be formed in the whole (bulk) of the semiconductor layer 742b. In an s-channel structure, the drain current of the transistor can be increased, so that a larger amount of on-state current can be obtained. Furthermore, the entire channel formation region of the semiconductor layer 742b can be depleted by an electric field of the electrode 743. Accordingly, the off-state current of the transistor with an s-channel structure can further be reduced.

When the projection of the insulating layer 772 is increased in height and the channel width is shortened, the effects of an s-channel structure to increase the on-state current and reduce the off-state current can be enhanced.

Part of the semiconductor layer 742a exposed at the time of forming the semiconductor layer 742b may be removed. In that case, the side surfaces of the semiconductor layer 742a and the semiconductor layer 742b may be aligned with each other.

Figure 86A:
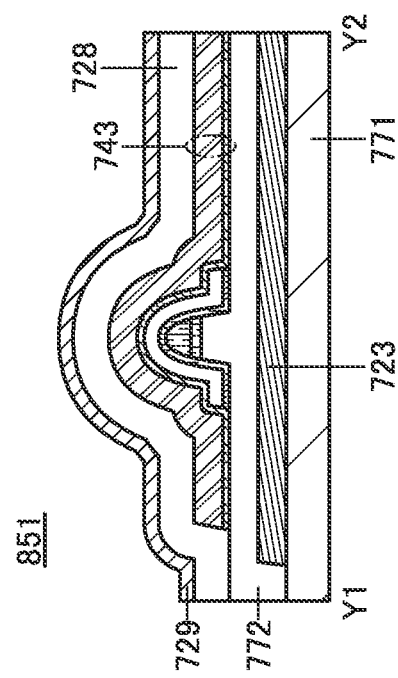
FIGS. 86A to 86C are a plan view and cross-sectional views illustrating one embodiment of a transistor.
Figure 86B:
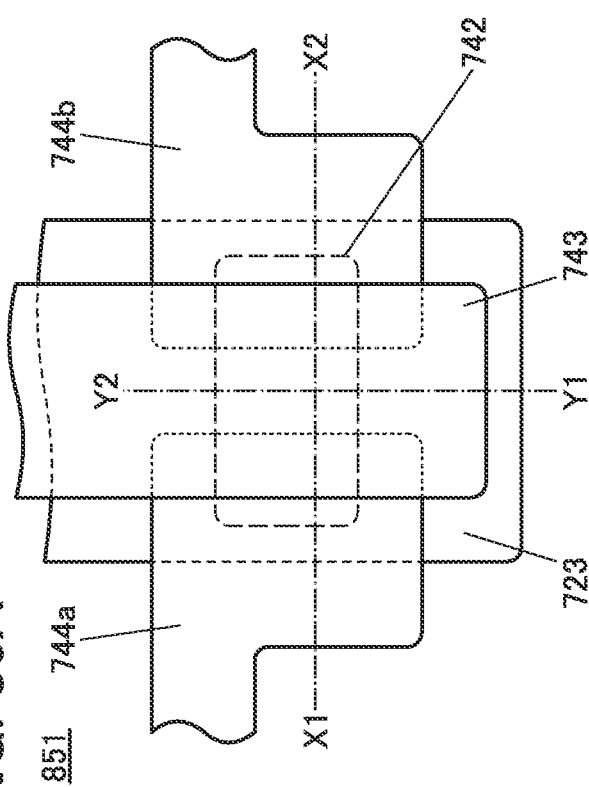
Figure 86C:
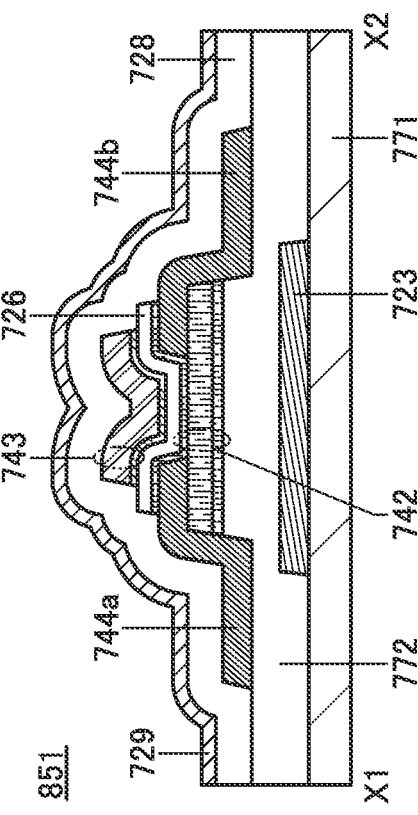

As in a transistor 851 illustrated in FIGS. 86A to 86C, the electrode 723 may be provided below the semiconductor layer 742 with an insulating layer provided therebetween. FIG. 86A is a top view of the transistor 851. FIG. 86B is a cross-sectional view taken along the dashed-dotted line X1-X2 in FIG. 86A. FIG. 86C is a cross-sectional view taken along the dashed-dotted line Y1-Y2 in FIG. 86A.

Figure 87C:
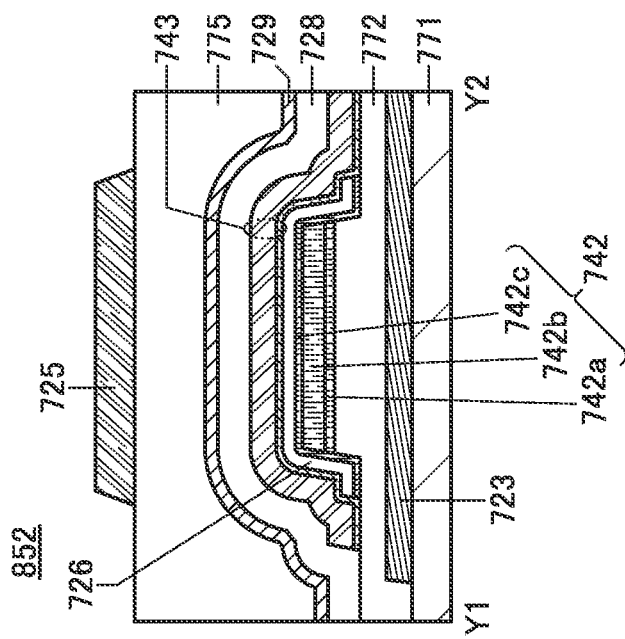
FIGS. 87A to 87C are a plan view and cross-sectional views illustrating one embodiment of a transistor.
Figure 87A:
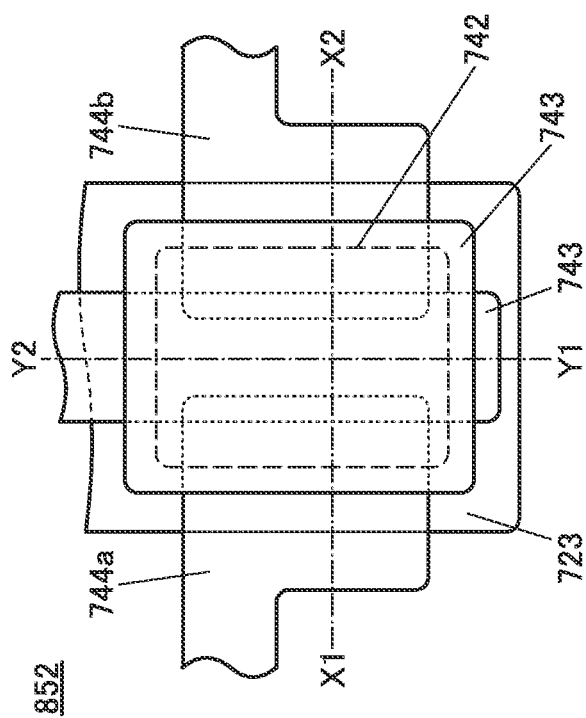
Figure 87B:
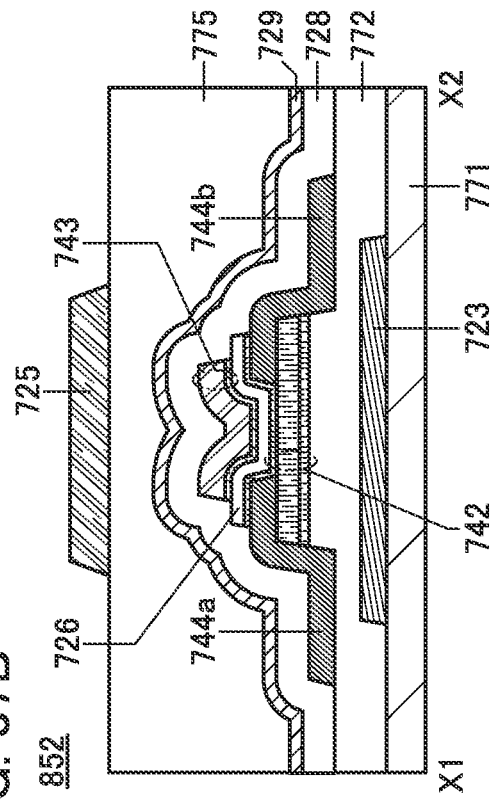

As in a transistor 852 illustrated in FIGS. 87A to 87C, an insulating layer 775 may be provided over the electrode 743, and a layer 725 may be provided over the insulating layer 775. FIG. 87A is a top view of the transistor 852. FIG. 87B is a cross-sectional view taken along the dashed-dotted line X1-X2 in FIG. 87A. FIG. 87C is a cross-sectional view taken along the dashed-dotted line Y1-Y2 in FIG. 87A.

Although the layer 725 is provided over the insulating layer 775 in FIGS. 87A to 87C, the layer 725 may be provided over the insulating layer 728 or 729. The layer 725 formed using a material with a light-blocking property can prevent a variation in characteristics, a decrease in reliability, or the like of the transistor caused by light irradiation. When the layer 725 is formed at least larger than the semiconductor layer 742b such that the semiconductor layer 742b is covered with the layer 725, the above effects can be improved. The layer 725 can be formed using an organic material, an inorganic material, or a metal material. In the case where the layer 725 is formed using a conductive material, voltage can be supplied to the layer 725 or the layer 725 may be brought into an electrically floating state.

Figure 88A:
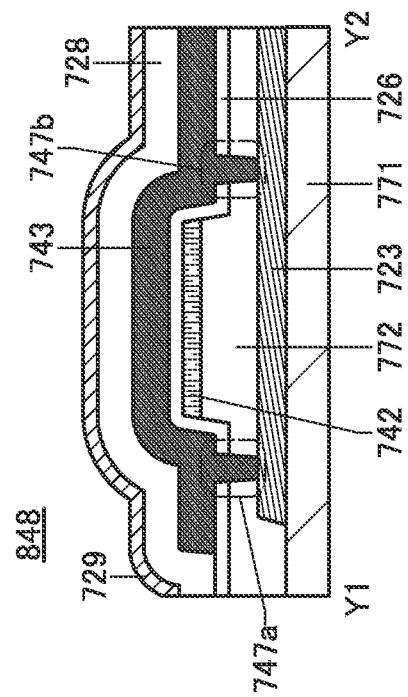
FIGS. 88A to 88C are a plan view and cross-sectional views illustrating one embodiment of a transistor.
Figure 88B:
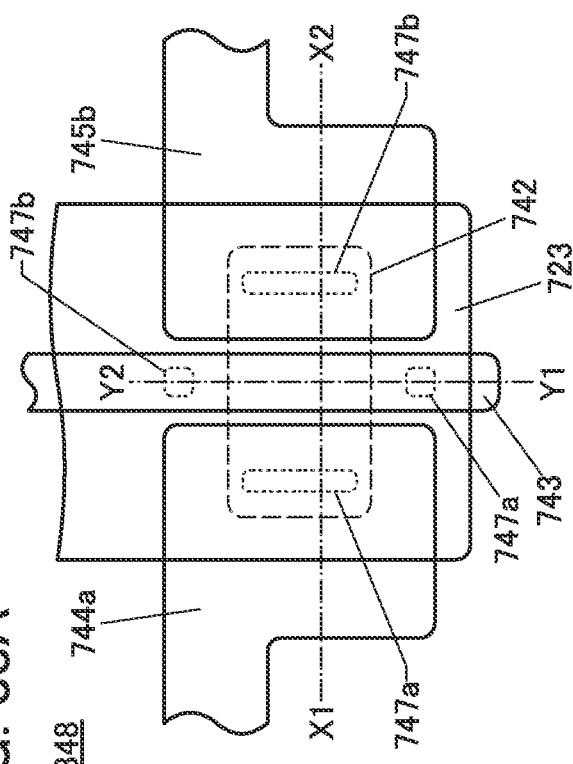
Figure 88C:
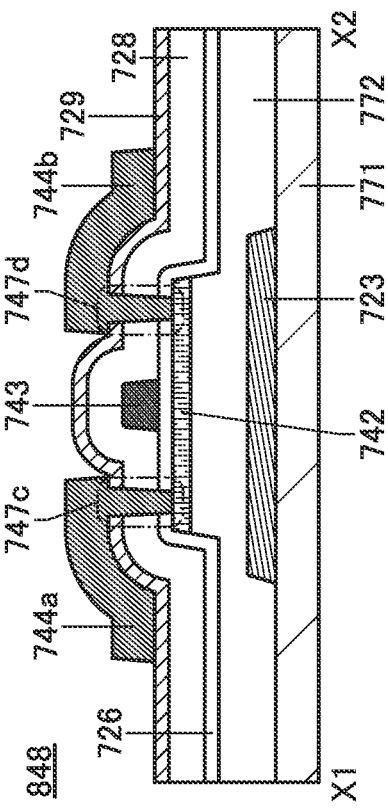

FIGS. 88A to 88C illustrate an example of a transistor with an s-channel structure. A transistor 848 illustrated in FIGS. 88A to 88C has almost the same structure as the transistor 847. In the transistor 848, the semiconductor layer 742 is formed over a projection of the insulating layer 772. The transistor 848 is a type of top-gate transistor including a back gate electrode. FIG. 88A is a top view of the transistor 848. FIG. 88B is a cross-sectional view taken along the dashed-dotted line X1-X2 in FIG. 88A. FIG. 88C is a cross-sectional view taken along the dashed-dotted line Y1-Y2 in FIG. 88A.

The electrode 744a provided over the insulating layer 729 is electrically connected to the semiconductor layer 742 through an opening 747c formed in the insulating layers 726, 728, and 729. The electrode 744b provided over the insulating layer 729 is electrically connected to the semiconductor layer 742 through an opening 747d formed in the insulating layers 726, 728, and 729.

The electrode 743 provided over the insulating layer 726 is electrically connected to the electrode 723 through an opening 747a and an opening 747b formed in the insulating layers 726 and 772. Accordingly, the same potential is supplied to the electrodes 746 and 723. Furthermore, either or both of the openings 747a and 747b may be omitted. In the case where both the openings 747a and 747b are omitted, different potentials can be supplied to the electrodes 723 and 746.

Note that the semiconductor layer in the transistor with an s-channel structure is not limited to include an oxide semiconductor.

This embodiment can be implemented in an appropriate combination with any of the structures described in the other embodiments.

Embodiment 4

In this embodiment, a display module and electronic devices that include the display device or the touch panel of one embodiment of the present invention will be described with reference to FIG. 90, FIGS. 91A to 91H, and FIGS. 92A and 92B.

Figure 90:
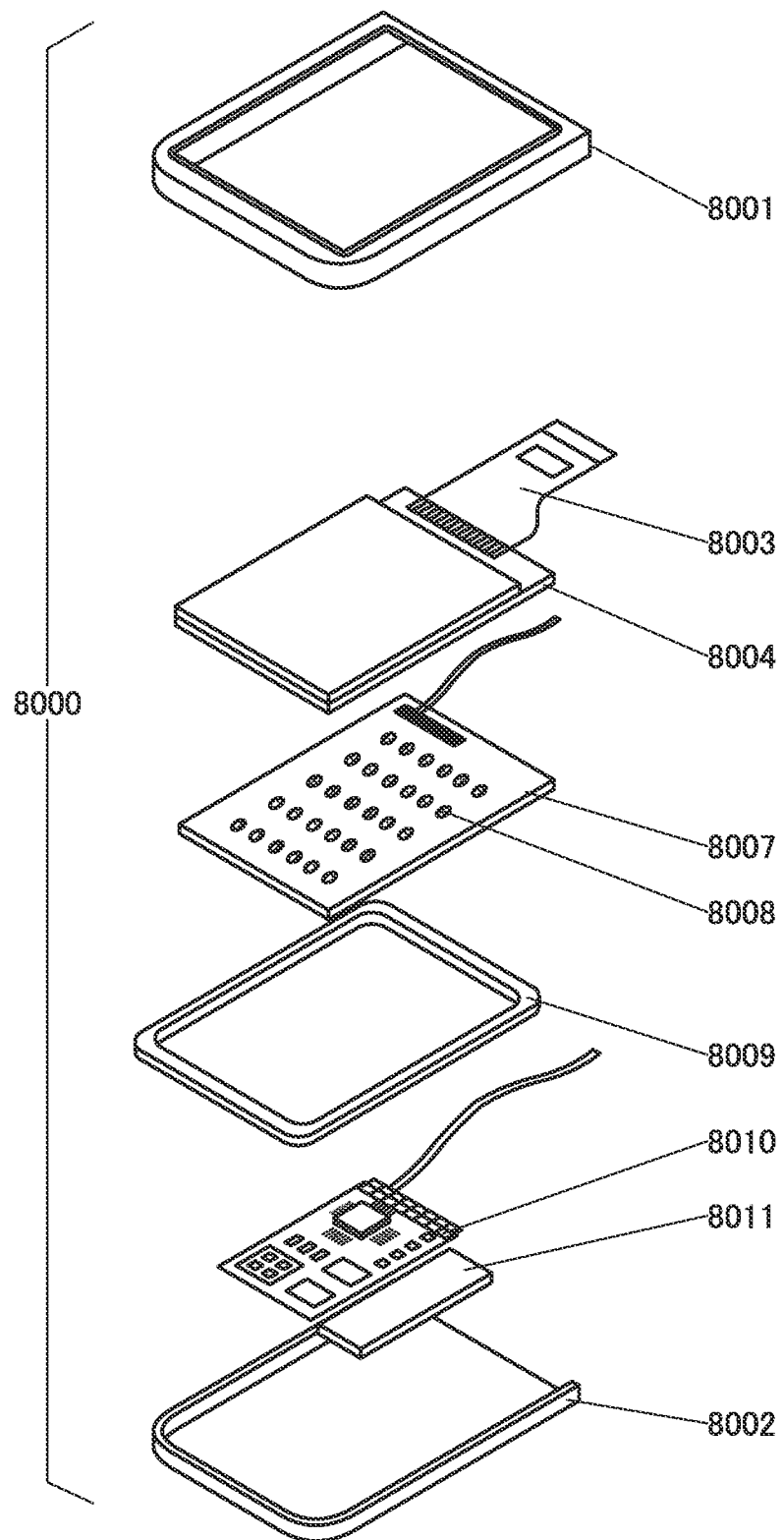
FIG. 90 illustrates a display module of one embodiment.

In a display module 8000 illustrated in FIG. 90, a touch panel 8004 connected to an FPC 8003, a frame 8009, a printed board 8010, and a battery 8011 are provided between an upper cover 8001 and a lower cover 8002.

The touch panel of one embodiment of the present invention can be used for the touch panel 8004, for example.

The shapes and sizes of the upper cover 8001 and the lower cover 8002 can be changed as appropriate in accordance with the size of the touch panel 8004.

The touch panel 8004 can be a resistive touch panel or a capacitive touch panel and may be formed so as to overlap with a display panel. A counter substrate (sealing substrate) of the touch panel 8004 can have a touch panel function. A photosensor may be provided in each pixel of the touch panel 8004 so that an optical touch panel can be obtained.

In the case of a transmissive liquid crystal element, a backlight 8007 may be provided as illustrated in FIG. 90. The backlight 8007 includes a light source 8008. Note that although a structure in which the light source 8008 is provided over the backlight 8007 is illustrated in FIG. 90, one embodiment of the present invention is not limited to this structure. For example, a structure in which the light source 8008 is provided at an end portion of the backlight 8007 and a light diffusion plate is further provided may be employed. Note that the backlight 8007 needs not be provided in the case where a self-luminous light-emitting element such as an organic EL element is used or in the case where a reflective panel or the like is employed.

The frame 8009 protects the touch panel 8004 and functions as an electromagnetic shield for blocking electromagnetic waves generated by the operation of the printed board 8010. The frame 8009 can also function as a radiator plate.

The printed board 8010 is provided with a power supply circuit and a signal processing circuit for outputting a video signal and a clock signal. As a power source for supplying electric power to the power supply circuit, an external commercial power source or a power source using the battery 8011 provided separately may be used. The battery 8011 can be omitted in the case of using a commercial power source.

The touch panel 8004 can be additionally provided with a component such as a polarizing plate, a retardation plate, or a prism sheet.

FIGS. 91A to 91H and FIGS. 92A and 92B illustrate electronic devices. These electronic devices can each include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 91A:
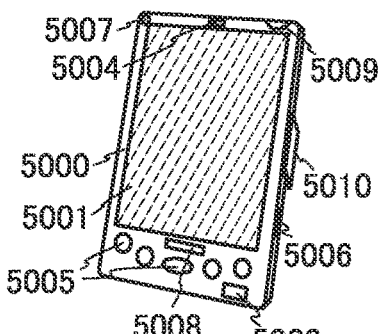
FIGS. 91A to 91H each illustrate an electronic device of one embodiment.
Figure 91B:
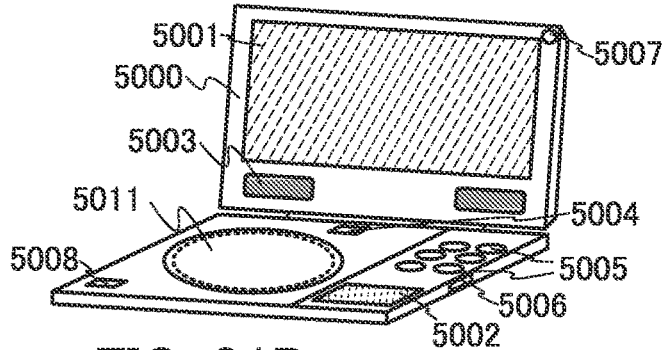
Figure 91C:
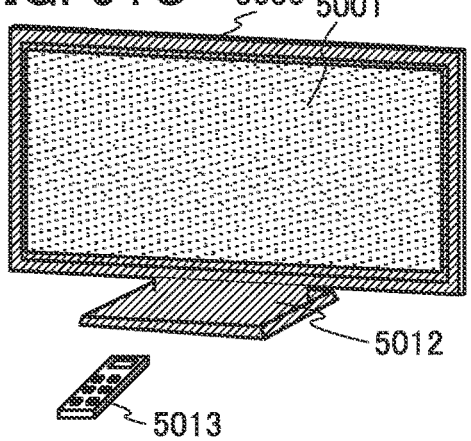
Figure 91D:
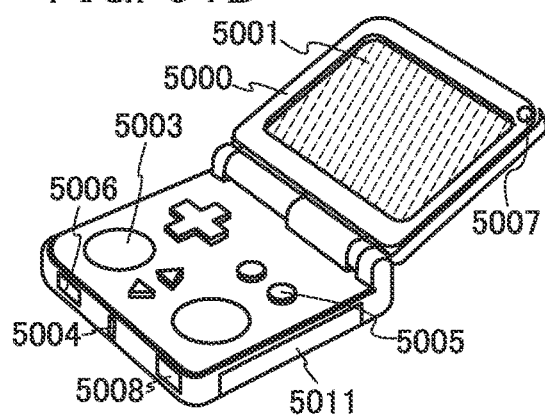
Figure 91E:
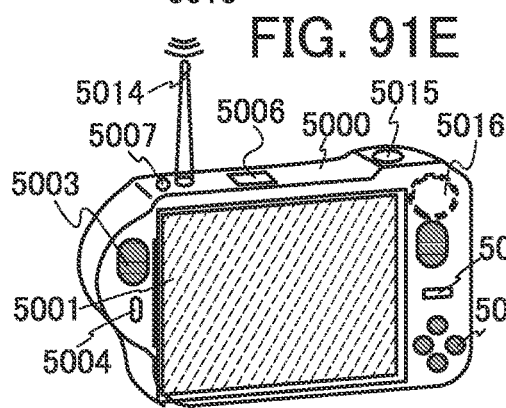
Figure 91F:
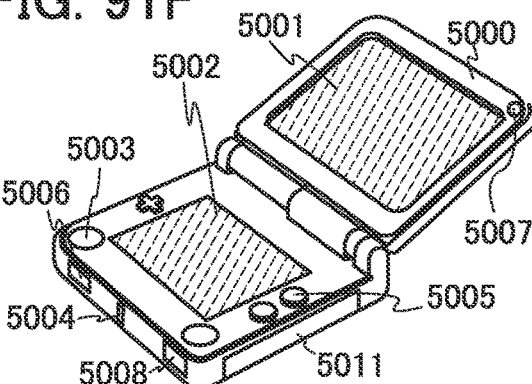
Figure 91G:
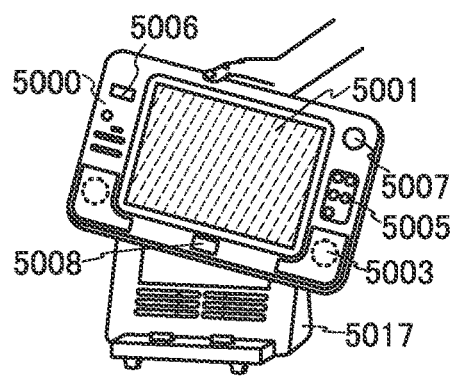
Figure 91H:
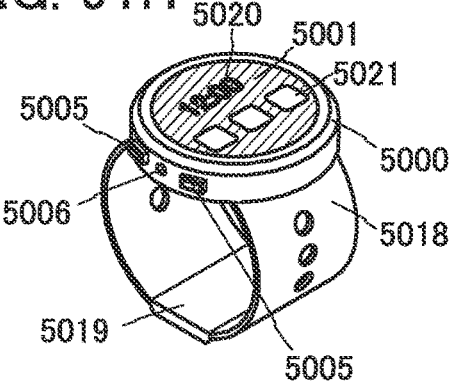
Figure 92A:
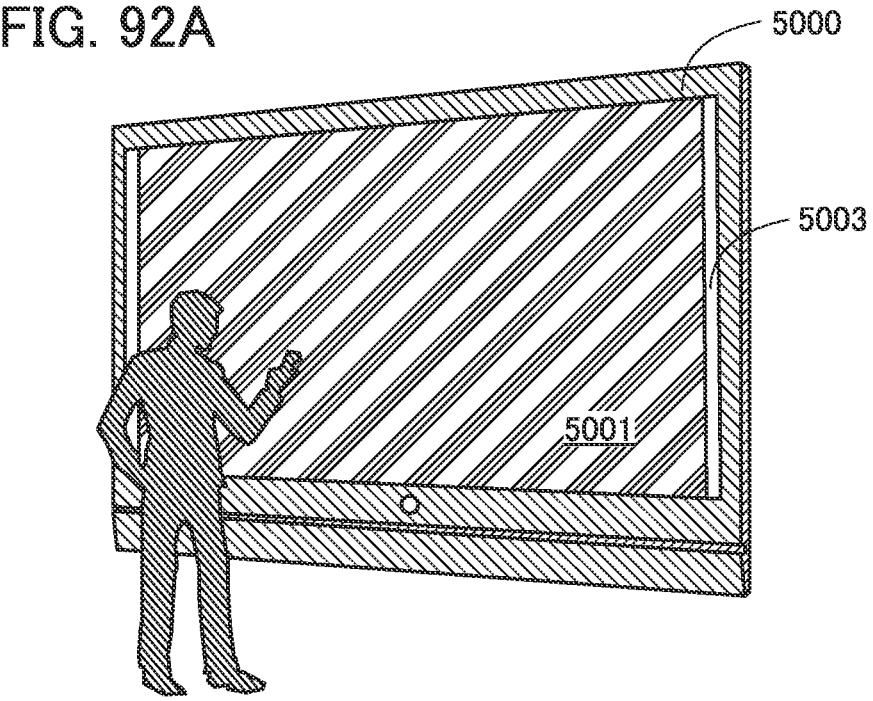
FIGS. 92A and 92B each illustrate an electronic device of one embodiment.
Figure 92B:
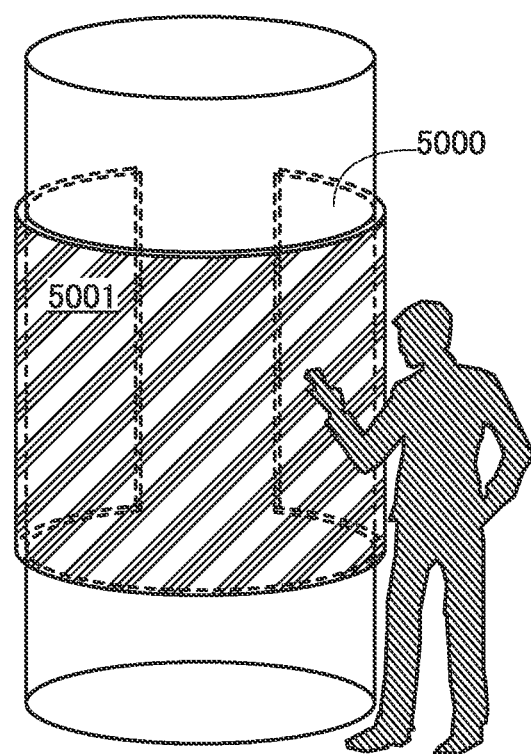

FIG. 91A illustrates a mobile computer, which can include a switch 5009, an infrared port 5010, and the like in addition to the above components. FIG. 91B illustrates a portable image reproducing device provided with a recording medium (e.g., a DVD reproducing device), which can include a second display portion 5002, a recording medium reading portion 5011, and the like in addition to the above components. FIG. 91C illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013. FIG. 91D illustrates a portable game machine, which can include the recording medium reading portion 5011 and the like in addition to the above components. FIG. 91E illustrates a digital camera that has a television reception function and can include an antenna 5014, a shutter button 5015, an image receiving portion 5016, and the like in addition to the above components. FIG. 91F illustrates a portable game machine, which can include the second display portion 5002, the recording medium reading portion 5011, and the like in addition to the above components. FIG. 91G illustrates a portable television receiver, which can include a charger 5017 capable of transmitting and receiving signals, and the like in addition to the above components. FIG. 91H illustrates a wrist-watch-type information terminal, which can include a band 5018, a clasp 5019, and the like in addition to the above components. The display portion 5001 mounted in the housing 5000 also serving as a bezel includes a non-rectangular display region. The display portion 5001 can display an icon 5020 indicating time, another icon 5021, and the like. FIG. 92A illustrates a digital signage. FIG. 92B illustrates a digital signage mounted on a cylindrical pillar.

The electronic devices illustrated in FIGS. 91A to 91H and FIGS. 92A and 92B can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a recording medium and displaying the program or data on a display portion. Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a recording medium (an external recording medium or a recording medium incorporated in the camera), a function of displaying a photographed image on a display portion, or the like. Note that the functions of the electronic devices illustrated in FIGS. 91A to 91H and FIGS. 92A and 92B are not limited thereto, and the electronic devices can have a variety of functions.

The electronic devices in this embodiment each include a display portion for displaying some kind of information. The touch panel of one embodiment of the present invention can be used for the display portion.

At least part of this embodiment can be implemented in combination with any of the other embodiments described in this specification as appropriate.

EXPLANATION OF REFERENCE

10: touch panel, 11: substrate, 12: substrate, 13: FPC, 14: conductive layer, 15: connection layer, 20: liquid crystal element, 21: conductive layer, 22: conductive layer, 23: liquid crystal, 31: coloring layer, 41: conductive layer, 41*a*: conductive layer, 41*b*: conductive layer, 51: pixel electrode, 52: common electrode, 55: sensor electrode, 56: sensor electrode, 57: wiring, 61: wiring, 62: wiring, 63: transistor, 64: liquid crystal element, 65_1: block, 65_2: block, 66: wiring, 71: wiring, 71_1: wiring, 71_2: wiring, 72: wiring, 72_1: wiring, 72_2: wiring, 81: source line, 82: source line, 83: source line, 84: source line, 85: gate line, 86: gate line, 87: gate line, 88: gate line, 100: display device, 151: connection layer, 201: transistor, 202: light-emitting element, 203: transistor, 206: connection portion, 207: conductive layer, 208: liquid crystal element, 209: connection layer, 211: insulating layer, 212: insulating layer, 213: insulating layer, 214: insulating layer, 215: insulating layer, 216: spacer, 217: insulating layer, 231: coloring layer, 232: light-blocking layer, 251: conductive layer, 252: conductive layer, 253: liquid crystal, 254: insulating layer, 255: insulating layer, 262: region, 263: region, 281: gate electrode, 282: gate electrode, 283: gate electrode, 284: gate electrode, 285: drain electrode, 310: touch panel, 311: conductive layer, 321: conductive layer, 322: EL layer, 323: conductive layer, 324: optical adjustment layer, 331: conductive layer, 332: conductive layer, 335: conductive layer, 341: conductive layer, 351: conductive layer, 352: conductive layer, 371: substrate, 372: substrate, 373: FPC, 373*a*: FPC, 373*b*: FPC, 374: IC, 381: display portion, 382: driver circuit, 383: wiring, 384: driver circuit, 385: connection portion, 386: connector, 401: conductive layer, 402: conductive layer, 404: conductive layer, 405: conductive layer, 411*a*: conductive layer, 411*a*_1: conductive layer, 411*aa*: conductive layer, 411*b*: conductive layer, 411*b*_1: conductive layer, 411*bb*: conductive layer, 411*c*: conductive layer, 412*a*: conductive layer, 412*aa*: conductive layer, 412*b*: conductive layer, 412*bb*: conductive layer, 412*c*: conductive layer, 500A: display device, 500B: display device, 510: pixel portion, 511: pixel, 520_1: gate driver, 520_2: gate driver, 530: source driver, 531: TAB tape, 532_*k*: source driver IC, 532_1: source driver IC, 601: pulse voltage output circuit, 602: current sensing circuit, 603: capacitor, 621: electrode, 622: electrode, 723: electrode, 724*a*: electrode, 724*b*: electrode, 725: layer, 726: insulating layer, 727: insulating layer, 728: insulating layer, 729: insulating layer, 741: insulating layer, 742: semiconductor layer, 742*a*: semiconductor layer, 742*b*: semiconductor layer, 742*c*: semiconductor layer, 743: electrode, 744*a*: electrode, 744*b*: electrode, 746: electrode, 747*a*: opening, 747*b*: opening, 747*c*: opening, 747*d*: opening, 755: impurity, 771: substrate, 772: insulating layer, 775: insulating layer, 810: transistor, 811: transistor, 820: transistor, 821: transistor, 822: transistor, 825: transistor, 830: transistor, 831: transistor, 834: transistor, 840: transistor, 841: transistor, 842: transistor, 843: transistor, 844: transistor, 845: transistor, 846: transistor, 847: transistor, 848: transistor, 850: transistor, 851: transistor, 852: transistor, 882: Ec, 883*a*: Ec, 883*b*: Ec, 883*c*: Ec, 886: Ec, 887: Ec, 890: trap state, 5000: housing, 5001: display portion, 5002: display portion, 5003: speaker, 5004: LED lamp, 5005:

operation key, 5006: connection terminal, 5007: sensor, 5008: microphone, 5009: switch, 5010: infrared port, 5011: recording medium reading portion, 5012: stand, 5013: remote controller, 5014: antenna, 5015: shutter button, 5016: image receiving portion, 5017: charger, 5018: band, 5019: clasp, 5020: icon, 5021: icon, 8000: display module, 8001: upper cover, 8002: lower cover, 8003: FPC, 8004: touch panel, 8006: display panel, 8007: backlight, 8008: light source, 8009: frame, 8010: printed board, 8011: battery This application is based on Japanese Patent Application serial no. 2015-066887 filed with Japan Patent Office on Mar. 27, 2015 and Japanese Patent Application serial no. 2015-081398 filed with Japan Patent Office on Apr. 13, 2015, the entire contents of which are hereby incorporated by reference.

The invention claimed is:

1. A display device comprising:
a first substrate;
a second substrate;
a liquid crystal element using a fringe field switching mode, the liquid crystal element comprising a pixel electrode comprising a slit;
a transistor comprising a polycrystalline semiconductor in a channel formation region;
a first conductive layer;
a second conductive layer;
a third conductive layer;
a touch sensor;
a source signal line electrically connected to the transistor; and
an FPC,
wherein the first conductive layer comprises a region functioning as one electrode of the touch sensor,
wherein the pixel electrode is provided over and in contact with an insulating layer,
wherein the first conductive layer is electrically connected to the second conductive layer through a first contact hole in the insulating layer,
wherein the pixel electrode is electrically connected to one of a source and a drain of the transistor through a second contact hole in the insulating layer,
wherein the second conductive layer overlaps with the source signal line,
wherein the FPC is electrically connected to the third conductive layer, and
wherein the first conductive layer, the second conductive layer, the third conductive layer, and the liquid crystal element are provided between the first substrate and the second substrate.

2. The display device according to claim 1, wherein the first conductive layer, the second conductive layer, and the third conductive layer are provided over the first substrate.

3. The display device according to claim 1, further comprising a fourth conductive layer over the second conductive layer,
wherein the fourth conductive layer is provided over and in contact with the insulating layer.

4. The display device according to claim 1, further comprising a coloring layer over the pixel electrode.

5. The display device according to claim 1, wherein the first conductive layer is in contact with the insulating layer.

6. The display device according to claim 1, wherein the source signal line is configured to supply a video signal to a pixel in the display device.

7. A display device comprising:
a first substrate;
a second substrate;
a liquid crystal element using a fringe field switching mode, the liquid crystal element comprising a pixel electrode comprising a slit;
a transistor comprising silicon in a channel formation region;
a first conductive layer;
a second conductive layer;
a third conductive layer;
a touch sensor;
a source signal line electrically connected to the transistor; and
an FPC,
wherein the first conductive layer comprises a region functioning as one electrode of the touch sensor,
wherein the pixel electrode is provided over and in contact with an insulating layer,
wherein the first conductive layer is electrically connected to the second conductive layer through a first contact hole in the insulating layer,
wherein the pixel electrode is electrically connected to one of a source and a drain of the transistor through a second contact hole in the insulating layer,
wherein the second conductive layer overlaps with the source signal line,
wherein the FPC is electrically connected to the third conductive layer, and
wherein the first conductive layer, the second conductive layer, the third conductive layer, and the liquid crystal element are provided between the first substrate and the second substrate.

8. The display device according to claim 7, wherein the first conductive layer, the second conductive layer, and the third conductive layer are provided over the first substrate.

9. The display device according to claim 7, further comprising a fourth conductive layer over the second conductive layer,
wherein the fourth conductive layer is provided over and in contact with the insulating layer.

10. The display device according to claim 7, further comprising a coloring layer over the pixel electrode.

11. The display device according to claim 7, wherein the first conductive layer is in contact with the insulating layer.

12. The display device according to claim 7, wherein the source signal line is configured to supply a video signal to a pixel in the display device.

13. A display device comprising:
a first substrate;
a second substrate;
a liquid crystal element using a fringe field switching mode, the liquid crystal element comprising a pixel electrode comprising a slit;
a transistor electrically connected to the liquid crystal element;
a first conductive layer;
a second conductive layer;
a third conductive layer;
a touch sensor;
a source signal line electrically connected to the transistor; and
an FPC,
wherein the first conductive layer comprises a region functioning as one electrode of the touch sensor,
wherein the pixel electrode is provided over and in contact with an insulating layer,
wherein the first conductive layer is electrically connected to the second conductive layer through a first contact hole in the insulating layer, wherein the pixel electrode is electrically connected to one of a source and a drain of the transistor through a second contact hole in the insulating layer, wherein the second conductive layer overlaps with the source signal line, wherein the FPC is electrically connected to the third conductive layer, and wherein the first conductive layer, the second conductive layer, the third conductive layer, and the liquid crystal element are provided between the first substrate and the second substrate.

14. The display device according to claim 13, wherein the first conductive layer, the second conductive layer, and the third conductive layer are provided over the first substrate.

15. The display device according to claim 13, further comprising a fourth conductive layer over the second conductive layer, wherein the fourth conductive layer is provided over and in contact with the insulating layer.

16. The display device according to claim 13, further comprising a coloring layer over the pixel electrode.

17. The display device according to claim 13, wherein the first conductive layer is in contact with the insulating layer.

18. The display device according to claim 13, wherein the source signal line is configured to supply a video signal to a pixel in the display device.

* * * * *